US012577262B2

(12) United States Patent
Sessler et al.

(10) Patent No.: US 12,577,262 B2
(45) Date of Patent: Mar. 17, 2026

(54) FUNCTIONALIZED GOLD CARBENE NAPTHAQUINONE COMPLEXES FOR USE IN THE TREATMENT OF CANCER

(71) Applicant: Board of Regents, The University of Texas System, Austin, TX (US)

(72) Inventors: Jonathan L. Sessler, Austin, TX (US); Sajal Sen, Austin, TX (US); Jonathan F. Arambula, Austin, TX (US); Zhengrong Cui, Austin, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 1088 days.

(21) Appl. No.: 17/595,670

(22) PCT Filed: May 22, 2020

(86) PCT No.: PCT/US2020/034415

§ 371 (c)(1),
(2) Date: Nov. 22, 2021

(87) PCT Pub. No.: WO2020/237225

PCT Pub. Date: Nov. 26, 2020

(65) Prior Publication Data

US 2022/0340601 A1 Oct. 27, 2022

Related U.S. Application Data

(60) Provisional application No. 62/851,187, filed on May 22, 2019.

(51) Int. Cl.

| | |
|---|---|
| ***C07F 1/10*** | (2006.01) |
| ***A61K 31/4178*** | (2006.01) |
| ***A61K 31/4184*** | (2006.01) |
| ***A61P 33/00*** | (2006.01) |
| ***A61P 35/00*** | (2006.01) |
| ***C07F 1/12*** | (2006.01) |

(52) U.S. Cl.
CPC .................................... *C07F 1/12* (2013.01)

(58) Field of Classification Search
CPC .......... C07F 1/10; C07F 1/12; A61K 31/4178; A61K 31/4184; A61P 33/00; A61P 35/00
See application file for complete search history.

(56) References Cited

U.S. PATENT DOCUMENTS

| | | | |
|---|---|---|---|
| 2013/0026453 | A1 | 1/2013 | Kunze et al. |
| 2017/0129911 | A1 | 5/2017 | Lippard et al. |

FOREIGN PATENT DOCUMENTS

| | | | |
|---|---|---|---|
| CN | 102821849 A | 12/2012 | |
| CN | 104220441 A | 12/2014 | |
| WO | WO 2011/107736 A1 | 9/2011 | |
| WO | WO 2013/122823 A1 | 8/2013 | |
| WO | WO 2019/006327 | 1/2019 | |

OTHER PUBLICATIONS

Ceccherini et al., Synthesis, Chemical Characterization, and Biological Evaluation of Hydrophilic Gold(I) and Silver(I) N-Heterocyclic Carbenes as Potential Anticancer Agents, Inorganic Chemistry, vol. 63, pp. 16949-16963 (Year: 2024).*

Office Communication issued in Chinese Application No. 202080050300.4, dated Feb. 7, 2024. English Translation.

Aguirre, J. Dafhne, et al. "Anticancer activity of heteroleptic diimine complexes of dirhodium: A study of intercalating properties, hydrophobicity and in cellulo activity." *Dalton Transactions* 48 (2009): 10806-10812.

Ai, Yong, et al. "Discovery of new monocarbonyl ligustrazine-curcumin hybrids for intervention of drug-sensitive and drug-resistant lung cancer." *Journal of medicinal chemistry* 59.5 (2016): 1747-1760.

Antonarakis, Emmanuel S., and Ashkan Emadi. "Ruthenium-based chemotherapeutics: are they ready for prime time?." *Cancer chemotherapy and pharmacology* 66 (2010): 1-9.

Apetoh, Lionel, et al. "Toll-like receptor 4-dependent contribution of the immune system to anticancer chemotherapy and radiotherapy." *Nature medicine* 13.9 (2007): 1050-1059.

Arambula, J. F., et al. "Targeting antioxidant pathways with ferrocenylated N-heterocyclic carbene supported gold (I) complexes in A549 lung cancer cells." *Chemical science* 7.2 (2016): 1245-1256.

Arnér, Elias SJ, and Arne Holmgren. "Physiological functions of thioredoxin and thioredoxin reductase." *European journal of biochemistry* 267.20 (2000): 6102-6109.

Arshad, Fatima, et al. "Revealing quinquennial anticancer journey of morpholine: A SAR based review." *European journal of medicinal chemistry* 167 (2019): 324-356.

Baker, Murray V., et al. "Cationic, linear Au (I) N-heterocyclic carbene complexes: synthesis, structure and anti-mitochondrial activity." *Dalton Transactions* 30 (2006): 3708-3715.

Barry, Nicolas PE, and Peter J. Sadler. "Exploration of the medical periodic table: towards new targets." *Chemical Communications* 49.45 (2013): 5106-5131.

Berggren M, Gallegos A, Gasdaska JR, Gasdaska PY, Warneke J, Powis G. Thioredoxin and thioredoxin reductase gene expression in human tumors and cell lines, and the effects of serum stimulation and hypoxia. Anticancer Res. Nov.-Dec. 1996;16(6B):3459-66. PMID: 9042207.

Berners-Price, Susan J., and Aleksandra Filipovska. "Gold compounds as therapeutic agents for human diseases." *Metallomics* 3.9 (2011): 863-873.

(Continued)

*Primary Examiner* — Brenda L Coleman
(74) *Attorney, Agent, or Firm* — pH IP Law

(57) ABSTRACT

The present disclosure relates to functionalized gold carbene naphthoquinone compounds and salts thereof. In some aspects, these compounds can be used to treat cancer including cancers which are resistant to one or more other chemotherapeutic agents such as cisplatin or platinum chemotherapeutic agents. Also provided herein are pharmaceutical compositions comprising the gold carbene naphthoquinone compounds. The present disclosure also provides methods of preparing a cancer vaccine.

17 Claims, 28 Drawing Sheets

(56) References Cited

OTHER PUBLICATIONS

Bertrand et al., *Eur. Inorg. Chem.*, 2014:4532-4536, 2014.
Bezu, Lucillia, et al. "Combinatorial strategies for the induction of immunogenic cell death." *Frontiers in immunology* 6 (2015): 187.
Blachère, Nathalie E., Robert B. Darnell, and Matthew L. Albert. "Apoptotic cells deliver processed antigen to dendritic cells for cross-presentation." *PLoS biology* 3.6 (2005): e185.
Boselli, Luca et al. "Synthesis, structures, and selective toxicity to cancer cells of gold(I) complexes involving N-heterocyclic carbene ligands." *European journal of medicinal chemistry* vol. 85 (2014): 87-94.
Casares N, Pequignot MO, Tesniere A, Ghiringhelli F, Roux S, Chaput N, Schmitt E, Hamai A, Hervas-Stubbs S, Obeid M, Coutant F, Métivier D, Pichard E, Aucouturier P, Pierron G, Garrido C, Zitvogel L, Kroemer G. Caspase-dependent immunogenicity of doxorubicin-induced tumor cell death. J Exp Med. Dec. 19, 2005;202(12):1691-701. doi: 10.1084/jem.20050915.
Che, Chi-Ming, and Raymond Wai-Yin Sun. "Therapeutic applications of gold complexes: lipophilic gold (III) cations and gold (I) complexes for anti-cancer treatment." *Chemical Communications* 47.34 (2011): 9554-9560.
Cisnetti, Federico, Clementine Gibard, and Arnaud Gautier. "Post-functionalization of metal-NHC complexes: A useful toolbox for bioorganometallic chemistry (and beyond)?." *Journal of Organometallic Chemistry* 782 (2015): 22-30.
Citta, Anna, et al. "Fluorescent silver (i) and gold (i)-N-heterocyclic carbene complexes with cytotoxic properties: mechanistic insights." *Metallomics* 5.8 (2013): 1006-1015.
Colotti, Gianni, et al. "Metal-based compounds as prospective antileishmanial agents: inhibition of trypanothione reductase by selected gold complexes." *ChemMedChem* 8.10 (2013): 1634-1637.
De Haro T, Nevado C. Flexible gold-catalyzed regioselective oxidative difunctionalization of unactivated alkenes. Angew Chem Int Ed Engl. Jan. 24, 2011;50(4):906-10. doi: 10.1002/anie.201005763. Epub Jan. 17, 2011.
Di Sarra, Francesca, et al. "Reactivity of auranofin with selenols and thiols—implications for the anticancer activity of gold (I) compounds." *European Journal of Inorganic Chemistry* 2013.15 (2013): 2718-2727.
Diebl, Tobias et al. "Synthesis of hydroxyl-functionalized N-heterocyclic carbene gold(i) complexes and peptide conjugates." *Dalton transactions* (*Cambridge, England : 2003*) vol. 46,9 (2017): 2988-2997.
Diehn, Maximilian, et al. "Association of reactive oxygen species levels and radioresistance in cancer stem cells." *nature* 458.7239 (2009): 780-783.
Enomoto, Masashi, Akihiro Kishimura, and Takuzo Aida. "Coordination metallacycles of an achiral dendron self-assemble via metal-metal interaction to form luminescent superhelical fibers." *Journal of the American Chemical Society* 123.23 (2001): 5608-5609.
Eriksson, Sofi E., et al. "High levels of thioredoxin reductase 1 modulate drug-specific cytotoxic efficacy." *Free Radical Biology and Medicine* 47.11 (2009): 1661-1671.
Extended European Search Report issued in European Application No. 20809519.0, dated Apr. 21, 2023.
Fan, Fangfang, Yuan Zhao, and Zexing Cao. "Insight into the delivery channel and selectivity of multiple binding sites in bovine serum albumin towards naphthalimide-polyamine derivatives." *Physical Chemistry Chemical Physics* 21.14 (2019): 7429-7439.
Farkona, Sofia, Eleftherios P. Diamandis, and Ivan M. Blasutig. "Cancer immunotherapy: the beginning of the end of cancer?." *BMC medicine* 14.1 (2016): 1-18.
Fernández, Eduardo J., Antonio Laguna, and José M. López-de-Luzuriaga. "Gold-heterometal complexes. Evolution of a new class of luminescent materials." *Dalton Transactions* 20 (2007): 1969-1981.
Ferwerda, Bart, et al. "TLR4 polymorphisms, infectious diseases, and evolutionary pressure during migration of modern humans." *Proceedings of the National Academy of Sciences* 104.42 (2007): 16645-16650.
Gaillard, Sylvain, et al. "Expeditious synthesis of [Au (NHC)(L)]+ (NHC= N-heterocyclic carbene; L= phosphine or NHC) complexes." *Organometallics* 29.21 (2010): 5402-5408.
Galanski, Markus, Michael A. Jakupec, and Bernhard K. Keppler. "Update of the preclinical situation of anticancer platinum complexes: novel design strategies and innovative analytical approaches." *Current medicinal chemistry* 12.18 (2005): 2075-2094.
Gorin, David J., and F. Dean Toste. "Relativistic effects in homogeneous gold catalysis." *Nature* 446.7134 (2007): 395-403.
Gorrini, Chiara, Isaac S. Harris, and Tak W. Mak. "Modulation of oxidative stress as an anticancer strategy." *Nature reviews Drug discovery* 12.12 (2013): 931-947.
Gromer, Stephan, Sabine Urig, and Katja Becker. "The thioredoxin system—from science to clinic." *Medicinal research reviews* 24.1 (2004): 40-89.
Groves, Lara M., et al. "Fluorescent functionalised naphthalimides and their Au (I)-NHC complexes for potential use in cellular bioimaging." *Dalton Transactions* 48.5 (2019): 1599-1612.
Guo, Shuai, et al. "Gold and palladium hetero-bis-NHC complexes: characterizations, correlations, and ligand redistributions." *Organometallics* 32.13 (2013): 3685-3696.
Hashmi, A. Stephen K., et al. "A new gold-catalyzed C—C bond formation." *Angewandte Chemie International Edition* 39.13 (2000): 2285-2288.
Hickey, James L., et al. "Mitochondria-targeted chemotherapeutics: the rational design of gold (I) N-heterocyclic carbene complexes that are selectively toxic to cancer cells and target protein selenols in preference to thiols." *Journal of the American Chemical Society* 130.38 (2008): 12570-12571.
Hill, David T., et al. "[. mu.-1, l'-Bis (diphenylphosphino) ferrocene] bis (chlorogold): synthesis, iron-57 and gold-197 Moessbauer spectroscopy, x-ray crystal structure, and antitumor activity." *Inorganic Chemistry* 28.18 (1989): 3529-3533.
Hillenmeyer ME, Fung E, Wildenhain J, Pierce SE, Hoon S, Lee W, Proctor M, St Onge RP, Tyers M, Koller D, Altman RB, Davis RW, Nislow C, Giaever G. The chemical genomic portrait of yeast: uncovering a phenotype for all genes. Science. Apr. 18, 2008;320(5874):362-5. doi: 10.1126/science.1150021.
Hong Y, Lam JW, Tang BZ. Aggregation-induced emission: phenomenon, mechanism and applications. Chem Commun (Camb). Aug. 7, 2009;(29):4332-53. doi: 10.1039/b904665h. Epub May 13, 2009.
Hopkins, Andrew L. "Network pharmacology: the next paradigm in drug discovery." *Nature chemical biology* 4.11 (2008): 682-690.
Hospital et al. Access to functionalised silver(I) and gold(I) N-heterocyclic carbenes by [2+3] dipolar cycloadditions. Dalton Trans. Jun. 14, 2012;41(22):6803-12. doi: 10.1039/c2dt30249g. Epub Apr. 20, 2012.
Ibrahim, Houssein, et al. "'Auto-click' functionalization for diversified copper (i) and gold (i) NHCs." *Dalton Transactions* 43.19 (2014): 6981-6989.
International Search Report and Written Opinion issued in International Application No. PCT/US2020/034415, dated Oct. 22, 2020.
Ishizaki, Akihito, et al. "Quantum coherence and its interplay with protein environments in photosynthetic electronic energy transfer." *Physical Chemistry Chemical Physics* 12.27 (2010): 7319-7337.
Kaufmann, Stefan HE. "Paul Ehrlich: founder of chemotherapy." *Nature Reviews Drug Discovery* 7.5 (2008): 373-373.
Kepp, Oliver, Laura Senovilla, and Guido Kroemer. "Immunogenic cell death inducers as anticancer agents." *Oncotarget* 5.14 (2014): 5190.
Kim, Seung Jin, et al. "High thioredoxin expression is associated with resistance to docetaxel in primary breast cancer." *Clinical Cancer Research* 11.23 (2005): 8425-8430.
Kimutai, Bett, et al. "Amino acid-linked platinum (II) compounds: non-canonical nucleoside preferences and influence on glycosidic bond stabilities." *JBIC Journal of Biological Inorganic Chemistry* 24 (2019): 985-997.

(56) References Cited

OTHER PUBLICATIONS

Lazreg, Faima, et al. "Synthesis of homoleptic and heteroleptic bis-N-heterocylic carbene group 11 complexes." *Organometallics* 34.2 (2015): 419-425.
Le Joncour, Vadim, and Pirjo Laakkonen. "Seek & Destroy, use of targeting peptides for cancer detection and drug delivery." *Bioorganic & medicinal chemistry* 26.10 (2018): 2797-2806.
Lewe, V., et al. "A clickable NHC-Au (i)-complex for the preparation of stimulus-responsive metallopeptide amphiphiles." *Chemical Communications* 54.68 (2018): 9498-9501.
Li, Yi, et al. "Antitumor properties and mechanisms of mitochondria-targeted Ag (I) and Au (I) complexes containing N-heterocyclic carbenes derived from cyclophanes." *Metallomics* 6.8 (2014): 1460-1468.
Li, Zigang, Chad Brouwer, and Chuan He. "Gold-catalyzed organic transformations." *Chemical reviews* 108.8 (2008): 3239-3265.
Lima, Joao Carlos, and Laura Rodriguez. "Applications of gold (I) alkynyl systems: a growing field to explore." *Chemical Society Reviews* 40.11 (2011): 5442-5456.
Liu, Qi et al. "Tunable Multicolor Phosphorescence of Crystalline Polymeric Complex Salts with Metallophilic Backbones." *Angewandte Chemie* (*International ed. in English*) vol. 57,21 (2018): 6279-6283.
Lu J, Chew EH, Holmgren A. Targeting thioredoxin reductase is a basis for cancer therapy by arsenic trioxide. Proc Natl Acad Sci U S A. Jul. 24, 2007;104(30):12288-93. doi: 10.1073/pnas.0701549104. Epub Jul. 18, 2007.
Mahoney, Kathleen M., Paul D. Rennert, and Gordon J. Freeman. "Combination cancer immunotherapy and new immunomodulatory targets." *Nature reviews Drug discovery* 14.8 (2015): 561-584.
Mamane, Victor, et al. "Platinum-and gold-catalyzed cycloisomerization reactions of bydroxylated enynes." *Journal of the American Chemical Society* 126.28 (2004): 8654-8655.
Marion, Nicolas, and Steven P. Nolan. "N-Heterocyclic carbenes in gold catalysis." *Chemical Society Reviews* 37.9 (2008): 1776-1782.
Marqus S, Pirogova E, Piva TJ. Evaluation of the use of therapeutic peptides for cancer treatment. J Biomed Sci. Mar. 21, 2017;24(1):21.
Marzano, Christine, et al. "Inhibition of thioredoxin reductase by auranofin induces apoptosis in cisplatin-resistant human ovarian cancer cells." *Free Radical Biology and Medicine* 42.6 (2007): 872-881.
Matzinger P. The danger model: a renewed sense of self. Science. Apr. 12, 2002;296(5566):301-5.
McCall, R et al. "Dual targeting of the cancer antioxidant network with 1,4-naphthoquinone fused Gold(i) N-heterocyclic carbene complexes." *Chemical science* vol. 8,9 (2017): 5918-5929.
Meléndez, Enrique. "Titanium complexes in cancer treatment." *Critical reviews in oncology/hematology* 42.3 (2002): 309-315.
Mirabell, Christopher K., et al. "Correlation of the in vitro cytotoxic and in vivo antitumor activities of gold (I) coordination complexes." *Journal of medicinal chemistry* 29.2 (1986): 218-223.
Mirabelli, Christopher K., et al. "Evaluation of the in vivo antitumor activity and in vitro cytotoxic properties of auranofin, a coordinated gold compound, in murine tumor models." *Cancer research* 45.1 (1985): 32-39.
Mo, Shengpeng, et al. "Low-temperature CO oxidation over integrated penthorum chinense-like MnCo 2 O 4 arrays anchored on three-dimensional Ni foam with enhanced moisture resistance." *Catalysis Science & Technology* 8.6 (2018): 1663-1676.
Mora, Malka, M. Concepción Gimeno, and Renso Visbal. "Recent advances in gold-NHC complexes with biological properties." *Chemical Society Reviews* 48.2 (2019): 447-462.
Ni et al. "Osmium (VI) complexes as a new class of potential anti-cancer agents." *Chemical Communications* 47.7 (2011): 2140-2142.
Nieto-Oberhuber, Cristina, et al. "Cationic gold (I) complexes: highly alkynophilic catalysts for the exo-and endo-cyclization of enynes." *Angewandte Chemie* 116.18 (2004): 2456-2460.
Niu, Weijia, et al. "N-Heterocyclic Carbene-Gold (I) Complexes Conjugated to a Leukemia-Specific DNA Aptamer for Targeted Drug Delivery." *Angewandte Chemie International Edition* 55.31 (2016): 8889-8893.
Obeid, Michel, et al. "Calreticulin exposure dictates the immunogenicity of cancer cell death." *Nature medicine* 13.1 (2007): 54-61.
Ohara, Hisashi et al. "Effect of chelating ring size in catalytic ketone hydrogenation: facile synthesis of ruthenium(II) precatalysts containing an N-heterocyclic carbene with a primary amine donor for ketone hydrogenation and a DFT study of mechanisms." *Dalton transactions* (*Cambridge, England : 2003*) vol. 41,29 (2012): 8797-808.
Ooi, Siew Loon, et al. "Global synthetic-letbality analysis and yeast functional profiling." *Trends in Genetics* 22.1 (2006): 56-63.
Porchia, Marina, et al. "New insights in Au-NHCs complexes as anticancer agents." *European journal of medicinal chemistry* 146 (2018): 709-746.
Prühs, Stefan, Christian W. Lehmann, and Alois Fürstner. "Preparation, reactivity, and structural peculiarities of hydroxyalkyl-functionalized "second-generation" ruthenium carbene complexes." *Organometallics* 23.2 (2004): 280-287.
Puddephatt, R. J. "Macrocycles, catenanes, oligomers and polymers in gold chemistry." *Chemical Society Reviews* 37.9 (2008): 2012-2027.
Raffel, Jennifer, et al. "Increased expression of thioredoxin-1 in human colorectal cancer is associated with decreased patient survival." *Journal of laboratory and clinical medicine* 142.1 (2003): 46-51.
Rijal, Keshab, Xun Bao, and Christine S. Chow. "Amino acid-linked platinum (II) analogues have altered specificity for RNA compared to cisplatin." *Chemical Communications* 50.30 (2014): 3918-3920.
Sancho, David, et al. "Tumor therapy in mice via antigen targeting to a novel, DC-restricted C-type lectin." *The Journal of clinical investigation* 118.6 (2008): 2098-2110.
Savill, John, and Valerie Fadok. "Corpse clearance defines the meaning of cell death." *Nature* 407.6805 (2000): 784-788.
Schumacker, Paul T. "Reactive oxygen species in cancer cells: live by the sword, die by the sword." *Cancer cell* 10.3 (2006): 175-176.
Search Report and Written Opinion issued in Singapore Application No. 11202112856Q, dated Apr. 21, 2023.
Sedgwick, Adam C., et al. "Excited-state intramolecular proton-transfer (ESIPT) based fluorescence sensors and imaging agents." *Chemical Society Reviews* 47.23 (2018): 8842-8880.
Sen, Sajal, et al. "Expanding the biological utility of bis-NHC gold (I) complexes through post synthetic carbamate conjugation." *Chemical Communications* 55.71 (2019): 10627-10630.
Sessler, Jonathan L., and Richard A. Miller. "Texaphyrins: new drugs with diverse clinical applications in radiation and photodynamic therapy." *Biochemical Pharmacology* 59.7 (2000): 733-739.
Sharma, Padmanee, and James P. Allison. "Immune checkpoint targeting in cancer therapy: toward combination strategies with curative potential." *Cell* 161.2 (2015): 205-214.
Sharma, Padmanee, et al. "Novel cancer immunotherapy agents with survival benefit: recent successes and next steps." *Nature Reviews Cancer* 11.11 (2011): 805-812.
Soini Y, Kahlos K, Näpänkangas U, Kaarteenabo-Wiik R, Säily M, Koistinen P, Pääakkö P, Holmgren A, Kinnula VL. Widespread expression of thioredoxin and thioredoxin reductase in non-small cell lung carcinoma. Clin Cancer Res. Jun. 2001;7(6):1750-7.
Sun, Qing-Fu, et al. "Self-assembly of a neutral luminescent Au 12 cluster with D 2 symmetry." *Chemical Communications* 43 (2008): 5514-5516.
Sun, Yang, et al. "Synthesis and spectroscopic characterization of 4-butoxyethoxy-N-octadecyl-1, 8-naphthalimide as a new fluorescent probe for the determination of proteins." *Bioorganic & Medicinal Chemistry Letters* 21.12 (2011): 3798-3804.
Suntharalingam, Kogularamanan, et al. "Necroptosis-inducing rhenium (V) oxo complexes." *Journal of the American Chemical Society* 137.8 (2015): 2967-2974.

(56) References Cited

OTHER PUBLICATIONS

Tacar, Oktay, Pornsak Sriamornsak, and Crispin R. Dass. "Doxorubicin: an update on anticancer molecular action, toxicity and novel drug delivery systems." *Journal of pharmacy and pharmacology* 65.2 (2013): 157-170.
Terenzi, Alessio, et al. "Anticancer metal drugs and immunogenic cell death." *Journal of inorganic biochemistry* 165 (2016): 71-79.
Tesniere, Antoine, et al. "Immunogenic death of colon cancer cells treated with oxaliplatin." *Oncogene* 29.4 (2010): 482-491.
Timerbaev, Andrei R. "Advances in developing tris (8-quinolinolato) gallium (III) as an anticancer drug: critical appraisal and prospects." *Metallomics* 1.3 (2009): 193-198.
Topalian, Suzanne L., George J. Weiner, and Drew M. Pardoll. "Cancer immunotherapy comes of age." *Journal of Clinical Oncology* 29.36 (2011): 4828.
Trachootham, Dunyaporn, Jerome Alexandre, and Peng Huang. "Targeting cancer cells by ROS-mediated mechanisms: a radical therapeutic approach?." *Nature reviews Drug discovery* 8.7 (2009): 579-591.
Vacondio, Federica, et al. "Amino acid derivatives as palmitoylethanolamide prodrugs: synthesis, in vitro metabolism and in vivo plasma profile in rats." *PLoS One* 10.6 (2015): e0128699.
Valent, Peter, et al. "Paul Ehrlich (1854-1915) and his contributions to the foundation and birth of translational medicine." *Journal of innate immunity* 8.2 (2016): 111-120.
Viotte, M., et al. "New potentially cytotoxic thiolatogold (I) complexes of 1, 1'-bis (diphenylphosphino) ferrocene." *Inorganica chimica acta* 253.1 (1996): 71-76.
Visbal, Renso, et al. "Cytotoxicity and biodistribution studies of luminescent Au (I) and Ag (I) N-heterocyclic carbenes. Searching for new biological targets." *Dalton Transactions* 45.38 (2016): 15026-15033.
Wu, Di, et al. "Fluorescent chemosensors: the past, present and future." *Chemical Society Reviews* 46.23 (2017): 7105-7123.
Yam, Vivian Wing-Wah, and Eddie Chung-Chin Cheng. "Highlights on the recent advances in gold chemistry—a photophysical perspective." *Chemical Society Reviews* 37.9 (2008): 1806-1813.
Zhang, Junmin, et al. "Targeting the thioredoxin system for cancer therapy." *Trends in Pharmacological Sciences* 38.9 (2017): 794-808.
Zhang, Xiaonan, et al. "Repurposing of auranofin: Thioredoxin reductase remains a primary target of the drug." *Biochimie* 162 (2019): 46-54.
Zhao, Yuhua, Ethan B. Butler, and Ming Tan. "Targeting cellular metabolism to improve cancer therapeutics." *Cell Death & Disease* 4.3 (2013): e532-e532.
Zhou, Wei, et al. "Systems pharmacology in small molecular drug discovery." *International Journal of Molecular Sciences* 17.2 (2016): 246.
Zou et al. "A binuclear gold(I) complex with mixed bridging diphospbine and bis(N-heterocyclic carbene) ligands shows favorable thiol reactivity and inhibits tumor growth and angiogenesis in vivo." Angew Chem Int Ed Engl. Jun. 2, 2014;53(23):5810-4. doi: 10.1002/anie.201400142. Epub Apr. 11, 2014.
Zou, Taotao, et al. "Chemical biology of anticancer gold (III) and gold (I) complexes." *Chemical Society Reviews* 44.24 (2015): 8786-8801.

* cited by examiner

6

4

4

11

1[$PF_6$]

10

FUNCTIONALIZED GOLD CARBENE NAPTHAQUINONE COMPLEXES FOR USE IN THE TREATMENT OF CANCER

This application is a national phase application under 35 U.S.C. § 371 of International Application No. PCT/US2020/034415, filed May 22, 2020, which claims the benefit of priority to U.S. Provisional Application No. 62/851,187, filed on May 22, 2019, the entire contents of each of which are incorporated herein by reference.

This invention was made with government support under Grant No. R01 CA068682 awarded by the National Institutes of Health. The government has certain rights in the invention.

BACKGROUND

1. Field

The present disclosure relates generally to the fields of medicine, pharmaceutical agents, and chemotherapeutics. The present disclosure relates to gold carbene naphthoquinone complexes and compositions, which can be used to treat cancer.

2. Description of Related Art

Au(I) bis-N-heterocyclic carbene (NHC) complexes have attracted growing interest due to their interesting catalytic (Hashmi et al., 2000; Nieto-Oberhuber et al., 2004; Mamane et al., 2004; Gorin and Toste, 2007; He et al., 2008; Marion and Nolan, 2008; Haro and Nevado, 2011), luminescent (Lima and Rodríguez, 2011; Puddephatt, 2008; Yam and Cheng, 2008; Fernández et al., 2007; Sun et al., 2008; Enomoto et al., 2001) and biological properties (Che and Sun, 2011; Barry and Sadler, 2013; Mora et al., 2019; Berners-Price and Filipovska, 2011; Baker et al., 2006). Although, a vast literature of homoleptic Au(I) bis-NHCs can be found, examples of Au(I) hetero-bis-NHC complexes, which contain two different NHCs, are scarce (Gaillard et al., 2010; Lazreg et al., 2015; 2013). Hetero-bis-NHCs, owing to their asymmetric nature, can be easily exploited for incorporating interesting imidazolium substituents and building up a library for structural-activity relationship (SAR) for biological purposes. In addition to this, few have explored post-synthetic modifications or conjugation of functionalized Au(I)-bis-NHCs to biologically relevant moieties (Diehl et al., 2017). In contrast, examples of similar functionalization in Au(I)-mono NHCs are quite common (Lewe et al., 2018; Cisnetti et al., 2015; Niu et al., 2016; Ibrahim et al., 2014; Hospital et al., 2012). Functionalization occurring at the ligand periphery helps avoid a change in the electronic structure at the metal center. Au(I) bis-NHCs have rarely been functionalized, and known examples have focused on the modification of symmetric complexes. The creation of asymmetric complexes represents a more difficult challenge. However, mono-functionalized systems may prove more suitable for conjugation to other entities, such as tumor-localizing agents, and may impart amphilicity that endows the systems with superior biological properties. Therefore, there remains a need to prepare Au(I)NHC complexes with asymmetric cores which allow for the targeting of multiple cellular pathways.

SUMMARY

In some aspects, the present disclosure provides compounds that are capable of inducing immunogenic cell death in a cell, such as a cancer cell. In some embodiments, these compounds comprise a functional group which allows the compound to be to be joined to another compound, such as a cell targeting group or a second anti-cancer therapeutic agent. In some embodiments, these compounds comprise a metal carbene complex-such as Au(I) carbene complex.

In some aspects, the present disclosure provides compounds of the formula:

(I)

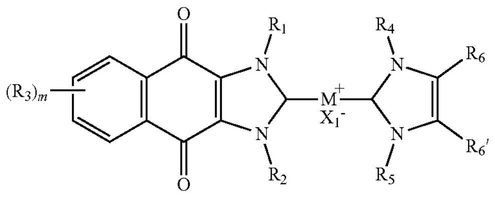

wherein:

M is an Au or Ag ion;

$R_1$ and $R_2$ are each independently alkyl$_{(C\leq12)}$, cycloalkyl$_{(C\leq12)}$, aryl$_{(C\leq18)}$, aralkyl$_{(C\leq18)}$, or a substituted version of any of these groups; or —$(CR_aR_b)C(O)Y_1$; wherein:

$Y_1$ is amino, hydroxy, alkoxy$_{(C\leq8)}$, substituted alkoxy$_{(C\leq8)}$, alkylamino$_{(C\leq8)}$, substituted alkylamino$_{(C\leq8)}$, dialkylamino$_{(C\leq8)}$, or substituted dialkylamino$_{(C\leq8)}$, and $R_a$ and $R_b$ are each independently the side chain of a canonical amino acid or alkyl$_{(C\leq8)}$, cycloalkyl$_{(C\leq8)}$, aryl$_{(C\leq12)}$, aralkyl$_{(C\leq12)}$, heteroaryl$_{(C\leq12)}$, heteroaralkyl$_{(C\leq12)}$, or a substituted version of these six groups; or a group of the formula: —$((CH_2)_qO)_nR_c$, wherein:

q is 1, 2, or 3;

n is 1-10; and $R_c$ is hydrogen, alkyl$_{(C\leq8)}$, or substituted alkyl$_{(C\leq8)}$, or a group of the formula: —$Y_2$—$R_7$, wherein:

$Y_2$ is alkanediyl$_{(C\leq12)}$, alkenediyl$_{(C\leq12)}$, arenediyl$_{(C\leq18)}$, heteroarenediyl$_{(C\leq18)}$, or a substituted version thereof; and $R_7$ is amino, carboxy, halo, hydroxy, mercapto, alkoxy$_{(C\leq8)}$, substituted alkoxy$_{(C\leq8)}$, alkylamino$_{(C\leq8)}$, substituted alkylamino$_{(C\leq8)}$, dialkylamino$_{(C\leq8)}$, or substituted dialkylamino$_{(C\leq8)}$, or —$X_2C(O)R_7'$; wherein:

$X_2$ is a covalent bond, $NR_g$, or O, wherein:

$R_g$ is hydrogen, alkyl$_{(C\leq6)}$, or substituted alkyl$_{(C\leq6)}$;

$R_{7'}$ is hydrazine, alkylhydrazine$_{(C\leq12)}$, substituted alkylhydrazine$_{(C\leq12)}$, heterocycloalkyl$_{(C\leq12)}$, substituted heterocycloalkyl$_{(C\leq12)}$, alkoxy$_{(C\leq8)}$, substituted alkoxy$_{(C\leq8)}$, cycloalkoxy$_{(C\leq8)}$, substituted cycloalkoxy$_{(C\leq8)}$, aryloxy$_{(C\leq8)}$, substituted aryloxy$_{(C\leq8)}$, aralkoxy$_{(C\leq8)}$, substituted aralkoxy$_{(C\leq8)}$, alkylamino$_{(C\leq8)}$, substituted alkylamino$_{(C\leq8)}$, dialkylamino$_{(C\leq8)}$, substituted dialkylamino$_{(C\leq8)}$, cycloalkylamino$_{(C\leq8)}$, substituted cycloalkylamino$_{(C\leq8)}$, arylamino$_{(C\leq8)}$, substituted arylamino$_{(C\leq8)}$, (alkyl)alkylamino$_{(C\leq8)}$, substituted (alkyl)arylamino$_{(C\leq8)}$, aralkylamino$_{(C\leq8)}$, substituted aralkylamino$_{(C\leq8)}$, a fluorophore, an amino acid residue, or a chemotherapeutic compound;

$R_3$ is hydrogen, amino, cyano, halo, hydroxy, nitro, thio, or alkyl$_{(C\le12)}$, cycloalkyl$_{(C\le12)}$, aryl$_{(C\le12)}$, heteroaryl$_{(C\le12)}$, aralkyl$_{(C\le12)}$, heteroaralkyl$_{(C\le12)}$, acyl$_{(C\le12)}$, alkoxy$_{(C\le12)}$, alkylamino$_{(C\le12)}$, dialkylamino$_{(C\le12)}$, or a substituted version of any of these ten groups, or —$(O(CH_2)_r)_yZ_1$, wherein:

r is 1, 2, or 3;

y is 0-10; and $Z_1$ is hydroxy, alkoxy$_{(C\le6)}$, or substituted alkoxy$_{(C\le6)}$;

or two or more positions are substituted with $R_3$ and two of the $R_3$ groups are taken together and are alkanediyl$_{(C\le12)}$, alkenediyl$_{(C\le12)}$, arenediyl$_{(C\le18)}$, heteroarenediyl$_{(C\le18)}$, or a substituted version thereof;

$R_4$ and $R_5$ are each independently alkyl$_{(C\le12)}$, cycloalkyl$_{(C\le12)}$, aryl$_{(C\le18)}$, aralkyl$_{(C\le18)}$, or a substituted version of any of these groups; or —$(CR_dR_e)C(O)Y_2$; wherein:

$Y_2$ is amino, hydroxy, alkoxy$_{(C\le8)}$, substituted alkoxy$_{(C\le8)}$, alkylamino$_{(C\le8)}$, substituted alkylamino$_{(C\le8)}$, dialkylamino$_{(C\le8)}$, or substituted dialkylamino$_{(C\le8)}$, and $R_d$ and $R_e$ are each independently the side chain of a canonical amino acid or alkyl$_{(C\le8)}$, cycloalkyl$_{(C\le8)}$, aryl$_{(C\le12)}$, aralkyl$_{(C\le12)}$, heteroaryl$_{(C\le12)}$, heteroaralkyl$_{(C\le12)}$, or a substituted version of these six groups;

a group of the formula: —$((CH_2)_sO)_pR_f$, wherein:

s is 1, 2, or 3;

p is 1-10; or $R_f$ is hydrogen, alkyl$_{(C\le8)}$, or substituted alkyl$_{(C\le8)}$, or a group of the formula: —$Y_2$—$R_7$, wherein:

$Y_2$ is alkanediyl$_{(C\le12)}$, alkenediyl$_{(C\le12)}$, arenediyl$_{(C\le18)}$, heteroarenediyl$_{(C\le18)}$, or a substituted version thereof; and $R_7$ is amino, carboxy, halo, hydroxy, mercapto, alkoxy$_{(C\le8)}$, substituted alkoxy$_{(C\le8)}$, alkylamino$_{(C\le8)}$, substituted alkylamino$_{(C\le8)}$, dialkylamino$_{(C\le8)}$, or substituted dialkylamino$_{(C\le8)}$, or —$C(O)R_7'$; wherein:

$R_7'$ is alkoxy$_{(C\le8)}$, substituted alkoxy$_{(C\le8)}$, alkylamino$_{(C\le8)}$, substituted alkylamino$_{(C\le8)}$, dialkylamino$_{(C\le8)}$, or substituted dialkylamino$_{(C\le8)}$;

$R_6$ and $R_6'$ are each independently hydrogen, amino, cyano, halo, hydroxy, nitro, thio, or alkyl$_{(C\le12)}$, cycloalkyl$_{(C\le12)}$, aryl$_{(C\le12)}$, heteroaryl$_{(C\le12)}$, aralkyl$_{(C\le12)}$, heteroaralkyl$_{(C\le12)}$, acyl$_{(C\le12)}$, alkoxy$_{(C\le12)}$, alkylamino$_{(C\le12)}$, dialkylamino$_{(C\le12)}$, or a substituted version of any of these ten groups, or —$(O(CH_2)_t)_zZ_2$, wherein:

t is 1, 2, or 3;

z is 0-10; and $Z_2$ is hydroxy, alkoxy$_{(C\le6)}$, or substituted alkoxy$_{(C\le6)}$; or $R_6$ and $R_6'$ are taken together and are alkanediyl$_{(C\le12)}$, alkenediyl$_{(C\le12)}$, arenediyl$_{(C\le18)}$, heteroarenediyl$_{(C\le18)}$, or a substituted version thereof;

m is 1, 2, 3, or 4; and $X_1$ is an anionic species such that the change on $X_1$ balances the net change on the complex.

In some embodiments, the compounds are further defined as:

(I)

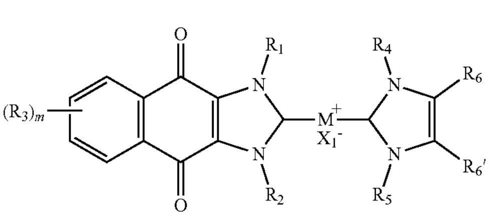

wherein:

M is an Au or Ag ion;

$R_1$ and $R_2$ are each independently alkyl$_{(C\le12)}$, cycloalkyl$_{(C\le12)}$, aryl$_{(C\le18)}$, aralkyl$_{(C\le18)}$, or a substituted version of any of these groups; or —$(CR_aR_b)C(O)Y_1$; wherein:

$Y_1$ is amino, hydroxy, alkoxy$_{(C\le8)}$, substituted alkoxy$_{(C\le8)}$, alkylamino$_{(C\le8)}$, substituted alkylamino$_{(C\le8)}$, dialkylamino$_{(C\le8)}$, or substituted dialkylamino$_{(C\le8)}$, and $R_a$ and $R_b$ are each independently the side chain of a canonical amino acid or alkyl$_{(C\le8)}$, cycloalkyl$_{(C\le8)}$, aryl$_{(C\le12)}$, aralkyl$_{(C\le12)}$, heteroaryl$_{(C\le12)}$, heteroaralkyl$_{(C\le12)}$, or a substituted version of these six groups; or a group of the formula: —$((CH_2)_qO)_nR_c$, wherein:

q is 1, 2, or 3;

n is 1-10; and $R_c$ is hydrogen, alkyl$_{(C\le8)}$, or substituted alkyl$_{(C\le8)}$, or a group of the formula: —$Y_2$—$R_7$, wherein:

$Y_2$ is alkanediyl$_{(C\le12)}$, alkenediyl$_{(C\le12)}$, arenediyl$_{(C\le18)}$, heteroarenediyl$_{(C\le18)}$, or a substituted version thereof; and $R_7$ is amino, carboxy, halo, hydroxy, mercapto, alkoxy$_{(C\le8)}$, substituted alkoxy$_{(C\le8)}$, alkylamino$_{(C\le8)}$, substituted alkylamino$_{(C\le8)}$, dialkylamino$_{(C\le8)}$, or substituted dialkylamino$_{(C\le8)}$, or —$C(O)R_7'$; wherein:

$R_7'$ is alkoxy$_{(C\le8)}$, substituted alkoxy$_{(C\le8)}$, alkylamino$_{(C\le8)}$, substituted alkylamino$_{(C\le8)}$, dialkylamino$_{(C\le8)}$, or substituted dialkylamino$_{(C\le8)}$;

$R_3$ is hydrogen, amino, cyano, halo, hydroxy, nitro, thio, or alkyl$_{(C\le12)}$, cycloalkyl$_{(C\le12)}$, aryl$_{(C\le12)}$, heteroaryl$_{(C\le12)}$, aralkyl$_{(C\le12)}$, heteroaralkyl$_{(C\le12)}$, acyl$_{(C\le12)}$, alkoxy$_{(C\le12)}$, alkylamino$_{(C\le12)}$, dialkylamino$_{(C\le12)}$, or a substituted version of any of these ten groups, or —$(O(CH_2)_r)_yZ_1$, wherein:

r is 1, 2, or 3;

y is 0-10; and $Z_1$ is hydroxy, alkoxy$_{(C\le6)}$, or substituted alkoxy$_{(C\le6)}$;

or two or more positions are substituted with $R_3$ and two of the $R_3$ groups are taken together and are alkanediyl$_{(C\le12)}$, alkenediyl$_{(C\le12)}$, arenediyl$_{(C\le18)}$, heteroarenediyl$_{(C\le18)}$, or a substituted version thereof;

$R_4$ and $R_5$ are each independently alkyl$_{(C\le12)}$, cycloalkyl$_{(C\le12)}$, aryl$_{(C\le18)}$, aralkyl$_{(C\le18)}$, or a substituted version of any of these groups; or —$(CR_dR_e)C(O)Y_2$; wherein:

$Y_2$ is amino, hydroxy, alkoxy$_{(C\le8)}$, substituted alkoxy$_{(C\le8)}$, alkylamino$_{(C\le8)}$, substituted alkylamino$_{(C\le8)}$, dialkylamino$_{(C\le8)}$, or substituted dialkylamino$_{(C\le8)}$, and $R_d$ and $R_e$ are each independently the side chain of a canonical amino acid or alkyl$_{(C\le8)}$, cycloalkyl$_{(C\le8)}$, aryl$_{(C\le12)}$, aralkyl$_{(C\le12)}$, heteroaryl$_{(C\le12)}$, heteroaralkyl$_{(C\le12)}$, or a substituted version of these six groups;

a group of the formula: $-((CH_2)_sO)_pR_f$, wherein:

s is 1, 2, or 3;

p is 1-10; or $R_f$ is hydrogen, alkyl$_{(C\le8)}$, or substituted alkyl$_{(C\le8)}$, or a group of the formula: $-Y_2-R_7$, wherein:

$Y_2$ is alkanediyl$_{(C\le12)}$, alkenediyl$_{(C\le12)}$, arenediyl$_{(C\le18)}$, heteroarenediyl$_{(C\le18)}$, or a substituted version thereof; and $R_7$ is amino, carboxy, halo, hydroxy, mercapto, alkoxy$_{(C\le8)}$, substituted alkoxy$_{(C\le8)}$, alkylamino$_{(C\le8)}$, substituted alkylamino$_{(C\le8)}$, dialkylamino$_{(C\le8)}$, or substituted dialkylamino$_{(C\le8)}$, or $-C(O)R_7'$; wherein:

$R_7'$ is alkoxy$_{(C\le8)}$, substituted alkoxy$_{(C\le8)}$, alkylamino$_{(C\le8)}$, substituted alkylamino$_{(C\le8)}$, dialkylamino$_{(C\le8)}$, or substituted dialkylamino$_{(C\le8)}$;

$R_6$ and $R_6'$ are each independently hydrogen, amino, cyano, halo, hydroxy, nitro, thio, or alkyl$_{(C\le12)}$, cycloalkyl$_{(C\le12)}$, aryl$_{(C\le12)}$, heteroaryl$_{(C\le12)}$, aralkyl$_{(C\le12)}$, heteroaralkyl$_{(C\le12)}$, acyl$_{(C\le12)}$, alkoxy$_{(C\le12)}$, alkylamino$_{(C\le12)}$, dialkylamino$_{(C\le12)}$, or a substituted version of any of these ten groups, or $-(O(CH_2)_t)_zZ_2$, wherein:

t is 1, 2, or 3;

z is 0-10; and $Z_2$ is hydroxy, alkoxy$_{(C\le6)}$, or substituted alkoxy$_{(C\le6)}$; or $R_6$ and $R_6'$ are taken together and are alkanediyl$_{(C\le12)}$, alkenediyl$_{(C\le12)}$, arenediyl$_{(C\le18)}$, heteroarenediyl$_{(C\le18)}$, or a substituted version thereof;

m is 1, 2, 3, or 4; and $X_1$ is an anionic species such that the change on $X_1$ balances the net change on the complex.

In some embodiments, the compounds are further defined as:

(II)

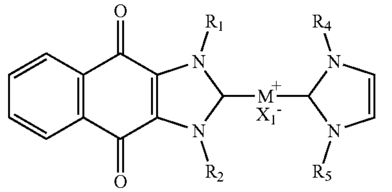

wherein:

M is an Au or Ag ion;

$R_1$ and $R_2$ are each independently alkyl$_{(C\le12)}$, cycloalkyl$_{(C\le12)}$, aryl$_{(C\le18)}$, aralkyl$_{(C\le18)}$, or a substituted version of any of these groups; or $-(CR_aR_b)C(O)Y_1$; wherein:

$Y_1$ is amino, hydroxy, alkoxy$_{(C\le8)}$, substituted alkoxy$_{(C\le8)}$, alkylamino$_{(C\le8)}$, substituted alkylamino$_{(C\le8)}$, dialkylamino$_{(C\le8)}$, or substituted dialkylamino$_{(C\le8)}$, and $R_a$ and $R_b$ are each independently the side chain of a canonical amino acid or alkyl$_{(C\le8)}$, cycloalkyl$_{(C\le8)}$, aryl$_{(C\le12)}$, aralkyl$_{(C\le12)}$, heteroaryl$_{(C\le12)}$, heteroaralkyl$_{(C\le12)}$, or a substituted version of these six groups; or a group of the formula: $-((CH_2)_qO)_nR_c$, wherein:

q is 1, 2, or 3;

n is 1-10; and $R_c$ is hydrogen, alkyl$_{(C\le8)}$, or substituted alkyl$_{(C\le8)}$, or a group of the formula: $-Y_2-R_7$, wherein:

$Y_2$ is alkanediyl$_{(C\le12)}$, alkenediyl$_{(C\le12)}$, arenediyl$_{(C\le18)}$, heteroarenediyl$_{(C\le18)}$, or a substituted version thereof; and $R_7$ is amino, carboxy, halo, hydroxy, mercapto, alkoxy$_{(C\le8)}$, substituted alkoxy$_{(C\le8)}$, alkylamino$_{(C\le8)}$, substituted alkylamino$_{(C\le8)}$, dialkylamino$_{(C\le8)}$, or substituted dialkylamino$_{(C\le8)}$, or $-C(O)R_7'$; wherein:

$R_7'$ is alkoxy$_{(C\le3)}$, substituted alkoxy$_{(C\le8)}$, alkylamino$_{(C\le8)}$, substituted alkylamino$_{(C\le8)}$, dialkylamino$_{(C\le8)}$, or substituted dialkylamino$_{(C\le8)}$;

$R_4$ and $R_5$ are each independently alkyl$_{(C\le12)}$, cycloalkyl$_{(C\le12)}$, aryl$_{(C\le18)}$, aralkyl$_{(C\le18)}$, or a substituted version of any of these groups; or $-(CR_dR_e)C(O)Y_2$; wherein:

$Y_2$ is amino, hydroxy, alkoxy$_{(C\le8)}$, substituted alkoxy$_{(C\le8)}$, alkylamino$_{(C\le8)}$, substituted alkylamino$_{(C\le8)}$, dialkylamino$_{(C\le8)}$, or substituted dialkylamino$_{(C\le8)}$, and $R_d$ and $R_e$ are each independently the side chain of a canonical amino acid or alkyl$_{(C\le8)}$, cycloalkyl$_{(C\le8)}$, aryl$_{(C\le12)}$, aralkyl$_{(C\le12)}$, heteroaryl$_{(C\le12)}$, heteroaralkyl$_{(C\le12)}$, or a substituted version of these six groups;

a group of the formula: $-((CH_2)_sO)_pR_f$, wherein:

s is 1, 2, or 3;

p is 1-10; or $R_f$ is hydrogen, alkyl$_{(C\le8)}$, or substituted alkyl$_{(C\le8)}$, or a group of the formula: $-Y_2-R_7$, wherein:

$Y_2$ is alkanediyl$_{(C\le12)}$, alkenediyl$_{(C\le12)}$, arenediyl$_{(C\le18)}$, heteroarenediyl$_{(C\le18)}$, or a substituted version thereof; and $R_7$ is amino, carboxy, halo, hydroxy, mercapto, alkoxy$_{(C\le8)}$, substituted alkoxy$_{(C\le8)}$, alkylamino$_{(C\le8)}$, substituted alkylamino$_{(C\le8)}$, dialkylamino$_{(C\le8)}$, or substituted dialkylamino$_{(C\le8)}$, or $-X_2C(O)R_7'$; wherein:

$X_2$ is a covalent bond, $NR_g$, or O, wherein:

$R_g$ is hydrogen, alkyl$_{(C\le6)}$, or substituted alkyl$_{(C\le6)}$;

$R_7'$ is hydrazine, alkylhydrazine$_{(C\le12)}$, substituted alkylhydrazine$_{(C\le12)}$, heterocycloalkyl$_{(C\le12)}$, substituted heterocycloalkyl$_{(C\le12)}$, alkoxy$_{(C\le8)}$, substituted alkoxy$_{(C\le8)}$, cycloalkoxy$_{(C\le8)}$, substituted cycloalkoxy$_{(C\le8)}$, aryloxy$_{(C\le8)}$, substituted aryloxy$_{(C\le8)}$, aralkoxy$_{(C\le8)}$, substituted aralkoxy$_{(C\le8)}$, alkylamino$_{(C\le8)}$, substituted alkylamino$_{(C\le8)}$, dialkylamino$_{(C\le8)}$, substituted dialkylamino$_{(C\le8)}$, cycloalkylamino$_{(C\le8)}$, substituted cycloalkylamino$_{(C\le8)}$, arylamino$_{(C\le8)}$, substituted arylamino$_{(C\le8)}$, (alkyl)alkylamino$_{(C\le8)}$, substituted (alkyl)arylamino$_{(C\le8)}$, aralkylamino$_{(C\le8)}$, substituted aralkylamino$_{(C\le8)}$, a fluorophore, an amino acid residue, or a chemotherapeutic compound; and $X_1$ is an anionic species such that the change on $X_1$ balances the net change on the complex.

In some embodiments, M is an Au ion such as Au(I). In other embodiments, M is an Ag ion such as Ag(I). In some embodiments, $X_1$ is $Cl^-$.

In some embodiments, $R_1$ is aryl$_{(C \leq 18)}$ or substituted aryl$_{(C \leq 18)}$. In some embodiments, $R_1$ is aryl$_{(C \leq 18)}$ such as phenyl, 2,6-diisopropylphenyl, or 2,4,6-trimethylphenyl. In some embodiments, $R_1$ is 2,6-diisopropylphenyl. In some embodiments, $R_2$ is aryl$_{(C \leq 18)}$ or substituted aryl$_{(C \leq 18)}$. In some embodiments, $R_2$ is aryl$_{(C \leq 18)}$ such as phenyl, 2,6-diisopropylphenyl, or 2,4,6-trimethylphenyl. In some embodiments, $R_2$ is 2,6-diisopropylphenyl.

In some embodiments, $R_3$ is halo such as fluoro. In some embodiments, $R_3$ is alkoxy$_{(C \leq 12)}$ or substituted alkoxy$_{(C \leq 12)}$. In some embodiments, $R_3$ is alkoxy$_{(C \leq 12)}$ such as methoxy. In some embodiments, $R_3$ is alkyl$_{(C \leq 12)}$ or substituted alkyl$_{(C \leq 12)}$. In some embodiments, $R_3$ is alkyl$_{(C \leq 12)}$ such as methyl. In some embodiments, two positions are substituted with $R_3$ and the $R_3$ groups are taken together and are alkenediyl$_{(C \leq 12)}$ or substituted alkenediyl$_{(C \leq 12)}$. In some embodiments, $R_3$ are taken together and are alkenediyl$_{(C \leq 12)}$ such as $R_3$ are taken together and form a phenyl ring. In some embodiments, m is 2, 3, or 4. In some embodiments, m is 2 or 4. In some embodiments, m is 2. In other embodiments, m is 4.

In some embodiments, at least one of $R_4$ or $R_5$ is a group of the formula: $-Y_2-R_7$. In some embodiments, $R_4$ is alkyl$_{(C \leq 12)}$ or substituted alkyl$_{(C \leq 12)}$. In some embodiments, $R_4$ is alkyl$_{(C \leq 12)}$ such as methyl, ethyl, or isopropyl. In some embodiments, $R_4$ is substituted alkyl$_{(C \leq 12)}$ such as 2-hydroxyethyl. In some embodiments, $R_4$ is aryl$_{(C \leq 18)}$ or substituted aryl$_{(C \leq 18)}$. In some embodiments, $R_4$ is aryl$_{(C \leq 18)}$ such as phenyl, 2,6-diisopropylphenyl, or 2,4,6-trimethylphenyl. In some embodiments, $R_4$ is 2,4,6-trimethylphenyl. In some embodiments, $R_4$ is $-(CH_2CH_2O)_pR_f$. In some embodiments, p is 2, 3, 4, 5, or 6. In some embodiments, p is 2, 3, or 4. In some embodiments, p is 3. In some embodiments, $R_f$ is hydrogen. In other embodiments, $R_f$ is alkyl$_{(C \leq 8)}$ or substituted alkyl$_{(C \leq 8)}$. In some embodiments, $R_f$ is alkyl$_{(C \leq 8)}$ such as methyl. In some embodiments, $R_4$ is $-Y_2-R_7$. In some embodiments, $Y_2$ is alkanediyl$_{(C \leq 12)}$ or substituted alkanediyl$_{(C \leq 12)}$ such as $-CH_2CH_2-$. In some embodiments, $R_7$ is hydroxy.

In some embodiments, $R_5$ is alkyl$_{(C \leq 12)}$ or substituted alkyl$_{(C \leq 12)}$. In some embodiments, $R_5$ is alkyl$_{(C \leq 12)}$ such as methyl, ethyl, or isopropyl. In other embodiments, $R_4$ is substituted alkyl$_{(C \leq 12)}$ such as 2-hydroxyethyl. In other embodiments, $R_5$ is aryl$_{(C \leq 18)}$ or substituted aryl$_{(C \leq 18)}$. In some embodiments, $R_5$ is aryl$_{(C \leq 18)}$ such as phenyl, 2,6-diisopropylphenyl, or 2,4,6-trimethylphenyl. In some embodiments, $R_5$ is 2,4,6-trimethylphenyl. In other embodiments, $R_5$ is $-(CH_2CH_2O)_pR_f$. In some embodiments, p is 2, 3, 4, 5, or 6. In some embodiments, p is 2, 3, or 4. In some embodiments, p is 3. In some embodiments, $R_e$ is hydrogen. In other embodiments, $R_f$ is alkyl$_{(C \leq 8)}$ or substituted alkyl$_{(C \leq 8)}$. In some embodiments, $R_f$ is alkyl$_{(C \leq 8)}$ such as methyl. In other embodiments, $R_5$ is $-Y_2-R_7$. In some embodiments, $Y_2$ is alkanediyl$_{(C \leq 12)}$ or substituted alkanediyl$_{(C \leq 12)}$ such as $-CH_2CH_2-$. In some embodiments, $R_7$ is hydroxy. In some embodiments, $R_6$ is hydrogen. In some embodiments, $R_6'$ is hydrogen. In some embodiments, the compounds are further defined as a cation of the formula:

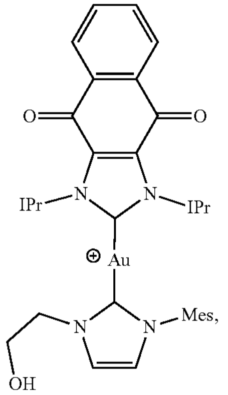

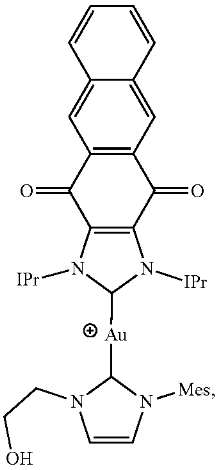

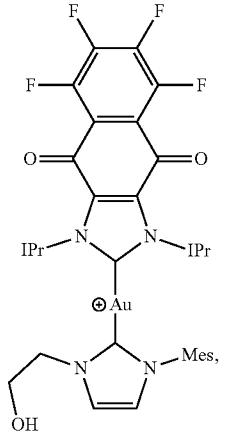

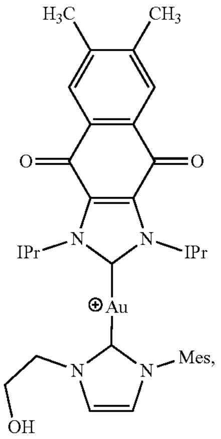

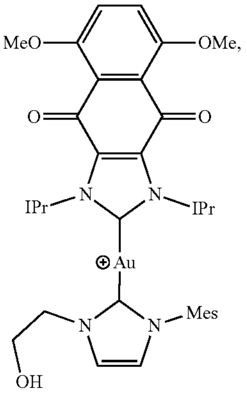

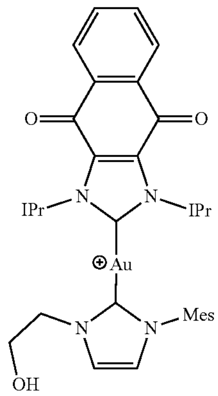

,

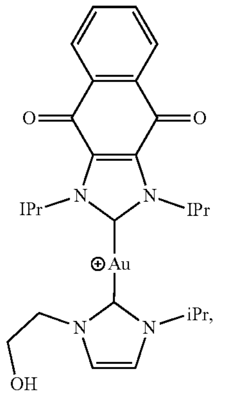

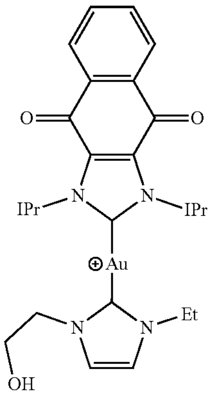

,

-continued
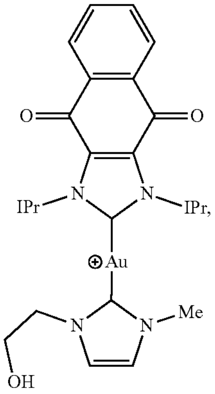
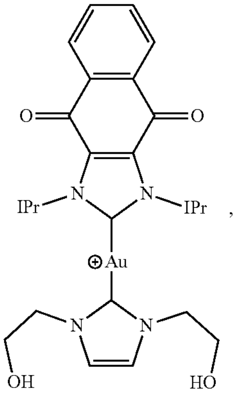
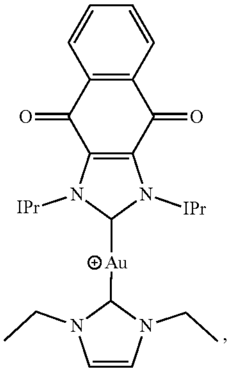
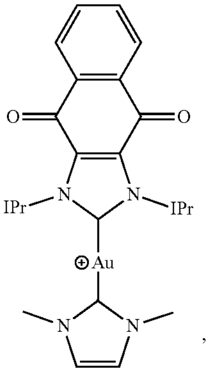
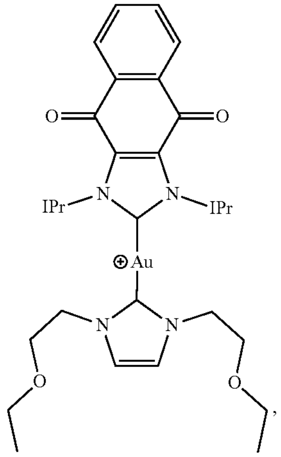
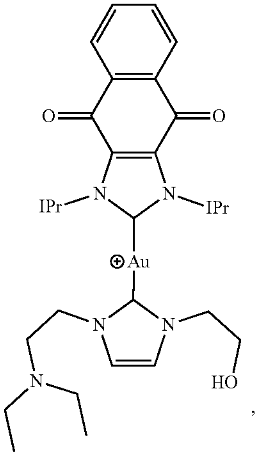
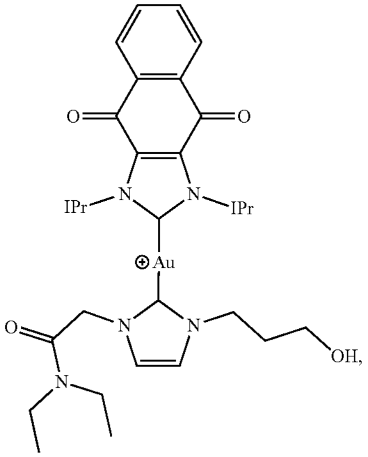
-continued
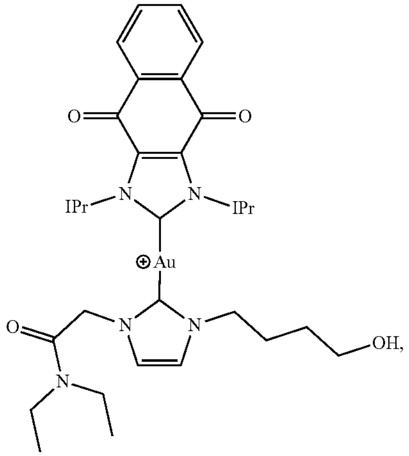
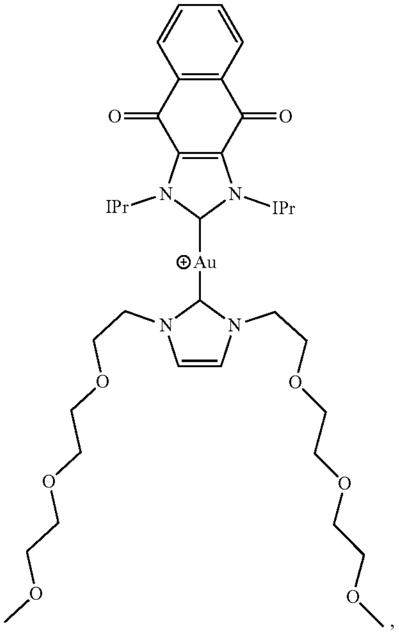
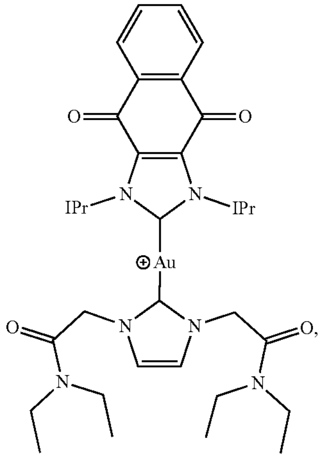
or -continued

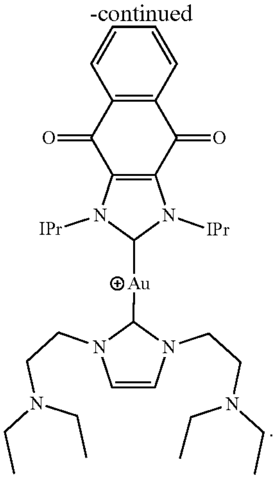

In some embodiments, the compounds are further defined as a halide salt. In some embodiments, the compounds are further defined as a cation of the formula:

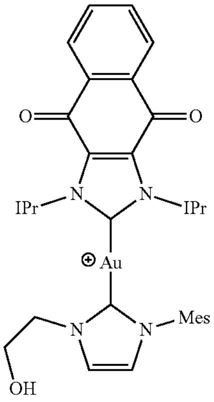

or a halide salt thereof.

In another aspect, the present disclosure provides pharmaceutical compositions comprising:

(A) a compound described herein; and (B) an excipient.

In some embodiments, the pharmaceutical compositions are formulated for administration: orally, intraadiposally, intraarterially, intraarticularly, intracranially, intradermally, intralesionally, intramuscularly, intranasally, intraocularly, intrapericardially, intraperitoneally, intrapleurally, intraprostatically, intrarectally, intrathecally, intratracheally, intratumorally, intraumbilically, intravaginally, intravenously, intravesicularly, intravitreally, liposomally, locally, mucosally, parenterally, rectally, subconjunctivally, subcutaneously, sublingually, topically, transbuccally, transdermally, vaginally, in crèmes, in lipid compositions, via a catheter, via a lavage, via continuous infusion, via infusion, via inhalation, via injection, via local delivery, or via localized perfusion. In some embodiments, the pharmaceutical compositions are formulated as a unit dose.

In yet another aspect, the present disclosure provides methods of treating a disease or disorder in a patient comprising administering to the patient in need thereof a therapeutically effective amount of a compound or composition described herein. In some embodiments, the disease or disorder is cancer. In some embodiments, cancer is a carcinoma, sarcoma, lymphoma, leukemia, melanoma, mesothelioma, multiple myeloma, or seminoma. In some embodiments, the cancer is of the bladder, blood, bone, brain, breast, central nervous system, cervix, colon, endometrium, esophagus, gall bladder, gastrointestinal tract, genitalia, genitourinary tract, head, kidney, larynx, liver, lung, muscle tissue, neck, oral or nasal mucosa, ovary, pancreas, prostate, skin, spleen, small intestine, large intestine, stomach, testicle, or thyroid. In some embodiments, the cancer is a platinum resistant cancer. In some embodiments, the platinum resistant cancer is resistant to one platinum chemotherapeutic agent. In some embodiments, the platinum resistant cancer is resistant to two or more platinum chemotherapeutic agents such as a platinum resistant ovarian cancer, a platinum resistant lung cancer, a platinum resistant mesothelioma, a platinum resistant bladder cancer, a platinum resistant head and neck cancer, a platinum resistant cervical cancer, or a platinum resistant esophageal cancer.

In some embodiments, the compound induces the cells of the cancer to undergo immunogenic cell death. In other embodiments, the disease is an infection of a parasite. In some embodiments, the infection is of a parasite associated with a tropical disease. In some embodiments, the infection is of an intracellular parasite. In some embodiments, the treatment of the disease or disorder would benefit from the inhibition of thioredoxin reductase. In some embodiments, the treatment of the disease or disorder would benefit from the increased production of reactive oxygen species.

In some embodiments, the methods comprise administering a second anticancer therapy. In some embodiments, second anticancer therapy is a chemotherapeutic agent. In some embodiments, the patient is a mammal such as a human. In some embodiments, the methods comprise administering the compound once. In other embodiments, the methods comprise administering the compound two or more times.

In still yet another aspect, the present disclosure provides methods of inducing immunological cell death in a cell comprising contacting the cell with an effective amount of a compound or composition described herein.

In still another aspect, the present disclosure provides methods of inhibiting thioredoxin reductase comprising administering an effective amount of a compound or composition described herein.

In yet another aspect, the present disclosure provides methods of increasing the production of reactive oxygen species in a cell comprising contacting the cell with an effective amount of a compound or composition described herein.

In some embodiments, the method is performed in vitro. In other embodiments, the method is performed in vivo. In some embodiments, the cell is in a patient. In some embodiments, the thioredoxin reductase is located in a cell. In some embodiments, the cell is in a patient.

In still another aspect, the present disclosure provides methods of inducing an immune response in a patient comprising administering to the patient a therapeutically effective amount of a compound or composition described herein. In some embodiments, the immune response is directed towards a specific type of cell. In some embodiments, the specific type of cell is a cancer cell. In some embodiments, the immune response leads to cell death in the specific type of cell.

In still yet another aspect, the present disclosure provides compositions comprising:

(A) a compound described herein; and (B) a cancer cell or cancer cell extract.

In some embodiments, the cancer cell is obtained from a patient. In some embodiments, the cancer cell is obtained from the patient to which the composition is to be administered. In some embodiments, the composition is obtained ex vivo. In some embodiments, the cancer cell or cancer cell extract are combined with the compound ex vivo. In some embodiments, the composition comprises an intact cancer cell. In other embodiments, the composition comprises a cancer cell extract. In some embodiments, the composition is purified to obtain the cancer cell.

In still yet another aspect, the present disclosure provides methods of treating cancer in a patient comprising administering a therapeutically effective amount of a composition described above to the patient. In some embodiments, the cancer cell or cancer cell extract is from the patient to which the composition is to be administered. In some embodiments, the cancer cell or cancer cell extract has been purified from the composition.

In still another aspect, the present disclosure provides methods of preparing a cancer vaccine comprising:

(A) obtaining a cancer cell or cancer cell extract from a patient;

(B) admixing the cancer cell or cancer cell extract with a compound described herein to obtain a cancer vaccine.

In some embodiments, the method further comprises purifying the cancer vaccine to obtain a purified cancer vaccine comprising the cancer cell or cancer cell extract. In some embodiments, the purification removes the compound.

In still yet another aspect, the present disclosure provides conjugates comprising:

(A) a compound described herein, wherein at least one of $R_1$, $R_2$, $R_4$, or $R_5$ is a group of the formula: $—Y_2—R_7$;

(B) a linker group; and (C) a cell targeting moiety or a chemotherapeutic agent.

In some embodiments, the linker group is a linker group that is degradable in vivo. In some embodiments, the linker group is a carbamate or carbonate. In some embodiments, the linker group further comprises a self-immolating group. In some embodiments, the linker group is a polypeptide sequence. In some embodiments, the polypeptide sequence is a sequence cleaved by a protease. In some embodiments, the cell targeting moiety is an antibody, an affibody, a peptide or protein, a nucleic acid sequence, or a small molecule. In some embodiments, the chemotherapeutic agent is a small molecule.

In yet another aspect, the present disclosure provides compound of the formula:

(III)

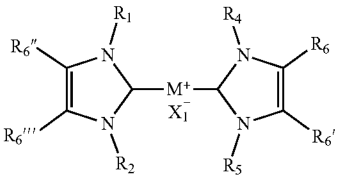

wherein:

M is an Au or Ag ion;

$R_1$, $R_2$, $R_4$, and $R_5$ are each independently alkyl$_{(C\leq12)}$, cycloalkyl$_{(C\leq12)}$, aryl$_{(C\leq18)}$, aralkyl$_{(C\leq18)}$, or a substituted version of any of these groups; or $—(CR_dR_e)C(O)Y_2$; wherein:

$Y_2$ is amino, hydroxy, alkoxy$_{(C\leq8)}$, substituted alkoxy$_{(C\leq8)}$, alkylamino$_{(C\leq8)}$, substituted alkylamino$_{(C\leq8)}$, dialkylamino$_{(C\leq8)}$, or substituted dialkylamino$_{(C\leq8)}$, and $R_d$ and $R_e$ are each independently the side chain of a canonical amino acid or alkyl$_{(C\leq8)}$, cycloalkyl$_{(C\leq8)}$, aryl$_{(C\leq12)}$, aralkyl$_{(C\leq12)}$, heteroaryl$_{(C\leq12)}$, heteroaralkyl$_{(C\leq12)}$, or a substituted version of these six groups;

a group of the formula: $—((CH_2)_rO)_pR_f$, wherein:

r is 1, 2, or 3;

p is 1-10; or $R_f$ is hydrogen, alkyl$_{(C\leq8)}$, or substituted alkyl$_{(C\leq8)}$, or a group of the formula: $—Y_2—R_7$, wherein:

$Y_2$ is alkanediyl$_{(C\leq12)}$, alkenediyl$_{(C\leq12)}$, arenediyl$_{(C\leq18)}$, heteroarenediyl$_{(C\leq18)}$, or a substituted version thereof; and $R_7$ is amino, carboxy, halo, hydroxy, mercapto, alkoxy$_{(C\leq8)}$, substituted alkoxy$_{(C\leq8)}$, alkylamino$_{(C\leq8)}$, substituted alkylamino$_{(C\leq8)}$, dialkylamino$_{(C\leq8)}$, or substituted dialkylamino$_{(C\leq8)}$, or $—X_2C(O)R_7'$; wherein:

$X_2$ is a covalent bond, $NR_g$, or O, wherein:

$R_g$ is hydrogen, alkyl$_{(C\leq6)}$, or substituted alkyl$_{(C\leq6)}$;

$R_7'$ is hydrazine, alkylhydrazine$_{(C\leq12)}$, substituted alkylhydrazine$_{(C\leq12)}$, heterocycloalkyl$_{(C\leq12)}$, substituted heterocycloalkyl$_{(C\leq12)}$, alkoxy$_{(C\leq8)}$, substituted alkoxy$_{(C\leq8)}$, cycloalkoxy$_{(C\leq8)}$, substituted cycloalkoxy$_{(C\leq8)}$, aryloxy$_{(C\leq8)}$, substituted aryloxy$_{(C\leq8)}$, aralkoxy$_{(C\leq8)}$, substituted aralkoxy$_{(C\leq8)}$, alkylamino$_{(C\leq8)}$, substituted alkylamino$_{(C\leq8)}$, dialkylamino$_{(C\leq8)}$; substituted dialkylamino$_{(C\leq8)}$, cycloalkylamino$_{(C\leq8)}$, substituted cycloalkylamino$_{(C\leq8)}$, arylamino$_{(C\leq8)}$, substituted arylamino$_{(C\leq8)}$, (alkyl)alkylamino$_{(C\leq8)}$, substituted (alkyl)arylamino$_{(C\leq8)}$, aralkylamino$_{(C\leq8)}$, substituted aralkylamino$_{(C\leq8)}$, a fluorophore, an amino acid residue, or a chemotherapeutic compound;

$R_6$, $R_6'$, $R_6''$, and $R_6'''$ each independently hydrogen, amino, cyano, halo, hydroxy, nitro, thio, or alkyl$_{(C\leq12)}$, cycloalkyl$_{(C\leq12)}$, aryl$_{(C\leq12)}$, heteroaryl$_{(C\leq12)}$, aralkyl$_{(C\leq12)}$, heteroaralkyl$_{(C\leq12)}$, acyl$_{(C\leq12)}$, alkoxy$_{(C\leq12)}$, alkylamino$_{(C\leq12)}$, dialkylamino$_{(C\leq12)}$, or a substituted version of any of these ten groups, or $—(O(CH_2)_s)_zZ_2$, wherein:

s is 1, 2, or 3;

z is 0-10; and $Z_2$ is hydroxy, alkoxy$_{(C\leq6)}$, or substituted alkoxy$_{(C\leq6)}$; or $R_6$ and $R_6'$ or $R_6''$ and $R_6'''$ are taken together and are alkanediyl$_{(C\leq12)}$, alkenediyl$_{(C\leq12)}$, arenediyl$_{(C\leq18)}$, heteroarenediyl$_{(C\leq18)}$, or a substituted version thereof; or $R_6''$ and $R_6'''$ are taken together and are a group of the formula:

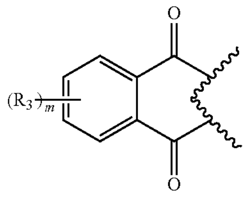

wherein:

$R_3$ is hydrogen, amino, cyano, halo, hydroxy, nitro, thio, or alkyl$_{(C\leq 12)}$, cycloalkyl$_{(C\leq 12)}$, aryl$_{(C\leq 12)}$, heteroaryl$_{(C\leq 12)}$, aralkyl$_{(C\leq 12)}$, heteroaralkyl$_{(C\leq 12)}$, acyl$_{(C\leq 12)}$, alkoxy$_{(C\leq 12)}$, alkylamino$_{(C\leq 12)}$, dialkylamino$_{(C\leq 12)}$, or a substituted version of any of these ten groups, or $—(O(CH_2)_t)_yZ_1$, wherein:

t is 1, 2, or 3;

y is 0-10; and $Z_1$ is hydroxy, alkoxy$_{(C\leq 6)}$, or substituted alkoxy$_{(C\leq 6)}$;

or two or more positions are substituted with $R_3$ and two of the $R_3$ groups are taken together and are alkanediyl$_{(C\leq 12)}$, alkenediyl$_{(C\leq 12)}$, arenediyl$_{(C\leq 18)}$, heteroarenediyl$_{(C\leq 18)}$, or a substituted version thereof;

m is 1, 2, 3, or 4; and $X_1$ is an anionic species such that the change on $X_1$ balances the net change on the complex;

provided at least one of $R_1$, $R_2$, $R_4$, or $R_5$ is a group of the formula: $—Y_2—R_7$.

In some embodiments, the compounds are further defined as:

(III)

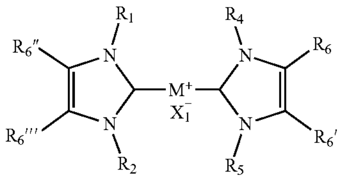

wherein:

M is an Au or Ag ion;

$R_1$ and $R_2$ are each independently alkyl$_{(C\leq 12)}$, cycloalkyl$_{(C\leq 12)}$, aryl$_{(C\leq 18)}$, aralkyl$_{(C\leq 18)}$, or a substituted version of any of these groups; or $—(CR_aR_b)C(O)Y_1$; wherein:

$Y_1$ is amino, hydroxy, alkoxy$_{(C\leq 8)}$, substituted alkoxy$_{(C\leq 8)}$, alkylamino$_{(C\leq 8)}$, substituted alkylamino$_{(C\leq 8)}$, dialkylamino$_{(C\leq 8)}$, or substituted dialkylamino$_{(C\leq 8)}$, and $R_a$ and $R_b$ are each independently the side chain of a canonical amino acid or alkyl$_{(C\leq 8)}$, cycloalkyl$_{(C\leq 8)}$, aryl$_{(C\leq 12)}$, aralkyl$_{(C\leq 12)}$, heteroaryl$_{(C\leq 12)}$, heteroaralkyl$_{(C\leq 12)}$, or a substituted version of these six groups; or a group of the formula: $—((CH_2)_qO)_nR_c$, wherein:

q is 1, 2, or 3;

n is 1-10; and $R_c$ is hydrogen, alkyl$_{(C\leq 8)}$, or substituted alkyl$_{(C\leq 8)}$, $R_4$ and $R_5$ are each independently alkyl$_{(C\leq 12)}$, cycloalkyl$_{(C\leq 12)}$, aryl$_{(C\leq 18)}$, aralkyl$_{(C\leq 18)}$, or a substituted version of any of these groups; or $—(CR_dR_e)C(O)Y_2$; wherein:

$Y_2$ is amino, hydroxy, alkoxy$_{(C\leq 8)}$, substituted alkoxy$_{(C\leq 8)}$, alkylamino$_{(C\leq 8)}$, substituted alkylamino$_{(C\leq 8)}$, dialkylamino$_{(C\leq 8)}$, or substituted dialkylamino$_{(C\leq 8)}$, and $R_d$ and $R_e$ are each independently the side chain of a canonical amino acid or alkyl$_{(C\leq 8)}$, cycloalkyl$_{(C\leq 8)}$, aryl$_{(C\leq 12)}$, aralkyl$_{(C\leq 12)}$, heteroaryl$_{(C\leq 12)}$, heteroaralkyl$_{(C\leq 12)}$, or a substituted version of these six groups;

a group of the formula: $—((CH_2)_rO)_pR_f$, wherein:

r is 1, 2, or 3;

p is 1-10; or $R_f$ is hydrogen, alkyl$_{(C\leq 8)}$, or substituted alkyl$_{(C\leq 8)}$, or a group of the formula: $—Y_2—R_7$, wherein:

$Y_2$ is alkanediyl$_{(C\leq 12)}$, alkenediyl$_{(C\leq 12)}$, arenediyl$_{(C\leq 18)}$, heteroarenediyl$_{(C\leq 18)}$, or a substituted version thereof; and $R_7$ is amino, carboxy, halo, hydroxy, mercapto, alkoxy$_{(C\leq 8)}$, substituted alkoxy$_{(C\leq 8)}$, alkylamino$_{(C\leq 8)}$, substituted alkylamino$_{(C\leq 8)}$, dialkylamino$_{(C\leq 8)}$, or substituted dialkylamino$_{(C\leq 8)}$, or $—X_2C(O)R_7'$; wherein:

$X_2$ is a covalent bond, $NR_g$, or O, wherein:

$R_g$ is hydrogen, alkyl$_{(C\leq 6)}$, or substituted alkyl$_{(C\leq 6)}$;

$R_7'$ is hydrazine, alkylhydrazine$_{(C\leq 12)}$, substituted alkylhydrazine$_{(C\leq 12)}$, heterocycloalkyl$_{(C\leq 12)}$, substituted heterocycloalkyl$_{(C\leq 12)}$, alkoxy$_{(C\leq 8)}$, substituted alkoxy$_{(C\leq 8)}$, cycloalkoxy$_{(C\leq 8)}$, substituted cycloalkoxy$_{(C\leq 8)}$, aryloxy$_{(C\leq 8)}$, substituted aryloxy$_{(C\leq 8)}$, aralkoxy$_{(C\leq 8)}$, substituted aralkoxy$_{(C\leq 8)}$, alkylamino$_{(C\leq 8)}$, substituted alkylamino$_{(C\leq 8)}$, dialkylamino$_{(C\leq 8)}$, substituted dialkylamino$_{(C\leq 8)}$, cycloalkylamino$_{(C\leq 8)}$, substituted cycloalkylamino$_{(C\leq 8)}$, arylamino$_{(C\leq 8)}$, substituted arylamino$_{(C\leq 8)}$, (alkyl)alkylamino$_{(C\leq 8)}$, substituted (alkyl)arylamino$_{(C\leq 8)}$, aralkylamino$_{(C\leq 8)}$, substituted aralkylamino$_{(C\leq 8)}$, a fluorophore, an amino acid residue, or a chemotherapeutic compound;

$R_6$, $R_6'$, $R_6''$, and $R_6'''$ each independently hydrogen, amino, cyano, halo, hydroxy, nitro, thio, or alkyl$_{(C\leq 12)}$, cycloalkyl$_{(C\leq 12)}$, aryl$_{(C\leq 12)}$, heteroaryl$_{(C\leq 12)}$, aralkyl$_{(C\leq 12)}$, heteroaralkyl$_{(C\leq 12)}$, acyl$_{(C\leq 12)}$, alkoxy$_{(C\leq 12)}$, alkylamino$_{(C\leq 12)}$, dialkylamino$_{(C\leq 12)}$, or a substituted version of any of these ten groups, or $—(O(CH_2)_s)_zZ_2$, wherein:

s is 1, 2, or 3;

z is 0-10; and $Z_2$ is hydroxy, alkoxy$_{(C\leq 6)}$, or substituted alkoxy$_{(C\leq 6)}$; or $R_6$ and $R_6'$ or $R_6''$ and $R_6'''$ are taken together and are alkanediyl$_{(C\leq 12)}$, alkenediyl$_{(C\leq 12)}$, arenediyl$_{(C\leq 18)}$, heteroarenediyl$_{(C\leq 18)}$, or a substituted version thereof; or $R_6''$ and $R_6'''$ are taken together and are a group of the formula:

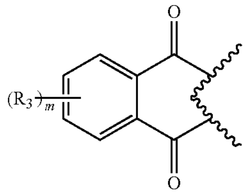

wherein:

$R_3$ is hydrogen, amino, cyano, halo, hydroxy, nitro, thio, or alkyl$_{(C\leq 12)}$, cycloalkyl$_{(C\leq 12)}$, aryl$_{(C\leq 12)}$, heteroaryl$_{(C\leq 12)}$, aralkyl$_{(C\leq 12)}$, heteroaralkyl$_{(C\leq 12)}$, acyl$_{(C\leq 12)}$, alkoxy$_{(C\leq 12)}$, alkylamino$_{(C\leq 12)}$, dialkylamino$_{(C\leq 12)}$, or a substituted version of any of these ten groups, or $—(O(CH_2)_t)_yZ_1$, wherein:

t is 1, 2, or 3;

y is 0-10; and $Z_1$ is hydroxy, alkoxy$_{(C\leq6)}$, or substituted alkoxy$_{(C\leq6)}$;

or two or more positions are substituted with $R_3$ and two of the $R_3$ groups are taken together and are alkanediyl$_{(C\leq12)}$, alkenediyl$_{(C\leq12)}$, arenediyl$_{(C\leq18)}$, heteroarenediyl$_{(C\leq18)}$, or a substituted version thereof;

m is 1, 2, 3, or 4; and $X_1$ is an anionic species such that the change on $X_1$ balances the net change on the complex;

provided at least one of $R_1$, $R_2$, $R_4$, or $R_5$ is a group of the formula: —$Y_2$—$R_7$.

In some embodiments, the compounds are further defined as:

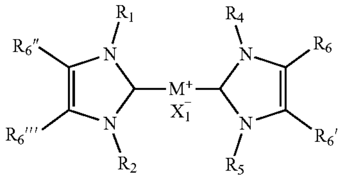

(III)

wherein:

M is an Au or Ag ion;

$R_1$ and $R_2$ are each independently alkyl$_{(C\leq12)}$, cycloalkyl$_{(C\leq12)}$, aryl$_{(C\leq18)}$, aralkyl$_{(C\leq18)}$, or a substituted version of any of these groups; or —$(CR_aR_b)C(O)Y_1$; wherein:

$Y_1$ is amino, hydroxy, alkoxy$_{(C\leq8)}$, substituted alkoxy$_{(C\leq8)}$, alkylamino$_{(C\leq8)}$, substituted alkylamino$_{(C\leq8)}$, dialkylamino$_{(C\leq8)}$, or substituted dialkylamino$_{(C\leq8)}$, and $R_a$ and $R_b$ are each independently the side chain of a canonical amino acid or alkyl$_{(C\leq8)}$, cycloalkyl$_{(C\leq8)}$, aryl$_{(C\leq12)}$, aralkyl$_{(C\leq12)}$, heteroaryl$_{(C\leq12)}$, heteroaralkyl$_{(C\leq12)}$, or a substituted version of these six groups; or $R_4$ and $R_5$ are each independently alkyl$_{(C\leq12)}$, cycloalkyl$_{(C\leq12)}$, aryl$_{(C\leq18)}$, aralkyl$_{(C\leq18)}$, or a substituted version of any of these groups; or —$(CR_dR_e)C(O)Y_2$; wherein:

$Y_2$ is amino, hydroxy, alkoxy$_{(C\leq8)}$, substituted alkoxy$_{(C\leq8)}$, alkylamino$_{(C\leq8)}$, substituted alkylamino$_{(C\leq8)}$, dialkylamino$_{(C\leq8)}$, or substituted dialkylamino$_{(C\leq8)}$, and $R_d$ and $R_e$ are each independently the side chain of a canonical amino acid or alkyl$_{(C\leq8)}$, cycloalkyl$_{(C\leq8)}$, aryl$_{(C\leq12)}$, aralkyl$_{(C\leq12)}$, heteroaryl$_{(C\leq12)}$, heteroaralkyl$_{(C\leq12)}$, or a substituted version of these six groups;

a group of the formula: —$((CH_2)_rO)_pR_f$, wherein:

r is 1, 2, or 3;

p is 1-10; or $R_f$ is hydrogen, alkyl$_{(C\leq8)}$, or substituted alkyl$_{(C\leq8)}$, or a group of the formula: —$Y_2$—$R_7$, wherein:

$Y_2$ is alkanediyl$_{(C\leq12)}$, alkenediyl$_{(C\leq12)}$, arenediyl$_{(C\leq18)}$, heteroarenediyl$_{(C\leq18)}$, or a substituted version thereof; and $R_7$ is amino, carboxy, halo, hydroxy, mercapto, alkoxy$_{(C\leq8)}$, substituted alkoxy$_{(C\leq8)}$, alkylamino$_{(C\leq8)}$, substituted alkylamino$_{(C\leq8)}$, dialkylamino$_{(C\leq8)}$, or substituted dialkylamino$_{(C\leq8)}$, or —$X_2C(O)R_7'$; wherein:

$X_2$ is a covalent bond, $NR_g$, or O, wherein:

$R_g$ is hydrogen, alkyl$_{(C\leq6)}$, or substituted alkyl$_{(C\leq6)}$;

$R_7'$ is hydrazine, alkylhydrazine$_{(C\leq12)}$, substituted alkylhydrazine$_{(C\leq12)}$, heterocycloalkyl$_{(C\leq12)}$, substituted heterocycloalkyl$_{(C\leq12)}$, alkoxy$_{(C\leq8)}$, substituted alkoxy$_{(C\leq8)}$, cycloalkoxy$_{(C\leq8)}$, substituted cycloalkoxy$_{(C\leq8)}$, aryloxy$_{(C\leq8)}$, substituted aryloxy$_{(C\leq8)}$, aralkoxy$_{(C\leq8)}$, substituted aralkoxy$_{(C\leq8)}$, alkylamino$_{(C\leq8)}$, substituted alkylamino$_{(C\leq8)}$, dialkylamino$_{(C\leq8)}$, substituted dialkylamino$_{(C\leq8)}$, cycloalkylamino$_{(C\leq8)}$, substituted cycloalkylamino$_{(C\leq8)}$, arylamino$_{(C\leq8)}$, substituted arylamino$_{(C\leq8)}$, (alkyl)alkylamino$_{(C\leq8)}$, substituted (alkyl)arylamino$_{(C\leq8)}$, aralkylamino$_{(C\leq8)}$, substituted aralkylamino$_{(C\leq8)}$, a fluorophore, an amino acid residue, or a chemotherapeutic compound;

$R_6$, $R_{6'}$, $R_6''$, and $R_6'''$ each independently hydrogen, amino, cyano, halo, hydroxy, nitro, thio, or alkyl$_{(C\leq12)}$, cycloalkyl$_{(C\leq12)}$, aryl$_{(C\leq12)}$, heteroaryl$_{(C\leq12)}$, aralkyl$_{(C\leq12)}$, heteroaralkyl$_{(C\leq12)}$, acyl$_{(C\leq12)}$, alkoxy$_{(C\leq12)}$, alkylamino$_{(C\leq12)}$, dialkylamino$_{(C\leq12)}$, or a substituted version of any of these ten groups, or —$(O(CH_2)_s)_zZ_2$, wherein:

s is 1, 2, or 3;

z is 0-10; and $Z_2$ is hydroxy, alkoxy$_{(C\leq6)}$, or substituted alkoxy$_{(C\leq6)}$; or $R_6$ and $R_6'$ or $R_6''$ and $R_6'''$ are taken together and are alkanediyl$_{(C\leq12)}$, alkenediyl$_{(C\leq12)}$, arenediyl$_{(C\leq18)}$, heteroarenediyl$_{(C\leq18)}$, or a substituted version thereof; or $R_6''$ and $R_6'''$ are taken together and are a group of the formula:

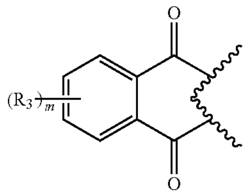

wherein:

$R_3$ is hydrogen, amino, cyano, halo, hydroxy, nitro, thio, or alkyl$_{(C\leq12)}$, cycloalkyl$_{(C\leq12)}$, aryl$_{(C\leq12)}$, heteroaryl$_{(C\leq12)}$, aralkyl$_{(C\leq12)}$, heteroaralkyl$_{(C\leq12)}$, acyl$_{(C\leq12)}$, alkoxy$_{(C\leq12)}$, alkylamino$_{(C\leq12)}$, dialkylamino$_{(C\leq12)}$, or a substituted version of any of these ten groups, or —$(O(CH_2)_t)_yZ_1$, wherein:

t is 1, 2, or 3;

y is 0-10; and $Z_1$ is hydroxy, alkoxy$_{(C\leq6)}$, or substituted alkoxy$_{(C\leq6)}$;

or two or more positions are substituted with $R_3$ and two of the $R_3$ groups are taken together and are alkanediyl$_{(C\leq12)}$, alkenediyl$_{(C\leq12)}$, arenediyl$_{(C\leq18)}$, heteroarenediyl$_{(C\leq18)}$, or a substituted version thereof;

m is 1, 2, 3, or 4; and $X_1$ is an anionic species such that the change on $X_1$ balances the net change on the complex;

provided at least one of $R_1$, $R_2$, $R_4$, or $R_5$ is a group of the formula: —$Y_2$—$R_7$.

In some embodiments, the compounds are further defined as:

(IV)

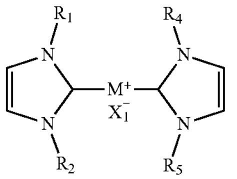

wherein:

M is an Au or Ag ion;

$R_1$ and $R_2$ are each independently alkyl$_{(C\leq 12)}$, cycloalkyl$_{(C\leq 12)}$, aryl$_{(C\leq 18)}$, aralkyl$_{(C\leq 18)}$, or a substituted version of any of these groups; or —$(CR_aR_b)C(O)Y_1$; wherein:

$Y_1$ is amino, hydroxy, alkoxy$_{(C\leq 8)}$, substituted alkoxy$_{(C\leq 8)}$, alkylamino$_{(C\leq 8)}$, substituted alkylamino$_{(C\leq 8)}$, dialkylamino$_{(C\leq 8)}$, or substituted dialkylamino$_{(C\leq 8)}$, and $R_a$ and $R_b$ are each independently the side chain of a canonical amino acid or alkyl$_{(C\leq 8)}$, cycloalkyl$_{(C\leq 8)}$, aryl$_{(C\leq 12)}$, aralkyl$_{(C\leq 12)}$, heteroaryl$_{(C\leq 12)}$, heteroaralkyl$_{(C\leq 12)}$, or a substituted version of these six groups; or $R_4$ and $R_5$ are each independently alkyl$_{(C\leq 12)}$, cycloalkyl$_{(C\leq 12)}$, aryl$_{(C\leq 18)}$, aralkyl$_{(C\leq 18)}$, or a substituted version of any of these groups; or —$(CR_dR_e)C(O)Y_2$; wherein:

$Y_2$ is amino, hydroxy, alkoxy$_{(C\leq 8)}$, substituted alkoxy$_{(C\leq 8)}$, alkylamino$_{(C\leq 8)}$, substituted alkylamino$_{(C\leq 8)}$, dialkylamino$_{(C\leq 8)}$, or substituted dialkylamino$_{(C\leq 8)}$, and $R_d$ and $R_e$ are each independently the side chain of a canonical amino acid or alkyl$_{(C\leq 8)}$, cycloalkyl$_{(C\leq 8)}$, aryl$_{(C\leq 12)}$, aralkyl$_{(C\leq 12)}$, heteroaryl$_{(C\leq 12)}$, heteroaralkyl$_{(C\leq 12)}$, or a substituted version of these six groups;

a group of the formula: —$((CH_2)_rO)_pR_f$, wherein:

r is 1, 2, or 3;

p is 1-10; or $R_f$ is hydrogen, alkyl$_{(C\leq 8)}$, or substituted alkyl$_{(C\leq 8)}$, or a group of the formula: —$Y_2$—$R_7$, wherein:

$Y_2$ is alkanediyl$_{(C\leq 12)}$, alkenediyl$_{(C\leq 12)}$, arenediyl$_{(C\leq 18)}$, heteroarenediyl$_{(C\leq 18)}$, or a substituted version thereof; and $R_7$ is amino, carboxy, halo, hydroxy, mercapto, alkoxy$_{(C\leq 8)}$, substituted alkoxy$_{(C\leq 8)}$, alkylamino$_{(C\leq 8)}$, substituted alkylamino$_{(C\leq 8)}$, dialkylamino$_{(C\leq 8)}$, or substituted dialkylamino$_{(C\leq 8)}$, or —$X_2C(O)R_7'$; wherein:

$X_2$ is a covalent bond, $NR_g$, or O, wherein:

$R_g$ is hydrogen, alkyl$_{(C\leq 6)}$, or substituted alkyl$_{(C\leq 6)}$;

$R_7'$ is hydrazine, alkylhydrazine$_{(C\leq 12)}$, substituted alkylhydrazine$_{(C\leq 12)}$, heterocycloalkyl$_{(C\leq 12)}$, substituted heterocycloalkyl$_{(C\leq 12)}$, alkoxy$_{(C\leq 8)}$, substituted alkoxy$_{(C\leq 8)}$, cycloalkoxy$_{(C\leq 8)}$, substituted cycloalkoxy$_{(C\leq 8)}$, aryloxy$_{(C\leq 8)}$, substituted aryloxy$_{(C\leq 8)}$, aralkoxy$_{(C\leq 8)}$, substituted aralkoxy$_{(C\leq 8)}$, alkylamino$_{(C\leq 8)}$, substituted alkylamino$_{(C\leq 8)}$, dialkylamino$_{(C\leq 8)}$, substituted dialkylamino$_{(C\leq 8)}$, cycloalkylamino$_{(C\leq 8)}$, substituted cycloalkylamino$_{(C\leq 8)}$, arylamino$_{(C\leq 8)}$, substituted arylamino$_{(C\leq 8)}$, (alkyl) alkylamino$_{(C\leq 8)}$, substituted (alkyl)arylamino $_{(C\leq 8)}$, aralkylamino$_{(C\leq 8)}$, substituted aralkylamino$_{(C\leq 8)}$, a fluorophore, an amino acid residue, or a chemotherapeutic compound; and $X_1$ is an anionic species such that the change on $X_1$ balances the net change on the complex;

provided at least one of $R_1$, $R_2$, $R_4$, or $R_5$ is a group of the formula: —$Y_2$—$R_7$.

In some embodiments, $R_1$ is aryl$_{(C\leq 18)}$ or substituted aryl$_{(C\leq 18)}$. In some embodiments, $R_1$ is aryl$_{(C\leq 18)}$ such as phenyl, 2,6-diisopropylphenyl, or 2,4,6-trimethylphenyl. In some embodiments, $R_1$ is 2,6-diisopropylphenyl. In some embodiments, $R_2$ is aryl$_{(C\leq 18)}$ or substituted aryl$_{(C\leq 18)}$. In some embodiments, $R_2$ is aryl$_{(C\leq 18)}$ such as phenyl, 2,6-diisopropylphenyl, or 2,4,6-trimethylphenyl. In some embodiments, $R_2$ is 2,6-diisopropylphenyl.

In some embodiments, $R_4$ is aryl$_{(C\leq 18)}$ or substituted aryl$_{(C\leq 18)}$. In some embodiments, $R_4$ is aryl$_{(C\leq 18)}$ such as phenyl, 2,6-diisopropylphenyl, or 2,4,6-trimethylphenyl. In some embodiments, $R_4$ is 2,4,6-trimethylphenyl.

In some embodiments, $R_6$ is hydrogen. In some embodiments, $R_6'$ is hydrogen. In some embodiments, $R_6''$ is hydrogen. In some embodiments, $R_6'''$ is hydrogen.

In some embodiments, $R_5$ is a group of the formula: —$Y_2$—$R_7$, wherein:

$Y_2$ is alkanediyl$_{(C\leq 12)}$, alkenediyl$_{(C\leq 12)}$, arenediyl$_{(C\leq 18)}$, heteroarenediyl$_{(C\leq 18)}$, or a substituted version thereof; and $R_7$ is amino, carboxy, halo, hydroxy, mercapto, alkoxy$_{(C\leq 8)}$, substituted alkoxy$_{(C\leq 8)}$, alkylamino$_{(C\leq 8)}$, substituted alkylamino$_{(C\leq 8)}$, dialkylamino$_{(C\leq 8)}$, or substituted dialkylamino$_{(C\leq 8)}$, or —$X_2C(O)R_7'$; wherein:

$X_2$ is a covalent bond, $NR_g$, or O, wherein:

$R_g$ is hydrogen, alkyl$_{(C\leq 6)}$, or substituted alkyl$_{(C\leq 6)}$; and $R_7'$ is hydrazine, alkylhydrazine$_{(C\leq 12)}$, substituted alkylhydrazine$_{(C\leq 12)}$, heterocycloalkyl$_{(C\leq 12)}$, substituted heterocycloalkyl$_{(C\leq 12)}$, alkoxy$_{(C\leq 8)}$, substituted alkoxy$_{(C\leq 8)}$, cycloalkoxy$_{(C\leq 8)}$, substituted cycloalkoxy$_{(C\leq 8)}$, aryloxy$_{(C\leq 8)}$, substituted aryloxy$_{(C\leq 8)}$, aralkoxy$_{(C\leq 8)}$, substituted aralkoxy$_{(C\leq 8)}$, alkylamino$_{(C\leq 8)}$, substituted alkylamino$_{(C\leq 8)}$, dialkylamino$_{(C\leq 8)}$, substituted dialkylamino$_{(C\leq 8)}$, cycloalkylamino$_{(C\leq 8)}$, substituted cycloalkylamino$_{(C\leq 8)}$, arylamino$_{(C\leq 8)}$, substituted arylamino$_{(C\leq 8)}$, (alkyl)alkylamino$_{(C\leq 8)}$, substituted (alkyl)arylamino$_{(C\leq 8)}$, aralkylamino$_{(C\leq 8)}$, substituted aralkylamino$_{(C\leq 8)}$, a fluorophore, an amino acid residue, or a chemotherapeutic compound.

In some embodiments, $Y_2$ is alkanediyl$_{(C\leq 12)}$ or substituted alkanediyl$_{(C\leq 12)}$. In some embodiments, $Y_2$ is alkanediyl$_{(C\leq 12)}$ such as ethylene.

In some embodiments, $R_7$ is —$X_2C(O)R_7'$. In some embodiments, $X_2$ is O. In some embodiments, $R_7'$ is hydrazine. In other embodiments, $R_7'$ is aralkamino$_{(C\leq 18)}$ or substituted aralkamino$_{(C\leq 18)}$. In some embodiments, $R_7'$ is aralkamino$_{(C\leq 18)}$ such as 4-t-butyl-phenylmethyl or pyrenylmethyl. In other embodiments, $R_7'$ is arylamino$_{(C\leq 12)}$ or substituted arylamino$_{(C\leq 12)}$. In some embodiments, $R_7'$ is arylamino$_{(C\leq 12)}$ such as 4-t-butylphenylamino. In some embodiments, $R_7'$ is (alkyl)arylamino$_{(C\leq 12)}$ or substituted (alkyl)arylamino$_{(C\leq 12)}$. In some embodiments, $R_7$' is (alkyl) arylamino$_{(C\leq 12)}$ such as (methyl)phenylamino. In some embodiments, $R_7$' is alkylamino$_{(C\leq 12)}$ or substituted alkylamino$_{(C\leq 12)}$. In some embodiments, $R_7$' is substituted alkylamino$_{(C\leq 12)}$ such as 2-N-Boc-aminoethylamino. In some embodiments, $R_7$' is heterocycloalkyl$_{(C\leq 12)}$ or substituted heterocycloalkyl$_{(C\leq 12)}$. In some embodiments, $R_7$' is heterocycloalkyl$_{(C\leq 12)}$ such as morpholinyl. In some embodiments, $R_7$' is a fluorophore. In some embodiments, $R_7$' is pyrene. In some embodiments, $R_7$' is a chemotherapeutic compound. In some embodiments, $R_7$' is an anticancer antibiotic. In some embodiments, $R_7$' is an anthracycline such as doxorubicin.

In some embodiments, $R_7$' is cycloalkoxy$_{(C\leq 12)}$ or substituted cycloalkoxy$_{(C\leq 12)}$. In some embodiments, $R_7$' is cycloalkoxy$_{(C\leq 12)}$ such as cyclohexyloxy. In some embodiments, $R_7$' is aralkoxy$_{(C\leq 12)}$ or substituted aralkoxy$_{(C\leq 12)}$. In some embodiments, $R_7$' is aralkoxy$_{(C\leq 12)}$ such as 4-methylphenylmethyl or napthyloxy. In some embodiments, $R_7$' is a fluorophore. In some embodiments, $R_7$' is a fluorophore which further comprises a linking group. In some embodiments, the linking group is an alkanediyl$_{(C\leq 8)}$ such as an ethylene linker. In some embodiments, the fluorophore is a naphthalimide based fluorophore. In some embodiments, $R_7$' is an amino acid residue. In some embodiments, the amino acid residue is connected via the side chain of the amino acid. In some embodiments, the side chain is a side chain from a canonical amino acid. In some embodiments, the amino acid is a protected amino acid. In some embodiments, the amino acid is tyrosine, a serine, or threonine. In some embodiments, the amino acid is a protected tyrosine, a serine, or threonine.

In some embodiments, $X_1$ is a monovalent anion such as hexafluorophosphate. In some embodiments, the compounds are further defined as:

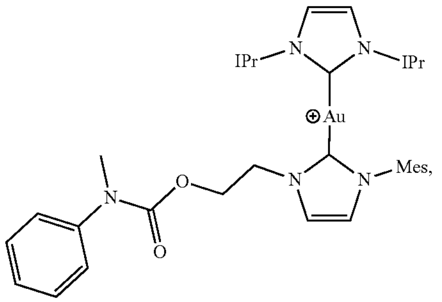

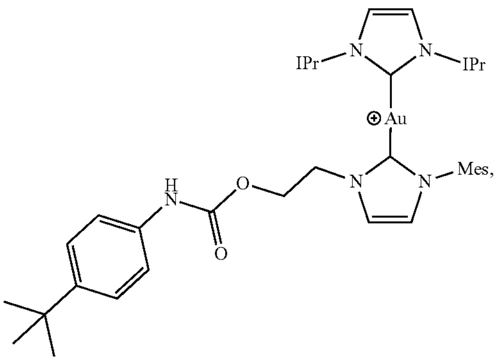

-continued

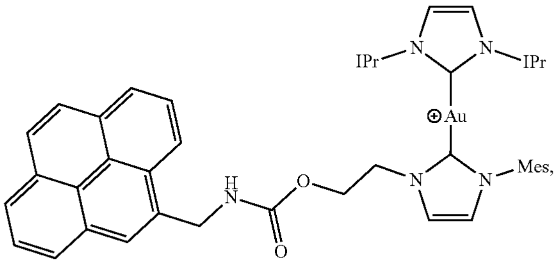

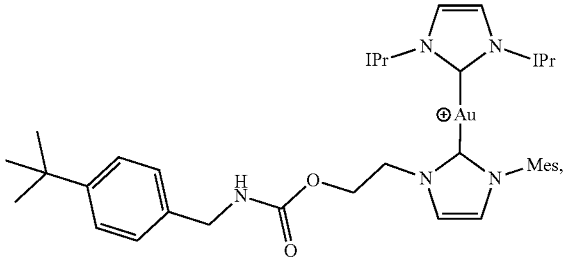

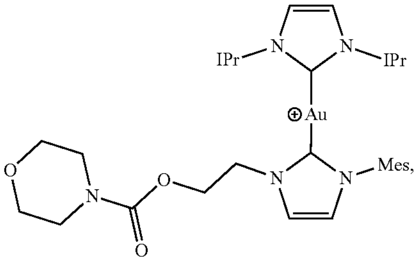

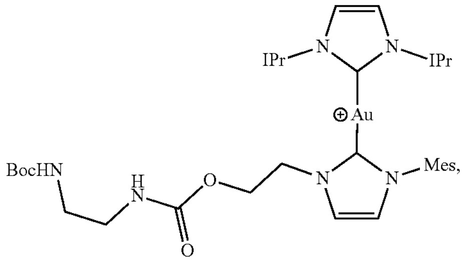

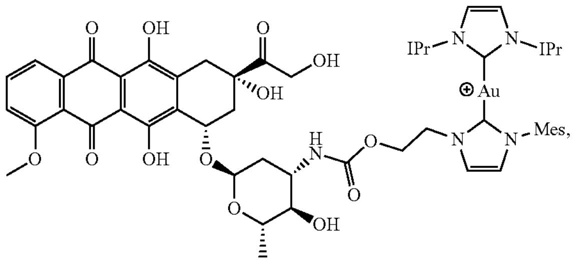

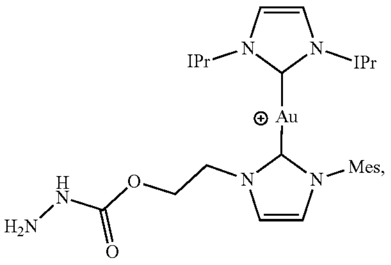

-continued

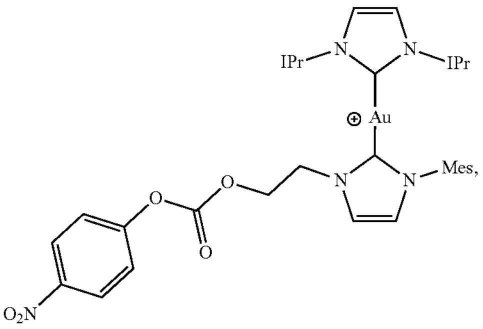

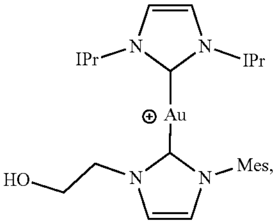

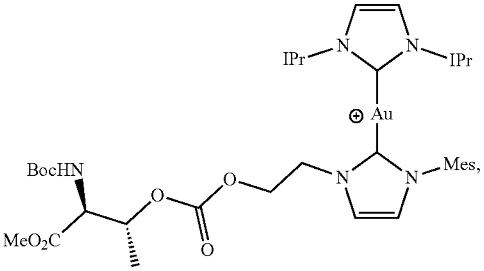

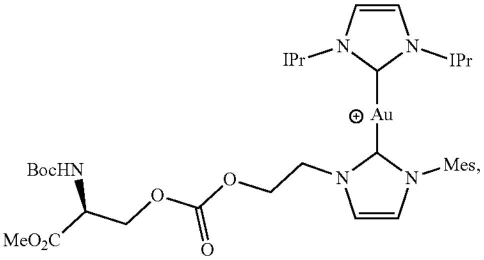

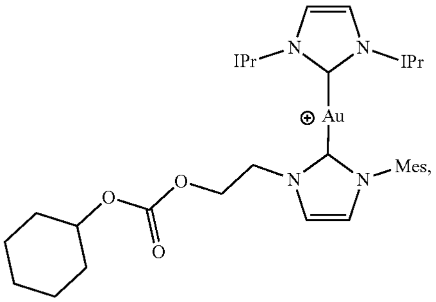

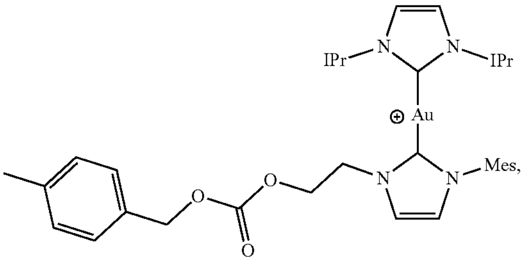

-continued

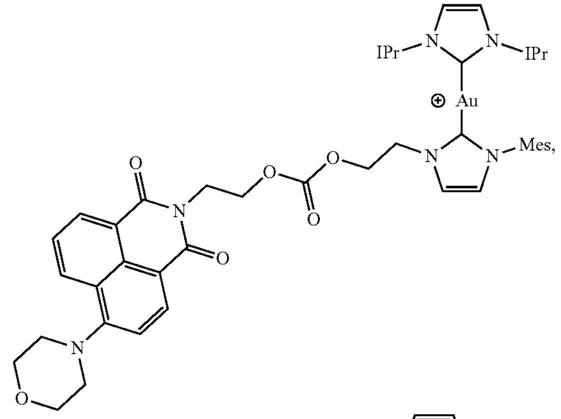

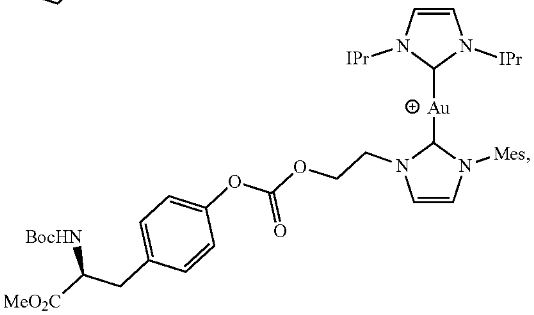

or

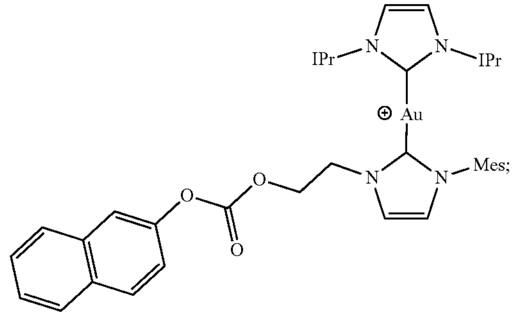

or a monovalent anionic salt thereof.

It is contemplated that any method or composition described herein can be implemented with respect to any other method or composition described herein.

The terms “comprise” (and any form of comprise, such as “comprises” and “comprising”), “have” (and any form of have, such as “has” and “having”), “contain” (and any form of contain, such as: “contains” and “containing”), and “include” (and any form of include, such as “includes” and “including”) are open-ended linking verbs. As a result, a method, composition, kit, or system that “comprises,” “has,” “contains,” or “includes” one or more recited steps or elements possesses those recited steps or elements, but is not limited to possessing only those steps or elements; it may possess (i.e., cover) elements or steps that are not recited. Likewise, an element of a method, composition, kit, or system that “comprises,” “has,” “contains,” or “includes” one or more recited features possesses those features, but is not limited to possessing only those features; it may possess features that are not recited.

Any embodiment of any of the present methods, composition, kit, and systems may consist of or consist essentially of—rather than comprise/include/contain/have—the described steps and/or features. Thus, in any of the claims, the term “consisting of” or “consisting essentially of” may be substituted for any of the open-ended linking verbs recited above, in order to change the scope of a given claim from what it would otherwise be using the open-ended linking verb.

The use of the term "or" in the claims is used to mean "and/or" unless explicitly indicated to refer to alternatives only or the alternatives are mutually exclusive, although the disclosure supports a definition that refers to only alternatives and "and/or."

Throughout this application, the term "about" is used to indicate that a value includes the standard deviation of error for the device or method being employed to determine the value.

Following long-standing patent law, the words "a" and "an," when used in conjunction with the word "comprising" in the claims or specification, denotes one or more, unless specifically noted.

Other objects, features and advantages of the present disclosure will become apparent from the following detailed description. It should be understood, however, that the detailed description and the specific examples, while indicating specific embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The following drawings form part of the present specification and are included to further demonstrate certain aspects of the present disclosure. The disclosure may be better understood by reference to one or more of these drawings in combination with the detailed description of specific embodiments presented herein.

(FIG. 4B) Percent $CRT^+$ Panc-02 cells treated with vehicle, oxaliplatin, and variable concentrations of 3, followed by flow cytometric assessment. (FIG. 4C) ATP release from CT26 cells after a 4 hr incubation with varying concentrations of 3. (FIG. 4D) % tumor free mice (i.e., left flank tumor) treated with the respective anticancer vaccine to the right flank and then inoculated (i.e., challenged) with CT26 cells in the left flank. (FIG. 4E) Tumor growth in the right flank as a result of vaccination.

(FIG. 5B) Dual targeting approach increases exogenous ROS via redox cycling and targeted inhibition of reducing metabolites.

(FIG. 8B) Fluorescence quenching of BSA (5 μM) observed in the presence of increasing equivalents (0-3.96 equiv.) of 5. (FIG. 8C) BSA pellets (left) without complex 5 (right) and with complex 5 illuminated with a hand-held UV lamp (excitation: 365 nm), and (FIG. 8D) stability comparison of 5 in the presence (top) and absence (bottom) of BSA.

(FIG. 12A) Gradual degradation of a 2% DMSO solution of complex 5 (100 μM) into complex 1 and Morpho-Np—OH in the presence of 98% 1:1 methanol/PBS upon incubation at 37° C. Methanol was used to ensure complete dissolution of complex 5 during this 96 h study. (FIG. 12B) 2% DMSO solution of complex 5 (100 μM) in 98% PBS in the presence of 600 μM BSA. No evidence of degradation was seen even after 6 days upon incubating at 37° C.

(FIG. 24A) Mitotracker Red channel (excited at 588 nm) (FIG. 24B) 10 (excited at 405 nm) (FIG. 24C) Merged image. The overlap indicates that 10 localizes to the mitochondria.

(FIG. 25A) Mitotracker Red channel (excited at 588 nm) (FIG. 25B) 8 (excited at 502 nm) (FIG. 25C) Merged image. This study indicates that there is no fluorescent interference between 7 and the Mitotracker Red channel.

(FIG. 26A) 1 μM (FIG. 26B) 500 nM.

DESCRIPTION OF ILLUSTRATIVE EMBODIMENTS

Figure 1:
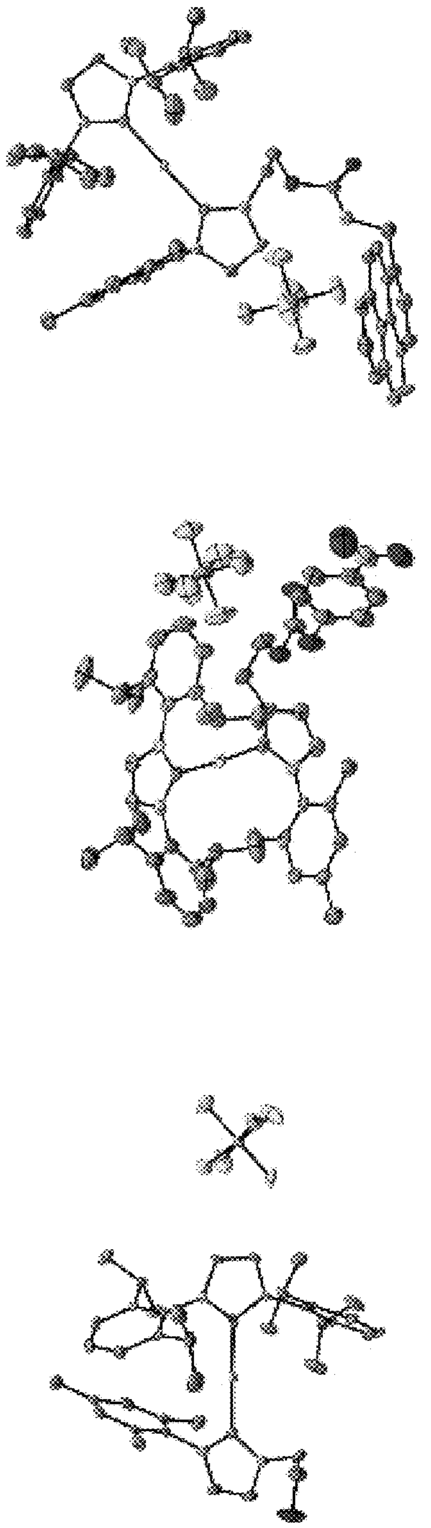
FIG. 1 shows ORTEP representation of SS-1*$PF_6$, SS-A-1, and SS-A-2e from left to right respectively.

In some aspects, the present disclosure provides gold carbene naphthoquinone compounds which contain two different therapeutically active centers and a functional group which allows the compound to be attached to another group. These compounds may be used in the treatment of cancers including platinum resistant cancers. Furthermore, these compounds may be used to lead to immunogenic cell death and the creation of a cancer vaccine. These compounds and related compositions and methods are described in more detail below.

A. COMPOUNDS OF THE PRESENT DISCLOSURE

In some aspects, the present disclosure relates to compounds of the formula:

(III)

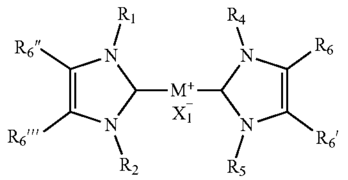

wherein:

M is an Au or Ag ion;

$R_1$, $R_2$, $R_4$, and $R_5$ are each independently alkyl$_{(C\leq12)}$, cycloalkyl$_{(C\leq12)}$, aryl$_{(C\leq18)}$, aralkyl$_{(C\leq18)}$, or a substituted version of any of these groups; or —$(CR_dR_e)C(O)Y_2$; wherein:

$Y_2$ is amino, hydroxy, alkoxy$_{(C\leq8)}$, substituted alkoxy$_{(C\leq8)}$, alkylamino$_{(C\leq8)}$, substituted alkylamino$_{(C\leq8)}$, dialkylamino$_{(C\leq8)}$, or substituted dialkylamino$_{(C\leq8)}$, and $R_d$ and $R_e$ are each independently the side chain of a canonical amino acid or alkyl$_{(C\leq8)}$, cycloalkyl$_{(C\leq8)}$, aryl$_{(C\leq12)}$, aralkyl$_{(C\leq12)}$, heteroaryl$_{(C\leq12)}$, heteroaralkyl$_{(C\leq12)}$, or a substituted version of these six groups;

a group of the formula: —$((CH_2)_rO)_pR_f$, wherein:

r is 1, 2, or 3;

p is 1-10; or $R_f$ is hydrogen, alkyl$_{(C\leq8)}$, or substituted alkyl$_{(C\leq8)}$, or a group of the formula: —$Y_2$—$R_7$, wherein:

$Y_2$ is alkanediyl$_{(C\leq12)}$, alkenediyl$_{(C\leq12)}$, arenediyl$_{(C\leq18)}$, heteroarenediyl$_{(C\leq18)}$, or a substituted version thereof; and $R_7$ is amino, carboxy, halo, hydroxy, mercapto, alkoxy$_{(C\leq8)}$, substituted alkoxy$_{(C\leq8)}$, alkylamino$_{(C\leq8)}$, substituted alkylamino$_{(C\leq8)}$, dialkylamino$_{(C\leq8)}$, or substituted dialkylamino$_{(C\leq8)}$, or —$X_2C(O)R_7'$; wherein:

$X_2$ is a covalent bond, $NR_g$, or O, wherein:

$R_g$ is hydrogen, alkyl$_{(C\leq6)}$, or substituted alkyl$_{(C\leq6)}$;

$R_7'$ is hydrazine, alkylhydrazine$_{(C\leq12)}$, substituted alkylhydrazine$_{(C\leq12)}$, heterocycloalkyl$_{(C\leq12)}$, substituted heterocycloalkyl$_{(C\leq12)}$, alkoxy$_{(C\leq8)}$, substituted alkoxy$_{(C\leq8)}$, cycloalkoxy$_{(C\leq8)}$, substituted cycloalkoxy$_{(C\leq8)}$, aryloxy$_{(C\leq8)}$, substituted aryloxy$_{(C\leq8)}$, aralkoxy$_{(C\leq8)}$, substituted aralkoxy$_{(C\leq8)}$, alkylamino$_{(C\leq8)}$, substituted alkylamino$_{(C\leq8)}$, dialkylamino$_{(C\leq8)}$, substituted dialkylamino$_{(C\leq8)}$, cycloalkylamino$_{(C\leq8)}$, substituted cycloalkylamino$_{(C\leq8)}$, arylamino$_{(C\leq8)}$, substituted arylamino$_{(C\leq8)}$, (alkyl) alkylamino$_{(C\leq8)}$, substituted (alkyl) arylamino$_{(C\leq8)}$, aralkylamino$_{(C\leq8)}$, substituted aralkylamino$_{(C\leq8)}$, a fluorophore, an amino acid residue, or a chemotherapeutic compound;

$R_6$, $R_6'$, $R_6''$, and $R_6'''$ each independently hydrogen, amino, cyano, halo, hydroxy, nitro, thio, or alkyl$_{(C\leq12)}$, cycloalkyl$_{(C\leq12)}$, aryl$_{(C\leq12)}$, heteroaryl$_{(C\leq12)}$, aralkyl$_{(C\leq12)}$, heteroaralkyl$_{(C\leq12)}$, acyl$_{(C\leq12)}$, alkoxy$_{(C\leq12)}$, alkylamino$_{(C\leq12)}$, dialkylamino$_{(C\leq12)}$, or a substituted version of any of these ten groups, or —$(O(CH_2)_s)_zZ_2$, wherein:

s is 1, 2, or 3;

z is 0-10; and $Z_2$ is hydroxy, alkoxy$_{(C\leq 6)}$, or substituted alkoxy$_{(C\leq 6)}$; or $R_6$ and $R_6'$ or $R_6''$ and $R_6'''$ are taken together and are alkanediyl$_{(C\leq 12)}$, alkenediyl$_{(C\leq 12)}$, arenediyl$_{(C\leq 18)}$, heteroarenediyl$_{(C\leq 18)}$, or a substituted version thereof; or $R_6''$ and $R_6'''$ are taken together and are a group of the formula:

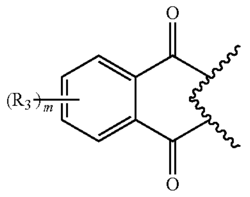

wherein:

$R_3$ is hydrogen, amino, cyano, halo, hydroxy, nitro, thio, or alkyl$_{(C\leq 12)}$, cycloalkyl$_{(C\leq 12)}$, aryl$_{(C\leq 12)}$, heteroaryl$_{(C\leq 12)}$, aralkyl$_{(C\leq 12)}$, heteroaralkyl$_{(C\leq 12)}$, acyl$_{(C\leq 12)}$, alkoxy$_{(C\leq 12)}$, alkylamino$_{(C\leq 12)}$, dialkylamino$_{(C\leq 12)}$, or a substituted version of any of these ten groups, or $—(O(CH_2)_t)_yZ_1$, wherein:

tis 1, 2, or 3;

y is 0-10; and $Z_1$ is hydroxy, alkoxy$_{(C\leq 6)}$, or substituted alkoxy$_{(C\leq 6)}$;

or two or more positions are substituted with $R_3$ and two of the $R_3$ groups are taken together and are alkanediyl$_{(C\leq 12)}$, alkenediyl$_{(C\leq 12)}$, arenediyl$_{(C\leq 18)}$, heteroarenediyl$_{(C\leq 18)}$, or a substituted version thereof;

m is 1, 2, 3, or 4; and $X_1$ is an anionic species such that the change on $X_1$ balances the net change on the complex;

provided at least one of $R_1$, $R_2$, $R_4$, or $R_5$ is a group of the formula: $—Y_2—R_7$.

These compounds are shown, for example, above in the summary section and in the claims below. They may be made using the methods outlined in the Examples section. These methods can be further modified and optimized using the principles and techniques of organic chemistry as applied by a person skilled in the art. Such principles and techniques are taught, for example, in *March's Advanced Organic Chemistry: Reactions, Mechanisms, and Structure* (2007), which is incorporated by reference herein.

The compounds of the present invention (also referred to as "compounds of the present disclosure") are shown, for example, above, in the summary of the invention section, and in the claims below. They may be made using the synthetic methods outlined in the Examples section. These methods can be further modified and optimized using the principles and techniques of organic chemistry as applied by a person skilled in the art. Such principles and techniques are taught, for example, in Smith, *March's Advanced Organic Chemistry: Reactions, Mechanisms, and Structure*, (2013), which is incorporated by reference herein. In addition, the synthetic methods may be further modified and optimized for preparative, pilot- or large-scale production, either batch or continuous, using the principles and techniques of process chemistry as applied by a person skilled in the art. Such principles and techniques are taught, for example, in Anderson, *Practical Process Research & Development—A Guide for Organic Chemists* (2012), which is incorporated by reference herein.

All the compounds of the present invention may in some embodiments be used for the prevention and treatment of one or more diseases or disorders discussed herein or otherwise. In some embodiments, one or more of the compounds characterized or exemplified herein as an intermediate, a metabolite, and/or prodrug, may nevertheless also be useful for the prevention and treatment of one or more diseases or disorders. As such unless explicitly stated to the contrary, all the compounds of the present invention are deemed "active compounds" and "therapeutic compounds" that are contemplated for use as active pharmaceutical ingredients (APIs). Actual suitability for human or veterinary use is typically determined using a combination of clinical trial protocols and regulatory procedures, such as those administered by the Food and Drug Administration (FDA). In the United States, the FDA is responsible for protecting the public health by assuring the safety, effectiveness, quality, and security of human and veterinary drugs, vaccines and other biological products, and medical devices.

In some embodiments, the compounds of the present invention have the advantage that they may be more efficacious than, be less toxic than, be longer acting than, be more potent than, produce fewer side effects than, be more easily absorbed than, more metabolically stable than, more lipophilic than, more hydrophilic than, and/or have a better pharmacokinetic profile (e.g., higher oral bioavailability and/or lower clearance) than, and/or have other useful pharmacological, physical, or chemical properties over, compounds known in the prior art, whether for use in the indications stated herein or otherwise.

Compounds of the present invention may contain one or more asymmetrically-substituted carbon or nitrogen atom and may be isolated in optically active or racemic form. Thus, all chiral, diastereomeric, racemic form, epimeric form, and all geometric isomeric forms of a chemical formula are intended, unless the specific stereochemistry or isomeric form is specifically indicated. Compounds may occur as racemates and racemic mixtures, single enantiomers, diastereomeric mixtures and individual diastereomers. In some embodiments, a single diastereomer is obtained. The chiral centers of the compounds of the present invention can have the S or the R configuration. In some embodiments, the present compounds may contain two or more atoms which have a defined stereochemical orientation.

Chemical formulas used to represent compounds of the present invention will typically only show one of possibly several different tautomers. For example, many types of ketone groups are known to exist in equilibrium with corresponding enol groups. Similarly, many types of imine groups exist in equilibrium with enamine groups. Regardless of which tautomer is depicted for a given compound, and regardless of which one is most prevalent, all tautomers of a given chemical formula are intended.

In addition, atoms making up the compounds of the present invention are intended to include all isotopic forms of such atoms. Isotopes, as used herein, include those atoms having the same atomic number but different mass numbers. By way of general example and without limitation, isotopes of hydrogen include tritium and deuterium, and isotopes of carbon include $^{13}C$ and $^{14}C$.

In some embodiments, compounds of the present invention function as prodrugs or can be derivatized to function as prodrugs. Since prodrugs are known to enhance numerous desirable qualities of pharmaceuticals (e.g., solubility, bioavailability, manufacturing, etc.), the compounds employed in some methods of the invention may, if desired, be delivered in prodrug form. Thus, the invention contemplates prodrugs of compounds of the present invention as well as methods of delivering prodrugs. Prodrugs of the compounds employed in the invention may be prepared by modifying functional groups present in the compound in such a way that the modifications are cleaved, either in routine manipulation or in vivo, to the parent compound. Accordingly, prodrugs include, for example, compounds described herein in which a hydroxy, amino, or carboxy group is bonded to any group that, when the prodrug is administered to a patient, cleaves to form a hydroxy, amino, or carboxylic acid, respectively.

In some embodiments, compounds of the present invention exist in salt or non-salt form. With regard to the salt form(s), in some embodiments the particular anion or cation forming a part of any salt form of a compound provided herein is not critical, so long as the salt, as a whole, is pharmacologically acceptable. Additional examples of pharmaceutically acceptable salts and their methods of preparation and use are presented in *Handbook of Pharmaceutical Salts: Properties, and Use* (2002), which is incorporated herein by reference.

B. HYPERPROLIFERATIVE DISEASES

While hyperproliferative diseases can be associated with any medical disorder that causes a cell to begin to reproduce uncontrollably, the prototypical example is cancer. One of the key elements of cancer is that the normal apoptotic cycle of the cell is interrupted and thus agents that lead to apoptosis of the cell are important therapeutic agents for treating these diseases. As such, the gold carbene naphthoquinone compounds and compositions described in this disclosure may be effective in treating cancers.

Cancer cells that may be treated with the compounds according to the embodiments include but are not limited to cells from the bladder, blood, bone, bone marrow, brain, breast, colon, esophagus, gastrointestine, gum, head, kidney, liver, lung, nasopharynx, neck, ovary, prostate, skin, stomach, pancreas, testis, tongue, cervix, or uterus. In addition, the cancer may specifically be of the following histological type, though it is not limited to these: neoplasm, malignant; carcinoma; carcinoma, undifferentiated; giant and spindle cell carcinoma; small cell carcinoma; papillary carcinoma; squamous cell carcinoma; lymphoepithelial carcinoma; basal cell carcinoma; pilomatrix carcinoma; transitional cell carcinoma; papillary transitional cell carcinoma; adenocarcinoma; gastrinoma, malignant; cholangiocarcinoma; hepatocellular carcinoma; combined hepatocellular carcinoma and cholangiocarcinoma; trabecular adenocarcinoma; adenoid cystic carcinoma; adenocarcinoma in adenomatous polyp; adenocarcinoma, familial polyposis coli; solid carcinoma; carcinoid tumor, malignant; branchiolo-alveolar adenocarcinoma; papillary adenocarcinoma; chromophobe carcinoma; acidophil carcinoma; oxyphilic adenocarcinoma; basophil carcinoma; clear cell adenocarcinoma; granular cell carcinoma; follicular adenocarcinoma; papillary and follicular adenocarcinoma; nonencapsulating sclerosing carcinoma; adrenal cortical carcinoma; endometroid carcinoma; skin appendage carcinoma; apocrine adenocarcinoma; sebaceous adenocarcinoma; ceruminous adenocarcinoma; mucoepidermoid carcinoma; cystadenocarcinoma; papillary cystadenocarcinoma; papillary serous cystadenocarcinoma; mucinous cystadenocarcinoma; mucinous adenocarcinoma; signet ring cell carcinoma; infiltrating duct carcinoma; medullary carcinoma; lobular carcinoma; inflammatory carcinoma; paget's disease, mammary; acinar cell carcinoma; adenosquamous carcinoma; adenocarcinoma w/squamous metaplasia; thymoma, malignant; ovarian stromal tumor, malignant; thecoma, malignant; granulosa cell tumor, malignant; androblastoma, malignant; sertoli cell carcinoma; leydig cell tumor, malignant; lipid cell tumor, malignant; paraganglioma, malignant; extramammary paraganglioma, malignant; pheochromocytoma; glomangiosarcoma; malignant melanoma; amelanotic melanoma; superficial spreading melanoma; malig melanoma in giant pigmented nevus; epithelioid cell melanoma; blue nevus, malignant; sarcoma; fibrosarcoma; fibrous histiocytoma, malignant; myxosarcoma; liposarcoma; leiomyosarcoma; rhabdomyosarcoma; embryonal rhabdomyosarcoma; alveolar rhabdomyosarcoma; stromal sarcoma; mixed tumor, malignant; mullerian mixed tumor; nephroblastoma; hepatoblastoma; carcinosarcoma; mesenchymoma, malignant; brenner tumor, malignant; phyllodes tumor, malignant; synovial sarcoma; mesothelioma, malignant; dysgerminoma; embryonal carcinoma; teratoma, malignant; struma ovarii, malignant; choriocarcinoma; mesonephroma, malignant; hemangiosarcoma; hemangioendothelioma, malignant; kaposi's sarcoma; hemangiopericytoma, malignant; lymphangiosarcoma; osteosarcoma; juxtacortical osteosarcoma; chondrosarcoma; chondroblastoma, malignant; mesenchymal chondrosarcoma; giant cell tumor of bone; ewing's sarcoma; odontogenic tumor, malignant; ameloblastic odontosarcoma; ameloblastoma, malignant; ameloblastic fibrosarcoma; pinealoma, malignant; chordoma; glioma, malignant; ependymoma; astrocytoma; protoplasmic astrocytoma; fibrillary astrocytoma; astroblastoma; glioblastoma; oligodendroglioma; oligodendroblastoma; primitive neuroectodermal; cerebellar sarcoma; ganglioneuroblastoma; neuroblastoma; retinoblastoma; olfactory neurogenic tumor; meningioma, malignant; neurofibrosarcoma; neurilemmoma, malignant; granular cell tumor, malignant; malignant lymphoma; Hodgkin's disease; Hodgkin's; paragranuloma; malignant lymphoma, small lymphocytic; malignant lymphoma, large cell, diffuse; malignant lymphoma, follicular; mycosis fungoides; other specified non-Hodgkin's lymphomas; malignant histiocytosis; multiple myeloma; mast cell sarcoma; immunoproliferative small intestinal disease; leukemia; lymphoid leukemia; plasma cell leukemia; erythroleukemia; lymphosarcoma cell leukemia; myeloid leukemia; basophilic leukemia; eosinophilic leukemia; monocytic leukemia; mast cell leukemia; megakaryoblastic leukemia; myeloid sarcoma; and hairy cell leukemia. In certain aspects, the tumor may comprise an osteosarcoma, angiosarcoma, rhabdosarcoma, leiomyosarcoma, Ewing sarcoma, glioblastoma, neuroblastoma, or leukemia.

In particular, the cancers treated herein may be associated with one or more specific types of mutations or treated by inducing reactive oxygen species or causing immunogenic cell death including through the use of medicinal metal complexes.

I. Medicinal Inorganic Compounds

Medicinal inorganic chemistry is a field of tremendous potential whose promise has yet to be fully realized. In fact, at present, the only non-radioactive inorganic compounds to have received FDA approval as cancer therapeutics are cisplatin, carboplatin, and oxaliplatin. These compounds are used as front line therapies by oncologists, with roughly half of all cancer patients undergoing chemotherapy receiving one of these three complexes, alone or in combination with other agents (Galanski et al., 2005). While the platins are not devoid of problems, including inter alia dose-limiting toxicities, poor tumor localization, accumulated resistance, and off-target toxicity, it is clear that if other metals could be found that show benefits approaching or surpassing those of platinum, it would have a transformative effect on oncology. This would be particularly true if different modes of action were involved.

Currently, considerable effort is being devoted to expanding the periodic table of medicinal inorganic chemistry. In addition to prior work with Lu and Gd of the inventors (Sessler and Miller, 2000), a variety of Ru (Antonarakis and Emadi, 2010), Os (Ni et al., 2011), Rh (Aguirre et al., 2009), Ti (Melendez, 2002), Re (Suntharalingam et al., 2015), and Ga (Timerbaev, 2009) complexes are being studied as potential cancer therapeutics, with several agents advancing into clinical trials. Gold complexes have also received attention (Berners-Price and Filipovska, 2011; Zou et al., 2015). The inventors have created a series of small Au(I)-containing molecules were specifically designed to target a cancer relevant pathway rather than a single protein target (Compounds 1 and 2) (Arambula et al., 2016; McCall et al., 2017). However, these systems suffered from poor water solubility and lacked a functional handle that would allow them to be attached to inter alia a targeting agent or derivatized in prodrug form. Therefore, instantly claimed compounds were created including complex 3 that may be formulated for use in vivo and which shows surprising and unexpected high potency.

In recent years a shift has occurred that gives rise to the field of systems/network pharmacology whose focus involves identifying drug candidates that act by modulating concurrently multiple networked targets (Hopkins, 2008; Zhou et al., 2016). This new vision is leading to a rethinking of the "magic bullet" approach involving drugs that bind and interact preferentially with a single disease target (Kaufmann, 2008; Valent et al., 2016). Dual knockout yeast model studies have lent support to the suggestion that the simultaneous deletion of two genes within a specific pathway can result in a phenotypic alteration under conditions where the targeting of a single gene will not (Ooi et al., 2017; Hillenmeyer et al., 2008). Without wishing to be bound by any theory, it is believed that dual targeting agents that both lead to the oxidative damage-based death of cancer cells and promote the dying/dead cancer cells to induce a specific immunological response will be exceptionally promising as drug leads. Because it should elicit immunogenic anticancer response mechanisms, this targeting of the cancer antioxidant network is expected to be exceptionally powerful. It will allow for the discovery of novel dual targeting immunotherapeutics that have particular utility in cancer indications, such as lung, colorectal, thyroid, breast, and melanoma, that display network hyperactivity and are characterized by an overexpression of several key proteins (Gromer et al., 2004).

II. Cancer Immunotherapy and Dual Therapies

While the idea of targeting a host's immune system to treat cancer is not new (Sharma et al., 2011), recent advances in therapeutic development have defined this field as the new state of the art for cancer treatment. Cancer is capable of activating multiple resistance mechanisms, such as local immune evasion, enhanced tolerance, and an intricate and systemic breakdown of T cell signaling. In addition to these mechanisms, immune editing allows for selective pressures on neoplasms, resulting in fewer immunogenic cancer cells (Mahoney et al., 2015). This confluence of factors has historically made the development of cancer immunotherapies a challenge. However, recent developments and significant achievements, such as 1) the autologous cellular immunotherapy, Sipuleucel-T, approved for prostate cancer in 2010 (Topalian et al., 2011), 2) anti-cytotoxic T lymphocyte-associated protein 4 (CTLA-4), approved for melanoma in 2011, and 3) anti-programmed cell death protein (PD-1), approved for melanoma in 2014, have changed the way medical professionals approach the treatment of cancer (Sharma and Allison, 2015). However, regardless of the strategy (i.e., cytokines, cell-based therapies, vaccines, immune checkpoint blockade), major challenges still exist, including low clinical responses (Cytokines), high dose-limiting toxicity (Cytokines), safety issues (Cell based therapies), expense (Cell based therapies), a small percentage of patients benefiting (immune checkpoint blockade), and immune related adverse events (immune checkpoint blockade) (Farkona et al., 2016). But novel approaches to activating an anticancer immunological response are still required.

a. Immunogenic Cell Death

Apoptosis via traditional chemotherapy treatment is generally thought to be immune system independent. However, recent data supports the notion that apoptosis follows biochemically distinct subroutines that promote ICD (Savill and Fadok, 2000; Matzinger et al., 2002; Blachère et al., 2005; Casares et al., 2005; Sancho et al., 2008). This is evidenced by the fact that when immunocompetent mice are inoculated with murine tumor cells pretreated with several specific apoptosis inducers (i.e., anthracyclines, oxaliplatin), an immune response is induced that protects the animals against a subsequent tumor re-challenge (Casares et al., 2005; Sancho et al., 2008). Sub-cellular stress response mechanisms are responsible for ICD (Casares et al., 2005; Tesniere et al., 2009; Bezu et al., 2015; Terenzi et al., 2016). While traditional chemotherapies impair mitotic progression via DNA damage and replication inhibition, the target promiscuity of anthracyclines and oxaliplatin (but not cisplatin) also results in mitochondrial and ER oxidative stress that leads to dendritic cell (DC) dependent immune activation (Sancho et al., 2008; Tesniere et al., 2009; Obeid et al., 2006). These stress mechanisms result in pre-apoptotic translocation of calreticulin (CRT) from the ER to the cellular membrane. Following this, autophagy-dependent release of ATP during apoptosis and the extracellular release of the high mobility group box 1 (HMGB1) protein (Apetoh et al., 2007) during cell permeabilization give rise to three specific biomarkers that are identified by the DC receptors CD91, P2RX7, and troll-like receptor 4 (TLR-4) for CRT, ATP, and HMGB1, respectively (Terenzi et al., 2016). Small molecules that induce such a unique anticancer response (i.e., ICD) are exceptionally rare. For example, Kepp, et al. screened 2,033 molecules, a set that included 1) all FDA-approved anti-cancer agents, 2) many other FDA approved drugs, and 3) putative anticancer agents that constitute the "mechanistic diversity set" of the NCI. Of these, only 9 molecules emerged as being validated to induce ICD (Kepp et al., 2014).

The significance of ICD in clinical outcomes is evidenced in wild-type and mutant TLR-4 patient populations (12-14% mutation rate in humans) in which loss-of-function alleles result in tumor recurrence after treatment with anthracyclines (Ferwerda et al., 2007). ICD results in a stepwise process of DC localization to the tumor, phagocytosis of dying/dead tumor cells by DCs, antigen processing by DCs, maturation of DCs, and antigen presentation by DCs to T cells. This cascade culminates in an IFN-γ-mediated immune response (Terenzi et al., 2016). As evidenced by the clinical benefits of immune checkpoint inhibitors, immunologically mediated anti-tumor mechanisms are now being actively pursued in the context of modern day cancer treatment (Baik et al., 2017). Without wishing to be bound by any theory, it is believed that the discovery of new small molecules that elicit such mechanisms of action will play a critical role within the cancer treatment landscape in the coming decades, either as stand-alone drugs or as combination therapies in conjunction with immune checkpoint inhibitors (Terenzi et al., 2016).

b. Antioxidant Network Targeting

An increase in intracellular reactive oxygen species (ROS) is a hallmark of malignant cellular proliferation. In cancer, this increase is often offset by an increase in antioxidant pathway activity (Diehn et al., 2009). These biochemical and phenotypic shifts (i.e., elevation in ROS and antioxidant pathway activity), as well as cancer-specific mechanisms for the regeneration of the biochemical antioxidant thioredoxin (Trx), makes inhibition of Trx and its complement thioredoxin reductase (TrxR) (or the Trx/TrxR redox couple) an attractive strategy for cancer drug discovery (Gromer et al., 2004; Arner and Holmgren, 2000; Berggren et al., 1966; Raffel et al., 2003; Kim et al., 2005; Ai et al., 2016; and Eriksson et al., 2009). However, the simple targeting of TrxR is not sufficient for in vivo anticancer activity.

Figure 5A:
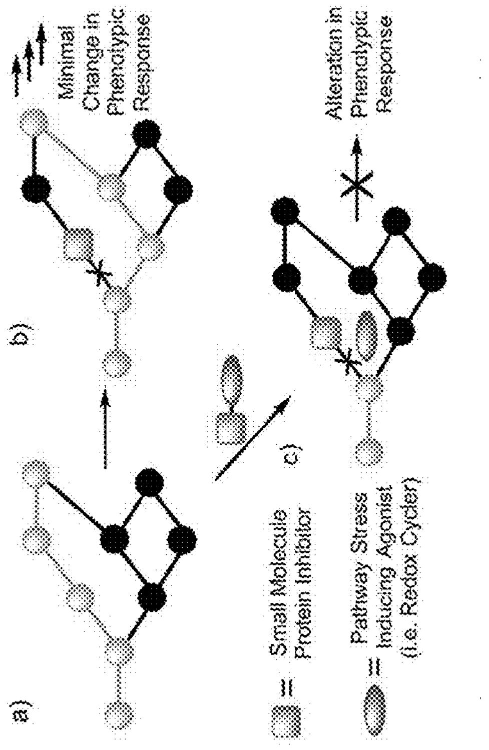
FIGS. 5A & 5B show (FIG. 5A) Schematic view of bimodal network targeting. I) Normal (green) signal transduction within a generic biological network. II) In the presence of a small molecule protein inhibitor, the pathway is shut down (black); however, no change in response is observed due to redirection of the signal transduction. III) It is hypothesized that biochemical targeting with the same protein inhibitor in conjunction with a small molecule that induces general pathway stress (e.g., a redox cycler) will shut down the network, resulting in a greater alteration in the phenotypic response.

While many complexes (both organic and inorganic in origin) are effective in TrxR inhibition, Au(I)-based complexes are particularly interesting due to their recognized ability to bind selectively to the selenylsulfide/selenothiol redox center of the enzyme (Colotti et al., 2013; 2005). Studies with auranofin (approved for rheumatoid arthritis) served to underscore its ability to inhibit TrxR via S—Au (I)—Se complexation. Moreover, auranofin is currently accepted as being the best known inhibitor of TrxR (Di Sarra et al., 2013). Auranofin and other Au(I)-phosphine complexes display moderate antiproliferative activity in several cancer cell lines; however, only limited anti-tumor activity has been observed in vivo (Hill et al., 1989; Mirabelli et al., 1986; Viotte et al., 1996). This contrast between in vitro activity and lack of in vivo efficacy is attributed to the lability of the Au(I)-phosphine bond and is compounded by the complexity of the antioxidant pathway. In particular, the resiliency of the highly-networked antioxidant pathway prevents effective growth inhibition in vivo when only TrxR is targeted (FIG. 5A, I→II).

Due to the limitations associated with targeting a single protein within the antioxidant pathway (e.g., the use of auranofin to inhibit TrxR), a systems/network pharmacology approach was adopted; which allows the identification of drug candidates that act via modulation of multiple networked targets and which, specifically, act as immune-stimulatory therapeutics (Hopkins, 2008; 2016). The emerging appeal of systems-based therapeutic approaches has prompted efforts to identify viable targets within biological networks (FIG. 5A, I→III). Unfortunately, to date, random deletions or inhibition of specific proteins have typically led to poor phenotypic outputs due to the scale-free nature of biological networks (Barabási and Oltvai, 2004). As a consequence, the targeting of single proteins or nodes within a biological system often does not lead to viable drug candidates (FIG. 5A, I→II) (e.g., auranofin targeting TrxR). However, dual knockout yeast model studies support the suggestion that the simultaneous deletion of two genes can result in a phenotypic alteration under conditions where the targeting of a single gene will not (Ooi et al., 2017; Hillenmeyer et al., 2008). However, the creation of effective small molecule capable of targeting such cellular networks is a current challenge.

Figure 5B:
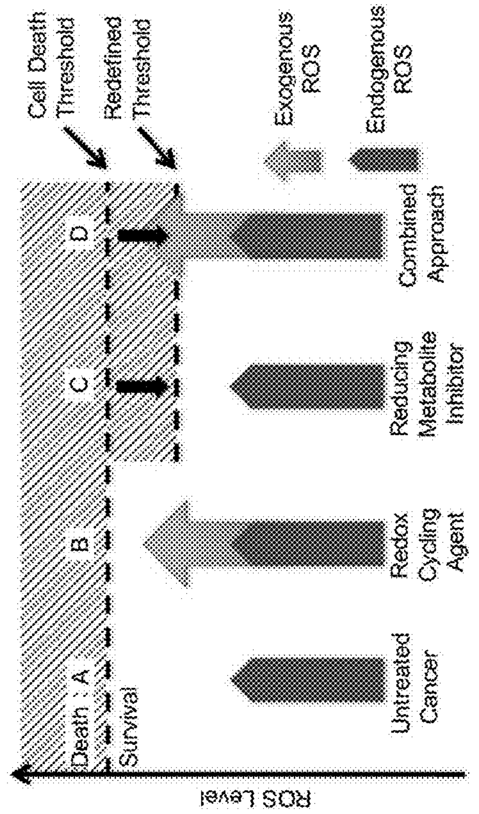

With the above considerations in mind, a new approach to systems biology-based drug discovery was developed that involves the dual targeting of antioxidant response mechanisms. Without wishing to be bound by any theory, it is believed that the oxidative damage and overcoming endogenous oxidative stress prevention provides an ideal means for dual network targeting since 1) the antioxidant response pathway is overexpressed in several cancers, 2) effective targeting leads to alterations of growth phenotypes, and 3) normal cells are believed to have a greater capacity for reactive oxygen species (ROS) adaptation (Diehn et al., 2009; Schumacker, 2017; Trachootham et al., 2009; Zhao and Butler, 2013; and Gorrini et al., 2013). These three differences are thought to result in cancer selectivity (Trachootham et al., 2009). Targeting the antioxidant network is a recognized strategy for anticancer drug discovery; however, there are limited examples of complexes that can pleiotropically modulate distinct mechanisms simultaneously (Hill et al., 1989; Mirabelli et al., 1986; Viotte et al., 1996; Mirabelli et al., 1985). To achieve a systems-based targeting of the antioxidant pathway, agents that both reduces ROS tolerance while increasing ROS production have been created (FIG. 5B). These agents are designed to perturb antioxidant homeostasis from both ends, thus overwhelming the network and promoting cell death (FIG. 5A, I→III, and FIG. 5B). As supported by the data presented herein, the resulting mitochondrial and ER stress response mechanisms triggers immunogenic cell death (ICD), thus generating a new class of immuno-stimulatory therapeutics.

C. PHARMACEUTICAL FORMULATIONS AND ROUTES OF ADMINISTRATION

In another aspect, for administration to a patient in need of such treatment, pharmaceutical formulations (also referred to as a pharmaceutical preparations, pharmaceutical compositions, pharmaceutical products, medicinal products, medicines, medications, or medicaments) comprise a therapeutically effective amount of a compound disclosed herein formulated with one or more excipients and/or drug carriers appropriate to the indicated route of administration. In some embodiments, the compounds disclosed herein are formulated in a manner amenable for the treatment of human and/or veterinary patients. In some embodiments, formulation comprises admixing or combining one or more of the compounds disclosed herein with one or more of the following excipients: lactose, sucrose, starch powder, cellulose esters of alkanoic acids, cellulose alkyl esters, talc, stearic acid, magnesium stearate, magnesium oxide, sodium and calcium salts of phosphoric and sulfuric acids, gelatin, acacia, sodium alginate, polyvinylpyrrolidone, and/or polyvinyl alcohol, as well as cyclodextrins, open chain oligosaccharides, and related carriers. In some embodiments, e.g., for oral administration, the pharmaceutical formulation may be tableted or encapsulated. In some embodiments, the compounds may be dissolved or slurried in water, polyethylene glycol, propylene glycol, ethanol, corn oil, cottonseed oil, peanut oil, sesame oil, benzyl alcohol, sodium chloride, and/or various buffers. In some embodiments, the pharmaceutical formulations may be subjected to pharmaceutical operations, such as sterilization, and/or may contain drug carriers and/or excipients such as preservatives, stabilizers, wetting agents, emulsifiers, encapsulating agents such as lipids, dendrimers, polymers, proteins such as albumin, nucleic acids, and buffers.

Pharmaceutical formulations may be administered by a variety of methods, e.g., orally or by injection (e.g. subcutaneous, intravenous, and intraperitoneal). Depending on the route of administration, the compounds disclosed herein may be coated in a material to protect the compound from the action of acids and other natural conditions which may inactivate the compound. To administer the active compound by other than parenteral administration, it may be necessary to coat the compound with, or co-administer the compound with, a material to prevent its inactivation. In some embodiments, the active compound may be administered to a patient in an appropriate carrier, for example, liposomes, or a diluent. Pharmaceutically acceptable diluents include saline and aqueous buffer solutions. Liposomes include water-in-oil-in-water CGF emulsions as well as conventional liposomes. Cyclodextrins and related systems may also be used as excipients.

The compounds disclosed herein may also be administered parenterally, intraperitoneally, intraspinally, or intracerebrally. Dispersions can be prepared in glycerol, liquid polyethylene glycols, and mixtures thereof and in oils. Under ordinary conditions of storage and use, these preparations may contain a preservative to prevent the growth of microorganisms.

Pharmaceutical compositions suitable for injectable use include sterile aqueous solutions (where water soluble) or dispersions and sterile powders for the extemporaneous preparation of sterile injectable solutions or dispersion. The carrier can be a solvent or dispersion medium containing, for example, water, ethanol, polyol (such as, glycerol, propylene glycol, and liquid polyethylene glycol, and the like), suitable mixtures thereof, and vegetable oils. The proper fluidity can be maintained, for example, by the use of a coating such as lecithin, by the maintenance of the required particle size in the case of dispersion and by the use of surfactants. Prevention of the action of microorganisms can be achieved by various antibacterial and antifungal agents, for example, parabens, chlorobutanol, phenol, ascorbic acid, thimerosal, and the like. In many cases, it will be preferable to include isotonic agents, for example, sugars, sodium chloride, or polyalcohols such as mannitol and sorbitol, in the composition. Prolonged absorption of the injectable compositions can be brought about by including in the composition an agent which delays absorption, for example, aluminum monostearate or gelatin.

The compounds disclosed herein can be administered orally, for example, with an inert diluent or an assimilable edible carrier. The compounds and other ingredients may also be enclosed in a hard or soft-shell gelatin capsule, compressed into tablets, or incorporated directly into the patient's diet. For oral therapeutic administration, the compounds disclosed herein may be incorporated with excipients and used in the form of ingestible tablets, buccal tablets, troches, capsules, elixirs, suspensions, syrups, wafers, and the like. The percentage of the therapeutic compound in the compositions and preparations may, of course, be varied. The amount of the therapeutic compound in such pharmaceutical formulations is such that a suitable dosage will be obtained.

The therapeutic compound may also be administered topically to the skin, eye, ear, or mucosal membranes. Administration of the therapeutic compound topically may include formulations of the compounds as a topical solution, lotion, cream, ointment, gel, foam, transdermal patch, or tincture. When the therapeutic compound is formulated for topical administration, the compound may be combined with one or more agents that increase the permeability of the compound through the tissue to which it is administered. In other embodiments, it is contemplated that the topical administration is administered to the eye. Such administration may be applied to the surface of the cornea, conjunctiva, or sclera. Without wishing to be bound by any theory, it is believed that administration to the surface of the eye allows the therapeutic compound to reach the posterior portion of the eye. Ophthalmic topical administration can be formulated as a solution, suspension, ointment, gel, or emulsion. Finally, topical administration may also include administration to the mucosa membranes such as the inside of the mouth. Such administration can be directly to a particular location within the mucosal membrane such as a tooth, a sore, or an ulcer. Alternatively, if local delivery to the lungs is desired the therapeutic compound may be administered by inhalation in a dry-powder or aerosol formulation.

In some embodiments, it may be advantageous to formulate parenteral compositions in dosage unit form for ease of administration and uniformity of dosage. Dosage unit form as used herein refers to physically discrete units suited as unitary dosages for the patients to be treated; each unit containing a predetermined quantity of therapeutic compound calculated to produce the desired therapeutic effect in association with the required pharmaceutical carrier. In some embodiments, the specification for the dosage unit forms of the invention are dictated by and directly dependent on (a) the unique characteristics of the therapeutic compound and the particular therapeutic effect to be achieved, and (b) the limitations inherent in the art of compounding such a therapeutic compound for the treatment of a selected condition in a patient. In some embodiments, active compounds are administered at a therapeutically effective dosage sufficient to treat a condition associated with a condition in a patient. For example, the efficacy of a compound can be evaluated in an animal model system that may be predictive of efficacy in treating the disease in a human or another animal.

In some embodiments, the effective dose range for the therapeutic compound can be extrapolated from effective doses determined in animal studies for a variety of different animals. In some embodiments, the human equivalent dose (HED) in mg/kg can be calculated in accordance with the following formula (see, e.g., Reagan-Shaw et al., *FASEB J.,* 22(3):659-661, 2008, which is incorporated herein by reference):

$$\text{HED (mg/kg)} = \text{Animal dose (mg/kg)} \times (\text{Animal } K_m/\text{Human } K_m)$$

Use of the $K_m$ factors in conversion results in HED values based on body surface area (BSA) rather than only on body mass. $K_m$ values for humans and various animals are well known. For example, the $K_m$ for an average 60 kg human (with a BSA of 1.6 $m^2$) is 37, whereas a 20 kg child (BSA 0.8 $m^2$) would have a $K_m$ of 25. $K_m$ for some relevant animal models are also well known, including: mice $K_m$ of 3 (given a weight of 0.02 kg and BSA of 0.007); hamster $K_m$ of 5 (given a weight of 0.08 kg and BSA of 0.02); rat $K_m$ of 6 (given a weight of 0.15 kg and BSA of 0.025) and monkey $K_m$ of 12 (given a weight of 3 kg and BSA of 0.24).

Precise amounts of the therapeutic composition depend on the judgment of the practitioner and are specific to each individual. Nonetheless, a calculated HED dose provides a general guide. Other factors affecting the dose include the physical and clinical state of the patient, the route of administration, the intended goal of treatment and the potency, stability and toxicity of the particular therapeutic formulation.

The actual dosage amount of a compound of the present disclosure or composition comprising a compound of the present disclosure administered to a patient may be determined by physical and physiological factors such as type of animal treated, age, sex, body weight, severity of condition, the type of disease being treated, previous or concurrent therapeutic interventions, idiopathy of the patient and on the route of administration. These factors may be determined by a skilled artisan. The practitioner responsible for administration will typically determine the concentration of active ingredient(s) in a composition and appropriate dose(s) for the individual patient. The dosage may be adjusted by the individual physician in the event of any complication.

In some embodiments, the therapeutically effective amount typically will vary from about 0.001 mg/kg to about 1000 mg/kg, from about 0.01 mg/kg to about 750 mg/kg, from about 100 mg/kg to about 500 mg/kg, from about 1 mg/kg to about 250 mg/kg, from about 10 mg/kg to about 150 mg/kg in one or more dose administrations daily, for one or several days (depending of course of the mode of administration and the factors discussed above). Other suitable dose ranges include 1 mg to 10,000 mg per day, 100 mg to 10,000 mg per day, 500 mg to 10,000 mg per day, and 500 mg to 1,000 mg per day. In some embodiments, the amount is less than 10,000 mg per day with a range of 750 mg to 9,000 mg per day.

In some embodiments, the amount of the active compound in the pharmaceutical formulation is from about 2 to about 75 weight percent. In some of these embodiments, the amount if from about 25 to about 60 weight percent.

Single or multiple doses of the agents are contemplated. Desired time intervals for delivery of multiple doses can be determined by one of ordinary skill in the art employing no more than routine experimentation. As an example, patients may be administered two doses daily at approximately 12-hour intervals. In some embodiments, the agent is administered once a day.

The agent(s) may be administered on a routine schedule. As used herein a routine schedule refers to a predetermined designated period of time. The routine schedule may encompass periods of time which are identical, or which differ in length, as long as the schedule is predetermined. For instance, the routine schedule may involve administration twice a day, every day, every two days, every three days, every four days, every five days, every six days, a weekly basis, a monthly basis or any set number of days or weeks there-between. Alternatively, the predetermined routine schedule may involve administration on a twice daily basis for the first week, followed by a daily basis for several months, etc. In other embodiments, the invention provides that the agent(s) may be taken orally and that the timing of which is or is not dependent upon food intake. Thus, for example, the agent can be taken every morning and/or every evening, regardless of when the patient has eaten or will eat.

D. DEFINITIONS

When used in the context of a chemical group: "hydrogen" means —H; "hydroxy" means —OH; "oxo" means =O; "carbonyl" means —C(=O)—; "carboxy" means —C(=O)OH (also written as —COOH or —$CO_2$H); "halo" means independently —F, —Cl, —Br or —I; "amino" means —$NH_2$; "hydroxyamino" means —NHOH; "nitro" means —$NO_2$; imino means =NH; "cyano" means —CN; "isocyanyl" means —N=C=O; "azido" means —$N_3$; in a monovalent context "phosphate" means —OP(O)$(OH)_2$ or a deprotonated form thereof; in a divalent context "phosphate" means —OP(O)(OH)O— or a deprotonated form thereof; "mercapto" means —SH; and "thio" means =S; "thiocarbonyl" means —C(=S)—; "sulfonyl" means —S$(O)_2$—; and "sulfinyl" means —S(O)—.

In the context of chemical formulas, the symbol "—" means a single bond, "=" means a double bond, and "≡" means triple bond. The symbol "----" represents an optional bond, which if present is either single or double. The symbol "⚌" represents a single bond or a double bond. Thus, the formula

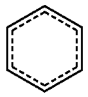

covers, for example,

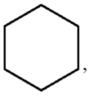, 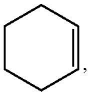, 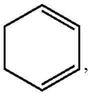, 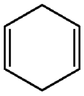 and 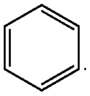.

And it is understood that no one such ring atom forms part of more than one double bond. Furthermore, it is noted that the covalent bond symbol "—", when connecting one or two stereogenic atoms, does not indicate any preferred stereochemistry. Instead, it covers all stereoisomers as well as mixtures thereof. The symbol "∿∿", when drawn perpendicularly across a bond (e.g.,

for methyl) indicates a point of attachment of the group. It is noted that the point of attachment is typically only identified in this manner for larger groups in order to assist the reader in unambiguously identifying a point of attachment. The symbol "◀" means a single bond where the group attached to the thick end of the wedge is "out of the page." The symbol "▪▪▪▪" means a single bond where the group attached to the thick end of the wedge is "into the page". The symbol "∿∿" means a single bond where the geometry around a double bond (e.g., either E or Z) is undefined. Both options, as well as combinations thereof are therefore intended. Any undefined valency on an atom of a structure shown in this application implicitly represents a hydrogen atom bonded to that atom. A bold dot on a carbon atom indicates that the hydrogen attached to that carbon is oriented out of the plane of the paper.

When a variable is depicted as a "floating group" on a ring system, for example, the group "R" in the formula:

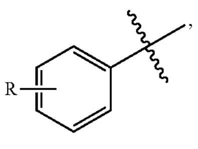, then the variable may replace any hydrogen atom attached to any of the ring atoms, including a depicted, implied, or expressly defined hydrogen, so long as a stable structure is formed. When a variable is depicted as a "floating group" on a fused ring system, as for example the group "R" in the formula:

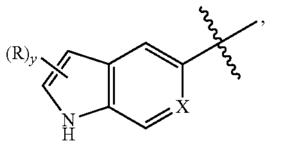

then the variable may replace any hydrogen attached to any of the ring atoms of either of the fused rings unless specified otherwise. Replaceable hydrogens include depicted hydrogens (e.g., the hydrogen attached to the nitrogen in the formula above), implied hydrogens (e.g., a hydrogen of the formula above that is not shown but understood to be present), expressly defined hydrogens, and optional hydrogens whose presence depends on the identity of a ring atom (e.g., a hydrogen attached to group X, when X equals —CH—), so long as a stable structure is formed. In the example depicted, R may reside on either the 5-membered or the 6-membered ring of the fused ring system. In the formula above, the subscript letter "y" immediately following the R enclosed in parentheses, represents a numeric variable. Unless specified otherwise, this variable can be 0, 1, 2, or any integer greater than 2, only limited by the maximum number of replaceable hydrogen atoms of the ring or ring system.

For the chemical groups and compound classes, the number of carbon atoms in the group or class is as indicated as follows: "Cn" or "C=n" defines the exact number (n) of carbon atoms in the group/class. "C≤n" defines the maximum number (n) of carbon atoms that can be in the group/class, with the minimum number as small as possible for the group/class in question. For example, it is understood that the minimum number of carbon atoms in the groups "$alkyl_{(C \leq 8)}$", "$cycloalkanediyl_{(C \leq 8)}$", "$heteroaryl_{(C \leq 8)}$", and "$acyl_{(C \leq 8)}$" is one, the minimum number of carbon atoms in the groups "$alkenyl_{(C \leq 8)}$", "$alkynyl_{(C \leq 8)}$", and "$heterocycloalkyl_{(C \leq 8)}$" is two, the minimum number of carbon atoms in the group "$cycloalkyl_{(C \leq 8)}$" is three, and the minimum number of carbon atoms in the groups "$aryl_{(C \leq 8)}$" and "$arenediyl_{(C \leq 8)}$" is six. "Cn-n'" defines both the minimum (n) and maximum number (n') of carbon atoms in the group. Thus, "$alkyl_{(C2-10)}$" designates those alkyl groups having from 2 to 10 carbon atoms. These carbon number indicators may precede or follow the chemical groups or class it modifies and it may or may not be enclosed in parenthesis, without signifying any change in meaning. Thus, the terms "C5 olefin", "C5-olefin", "$olefin_{(C5)}$", and "$olefin_{C5}$" are all synonymous. Except as noted below, every carbon atom is counted to determine whether the group or compound falls with the specified number of carbon atoms. For example, the group dihexylamino is an example of a $dialkylamino_{(C=12)}$ group; however, it is not an example of a $dialkylamino_{(C=6)}$ group. Likewise, phenylethyl is an example of an $aralkyl_{(C=8)}$ group. When any of the chemical groups or compound classes defined herein is modified by the term "substituted", any carbon atom in the moiety replacing the hydrogen atom is not counted. Thus methoxyhexyl, which has a total of seven carbon atoms, is an example of a substituted $alkyl_{(C1-6)}$. Unless specified otherwise, any chemical group or compound class listed in a claim set without a carbon atom limit has a carbon atom limit of less than or equal to twelve.

The term "saturated" when used to modify a compound or chemical group means the compound or chemical group has no carbon-carbon double and no carbon-carbon triple bonds, except as noted below. When the term is used to modify an atom, it means that the atom is not part of any double or triple bond. In the case of substituted versions of saturated groups, one or more carbon oxygen double bond or a carbon nitrogen double bond may be present. And when such a bond is present, then carbon-carbon double bonds that may occur as part of keto-enol tautomerism or imine/enamine tautomerism are not precluded. When the term "saturated" is used to modify a solution of a substance, it means that no more of that substance can dissolve in that solution.

The term "aliphatic" signifies that the compound or chemical group so modified is an acyclic or cyclic, but non-aromatic compound or group. In aliphatic compounds/groups, the carbon atoms can be joined together in straight chains, branched chains, or non-aromatic rings (alicyclic). Aliphatic compounds/groups can be saturated, that is joined by single carbon-carbon bonds (alkanes/alkyl), or unsaturated, with one or more carbon-carbon double bonds (alkenes/alkenyl) or with one or more carbon-carbon triple bonds (alkynes/alkynyl).

The term "aromatic" signifies that the compound or chemical group so modified has a planar unsaturated ring of atoms with 4n+2 electrons in a fully conjugated cyclic π system. An aromatic compound or chemical group may be depicted as a single resonance structure; however, depiction of one resonance structure is taken to also refer to any other resonance structure. For example:

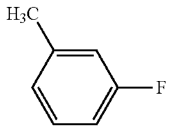

is also taken to refer to

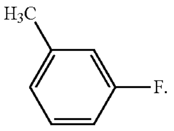

Aromatic compounds may also be depicted using a circle to represent the delocalized nature of the electrons in the fully conjugated cyclic π system, two non-limiting examples of which are shown below:

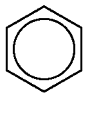
and
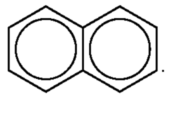

The term "alkyl" refers to a monovalent saturated aliphatic group with a carbon atom as the point of attachment, a linear or branched acyclic structure, and no atoms other than carbon and hydrogen. The groups $—CH_3$ (Me), $—CH_2CH_3$ (Et), $—CH_2CH_2CH_3$ (n-Pr or propyl), —CH $(CH_3)_2$ (i-Pr, ${}^{i}$Pr or isopropyl), $—CH_2CH_2CH_2CH_3$ (n-Bu), $—CH(CH_3)CH_2CH_3$ (sec-butyl), $—CH_2CH(CH_3)_2$ (isobutyl), $—C(CH_3)_3$ (tert-butyl, t-butyl, t-Bu or ${}^{t}$Bu), and $—CH_2C(CH_3)_3$ (neo-pentyl) are non-limiting examples of alkyl groups. The term "alkanediyl" refers to a divalent saturated aliphatic group, with one or two saturated carbon atom(s) as the point(s) of attachment, a linear or branched acyclic structure, no carbon-carbon double or triple bonds, and no atoms other than carbon and hydrogen. The groups $—CH_2$-(methylene), $—CH_2CH_2—$, $—CH_2C(CH_3)_2CH_2—$, and $—CH_2CH_2CH_2—$ are non-limiting examples of alkanediyl groups. The term "alkylidene" refers to the divalent group =CRR' in which R and R' are independently hydrogen or alkyl. Non-limiting examples of alkylidene groups include: $=CH_2$, $=CH(CH_2CH_3)$, and $=C(CH_3)_2$. An "alkane" refers to the class of compounds having the formula H—R, wherein R is alkyl as this term is defined above.

The term "cycloalkyl" refers to a monovalent saturated aliphatic group with a carbon atom as the point of attachment, said carbon atom forming part of one or more non-aromatic ring structures, no carbon-carbon double or triple bonds, and no atoms other than carbon and hydrogen. Non-limiting examples include: $—CH(CH_2)_2$ (cyclopropyl), cyclobutyl, cyclopentyl, or cyclohexyl(Cy). As used herein, the term does not preclude the presence of one or more alkyl groups (carbon number limitation permitting) attached to a carbon atom of the non-aromatic ring structure. The term "cycloalkanediyl" refers to a divalent saturated aliphatic group with two carbon atoms as points of attachment, no carbon-carbon double or triple bonds, and no atoms other than carbon and hydrogen. The group

is a non-limiting example of cycloalkanediyl group. A "cycloalkane" refers to the class of compounds having the formula H—R, wherein R is cycloalkyl as this term is defined above.

The term "alkenyl" refers to a monovalent unsaturated aliphatic group with a carbon atom as the point of attachment, a linear or branched, acyclic structure, at least one nonaromatic carbon-carbon double bond, no carbon-carbon triple bonds, and no atoms other than carbon and hydrogen. Non-limiting examples include: $—CH{=}CH_2$ (vinyl), $—CH{=}CHCH_3$, $—CH{=}CHCH_2CH_3$, $—CH_2CH{=}CH_2$ (allyl), $—CH_2CH{=}CHCH_3$, and $—CH{=}CHCH{=}CH_2$. The term "alkenediyl" refers to a divalent unsaturated aliphatic group, with two carbon atoms as points of attachment, a linear or branched acyclic structure, at least one nonaromatic carbon-carbon double bond, no carbon-carbon triple bonds, and no atoms other than carbon and hydrogen. The groups $—CH{=}CH—$, $—CH{=}C(CH_3)CH_2—$, $—CH{=}CHCH_2—$, and $—CH_2CH{=}CHCH_2—$ are non-limiting examples of alkenediyl groups. It is noted that while the alkenediyl group is aliphatic, once connected at both ends, this group is not precluded from forming part of an aromatic structure. The terms "alkene" and "olefin" are synonymous and refer to the class of compounds having the formula H—R, wherein R is alkenyl as this term is defined above. Similarly, the terms "terminal alkene" and "α-olefin" are synonymous and refer to an alkene having just one carbon-carbon double bond, wherein that bond is part of a vinyl group at an end of the molecule.

The term "alkynyl" refers to a monovalent unsaturated aliphatic group with a carbon atom as the point of attachment, a linear or branched acyclic structure, at least one carbon-carbon triple bond, and no atoms other than carbon and hydrogen. As used herein, the term alkynyl does not preclude the presence of one or more non-aromatic carbon-carbon double bonds. The groups $—C{\equiv}CH$, $—C{\equiv}CCH_3$, and $—CH_2C{\equiv}CCH_3$ are non-limiting examples of alkynyl groups. An "alkyne" refers to the class of compounds having the formula H—R, wherein R is alkynyl.

The term "aryl" refers to a monovalent unsaturated aromatic group with an aromatic carbon atom as the point of attachment, said carbon atom forming part of a one or more aromatic ring structures, each with six ring atoms that are all carbon, and wherein the group consists of no atoms other than carbon and hydrogen. If more than one ring is present, the rings may be fused or unfused. Unfused rings are connected with a covalent bond. As used herein, the term aryl does not preclude the presence of one or more alkyl groups (carbon number limitation permitting) attached to the first aromatic ring or any additional aromatic ring present. Non-limiting examples of aryl groups include phenyl(Ph), methylphenyl, (dimethyl)phenyl, $—C_6H_4CH_2CH_3$ (ethylphenyl), naphthyl, and a monovalent group derived from biphenyl(e.g., 4-phenylphenyl). The term "arenediyl" refers to a divalent aromatic group with two aromatic carbon atoms as points of attachment, said carbon atoms forming part of one or more six-membered aromatic ring structures, each with six ring atoms that are all carbon, and wherein the divalent group consists of no atoms other than carbon and hydrogen. As used herein, the term arenediyl does not preclude the presence of one or more alkyl groups (carbon number limitation permitting) attached to the first aromatic ring or any additional aromatic ring present. If more than one ring is present, the rings may be fused or unfused. Unfused rings are connected with a covalent bond. Non-limiting examples of arenediyl groups include:

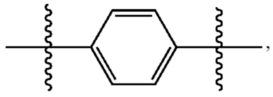,
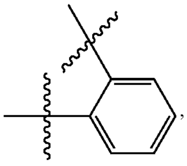,
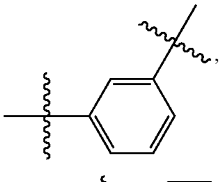,
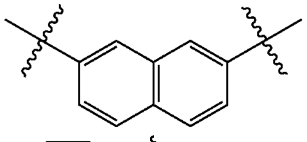
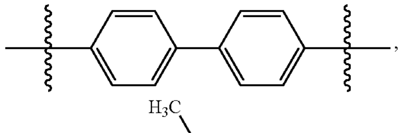, and
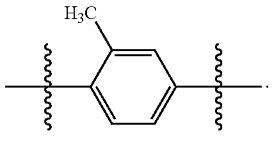.

An "arene" refers to the class of compounds having the formula H—R, wherein R is aryl as that term is defined above. Benzene and toluene are non-limiting examples of arenes.

The term “aralkyl” refers to the monovalent group-alkanediyl-aryl, in which the terms alkanediyl and aryl are each used in a manner consistent with the definitions provided above. Non-limiting examples are: phenylmethyl(benzyl, Bn) and 2-phenyl-ethyl.

The term “heteroaryl” refers to a monovalent aromatic group with an aromatic carbon atom or nitrogen atom as the point of attachment, said carbon atom or nitrogen atom forming part of one or more aromatic ring structures, each with three to eight ring atoms, wherein at least one of the ring atoms of the aromatic ring structure(s) is nitrogen, oxygen or sulfur, and wherein the heteroaryl group consists of no atoms other than carbon, hydrogen, aromatic nitrogen, aromatic oxygen and aromatic sulfur. If more than one ring is present, the rings are fused; however, the term heteroaryl does not preclude the presence of one or more alkyl or aryl groups (carbon number limitation permitting) attached to one or more ring atoms. Non-limiting examples of heteroaryl groups include benzoxazolyl, benzimidazolyl, furanyl, imidazolyl(Im), indolyl, indazolyl(Im), isoxazolyl, methylpyridinyl, oxazolyl, oxadiazolyl, phenylpyridinyl, pyridinyl(pyridyl), pyrrolyl, pyrimidinyl, pyrazinyl, quinolyl, quinazolyl, quinoxalinyl, triazinyl, tetrazolyl, thiazolyl, thienyl, and triazolyl. The term “N-heteroaryl” refers to a heteroaryl group with a nitrogen atom as the point of attachment. A “heteroarene” refers to the class of compounds having the formula H—R, wherein R is heteroaryl. Pyridine and quinoline are non-limiting examples of heteroarenes.

The term “heterocycloalkyl” refers to a monovalent non-aromatic group with a carbon atom or nitrogen atom as the point of attachment, said carbon atom or nitrogen atom forming part of one or more non-aromatic ring structures, each with three to eight ring atoms, wherein at least one of the ring atoms of the non-aromatic ring structure(s) is nitrogen, oxygen or sulfur, and wherein the heterocycloalkyl group consists of no atoms other than carbon, hydrogen, nitrogen, oxygen and sulfur. If more than one ring is present, the rings are fused. As used herein, the term does not preclude the presence of one or more alkyl groups (carbon number limitation permitting) attached to one or more ring atoms. Also, the term does not preclude the presence of one or more double bonds in the ring or ring system, provided that the resulting group remains non-aromatic. Non-limiting examples of heterocycloalkyl groups include aziridinyl, azetidinyl, pyrrolidinyl, piperidinyl, piperazinyl, morpholinyl, thiomorpholinyl, tetrahydrofuranyl, tetrahydrothiofuranyl, tetrahydropyranyl, pyranyl, oxiranyl, and oxetanyl. The term “N-heterocycloalkyl” refers to a heterocycloalkyl group with a nitrogen atom as the point of attachment. N-pyrrolidinyl is an example of such a group.

The term “acyl” refers to the group —C(O)R, in which R is a hydrogen, alkyl, cycloalkyl, or aryl as those terms are defined above. The groups, —CHO, —C(O)$CH_3$ (acetyl, Ac), —C(O)$CH_2CH_3$, —C(O)$CH(CH_3)_2$, —C(O)$CH(CH_2)_2$, —C(O)$C_6H_5$, and —C(O)$C_6H_4CH_3$ are non-limiting examples of acyl groups. A “thioacyl” is defined in an analogous manner, except that the oxygen atom of the group —C(O)R has been replaced with a sulfur atom, —C(S)R. The term “aldehyde” corresponds to an alkyl group, as defined above, attached to a —CHO group.

The term “alkoxy” refers to the group —OR, in which R is an alkyl, as that term is defined above. Non-limiting examples include: —$OCH_3$ (methoxy), —$OCH_2CH_3$ (ethoxy), —$OCH_2CH_2CH_3$, —$OCH(CH_3)_2$ (isopropoxy), or —$OC(CH_3)_3$ (tert-butoxy). The terms “cycloalkoxy”, “alkenyloxy”, “alkynyloxy”, “aryloxy”, “aralkoxy”, “heteroaryloxy”, “heterocycloalkoxy”, and “acyloxy”, when used without the “substituted” modifier, refers to groups, defined as —OR, in which R is cycloalkyl, alkenyl, alkynyl, aryl, aralkyl, heteroaryl, heterocycloalkyl, and acyl, respectively. The term “alkylthio” and “acylthio” refers to the group —SR, in which R is an alkyl and acyl, respectively. The term “alcohol” corresponds to an alkane, as defined above, wherein at least one of the hydrogen atoms has been replaced with a hydroxy group. The term “ether” corresponds to an alkane, as defined above, wherein at least one of the hydrogen atoms has been replaced with an alkoxy group.

The term “alkylamino” refers to the group —NHR, in which R is an alkyl, as that term is defined above. Non-limiting examples include: —$NHCH_3$ and —$NHCH_2CH_3$. The term “dialkylamino” refers to the group —NRR', in which R and R' can be the same or different alkyl groups. Non-limiting examples of dialkylamino groups include: —$N(CH_3)_2$ and —$N(CH_3)(CH_2CH_3)$. The terms “cycloalkylamino”, “alkenylamino”, “alkynylamino”, “arylamino”, “aralkylamino”, “heteroarylamino”, “heterocycloalkylamino”, and “alkoxyamino” when used without the “substituted” modifier, refers to groups, defined as —NHR, in which R is cycloalkyl, alkenyl, alkynyl, aryl, aralkyl, heteroaryl, heterocycloalkyl, and alkoxy, respectively. A non-limiting example of an arylamino group is —$NHC_6H_5$. The terms “dicycloalkylamino”, “dialkenylamino”, “dialkynylamino”, “diarylamino”, “diaralkylamino”, “diheteroarylamino”, “diheterocycloalkylamino”, and “dialkoxyamino”, refers to groups, defined as —NRR', in which R and R' are both cycloalkyl, alkenyl, alkynyl, aryl, aralkyl, heteroaryl, heterocycloalkyl, and alkoxy, respectively. Similarly, the term alkyl(cycloalkyl)amino refers to a group defined as —NRR', in which R is alkyl and R' is cycloalkyl. The term “amido” (acylamino), when used without the “substituted” modifier, refers to the group —NHR, in which R is acyl, as that term is defined above. A non-limiting example of an amido group is —NHC(O)$CH_3$.

When a chemical group is used with the “substituted” modifier, one or more hydrogen atom has been replaced, independently at each instance, by —OH, —F, —Cl, —Br, —I, —$NH_2$, —$NO_2$, —$CO_2H$, —$CO_2CH_3$, —$CO_2CH_2CH_3$, —CN, —SH, —$OCH_3$, —$OCH_2CH_3$, —C(O)$CH_3$, —$NHCH_3$, —$NHCH_2CH_3$, —$N(CH_3)_2$, —C(O)$NH_2$, —C(O)$NHCH_3$, —C(O)$N(CH_3)_2$, —OC(O)$CH_3$, —NHC(O)$CH_3$, —$S(O)_2OH$, or —$S(O)_2NH_2$. For example, the following groups are non-limiting examples of substituted alkyl groups: —$CH_2OH$, —$CH_2Cl$, —$CF_3$, —$CH_2CN$, —$CH_2C(O)OH$, —$CH_2C(O)$ $OCH_3$, —$CH_2C(O)NH_2$, —$CH_2C(O)CH_3$, —$CH_2OCH_3$, —$CH_2OC(O)CH_3$, —$CH_2NH_2$, —$CH_2N(CH_3)_2$, and —$CH_2CH_2Cl$. The term “haloalkyl” is a subset of substituted alkyl, in which the hydrogen atom replacement is limited to halo (i.e. —F, —Cl, —Br, or —I) such that no other atoms aside from carbon, hydrogen and halogen are present. The group, —$CH_2Cl$ is a non-limiting example of a haloalkyl. The term “fluoroalkyl” is a subset of substituted alkyl, in which the hydrogen atom replacement is limited to fluoro such that no other atoms aside from carbon, hydrogen and fluorine are present. The groups —$CH_2F$, —$CF_3$, and —$CH_2CF_3$ are non-limiting examples of fluoroalkyl groups. Non-limiting examples of substituted aralkyls are: (3-chlorophenyl)-methyl, and 2-chloro-2-phenyl-eth-1-yl. The groups, —C(O)$CH_2CF_3$, —$CO_2H$ (carboxyl), —$CO_2CH_3$ (methylcarboxyl), —$CO_2CH_2CH_3$, —C(O)$NH_2$ (carbamoyl), and —CON$(CH_3)_2$, are non-limiting examples of substituted acyl groups. The groups —NHC(O) $OCH_3$ and —NHC(O)

$NHCH_3$ are non-limiting examples of substituted amido groups. In some embodiments, the compounds may also further comprise a protected amine group such as an amine protected with either a monovalent protecting group or a divalent protected group.

The use of the word "a" or "an," when used in conjunction with the term "comprising" in the claims and/or the specification may mean "one," but it is also consistent with the meaning of "one or more," "at least one," and "one or more than one."

Throughout this application, the term "about" is used to indicate that a value includes the inherent variation of error for the device, the method being employed to determine the value, or the variation that exists among the study subjects or patients.

An "active ingredient" (AI) or active pharmaceutical ingredient (API) (also referred to as an active compound, active substance, active agent, pharmaceutical agent, agent, biologically active molecule, or a therapeutic compound) is the ingredient in a pharmaceutical drug that is biologically active.

An "amine protecting group" or "amino protecting group" is well understood in the art. An amine protecting group is a group which modulates the reactivity of the amine group during a reaction which modifies some other portion of the molecule. Amine protecting groups can be found at least in Greene and Wuts, 1999, which is incorporated herein by reference. Some non-limiting examples of amino protecting groups include formyl, acetyl, propionyl, pivaloyl, t-butylacetyl, 2-chloroacetyl, 2-bromoacetyl, trifluoroacetyl, trichloroacetyl, o-nitrophenoxyacetyl, α-chlorobutyryl, benzoyl, 4-chlorobenzoyl, 4-bromobenzoyl, 4-nitrobenzoyl, and the like; sulfonyl groups such as benzenesulfonyl, p-toluenesulfonyl and the like; alkoxy- or aryloxycarbonyl groups (which form urethanes with the protected amine) such as benzyloxycarbonyl(Cbz), p-chlorobenzyloxycarbonyl, p-methoxybenzyloxycarbonyl, p-nitrobenzyloxycarbonyl, 2-nitrobenzyloxycarbonyl, p-bromobenzyloxycarbonyl, 3,4-dimethoxybenzyloxycarbonyl, 3,5-dimethoxybenzyloxycarbonyl, 2,4-dimethoxybenzyloxycarbonyl, 4-methoxybenzyloxycarbonyl, 2-nitro-4,5-dimethoxybenzyloxycarbonyl, 3,4,5-trimethoxybenzyloxycarbonyl, 1-(p-biphenylyl)-1-methylethoxycarbonyl, α,α-dimethyl-3,5-dimethoxybenzyloxycarbonyl, benzhydryloxycarbonyl, t-butyloxycarbonyl(Boc), diisopropylmethoxycarbonyl, isopropyloxycarbonyl, ethoxycarbonyl, methoxycarbonyl, allyloxycarbonyl(Alloc), 2,2,2-trichloroethoxycarbonyl, 2-trimethylsilylethyloxycarbonyl(Teoc), phenoxycarbonyl, 4-nitrophenoxycarbonyl, fluorenyl-9-methoxycarbonyl (Fmoc), cyclopentyloxycarbonyl, adamantyloxycarbonyl, cyclohexyloxycarbonyl, phenylthiocarbonyl and the like; alkylaminocarbonyl groups (which form ureas with the protect amine) such as ethylaminocarbonyl and the like; aralkyl groups such as benzyl, triphenylmethyl, benzyloxymethyl and the like; and silyl groups such as trimethylsilyl and the like. Additionally, the "amine protecting group" can be a divalent protecting group such that both hydrogen atoms on a primary amine are replaced with a single protecting group. In such a situation the amine protecting group can be phthalimide (phth) or a substituted derivative thereof wherein the term "substituted" is as defined above. In some embodiments, the halogenated phthalimide derivative may be tetrachlorophthalimide (TCphth). When used herein, a "protected amino group", is a group of the formula $PG_{MA}NH$— or $PG_{DA}N$— wherein $PG_{MA}$ is a monovalent amine protecting group, which may also be described as a "monovalently protected amino group" and $PG_{DA}$ is a divalent amine protecting group as described above, which may also be described as a "divalently protected amino group".

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

The term "effective," as that term is used in the specification and/or claims, means adequate to accomplish a desired, expected, or intended result. "Effective amount," "Therapeutically effective amount" or "pharmaceutically effective amount" when used in the context of treating a patient or subject with a compound means that amount of the compound which, when administered to the patient or subject, is sufficient to effect such treatment or prevention of the disease as those terms are defined below.

An "excipient" is a pharmaceutically acceptable substance formulated along with the active ingredient(s) of a medication, pharmaceutical composition, formulation, or drug delivery system. Excipients may be used, for example, to stabilize the composition, to bulk up the composition (thus often referred to as "bulking agents," "fillers," or "diluents" when used for this purpose), or to confer a therapeutic enhancement on the active ingredient in the final dosage form, such as facilitating drug absorption, reducing viscosity, or enhancing solubility. Excipients include pharmaceutically acceptable versions of antiadherents, binders, coatings, colors, disintegrants, flavors, glidants, lubricants, preservatives, sorbents, sweeteners, and vehicles. The main excipient that serves as a medium for conveying the active ingredient is usually called the vehicle. Excipients may also be used in the manufacturing process, for example, to aid in the handling of the active substance, such as by facilitating powder flowability or non-stick properties, in addition to aiding in vitro stability such as prevention of denaturation or aggregation over the expected shelf life. The suitability of an excipient will typically vary depending on the route of administration, the dosage form, the active ingredient, as well as other factors.

As used herein, the term "$IC_{50}$" refers to an inhibitory dose which is 50% of the maximum response obtained. This quantitative measure indicates how much of a particular drug or other substance (inhibitor) is needed to inhibit a given biological, biochemical or chemical process (or component of a process, i.e. an enzyme, cell, cell receptor or microorganism) by half.

As used herein, the term "patient" or "subject" refers to a living mammalian organism, such as a human, monkey, cow, sheep, goat, dog, cat, mouse, rat, guinea pig, or transgenic species thereof. In certain embodiments, the patient or subject is a primate. Non-limiting examples of human patients are adults, juveniles, infants and fetuses.

As generally used herein "pharmaceutically acceptable" refers to those compounds, materials, compositions, and/or dosage forms which are, within the scope of sound medical judgment, suitable for use in contact with the tissues, organs, and/or bodily fluids of human beings and animals without excessive toxicity, irritation, allergic response, or other problems or complications commensurate with a reasonable benefit/risk ratio.

"Pharmaceutically acceptable salts" means salts of compounds disclosed herein which are pharmaceutically acceptable, as defined above, and which possess the desired pharmacological activity. Such salts include acid addition salts formed with inorganic acids such as hydrochloric acid, hydrobromic acid, sulfuric acid, nitric acid, phosphoric acid, and the like; or with organic acids such as 1,2-ethanedisulfonic acid, 2-hydroxyethanesulfonic acid, 2-naphthalenesulfonic acid, 3-phenylpropionic acid, 4,4'-methylenebis(3-hydroxy-2-ene-1-carboxylic acid), 4-methylbicyclo[2.2.2]oct-2-ene-1-carboxylic acid, acetic acid, aliphatic mono- and dicarboxylic acids, aliphatic sulfuric acids, aromatic sulfuric acids, benzenesulfonic acid, benzoic acid, camphorsulfonic acid, carbonic acid, cinnamic acid, citric acid, cyclopentanepropionic acid, ethanesulfonic acid, fumaric acid, glucoheptonic acid, gluconic acid, glutamic acid, glycolic acid, heptanoic acid, hexanoic acid, hydroxynaphthoic acid, lactic acid, laurylsulfuric acid, maleic acid, malic acid, malonic acid, mandelic acid, methanesulfonic acid, muconic acid, o-(4-hydroxybenzoyl)benzoic acid, oxalic acid, p-chlorobenzenesulfonic acid, phenyl-substituted alkanoic acids, propionic acid, p-toluenesulfonic acid, pyruvic acid, salicylic acid, stearic acid, succinic acid, tartaric acid, tertiarybutylacetic acid, trimethylacetic acid, and the like. Pharmaceutically acceptable salts also include base addition salts which may be formed when acidic protons present are capable of reacting with inorganic or organic bases. Acceptable inorganic bases include sodium hydroxide, sodium carbonate, potassium hydroxide, aluminum hydroxide and calcium hydroxide. Acceptable organic bases include ethanolamine, diethanolamine, triethanolamine, tromethamine, N-methylglucamine and the like. It should be recognized that the particular anion or cation forming a part of any salt of this invention is not critical, so long as the salt, as a whole, is pharmacologically acceptable. Additional examples of pharmaceutically acceptable salts and their methods of preparation and use are presented in *Handbook of Pharmaceutical Salts: Properties, and Use* (P. H. Stahl & C. G. Wermuth eds., Verlag Helvetica Chimica Acta, 2002).

A "pharmaceutically acceptable carrier," "drug carrier," or simply "carrier" is a pharmaceutically acceptable substance formulated along with the active ingredient medication that is involved in carrying, delivering and/or transporting a chemical agent. Drug carriers may be used to improve the delivery and the effectiveness of drugs, including for example, controlled-release technology to modulate drug bioavailability, decrease drug metabolism, and/or reduce drug toxicity. Some drug carriers may increase the effectiveness of drug delivery to the specific target sites. Examples of carriers include: liposomes, microspheres (e.g., made of poly(lactic-co-glycolic) acid), albumin microspheres, synthetic polymers, nanofibers, protein-DNA complexes, protein conjugates, erythrocytes, virosomes, and dendrimers.

A "pharmaceutical drug" (also referred to as a pharmaceutical, pharmaceutical preparation, pharmaceutical composition, pharmaceutical formulation, pharmaceutical product, medicinal product, medicine, medication, medicament, or simply a drug, agent, or preparation) is a composition used to diagnose, cure, treat, or prevent disease, which comprises an active pharmaceutical ingredient (API) (defined above) and optionally contains one or more inactive ingredients, which are also referred to as excipients (defined above).

A "platinum chemotherapeutic agent" is an organic compound which contains platinum as an integral part of the molecule. Examples of platinum-based chemotherapeutic agents include carboplatin, cisplatin, and oxaliplatin.

A "platinum resistant" cancer is a cancer in a patient has progressed while receiving platinum chemotherapeutic agent (i.e. the patient is "platinum refractory"), or the patient has progressed within 12 months (for instance, within 6 months) after completing a course of platinum chemotherapeutic agent.

"Prevention" or "preventing" includes: (1) inhibiting the onset of a disease in a subject or patient which may be at risk and/or predisposed to the disease but does not yet experience or display any or all of the pathology or symptomatology of the disease, and/or (2) slowing the onset of the pathology or symptomatology of a disease in a subject or patient which may be at risk and/or predisposed to the disease but does not yet experience or display any or all of the pathology or symptomatology of the disease.

"Prodrug" means a compound that is convertible in vivo metabolically into an active pharmaceutical ingredient of the present invention. The prodrug itself may or may not also have activity with respect in a given indication. For example, a compound comprising a hydroxy group may be administered as an ester that is converted by hydrolysis in vivo to the hydroxy compound. Non-limiting examples of suitable esters that may be converted in vivo into hydroxy compounds include acetates, citrates, lactates, phosphates, tartrates, malonates, oxalates, salicylates, propionates, succinates, fumarates, maleates, methylene-bis-β-hydroxynaphthoate, gentisates, isethionates, di-p-toluoyltartrates, methanesulfonates, ethanesulfonates, benzenesulfonates, p-toluenesulfonates, cyclohexylsulfamates, quinates, and esters of amino acids. Similarly, a compound comprising an amine group may be administered as an amide that is converted by hydrolysis in vivo to the amine compound.

In the context of this application, "selectively" means that greater than 50% of the activity of the compound is exhibited in the noted location. On the other hand, "preferentially" means that greater than 75% of the activity of the compound is exhibited in the noted location.

A "stereoisomer" or "optical isomer" is an isomer of a given compound in which the same atoms are bonded to the same other atoms, but where the configuration of those atoms in three dimensions differs. "Enantiomers" are stereoisomers of a given compound that are mirror images of each other, like left and right hands. "Diastereomers" are stereoisomers of a given compound that are not enantiomers. Chiral molecules contain a chiral center, also referred to as a stereocenter or stereogenic center, which is any point, though not necessarily an atom, in a molecule bearing groups such that an interchanging of any two groups leads to a stereoisomer. In organic compounds, the chiral center is typically a carbon, phosphorus or sulfur atom, though it is also possible for other atoms to be stereocenters in organic and inorganic compounds. A molecule can have multiple stereocenters, giving it many stereoisomers. In compounds whose stereoisomerism is due to tetrahedral stereogenic centers (e.g., tetrahedral carbon), the total number of hypothetically possible stereoisomers will not exceed $2^n$, where n is the number of tetrahedral stereocenters. Molecules with symmetry frequently have fewer than the maximum possible number of stereoisomers. A 50:50 mixture of enantiomers is referred to as a racemic mixture. Alternatively, a mixture of enantiomers can be enantiomerically enriched so that one enantiomer is present in an amount greater than 50%. Typically, enantiomers and/or diastereomers can be resolved or separated using techniques known in the art. It is contemplated that that for any stereocenter or axis of chirality for which stereochemistry has not been defined, that stereocenter or axis of chirality can be present in its R form, S form, or as a mixture of the R and S forms, including racemic and non-racemic mixtures. As used herein, the phrase "substantially free from other stereoisomers" means that the composition contains ≤15%, more preferably ≤10%, even more preferably ≤5%, or most preferably ≤1% of another stereoisomer(s).

"Treatment" or "treating" includes (1) inhibiting a disease in a subject or patient experiencing or displaying the pathology or symptomatology of the disease (e.g., arresting further development of the pathology and/or symptomatology), (2) ameliorating a disease in a subject or patient that is experiencing or displaying the pathology or symptomatology of the disease (e.g., reversing the pathology and/or symptomatology), and/or (3) effecting any measurable decrease in a disease or symptom thereof in a subject or patient that is experiencing or displaying the pathology or symptomatology of the disease.

The term "unit dose" refers to a formulation of the compound or composition such that the formulation is prepared in a manner sufficient to provide a single therapeutically effective dose of the active ingredient to a patient in a single administration. Such unit dose formulations that may be used include but are not limited to a single tablet, capsule, or other oral formulations, or a single vial with a syringeable liquid or other injectable formulations.

The above definitions supersede any conflicting definition in any reference that is incorporated by reference herein. The fact that certain terms are defined, however, should not be considered as indicative that any term that is undefined is indefinite. Rather, all terms used are believed to describe the disclosure in terms such that one of ordinary skill can appreciate the scope and practice the present disclosure.

E. EXAMPLES

The following examples are included to demonstrate preferred embodiments of the disclosure. It should be appreciated by those of skill in the art that the techniques disclosed in the examples which follow represent techniques discovered by the inventor to function well in the practice of the disclosure, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the disclosure.

Example 1—Preparation of Functionalized Gold Carbene Compounds

A library of asymmetric-Au(I)-bis-NHCs conjugated with different amines were prepared. To start, the hydroxyl-functionalized imidazolium proligand were first synthesized by reacting mesitylimidazole with little excess of bromoethanol (Scheme 1) in THF which resulted in 90% yield of the imidazolium bromide 1*Br. The other synthon [Au(IPr)OH] was prepared as described by Nolan et. al., by reacting [Au(IPr)Cl] with excess NaOH in presence of $^{t}$AmOH as a catalyst. Next, [Au(IPr)OH] and 1*Br were mixed in dry toluene and heat up at 90° C. to obtain a white precipitate as the crude product. Washing off with water to get rid of the starting imidazolium bromide resulted in isolation of the pure product SS-1*Br in an overall yield of 70%. Previously, Nolan et al. reported a library of asymmetric Au(I)-bis-NHCs using [Au(IPr)OH] as the building block (Gaillard et al., 2010). Huynh et al. used Au(I) acetate complex [Au($O_2CCH_3$) (i$Pr_2$-bimy)] to obtain a series of new hetero-Au(I)-bis-NHCs in high yields (Guo et al., 2013). Cazine et al. demonstrated the microwave assisted synthesis of homoleptic and heteroleptic Au(I)-bis-NHCs (Lazreg et al., 2015). But, interestingly, none these hetero-bis-NHCs contains any functional group that can undergo late-stage modification.

Scheme 1: Preparation of Functionalized Au(I)-bis-NHCs

A.

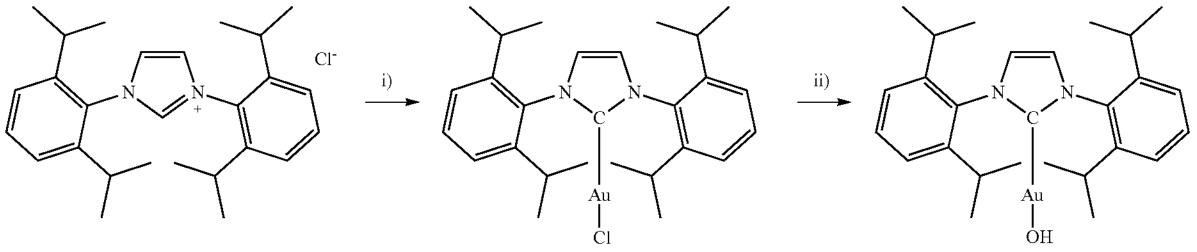

B.

-continued

C.

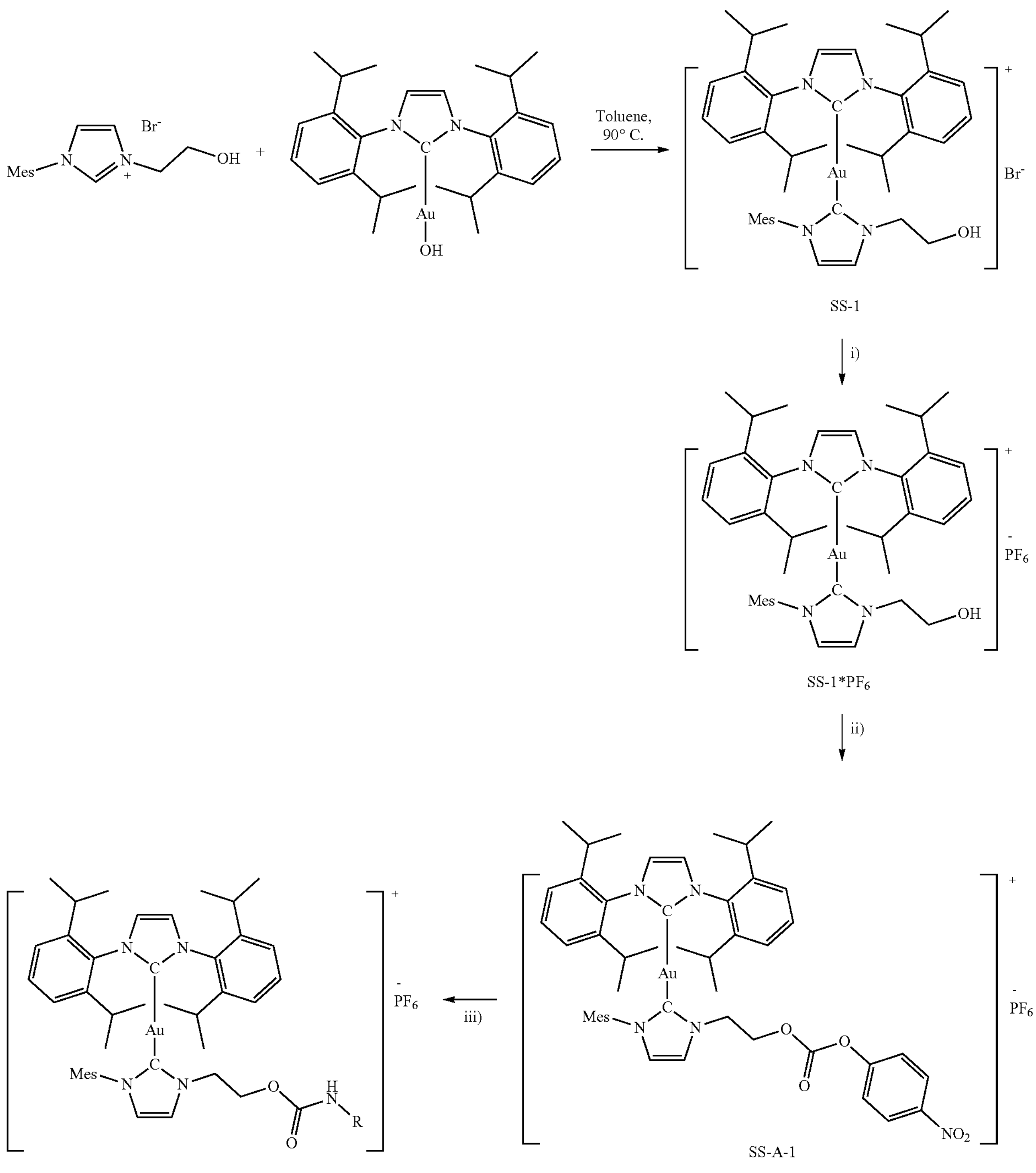

SS-1

SS-1*PF6

SS-A-1

As the initial step for post-synthetic modification, anion metathesis has been carried on by using sodium hexafluorophosphate with a quantitative yield to generate SS-1*$PF_6$. Spectroscopic details reveal apparently no change in $^1H$ and $^{13}C$ NMR but ESI-negative mass spectroscopy clearly indicates the anion exchange. It was then reacted with p-nitrophenylchloroformate to obtain the carbonate ester intermediate SS-A-1. Suitable crystals were grown for both SS-1*PF6 and SS-A-1 by slow diffusion of diethyl ether in dichloromethane solution. An ORTEP representation of those crystals can be seen in FIG. 1.

Once the reactive intermediate SS-A-1 was obtained and fully characterized, various amines were tried to tether with it. Using this methodology, most of the primary, secondary and benzylic amines were attached. While the yields varied over the amines chosen, full conversion to respective carbamates was observed using HPLC and LCMS. All the carbamates were characterized using $^1H$, $^{13}C$ and ESI-MS. Furthermore, suitable crystals can also be obtained for several representative examples. The examples made using this protocol are shown below. As a future prospect, a few of these molecules were wisely chosen as they can further undergo modification.

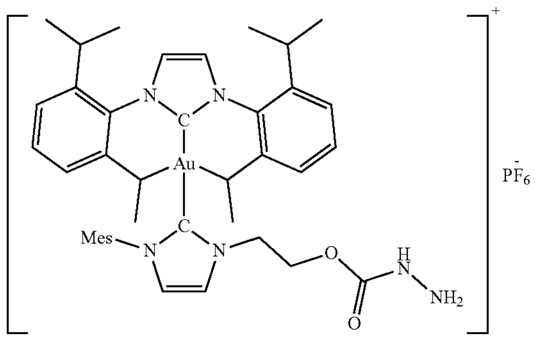
SS-A2*a*
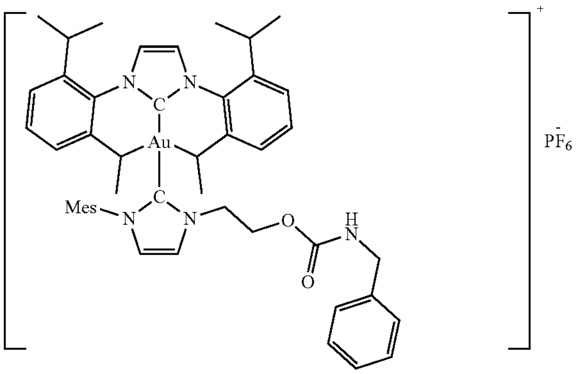
SS-A2*d*
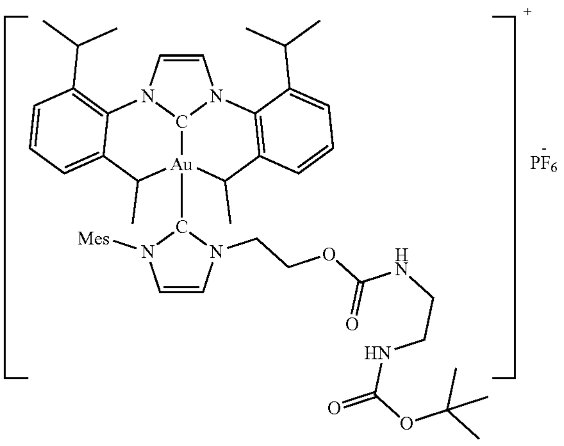
SS-A2*c*

-continued
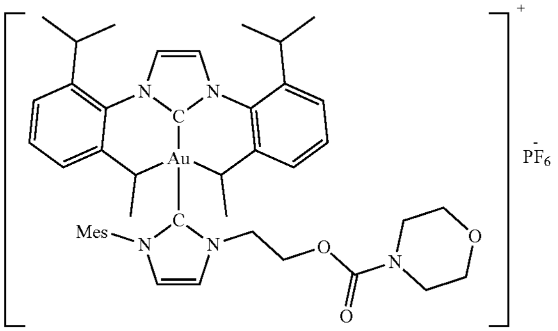
SS-A2*b*
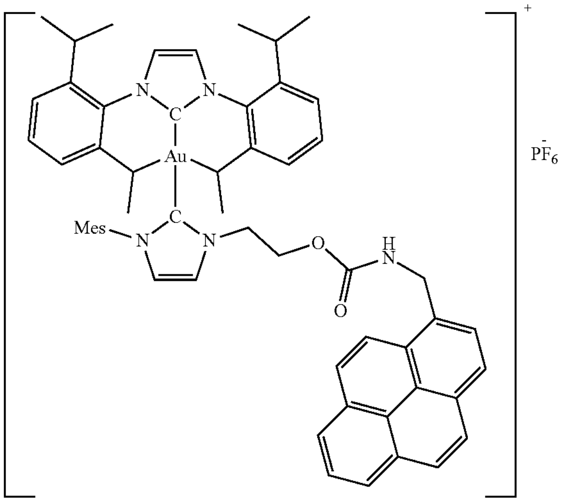
SS-A2*e*
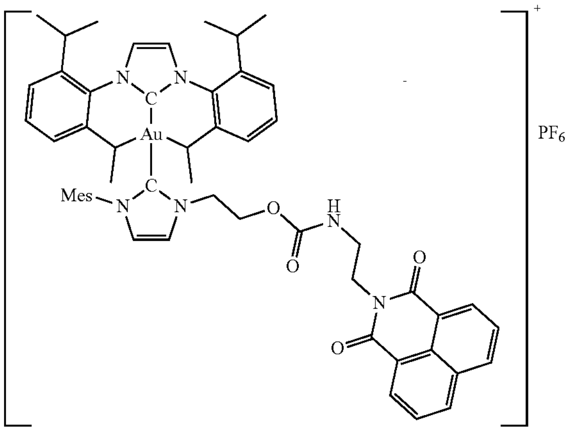
SS-A2*f*

After the model studies using different amines were performed, the next target was to utilize this strategy to create systems amenable to attachment to signaling agents, moieties that might permit the preparation of prodrug forms and biologically relevant molecules. First efforts focused on fluorescent signaling agents. Fluorescent Au(I)-bis-NHCs are rare compared to Au(I)-mono-NHCs. Now exploiting the new synthetic methodology, fluorescent molecules such as pyrenes and naphthalimides can be easily attached via carbamate bond. After reacting SS-A-1 with pyrene methylamine hydrochloride (3 equiv) in presence of TEA (4 equiv) for 30 h, the full conversion was seen from LCMS. After the necessary water wash to get rid of the ammonium hydrochloride, a crude product was obtained that comes with the pyrenemethylamine hydrochloride salt. Hence, the compound was purified through silica column using 20:1 DCM/Methanol mixture as the eluent. This kind of column purification is also rare in Au(I) carbene chemistry and it clearly portrays the robustness of the carbamate bonds. The target pyrene-conjugated product SS-2e can be isolated with moderate yield (50%) and it has been fully characterized using $^{1}H$, $^{13}C$, and HRMS. Suitable crystals of SS-2e were also grown using slow diffusion of DEE in DCM solution (ORTEP representation shown in FIG. 1). Fluorescence microscopy studies reveal that the $\lambda_{max}$ for excitation is 342 nm whereas $\lambda_{max}$ of emission lies at 395 nm with an excimer emission at 470 nm. The fluorescence spectrum can be tuned by wisely choosing the fluorescent probe. For example, changing the pyrene moiety to naphthalimide shifts the $\lambda_{max}$ for excitation to 414 nm.

Furthermore, to exploit the broader prospect of the methodology, an FDA approved anti-cancer drug Doxorubicin was chosen. Doxorubicin, an anthracyclin type drug that slows or stops the growth of cancer cells by blocking the enzyme topoisomerase 2, has also a primary amine. After mixing Doxorubicin (1.5 equiv), TEA (3 equiv), and SS-A-1, the reaction was monitored using HPLC. As the chromatogram shows, the target product peak gradually rises up around 16.4 min retention time after 3 h. Whereas, Doxorubicin and SS-A-1 peaks gradually decrease. Finally, the reaction reaches completion around 45 h as evident from both HPLC and ESI-MS. The final product (shown below) was separated using HPLC column with 30% yield. The purity of the isolated product was confirmed by HPLC, HRMS, $^{1}H$ and $^{13}C$ NMR. This is first example where an FDA approved drug has been conjugated with Au(I)-bis-NHC. This molecule, due to the presence of doxorubicin, also behaves as a fluorescent molecule.

Now, as a drawback of this aforementioned synthetic protocol, aromatic amines were not able to be attached via carbamate bond. Aromatic amines, present in various pharmaceuticals such as the anti-leprosy drug dapson and some antimalarials (e.g. primaquin), are known to be very weak nucleophiles and often need activating agent for coupling reactions. Hence, a scheme which utilized hydroxybenzotriazole (HOBt) as the activating agent and used DMF as a solvent (Scheme 2) was developed. With this protocol, the range of amines that can be attached to SS-1 includes aromatic amines. The final products were characterized by $^{1}H$ and $^{13}C$ NMR spectroscopy, ESI-MS, and X-ray crystallography. Table 1 demonstrates the scope of the newly developed methodologies.

Scheme 2

Methods of attaching aromatic amines using HOBt (1.5 equiv), DMF, and 4-tertbutylaniline. Examples made with this protocol are shown herewith.

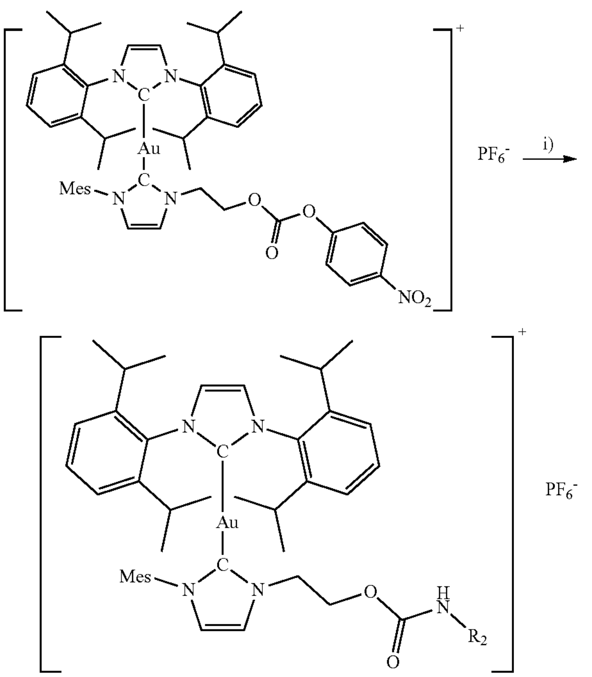

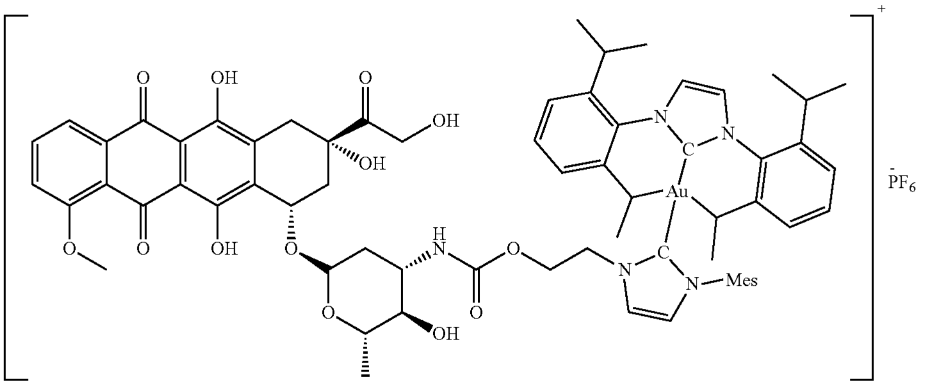

-continued

SS-A-2g

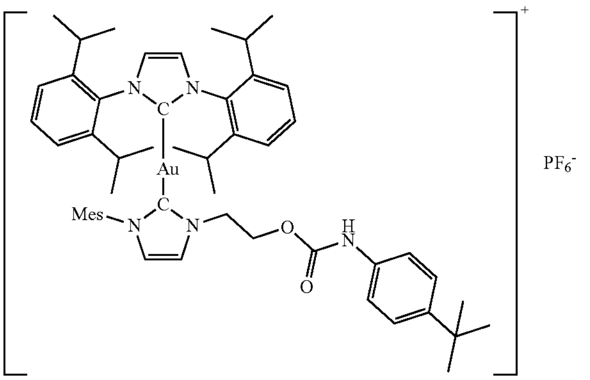

SS-A-2h

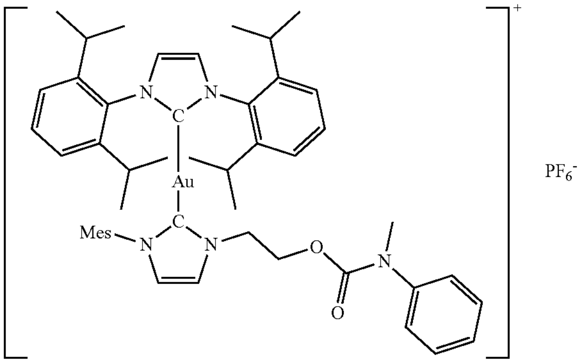

TABLE 1

Types of different amines attached via newly developed methodologies.

| Type of amine | Example | Protocol | Yield |
|---|---|---|---|
| Activated primary | SS-A-2a | 1 | 79% |
| Normal primary | SS-A-2c | 1 | 53% |
| Primary ammonium salt (an FDA approved drug Doxorubicin) | Au(I)NHC-DOX | 1 | 15% |

TABLE 1-continued

Types of different amines attached via newly developed methodologies.

| Type of amine | Example | Protocol | Yield |
|---|---|---|---|
| Secondary | SS-A-2b | 1 | 61% |
| Benzylic | SS-A-2d | 1 | 40% |
| Benzylic ammonium salt | SS-A-2e | 1 | 40% |
| Aromatic primary | SS-A-2g | 2 | 57% |
| Aromatic secondary | SS-A-2h | 2 | 36% |

All chemical reactions were conducted under nitrogen atmosphere using Schlenk technique. The glassware was oven dried at 120° C. before use. All materials were obtained from commercial sources at the highest purity available and used without further purification. Chloro (dimethylsufide) gold(I) was purchased from Sigma-Aldrich. [Au(IPr)OH] was synthesized according to the known literature by Nolan et al. (Gaillard et al., 2010) 1*Br and NPNH2 were also synthesized according to previously published protocols (Prühs et al., 2004; Mo et al., 2017). Solvents were either dried with a solvent purification system (DCM, acetonitrile, methanol) or dried over molecular sieves (toluene) (3 Å) and degassed prior to use.

The $^{1}H$ NMR and $^{13}C$ NMR spectra were measured on Varian Inova spectrometers at the University of Texas at Austin using $CD_2Cl_2$ and DMSO-$d_6$ as deuterated solvents. The chemical shifts were reported relative to the residual solvent protons. For the declaration of the spin multiplicities the following abbreviations were used: s (singlet), d (doublet), t (triplet) and m (multiplet), as well as appropriate combinations of these. Coupling constants of protons (J) are stated in Hertz (Hz). The NMR spectra were analyzed using the software MestReNova v. 10.0.2-15465 (Mestrelab Research S.L.) All deuterated solvents were bought from Cambridge Isotope laboratories. High-resolution electrospray ionization (ESI) mass spectra were recorded on a VG ZAB2E instrument or VG AutoSpec apparatus. Column chromatography was performed on Sorbent silica gel (40-63 μm). Analytical thin layer chromatography (TLC) analyses were carried on glassbacked silica gel plates (200 μm, Sorbent Technologies). Fluorescence measurements were performed at room temperature on a Photon Technology International fluorimeter.

Synthesis of Au(I)NHC-DOX Conjugate:

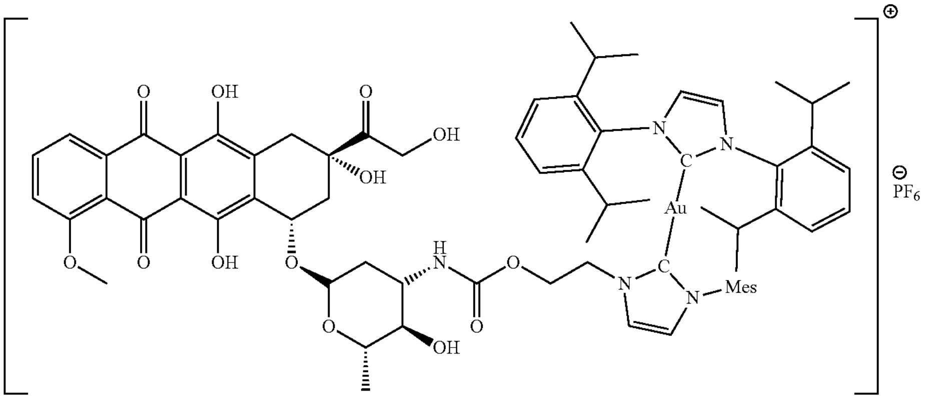

Reaction time: ~47 h DOX·HCl (40 mg, 0.0735 mmol, 2.1 equiv) was dissolved in 0.2 ml dry DMF, 12 ml dry DCM and 0.080 ml dry TEA (0.582 mmol, 16 equiv) and stirred for 30 mins. Next, SS-A-1 (40 mg, 0.035 mmol, 1 equiv) dissolved in 1 ml dry DCM was added to it. The reaction progress was monitored over time. It was noticed that around after 47 h, the reaction comes to completion. Next, the DCM was evaporated and DEE was added to it to get a dark red solid. 15 mg of this solid was dissolved in 2 ml ACN:water (55:45) mixture. Then the mixture was purified in HPLC column where the gradient of ACN and water was 75:25 and the retention time ~24.5 mins. The fractions were collected and combined together. Finally, the resultant product was lyophilized to get pure dry product. Yield: 8 mg (15%) ESI-HRMS (acetonitrile) (m/z): Positive mode-Calculated for $[C_{69}H_{81}AuN_5O_{13}]^+$: 1384.5497, obtained: 1384.5505. Negative mode-$[PF_6]^-$: 145.1. $^1H$ NMR (500 MHz, methylene chloride-$d_2$): δ 13.94 (s, 1H), 13.21 (s, 1H), 7.94 (d, J=7.7 Hz, 1H), 7.73 (t, J=8.1 Hz, 1H), 7.43 (t, J=7.8 Hz, 2H), 7.33 (d, J=8.5 Hz, 1H), 7.20-7.11 (m, 5H), 7.05 (d, J=1.9 Hz, 1H), 6.61 (d, J=1.8 Hz, 1H), 6.47 (s, 1H), 6.39 (s, 1H), 5.39 (d, J=3.7 Hz, 1H), 5.19 (t, J=3.0 Hz, 1H), 5.13 (d, J=8.8 Hz, 1H), 4.67 (s, 2H), 4.48 (s, 1H), 4.00 (q, J=6.6 Hz, 1H), 3.93 (s, 3H), 3.68-3.52 (m, 4H), 3.49 (d, J=2.6 Hz, 1H), 3.20 (dd, J=18.6, 2.0 Hz, 1H), 2.97 (d, J=18.7 Hz, 1H), 2.29 (pd, J=7.1, 4.3 Hz, 4H), 2.19 (s, 3H), 1.41 (d, J=4.1 Hz, 6H), 1.21-1.16 (m, 3H), 1.08 (d, J=6.8 Hz, 12H), 1.00 (dd, J=16.4, 6.9 Hz, 12H).

Scheme 3: Preparation of Functionalized Naphthoquinone Containing Complexes

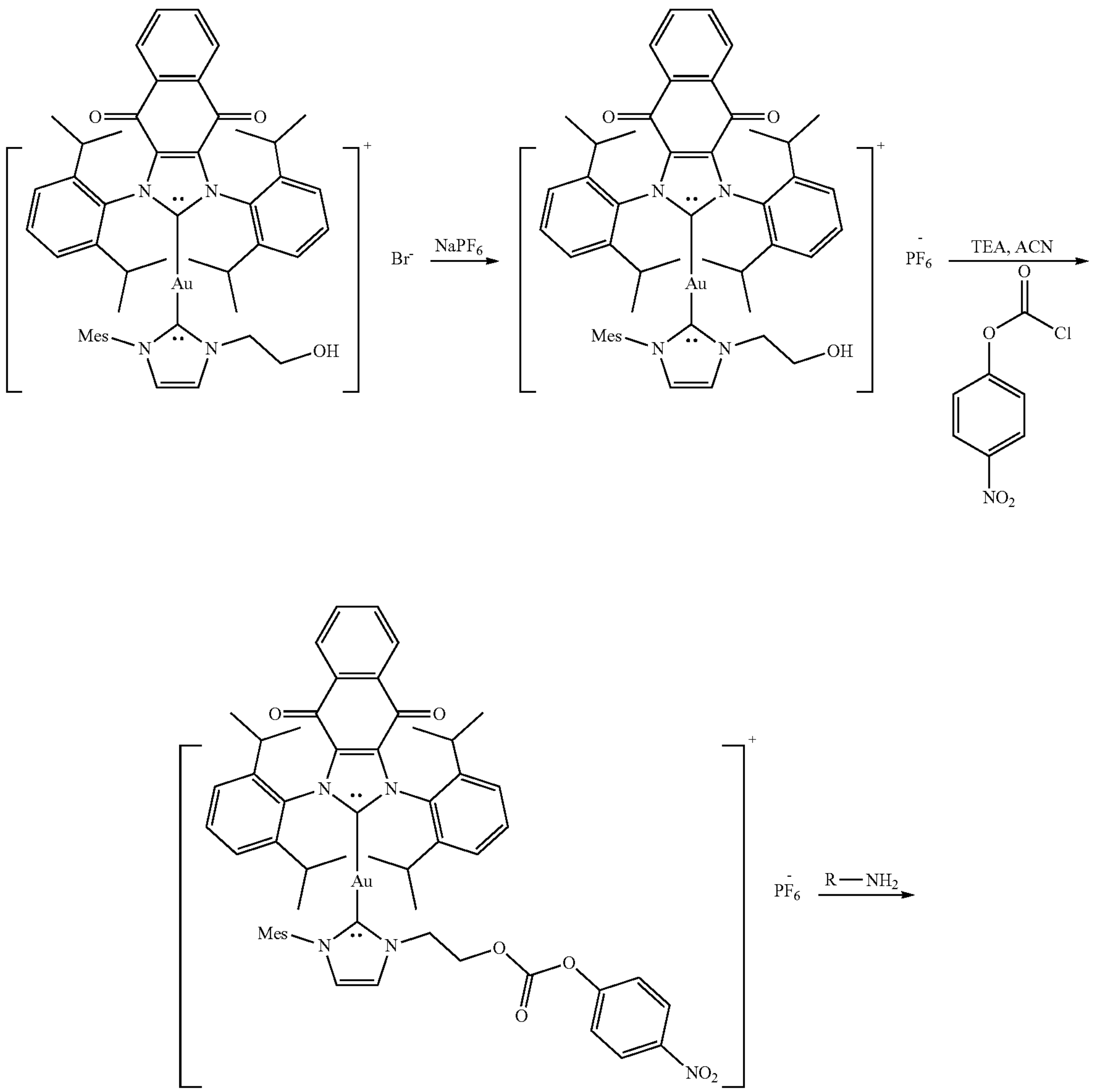

-continued

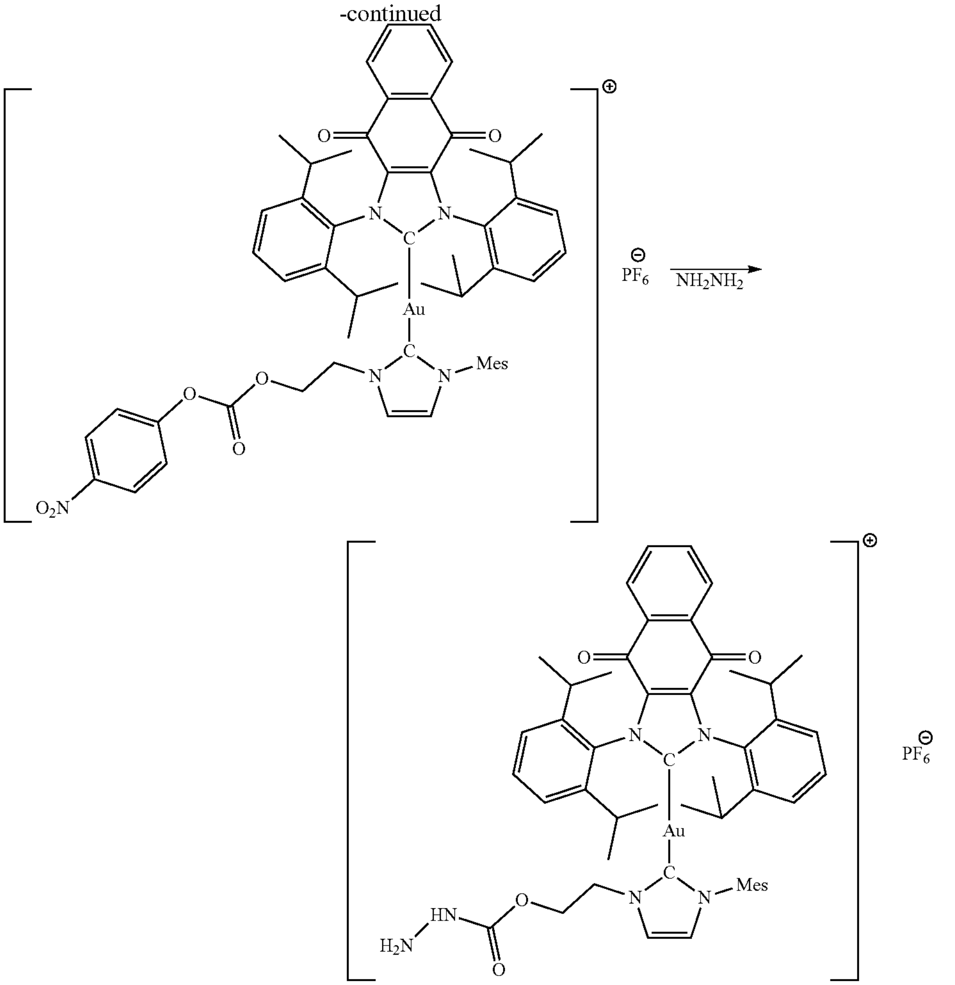

Figure 6:
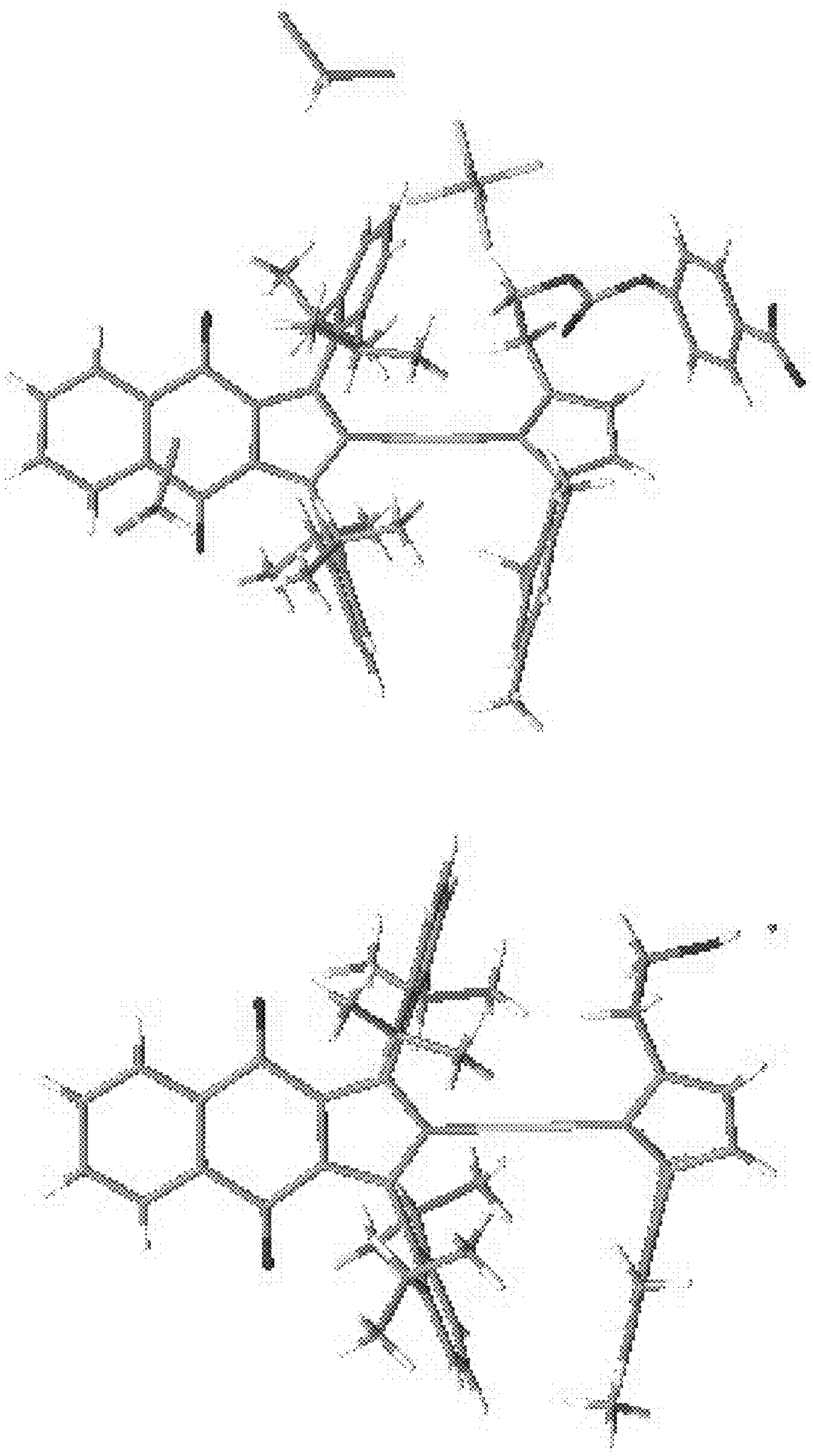
FIG. 6 shows the ORTEP representation of complex 3 and a functionalized version thereof.

Crystal structures of these compounds are shown in FIG. 6.

Example 2—Biological Activity of Functionalized Gold Carbene Compounds

Figure 2:
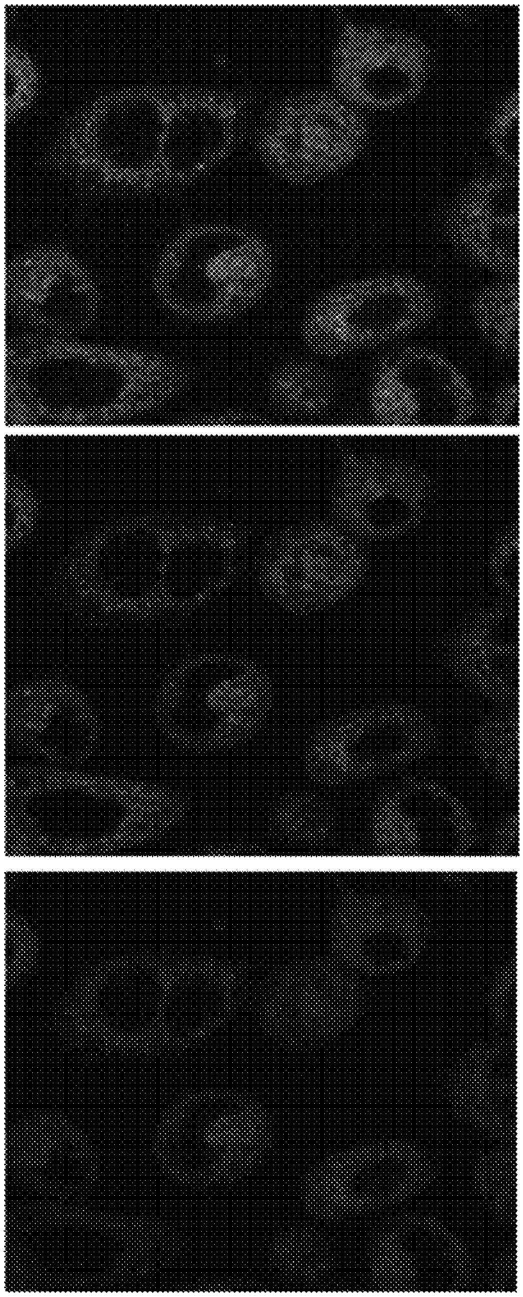
FIG. 2 shows cell proliferation profiles of A549 cell line treated with i) Auranofin, ii) SS-1*$PF_6$, and iii) SS-A-2e (shown from left to right).

After making these carbamates using all kind of amines, the cytotoxicity of these novel complexes was tested against cancer cells. Au(I)-bis-NHCs have emerged as potential anti-cancer drugs, especially after the seminal work done by Berners-Price et al. Recently, Arambula et al. showed the relevance of redox-active Au(I)-bis-NHCs as promising anti-neoplastic agents. The anti-proliferative property of Au(I)—NHC complexes stem from their selective inhibition of TrxR enzyme. Unfortunately, as recent studies suggest, targeting only a particular protein or an enzyme is always not that effective and often results in minimal phenotypic change in oncogenic cells. As an alternative, conjugate drugs are exhibiting great promise because of their dual targeting or multi-targeting mechanism of action. To demonstrate the anti-proliferative activity of these few newly synthesized carbamate conjugates, the compounds were tested against a A549 lung cancer cell line. As the triplicated 3 day MTT study suggests, these conjugates are highly cytotoxic against that cell line. Also, FIG. 2 demonstrates the comparative cell proliferative profile of these carbamate conjugates. This high cytotoxicity could, in part, emerge from the high lipophilic nature of these complexes which help them permeate through the cell membrane easily and target the mitochondria.

Finally, as three fluorescent Au(I)—NHC conjugates had been prepared, these compounds were used as in vitro cellular imaging agent. Au(I)NHC-DOX conjugate turned out to be the best amongst them when A549 human lung cancer cell lines were used for confocal microscopy. After using MItotracker Red to stain mitochondria, overlap of bright red spots from Mitotracker Red and green spots from Au(I)-DOX conjugate were seen. Therefore, the merged image on the right in FIG. 5 clearly indicates the mitochondria as the primary target, which is in accordance with the literature. The primary target for Doxorubicin·HCl is mainly the nucleus, as evident from the microscopy images and in accordance with the literature. This evidence is consistent with the positively charged Au(I)—NHC, functionalized with doxorubicin, playing the pivotal role in mitochondrial localization.

A. Initial Testing of Dual Pathway Targeting Complexes

The initial rationale for preparing complexes 1-3 (shown below) involved a systems approach to circumventing the antioxidant network that helps give solid tumors their resiliency. These compounds were believed to be able to 1) inhibit the production of reducing metabolites (e.g., TrxR/Trx), thereby reducing the ability of the cancer cell to maintain ROS homeostasis and 2) accentuate exogenous ROS production via the use of a redox cycling agent (e.g., ferrocene, naphthoquinone) (Arambula et al., 2016; McCall et al., 2017). Side by side comparisons of these complexes (and relative to Au-phosphine bound complexes such as Auranofin) revealed high formulation stability, inactivity to plasma proteins (McCall et al., 2017), and broad anticancer activity in vitro (Table 3). The selectivity of compound 3 to cancer cells was further assessed against healthy human L929 fibroblasts (Table 3). In comparisons to A549 lung cancer cells, complex 3 displayed a cancer selectivity of 27-fold, whereas auranofin displayed only a 2.5-fold selectivity. This further validates the dual targeting drug development approach to achieving cancer selectivity and inducing ICD by perturbing the antioxidant pathway via multiple mechanisms.

Compound 3 were developed with a view to improving potency and obtaining a system with features that might make them suitable for development as a potential drug leads.

B. In Vivo Efficacy of Dual Targeting Au(I) Complexes

Figures 3A, 3B:
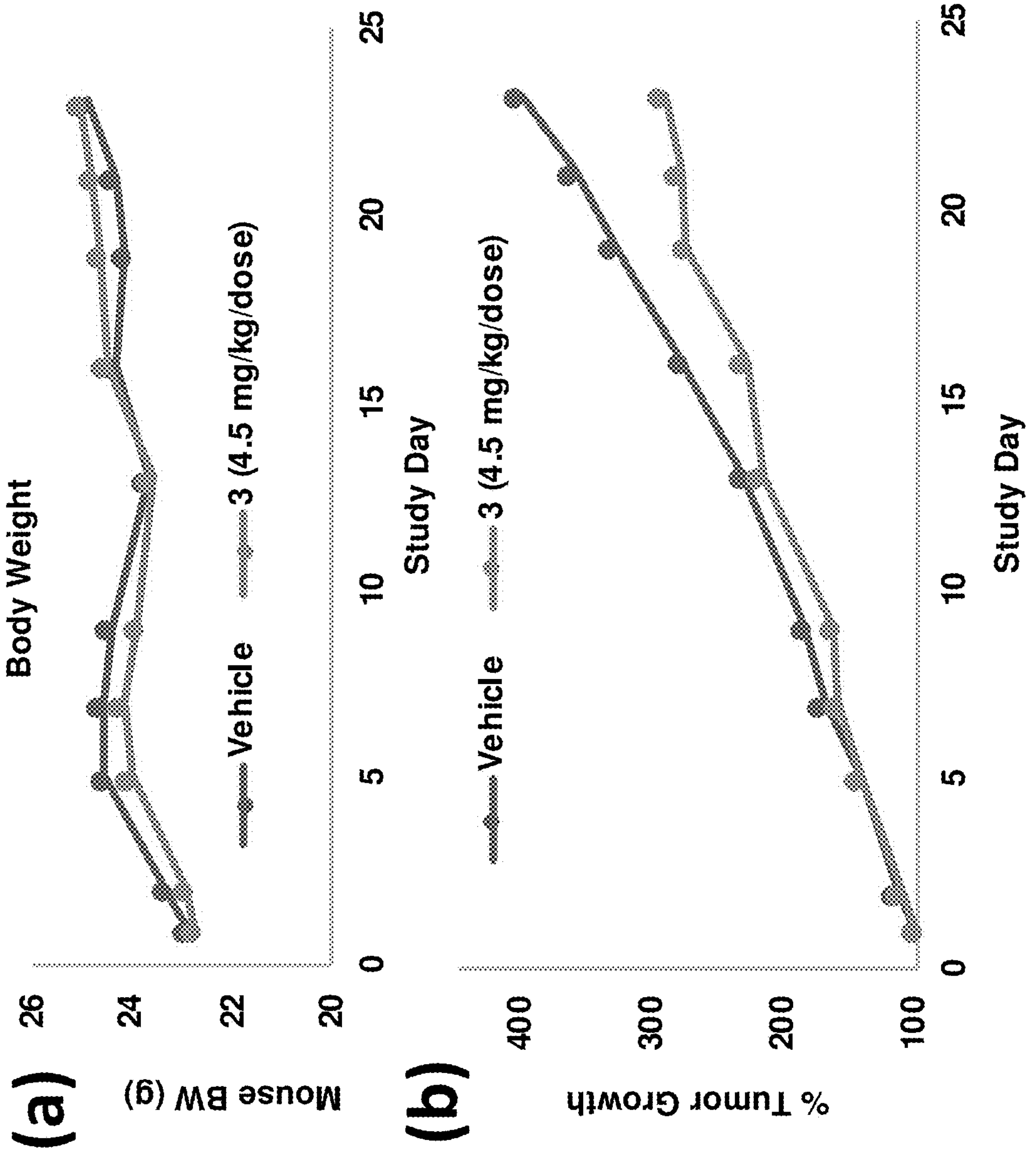
FIGS. 3A & 3B show (FIG. 3A) tolerability (mouse body weight) and (FIG. 3B) anticancer efficacy of 3 in nude mice bearing subcutaneous A549 human lung cancer xenografts. 3 was administered intravenously on days 1, 3, 5, 7, 10, and 13.

Initial work with complex 3 carried out revealed the complex to be well tolerated after repeated doses of up to 4.5 mg/kg/dose via intravenous administration using a Tween 80/PEG400/ethanol/water sterile solution. Mice were subject to 6 injections using this dose/formulation over a 2 week period with no adverse clinical observations or body weight loss (FIG. 3A). Without wishing to be bound by any theory, it is believed that the maximum tolerated dose has not yet been reached and that the anticancer potential of 3 is limited by solubility issues, rather than intrinsic potency or tolerability concerns. Nude mice bearing A549 subcutaneous

TABLE 3

Cell proliferation data in human cancer cell lines[a]

Gold complexes

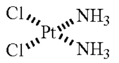

Cisplatin

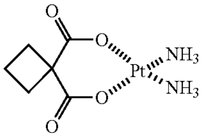

Carboplatin

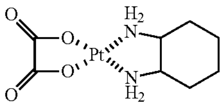

Oxaliplatin

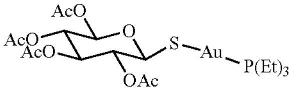

Auranofin

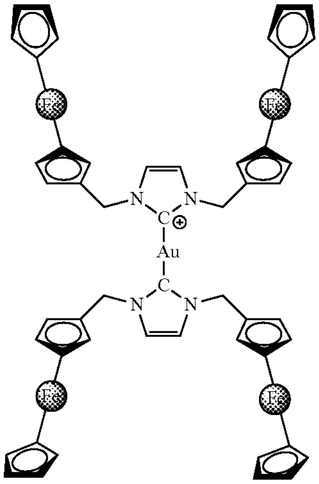

1

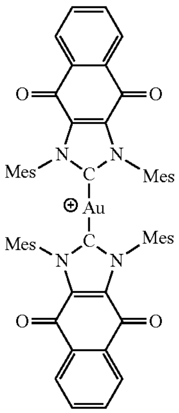

2

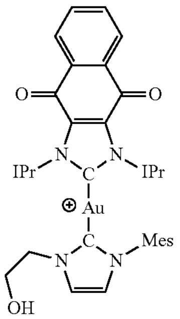

3

| | A549 Lung | A2780 Ovarian | 2780CP Ovarian | HCT116 Colon | CT26 Colon | L929 Fibroblasts |
|---|---|---|---|---|---|---|
| Auranofin | 1.67 (0.05) | — | — | 1.3 (0.1) | | 4.2 (0.29) |
| Cisplatin | 1.03 (0.02) | 0.33 (0.05) | 7.1 (0.3) | — | | |
| Oxaliplatin | 0.97 (0.04) | 0.15 (0.01) | 0.3 (0.02) | 0.5 (0.03) | 2.0 (0.05) | |
| Au(I) complex 1 | 0.14 (0.03) | 0.19 (0.01) | 0.12 (0.01) | — | | |
| Au(I) complex 2 | 0.07 (0.01) | 0.03 (0.01) | 0.05 (0.01) | — | | |
| Au(I) complex 3 | 0.02 (0.002) | — | — | 0.02 (0.01) | 0.25 (0.03) | 0.71 (0.13) |
| Fold Difference of 3 to cisplatin | 52 | | | | | |
| Fold Difference of 3 to oxaliplatin | | | | 25 | 8 | |

[a]Data represents respective 72 h $IC_{50}$ (μM) values with the (standard deviation) from 3-5 separate experiments.

xenografts were then treated with 3 and the tumor growth was monitored relative to controls (FIG. 3B). A moderate tumor growth inhibition of 36% was observed. Despite not being statistically significant (p-value=0.16 on day 23, end of study), this proof-of-concept data does augur well for the anticancer potential of these dual targeting complexes. It is believed that the antitumor activity of 3 will prove stronger when tested in immunocompetent mice (i.e., BALB/c with CT26 syngeneic tumor).

Figure 4A:
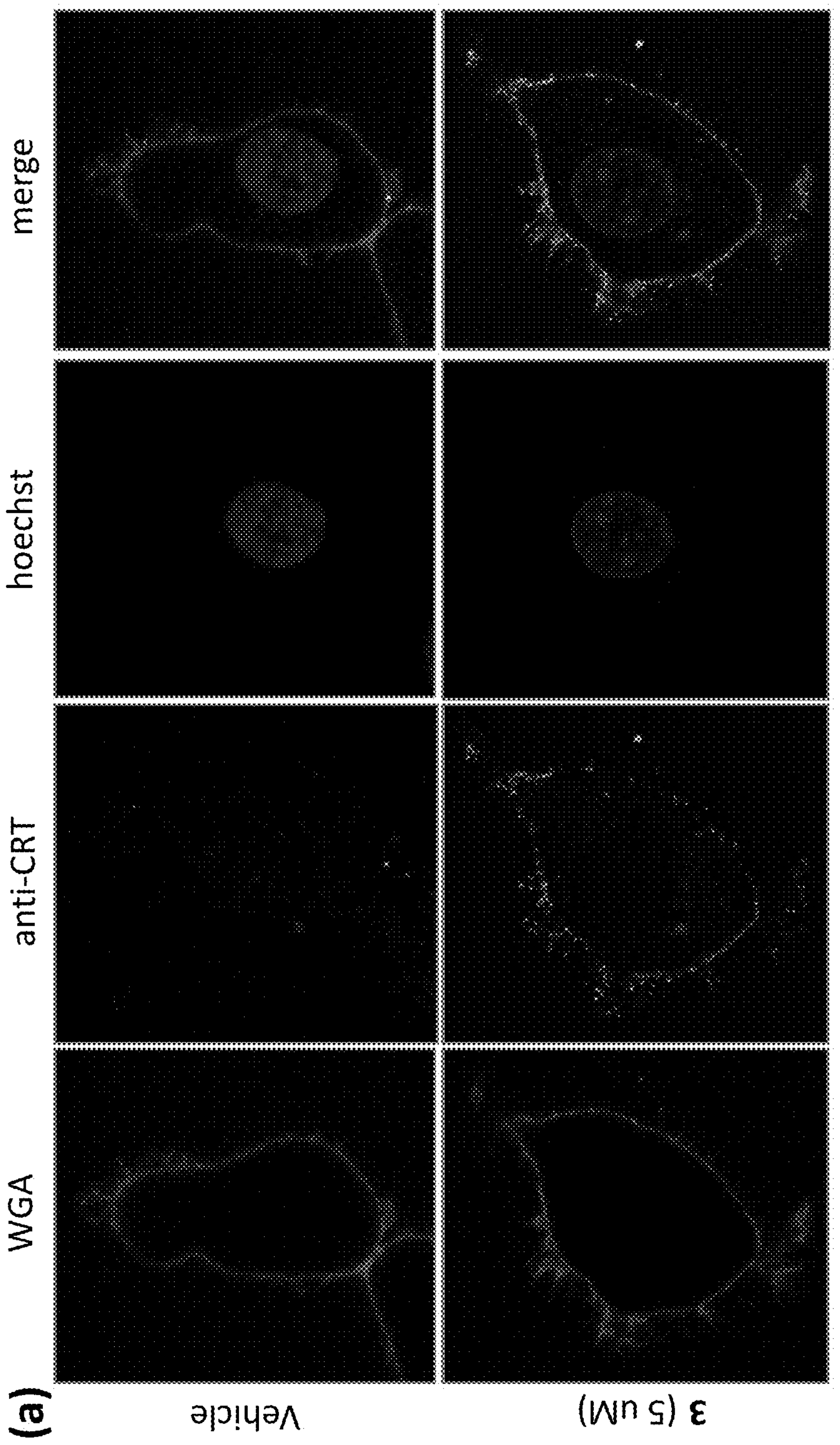
FIGS. 4A-4E show (FIG. 4A)Confocal microscopy analysis of CT26 colon cancer cells illustrating CRT translocation to the cell membrane upon treatment of 3 for 6 hr (red, WGA; blue, DAPI; green, CRT).
Figures 4B, 4C, 4D, 4E:
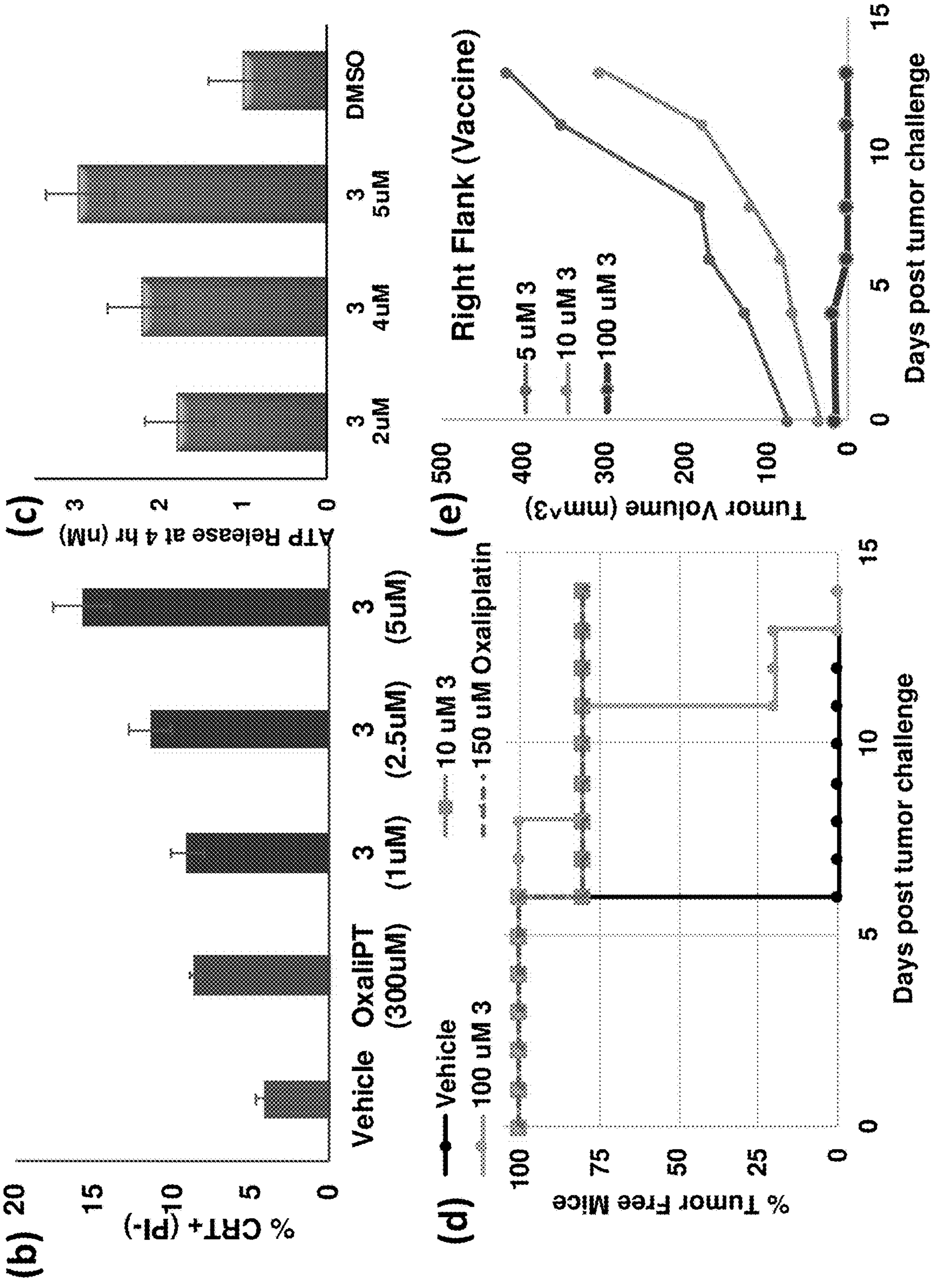

C. Dual Targeting Complexes Induce Immunogenic Cell Death:

As noted above, complexes 1-3 were designed to 1) inhibit TrxR (leading to a reduction in biological antioxidants) and 2) accentuate exogenous ROS (via redox cycling). ICD is mediated by oxidative stress response mechanisms localized to the mitochondria and ER. Calreticulin (CRT) translocation from the ER to the cell membrane is a critical mechanistic step in ICD induction. To correlate the findings of ER and mitochondrial stress to ICD induction, murine cancer cell lines (Panc-02 pancreas and CT26 colon) were treated with 3 and assessed for cell membrane CRT translocation (FIG. 4). At low concentrations (i.e., 1 μM), 3 induced CRT translocation as assessed by fluorescent microscopy and flow cytometry (FIGS. 4A & 4B). To achieve the same $CRT^+$ signal by the known ICD-inducing agent oxaliplatin, a concentration of 300 μM was needed (FIG. 4B); on this basis, complex 3 was proposed to be approximately 300-fold more effective than oxaliplatin at inducing CRT translocation. To determine whether strict TrxR inhibition or the proposed dual targeting approach is responsible for the observed CRT translocation, auranofin (an effective and selective TrxR inhibitor) was assessed for its ability to induce CRT translocation under the same conditions as 3. In side by side experiments in Panc-02 cells, auranofin was found ineffective at inducing CRT translocation to the cell membrane.

Additionally, another ICD biomarker, ATP release, has been confirmed in CT26 cells treated with complex 3 (FIG. 4C). This data represents preliminary in vivo data confirming 3 is an ICD inducer. Here, mice were subcutaneously immunized on the right flank with CT26 mouse colorectal cancer cells ($3\times10^6$) that were pretreated with varying concentrations (5, 10, or 100 μM) of 3 for 4 hours (so as to induce the desired ICD biomarkers and creating a potential anticancer vaccine). Seven days later, the mice were challenged subcutaneously in the opposite flank (i.e. left flank) with naïve CT26 cells ($5\times10^5$) and the challenge tumor growth was monitored over time (FIG. 4D). As a negative control, all mice immunized with CT26 cells subjected to freeze-and-thaw to induce necrosis developed measurable tumors after 6 days, whereas 80% of the mice immunized with CT26 cells treated with 3 at 10 μM or the ICD inducing oxaliplatin at 150 μM remained tumor-free at the end of the study, confirming the induction of tumor-specific immunity. (FIG. 4E).

Example 3—CarbonateFunctionalized Gold Carbene Compounds

Scheme 4: Synthesis of various carbonate-based Au(I) bis-NHCs using 1 as a synthetic platform.

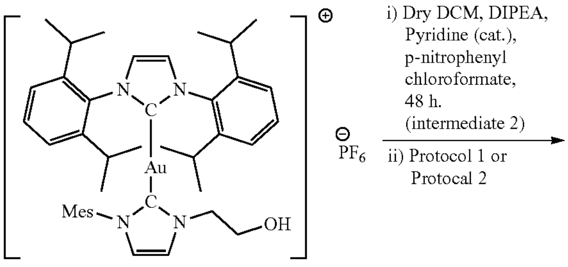

1

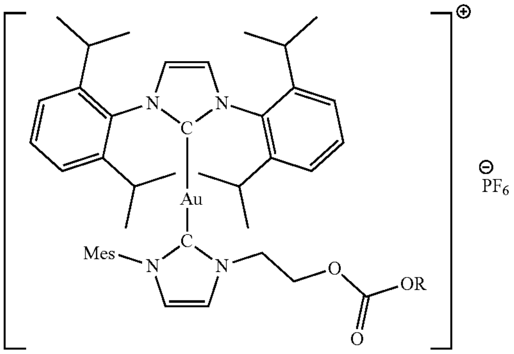

3

4

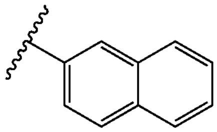

(74%)

5

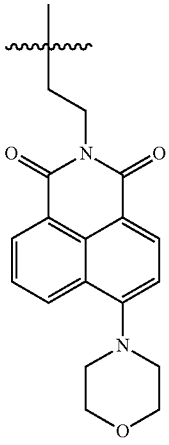

(40%)

-continued

6

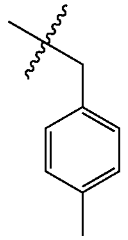

(54%)

7

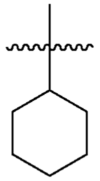

(43%)

8

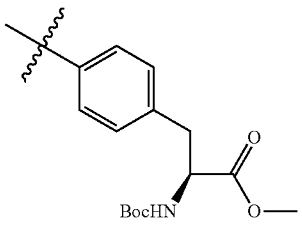

(60%)

9

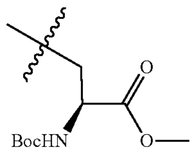

(43%)

10

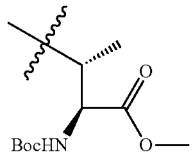

(33%)

Protocol 1: Aromatic alcohol, dry dichloromethane (DCM), triethylamine (TEA), 24 h.

Protocol 2: Aliphatic or benzylic alcohol, dimethylaminopyridine (DMAP), dry DCM, 24 h.

Note—yields (shown in brackets) were calculated based on isolated product.

Figure 7:
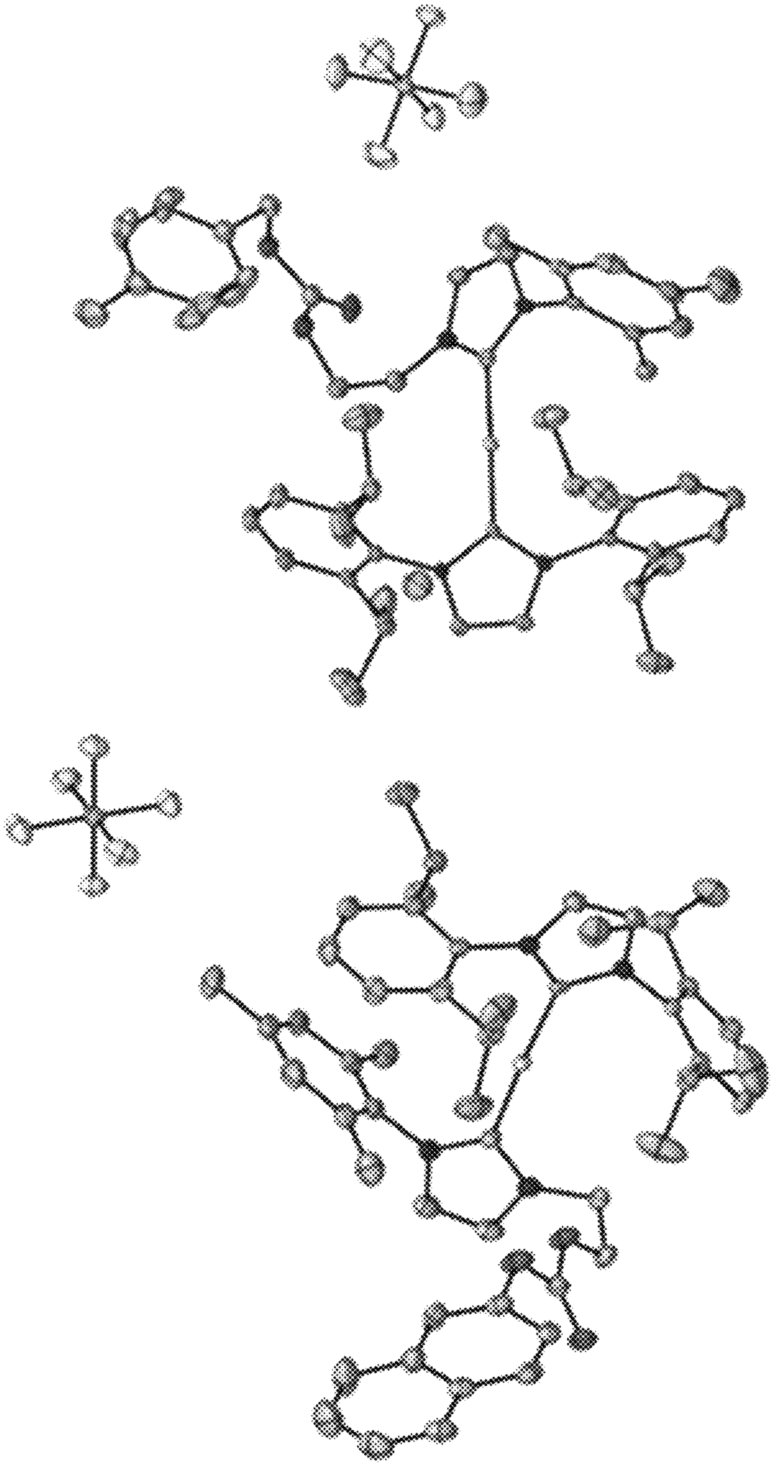
FIG. 7 shows the ORTEP representations of 4 and 6. Hydrogen atoms are omitted for clarity. Thermal ellipsoids are drawn at the 50% probability level. Further details of these structures and that of 5 may be obtained from the Cambridge Crystallographic Centre by making reference to CCDC nos. 1999228-1999230.

Scheme 4 summarizes the reaction chemistry used to produce carbonate functionalized Au(I) bis-NHCs of generalized structure 3 from the starting hydroxyethyl Au(I) bis-NHC 1. In brief, complex 1 was reacted with 4-nitrophenyl chloroformate in a solution of DCM containing diisopropylethylamine (DIPEA) as a base and a catalytic quantity of pyridine to afford 2 in good yield (87%). With reactive intermediate 2 in hand two protocols were employed to effect conversion to various carbonate functionalized Au(I) bis-NHCs. Owing to the relatively high acidity of phenolic hydrogens, aromatic alcohols such as β-naphthol, were easily conjugated with 2 using dry dichloromethane (DCM) and $NEt_3$, conditions referred to as Protocol 1 (yields: 60-74%). Unfortunately, Protocol 1 proved unsuccessful for the conjugation of aliphatic and benzylic alcohols. Success was encountered by mixing 2 in dry DCM along with dimethylaminopyridine (DMAP) in the presence of an aliphatic or benzylic alcohol. This procedure, Protocol 2, provided access to the desired carbonate aliphatic/benzylic derivatives (yields: 33-54%). Using this latter protocol, Au(I)-bis-NHCs conjugates 5-7 were successfully synthesized and fully characterized (Scheme 4). Single crystals of 4-6 suitable for X-ray diffraction analysis were grown via slow diffusion of diethyl ether into DCM solutions of the complex. Two representative structures are shown in in FIG. 7.

Figures 8A, 8B, 8C, 8D:
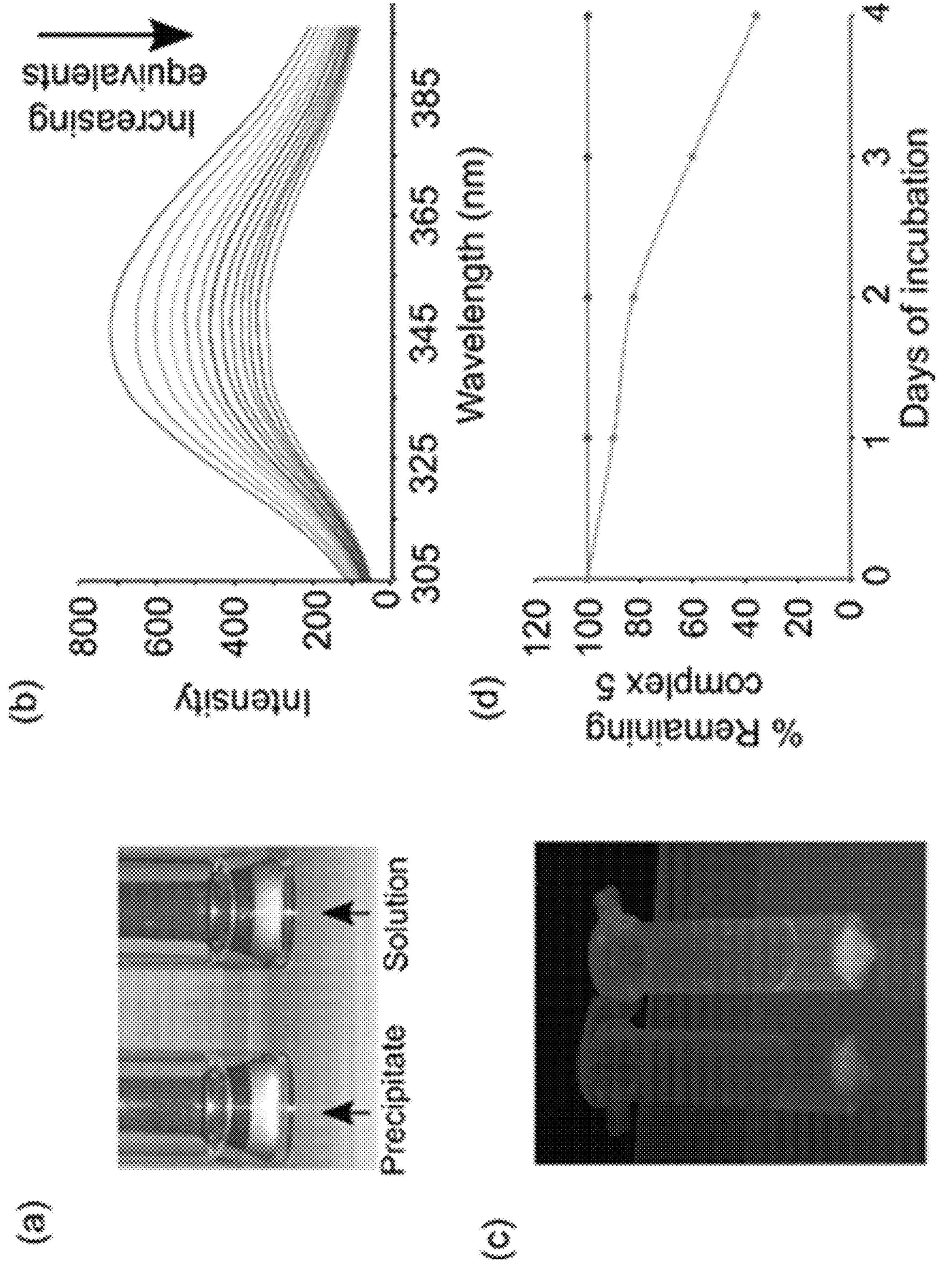
FIGS. 8A-8D show the (FIG. 8A) 5 (100 μM, 2% DMSO in PBS) photographed in the absence (left) and presence (right) of BSA after allowing to mix for 15 min.

Both Protocols 1 and 2 proved successful for the conjugation of alcohols containing amino acids yielding modified tyrosine, serine, and threonine linked Au(I)-bis NHCs 8-10. Peptides and amino acid analogues have been widely used in anticancer therapy, (Le Joncour and Laakkonen, 2018; Marques et al., 2017) with amino-acids linked Pt(II) complexes displaying promise as anticancer agents (Rijal et al., 2014; Kimutai et al., 2019). Unfortunately, in spite of several attempts, the conjugation of tertiary alcohols with 2 proved unsuccessful. The naphthalimide-based conjugate 5 was of particular interest owing to the fact that it contains a fluorescent moiety tethered to the putative Au(I)-bis NHC therapeutic core. In addition, naphthalimide derivatives are recognised for their ability to stabilize serum albumin-drug interactions (Fan et al., 2019; Sun et al., 2011). This was viewed as attractive in the context of developing Au(I) complexes as potential drug leads. In spite of a number of successful in vitro studies being reported, the highly lipophilic nature of most Au(I) bis-NHCs have limited their full biological evaluation (Porchia et al., 2018; Zou et al., 2015). Without wishing to be bound by any theory, it is believed that the naphthalimide-based Au(I) bis-NHC 5 might bind to serum albumins, thus boosting its effective solubility. As shown in FIG. 8A, in their native form both 1 and 5 precipitate from aqueous solution after a 15-minute incubation period at a concentration relevant for in vivo studies (100 μM, 2% DMSO in phosphate buffered solution). However, in the presence of 0.6 mM BSA (physiological concentration, 6 equiv.), solutions of 5 remained transparent even after incubation for 6 days at 37° C. (FIG. 8A).

To confirm this apparent binding and solubilisation by BSA, fluorescence titrations were performed with BSA (5 μM) against increasing equivalents of either 1 or 5 (cf. FIG. 8A). The addition of 1 or 5, led to a decrease in the inherent fluorescence intensity of BSA at 344 nm, which was taken as evidence of BSA binding. As expected for the design strategy, the extent of quenching was much higher in the case of 5 than for 1 (60% vs 26%). This finding is interpreted in terms of a higher level of binding for 5. Quantitative analysis of the fluorescence data using the Stern-Volmer equation provided support for this conclusion. The bimolecular quenching constants, $K_q$, calculated from the associated Stern-Volmer plots were found to be $(3.8\pm0.3)\times10^{12}$ and $(1.4\pm0.2)\times10^{13}$ $M^{-1}$ $s^{-1}$ for complexes 1 and 5, respectively. These values are consistent with binding and thus static quenching between the BSA and the Au(I) complexes in question (Liu et al., 2018). See Table 4.

TABLE 4

Stern-Volmer data for the studies of the Au NHC complexes 1 and 5 with albumin, as calculated from the fluorescence quenching experiments.

| Compound | $K_{SV}$ ($M^{-1}$) | $K_q$ ($M^{-1}$ $s^{-1}$) | $K_{app}$ ($M^{-1}$) | n |
|---|---|---|---|---|
| 1 | 1.76*$10^4$ | 3.54*$10^{12}$ | 6.45*$10^3$ | ~1 (0.912) |
| 5 | 5.95*$10^4$ | 1.19*$10^{13}$ | 7.58*$10^4$ | ~1 (1.023) |

The apparent association constant ($K_{app}$) and the number of binding sites (n) for each metal complex with albumin, as calculated from double-logarithm plots, are included in this table.

Figure 11:
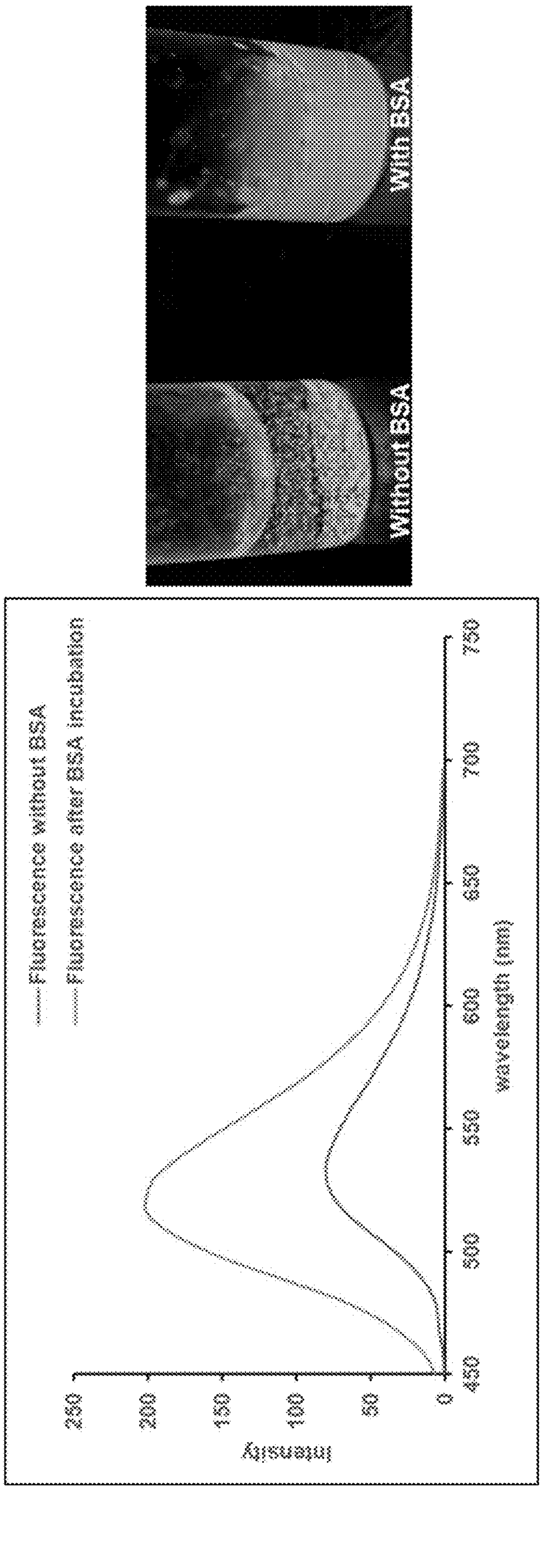
FIG. 11 shows on the left, the fluorescence spectrum of complex 5 (1 μM) recorded in the absence and presence of 20 μM BSA in PBS. On the right, complex 5 (100 μM) precipitates out as aggregates in the absence of BSA in PBS, whereas in the presence of 600 μM BSA 5 is solubilized.

The binding of 5 with BSA was further revealed through qualitative analyses, in which both BSA and, separately, 5 with BSA were precipitated from solution using cold EtOH. The resulting pellets were washed with PBS and checked for fluorescence with a handheld UV lamp (excitation: 365 nm). A clear distinction in the fluorescence intensity between the BSA only pellet and that produced from 5 and BSA was observed (FIG. 8C). Importantly, an enhanced fluorescence intensity was observed in the presence of BSA. (FIG. 11) This latter finding was believed to be the result of BSA preventing aggregation and attendant quenching of a poorly soluble fluorophore (Hong et al., 2009).

Figure 12A:
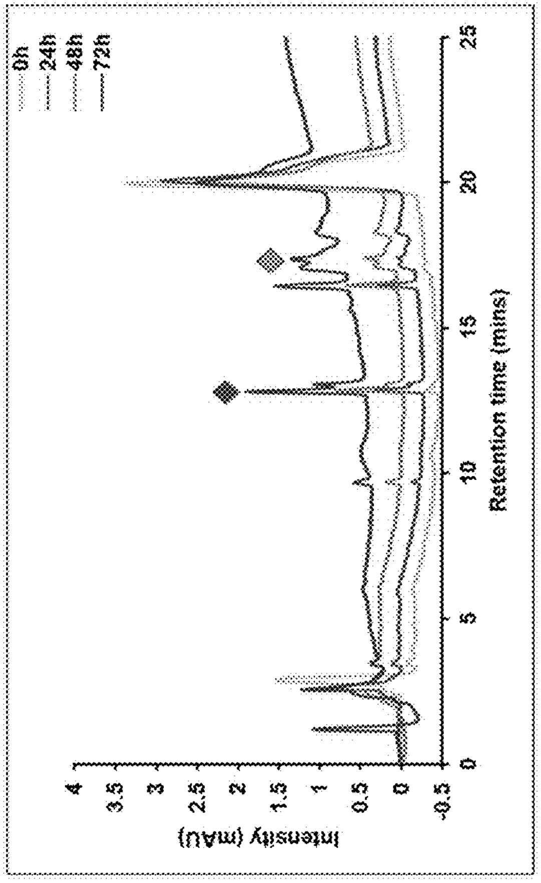
FIGS. 12A & 12B show HPLC diagram showing.
Figure 12B:
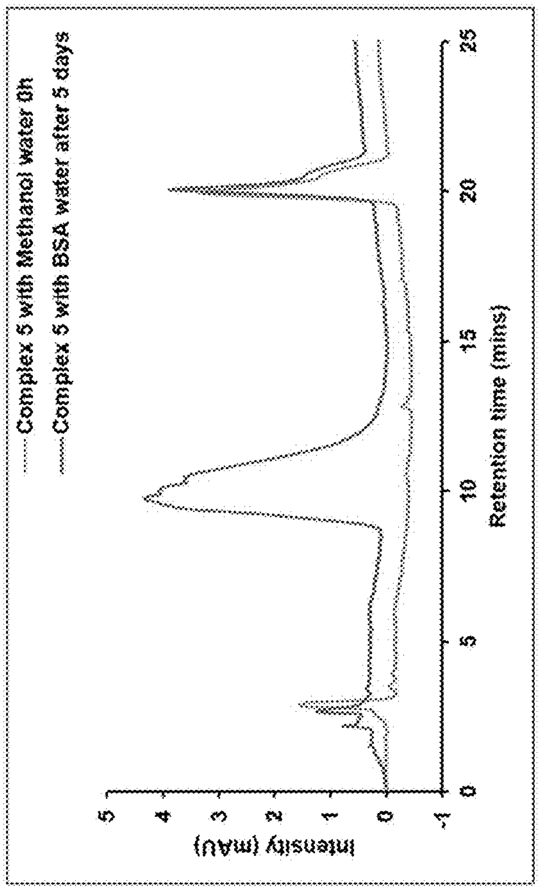

Carbonates are often seen as labile and prone to hydrolysis, which prevents their full therapeutic evaluation (Vacondio et al., 2015). Without wishing to be bound by any theory, it is believed that interaction with BSA could provide a relatively stable formulation that would also benefit from enhanced aqueous solubility. To test this hypothesis, complex 5 (100 μM) was dissolved in a 1:1 methanol/water mixture and subject to time dependent HPLC analysis. Over time, significant degradation of 5 was observed, which was ascribed to hydrolysis of the carbonate unit (FIGS. 8D & 12A). When a similar study was carried out in the presence of BSA, complex 5 remained largely intact even after incubation for 6 days at 37° C. (FIGS. 8D & 12B).

Figure 10:
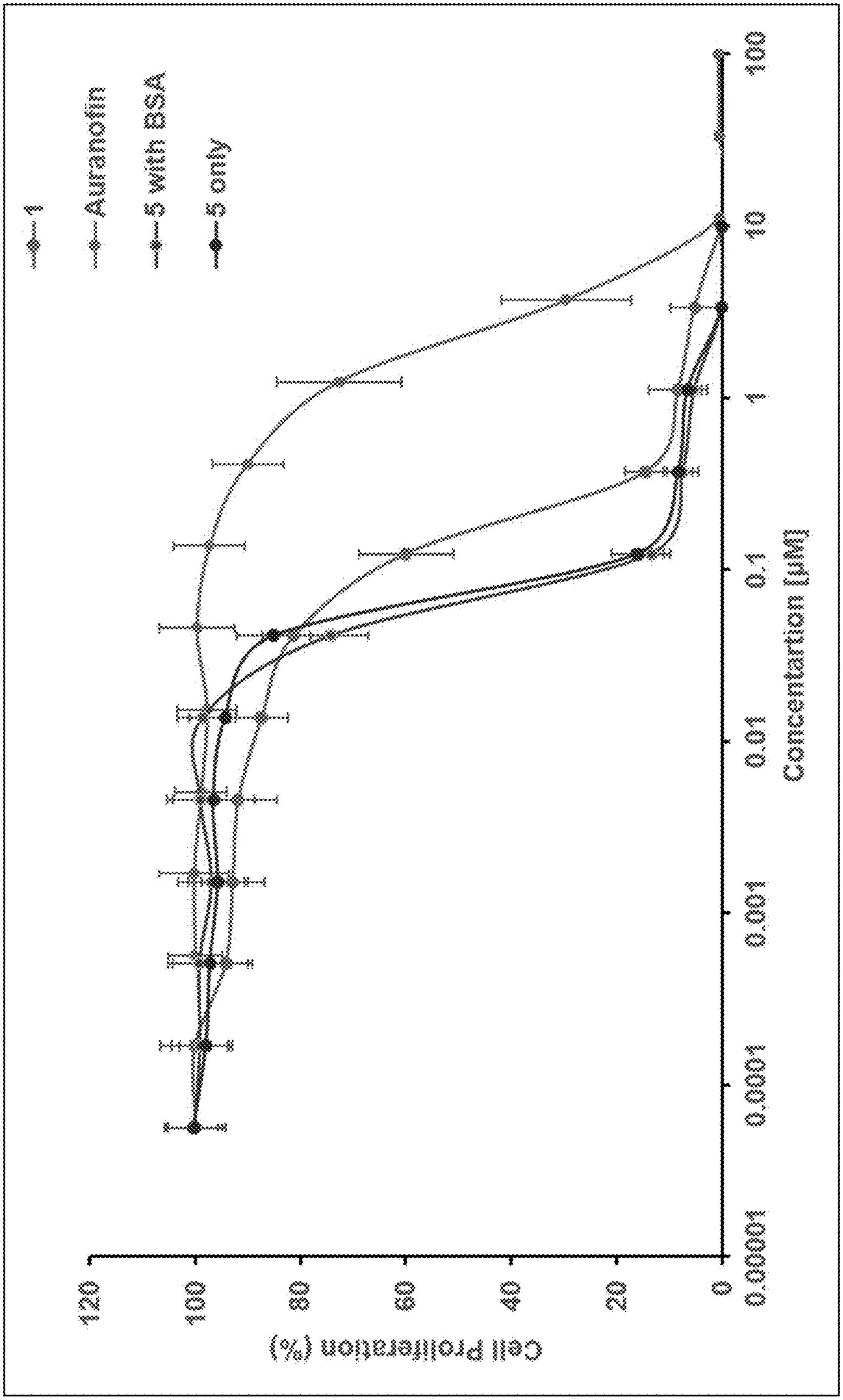
FIG. 10 shows cell proliferation profiles of A549 lung cancer cells treated with complex 1 and complex 5 in the presence and absence of BSA, respectively (72 h drug incubation time). Auranofin was used as a reference drug (maximum DMSO: 0.1%).

According to previous literature reports, BSA binding can reduce the cytotoxicity of Au(I) bis-NHC complexes (Zou et al., 2014). Therefore, an effort was made to test the anti-proliferative activity, of 1, 5, and 5 in the presence of BSA using the A549 human lung cancer cell line. The non-conjugated alcohol 1 and Auranofin were used as benchmark comparisons. Incubation was carried out for 72 h in all cases. The resulting $IC_{50}$ values revealed an enhanced cytotoxicity for 5 compared to 1 with no loss in cytotoxic potency being seen after 5 was treated with BSA for 1 h (Table 5 and FIG. 10).

TABLE 5

Cell proliferative data in A549 lung cancer cell line.

| Compound | $IC_{50}$ (μM) | Std. Error (±) |
|---|---|---|
| Auranofin | 2.2351 | 0.12456 |
| 1 | 0.14941 | 0.01837 |
| 5 | 0.07171 | 0.00457 |
| 5 with BSA | 0.05955 | 0.00275 |

Figure 9:
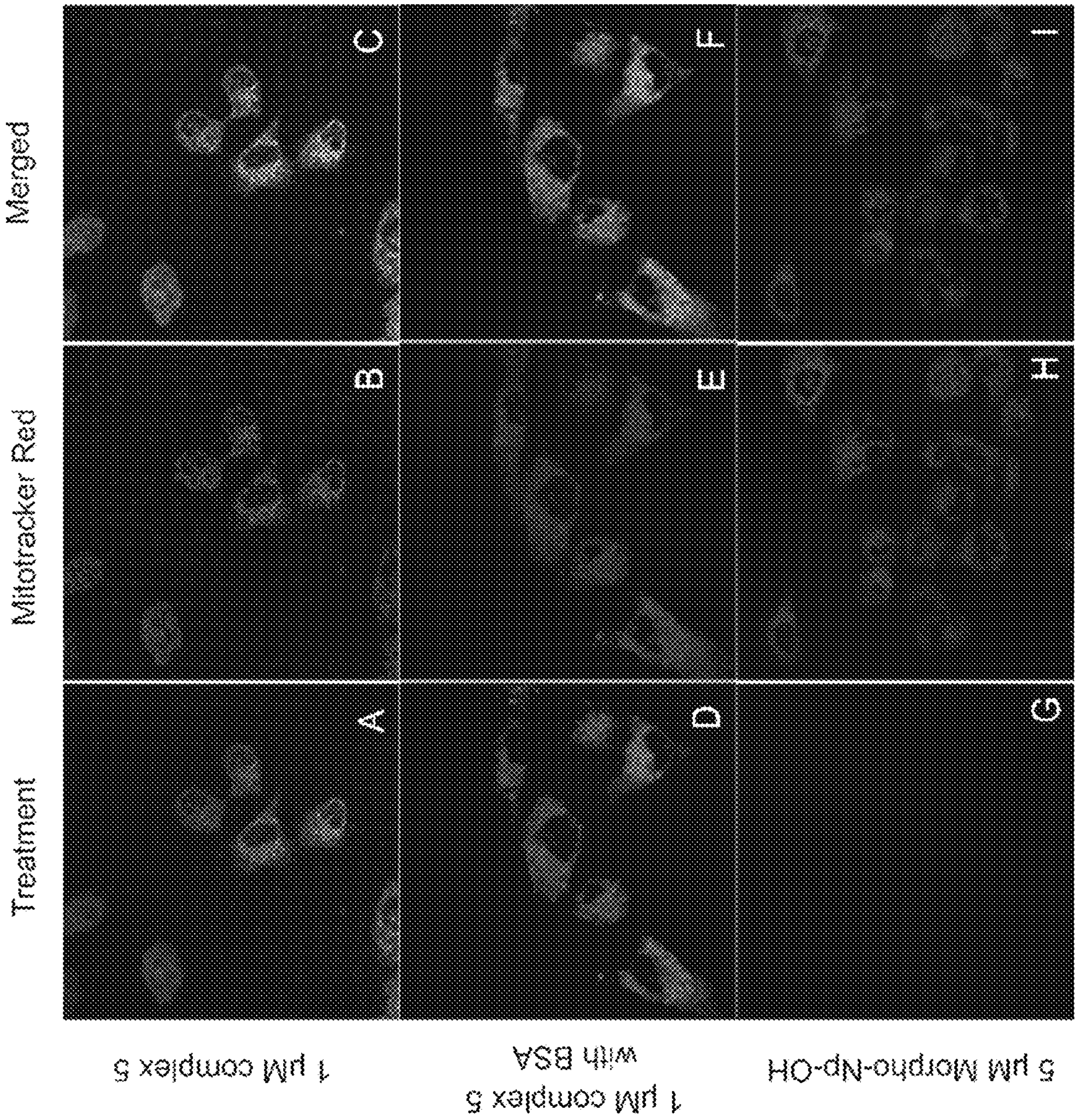
FIG. 9 shows Confocal microscopic images of A549 lung cancer cells after treatment with (A-C) 1 μM 5, (D-F) 1 μM 5, and BSA (G-1) 5 μM Morpho-Np—OH.

As noted above, complex 5 contains a naphthalimide subunit, which was expected to allow its cellular uptake to be followed via confocal microscopy. Moreover, the large stokes shift (~140 nm) seen for 5 could make it attractive for fluorescence imaging (Sedgwick et al., 2018). Most Au(I) bis-NHCs are cationic and, as a result, typically localize in the mitochondria (Hickey et al., 2008; Sen et al., 2019). This general expectation notwithstanding, certain naphthalimide functionalized Au(I) mono carbenes (Groves et al., 2019) and morpholine substituted naphthalimide-based probes (Sedgwick et al., 2018; Wu et al., 2017) have been reported to localize in lysosomes. Which localization effect, if any, would dominate in the case of 5 was thus not clear. In addition, the presence of BSA may affect the cellular localization relative to that seen for 5 alone. Cellular localisation studies were thus carried out using the A549 cell line as shown in FIG. 9. It was found via confocal microscopy that both 5 and 5+BSA localise within the mitochondria, as inferred from inspection of merged images recorded using MitoTracker® Red in the presence of either 5 or 5+BSA. Owing to the high cytotoxicity of 5, A549 lung cancer cells were treated with low concentrations of 5 (1 μM). At these low concentrations, 5 remained soluble during the course of the experiment. Moreover, easy-to-discern images were obtained in the case of both 5 and 5+BSA. In contrast, the control naphthalimide fluorophore (Morpho-Np—OH) produced little in the way of an observable emission signal. This lack of intracellular fluorescence is ascribed to the inability of Morpho-Np—OH to cross the cell membrane. In contrast, 5 and 5+BSA were able to cross the cell membrane.

A. Methods and Materials

All chemical reactions were conducted under a nitrogen atmosphere using Schlenk techniques unless otherwise noted. The glassware was oven dried at 120° C. before use. All materials were obtained from commercial sources at the highest purity available and used without further purification. Chloro (dimethylsufide) gold(I) was purchased from Sigma-Aldrich. Complex [1] [$PF_6$] was synthesized according to a reported procedure (Sen et al., 2019). Morpho-Np—OH was also synthesized according to a previously published protocol (Ishizaki et al., 2010) A modified synthesis for 2 is reported here. Solvents were either dried with a solvent purification system (dichloromethane (DCM), acetonitrile, methanol) or dried over molecular sieves (toluene) (3 Å) and degassed prior to use.

The reported $^1H$ NMR and $^{13}C$ NMR spectra were measured on Varian Inova spectrometers at The University of Texas at Austin using $CD_2Cl_2$ and DMSO-$d_6$ as the deuterated solvents. Chemical shifts are reported relative to the residual solvent proton signals. For the spin multiplicities the following abbreviations were used: s (singlet), d (doublet), t (triplet) and m (multiplet), as well as appropriate combinations of these. Coupling constants for protons (J) are given in Hertz (Hz). The NMR spectra were analyzed using the software MestReNova v. 10.0.2-15465 (Mestrelab Research S.L.). All deuterated solvents were purchased from Cambridge Isotope Laboratories. High-resolution electrospray ionization (ESI) mass spectra were recorded on a VG ZAB2E instrument or VG AutoSpec apparatus. Column chromatography was performed on Sorbent silica gel (40-63 μm). Analytical thin layer chromatography (TLC) analyses were carried on glass-backed silica gel plates (200 μm, Sorbent Technologies). Fluorescence spectroscopic measurements were made using an Agilent Cary Eclipse fluorescence spectrofluorometer. Analytical and semi-preparative RP-HPLC were performed on a Thermo Scientific Dionex Ultimate 3000 instrument equipped with a PDA detector. The analytical column was a Syncronis C18 column, 5 μm, 4.6×250 mm (Thermo Scientific); the mobile phase containing 0.1% acetic acid consisted of an increasing gradient from 10% acetonitrile/water to 99% acetonitrile/ water over 30 min at a flow rate of 1.2 ml/min. BSA was purchased from Sigma-Aldrich and used without further purification. All fluorescence measurements for the titrations against BSA were recorded from 300 to 400 nm with an excitation wavelength of 290 nm. The emission and excitation slit widths were fixed at 5 mm. In these measurements, 20 μM BSA stock solutions were prepared in PBS buffer and diluted down to 5 μM. The approximate concentration of BSA in the resulting stock solutions was determined spectrophotometrically using a molar extinction coefficient of 43,824 $M^{-1}$ $cm^{-1}$ at 279 nm. For the titrations themselves, 5 mM solutions of the complex in question was used as the working solution with 1 μL aliquots being used for each addition into a 3 mL volume of the BSA stock solution.

B. Synthesis and Characterization i. Synthesis of Intermediate 2

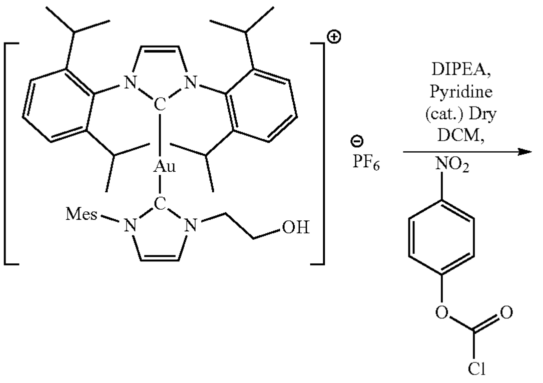

-continued

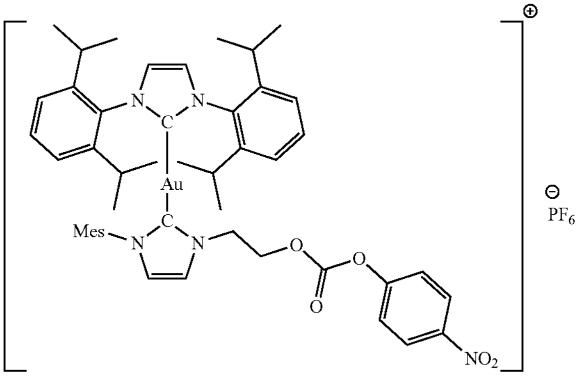

[1][$PF_6$] (300 mg, 0.312 mmol, 1 equiv.) and 4-nitrophenyl chloroformate (377.3 mg, 1.872 mmol, 6 equiv.) were combined in an oven-dried two-neck round bottom and kept under vacuum for 15 min. Dry DCM (7 mL) and dry DIPEA (75 μL, 0.468 mmol, 1.5 equiv.) were added to the mixture. Dry pyridine (30 μL) was then added to the mixture. The resulting solution was stirred for 48 h to achieve the full conversion as indicated by LCMS. The volatiles were evaporated off and diethyl ether was added. A white solid precipitated out after stirring for 15 mins and subjecting to trituration. The solid obtained in this way was collected via filtration and washed several times with diethyl ether. The solid was placed in a 20 mL scintillation vial and 5 mL of nanopore water was added. The reaction mixture was then stirred for 15 min. Finally, the resulting white suspension was collected by filtration, washed with 5 mL water and diethyl ether, and left to dry under air. All characterization results matched with those previously reported (Sen et al., 2019) Yield: 306 mg (87%).

ii. General Synthesis of Carbonates Via Protocol 1

Precursor 2 (1 equiv.) was kept under vacuum for 15 mins in an oven-dried two-neck round bottomed flask. Dry DCM (4 ml) and the aromatic alcohol of interest (3 equiv.) were then added. After stirring the mixture for 10 min, dry TEA (2 equiv.) was added and whole mixture was stirred under an $N_2$ atmosphere for 24 h. After confirming the completion of the reaction by LCMS, the volatiles were evaporated off and diethyl ether was added. The solid precipitate that resulted was collected by filtration. The solid was repeatedly washed with diethyl ether and dried under air.

iii. Synthesis of 4

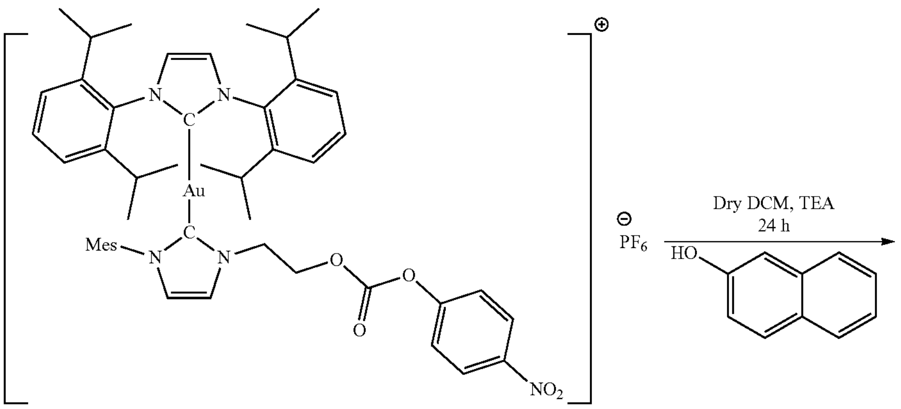

-continued

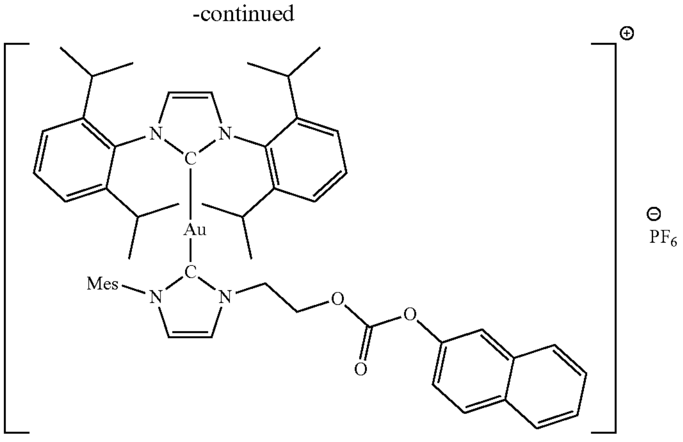

Precursor 2 (40 mg, 0.035 mmol) was used along with β-naphthol (15 mg, 0.105 mmol, 3 equiv.) and dry TEA (10 μL, 0.070 mmol, 2 equiv.) with the reaction run in 5 mL dry DCM. A white microcrystalline powder was obtained as the product. Crystals were grown via slow diffusion using DCM/diethyl ether. Yield: 29 mg (74%). ESI-HRMS (acetonitrile) (m/z): Calculated for $[C_{52}H_{60}N_4O_3Au]^+$: 985.4331. Found: 985.4340. $^1H$ NMR (500 MHz, DMSO-$d_6$) δ 8.07 (s, 2H), 7.99 (t, J=7.9 Hz, 2H), 7.95-7.91 (m, 1H), 7.74 (d, J=1.9 Hz, 1H), 7.65 (d, J=2.5 Hz, 1H), 7.63-7.53 (m, 4H), 7.41 (d, J=1.8 Hz, 1H), 7.34 (d, J=7.8 Hz, 4H), 7.27 (dd, J=8.9, 2.5 Hz, 1H), 6.76 (s, 2H), 4.10 (t, J=5.0 Hz, 2H), 3.97 (t, J=5.0 Hz, 2H), 2.43-2.30 (m, 7H), 1.55 (s, 6H), 1.16 (d, J=6.8 Hz, 12H), 1.09 (d, J=6.9 Hz, 12H). $^{13}C$ NMR (126 MHz, DMSO-$d_6$) δ 186.2, 182.9, 153.1, 148.5, 145.5, 138.9, 134.4, 134.1, 133.9, 133.6, 131.6, 130.9, 130.1, 129.5, 128.2, 128.0, 127.4, 126.6, 125.5, 124.2, 123.7, 121.0, 118.3, 67.0, 49.3, 28.7, 24.2, 24.1, 21.2, 17.1.

iv. Synthesis of 8:

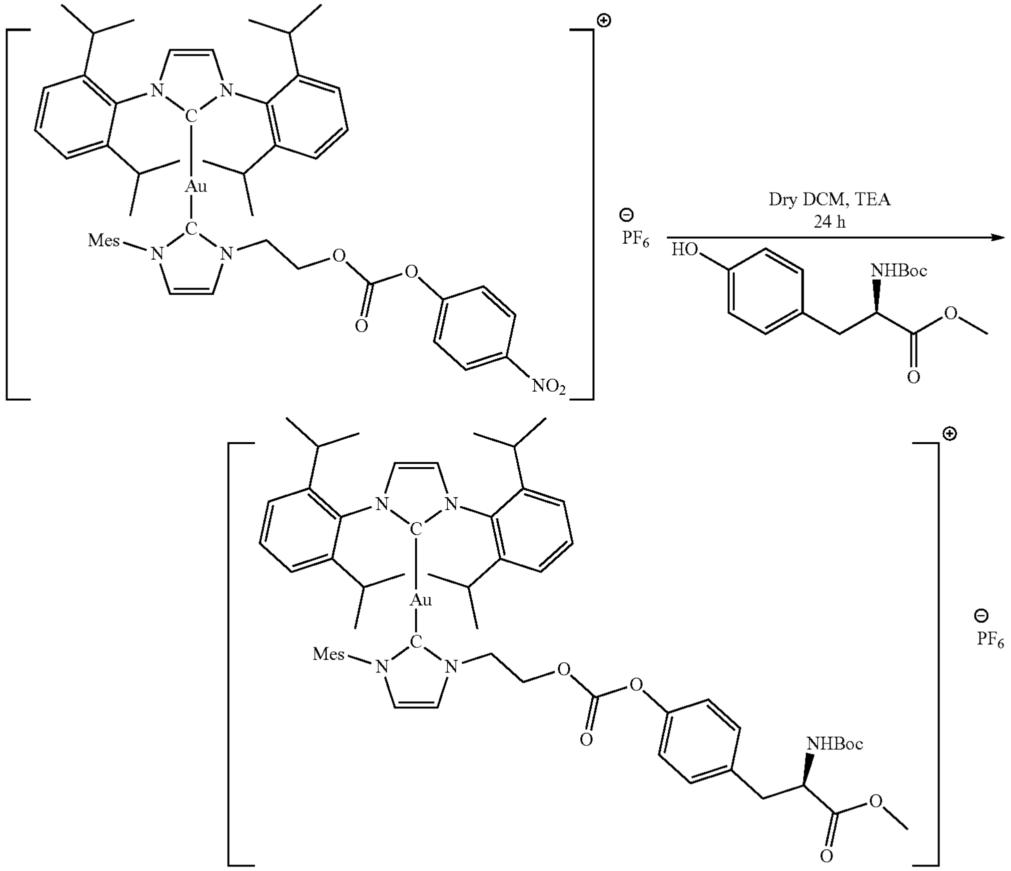

Precursor 2 (40 mg, 0.035 mmol) was used along with methyl(tert-butoxycarbonyl)-L-tyrosinate (31 mg, 0.105 mmol, 3 equiv.) and dry TEA (10 μL, 0.070 mmol, 2 equiv.) with the reaction run in 5 mL dry DCM. The product was obtained as a white microcrystalline powder. Yield: 27 mg (60%). ESI-HRMS (acetonitrile) (m/z): Calculated for $[C_{57}H_{73}N_5O_7Au]^+$: 1136.5176. Found: 1136.5179. $^1$H NMR (500 MHz, DMSO-$d_6$) δ 8.07 (s, 2H), 7.68 (d, J=2.0 Hz, 1H), 7.60 (t, J=7.8 Hz, 2H), 7.37 (d, J=1.8 Hz, 1H), 7.33 (d, J=7.8 Hz, 5H), 7.27 (d, J=8.1 Hz, 2H), 7.01 (d, J=8.2 Hz, 2H), 6.75 (s, 2H), 4.18 (td, J=9.7, 8.5, 5.1 Hz, 1H), 4.05 (t, J=5.1 Hz, 2H), 3.93 (t, J=5.1 Hz, 2H), 3.62 (s, 3H), 3.01 (dd, J=13.9, 5.0 Hz, 1H), 2.85 (dd, J=13.8, 10.3 Hz, 1H), 2.35 (q, J=7.1 Hz, 7H), 1.54 (d, J=2.6 Hz, 6H), 1.32 (s, 9H), 1.16 (d, J=6.9 Hz, 12H), 1.08 (d, J=6.9 Hz, 12H). $^{13}$C NMR (126 MHz, DMSO-$d_6$) δ 186.1, 182.8, 172.9, 155.9, 153.0, 149.6, 145.5, 138.9, 136.2, 134.1, 133.9, 130.9, 130.7, 129.5, 125.5, 124.3, 124.1, 123.6, 121.1, 78.8, 66.8, 55.5, 52.3, 49.2, 46.2, 36.2, 28.7, 28.6, 24.3, 24.1, 21.3, 17.1.

v. General Synthesis of Carbonates Via Protocol 2

Precursor 2 (1 equiv.) and dry DMAP (3 equiv.) were kept under vacuum for 5 mins in an oven-dried two-neck round bottomed flask. Dry DCM (4 mL) and the alcohol of interest (3 equiv.) were then added. The whole mixture was stirred under $N_2$ atmosphere for 24 h. After confirming the completion of the reaction by LCMS, the volatiles were evaporated off. Diethyl ether was then added to the residue. The solid precipitate that resulted was collected by filtration, washed with diethyl ether, and dried under air. Finally, it was purified by means of a small silica gel chromatography column using 5% MeOH/95% DCM collecting the fraction at $R_f$~0.4. (NB: DMAP sticks to the column). The appropriate fractions were collected and concentrated under reduced pressure before hexanes were added to produce a white precipitate. The solid was collected by filtration and washed with hexanes several times to give the final product as a white fluffy powder.

vi. Synthesis of 5

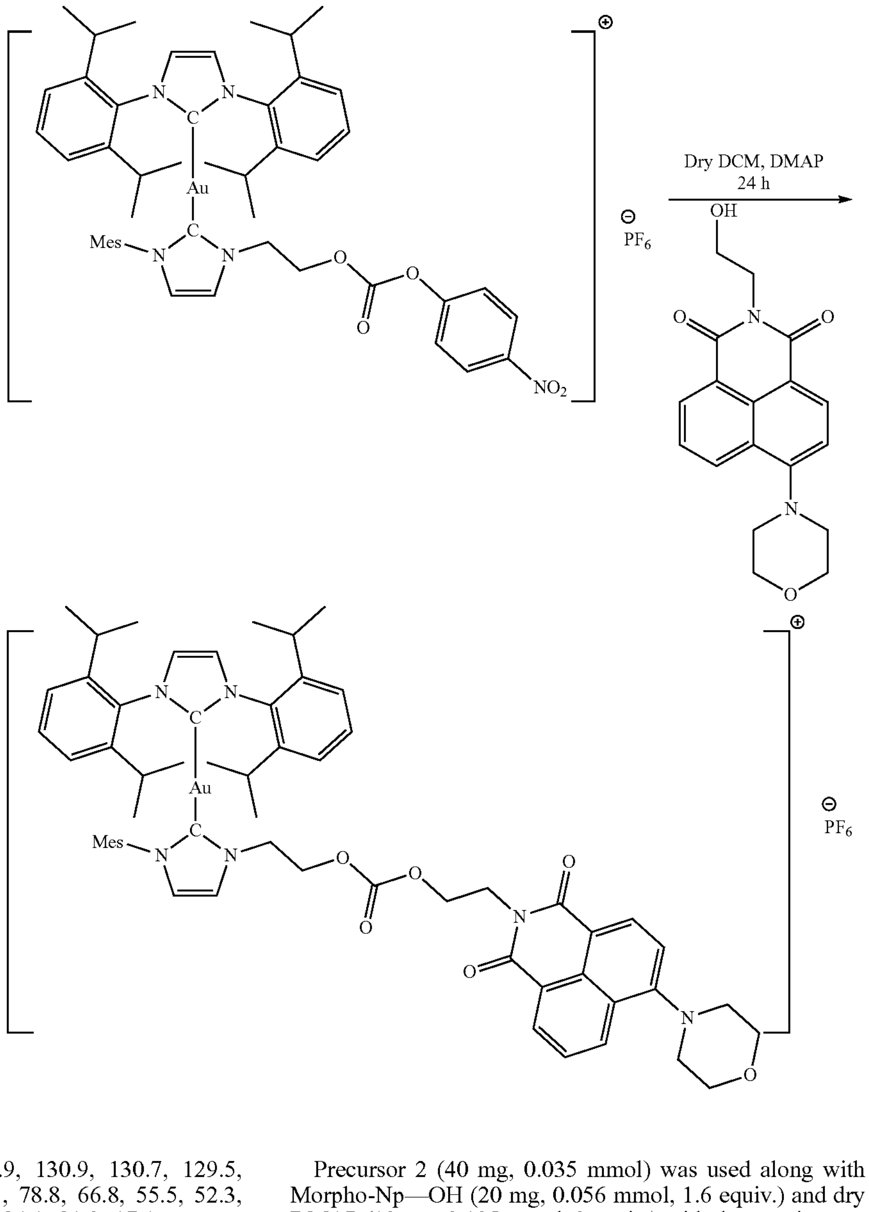

Precursor 2 (40 mg, 0.035 mmol) was used along with Morpho-Np—OH (20 mg, 0.056 mmol, 1.6 equiv.) and dry DMAP (13 mg, 0.105 mmol, 3 equiv.) with the reaction run in 5 mL dry DCM. The product was obtained as a yellow microcrystalline powder. Crystals could be grown from DCM/diethyl ether via slow diffusion. Yield: 19 mg (40%).

ESI-HRMS (acetonitrile) (m/z): Calculated for $[C_{60}H_{70}N_6O_6Au]^+$: 1167.5017. Found: 1167.5015. $^1$H NMR (500 MHz, DMSO-$d_6$) δ 8.53 (t, J=7.1 Hz, 2H), 8.45 (d, J=8.1 Hz, 1H), 8.02 (s, 2H), 7.86 (t, J=7.9 Hz, 1H), 7.59 (d, J=1.9 Hz, 1H), 7.51 (t, J=7.8 Hz, 2H), 7.40 (d, J=8.2 Hz, 1H), 7.26-7.18 (m, 5H), 6.72 (s, 2H), 4.32 (s, 4H), 3.92 (t, J=4.4 Hz, 4H), 3.88 (t, J=5.1 Hz, 2H), 3.80 (t, J=5.2 Hz, 2H), 3.22 (t, J=4.5 Hz, 4H), 2.35 (s, 3H), 2.27 (h, J=7.0 Hz, 4H), 1.48 (s, 6H), 1.08 (d, J=6.9 Hz, 12H), 0.98 (d, J=6.9 Hz, 12H). $^{13}$C NMR (126 MHz, DMSO-$d_6$) δ 186.1, 182.7, 164.2, 163.7, 156.1, 154.4, 145.4, 138.8, 134.3, 134.0, 133.8, 132.9, 131.3, 130.8, 129.8, 129.4, 126.7, 125.8, 125.4, 124.2, 123.8, 123.4, 122.9, 116.2, 115.6, 66.6, 66.1, 65.4, 53.5, 49.2, 38.8, 28.6, 24.1, 24.0, 21:2, 17.0.

vii. Synthesis of 6

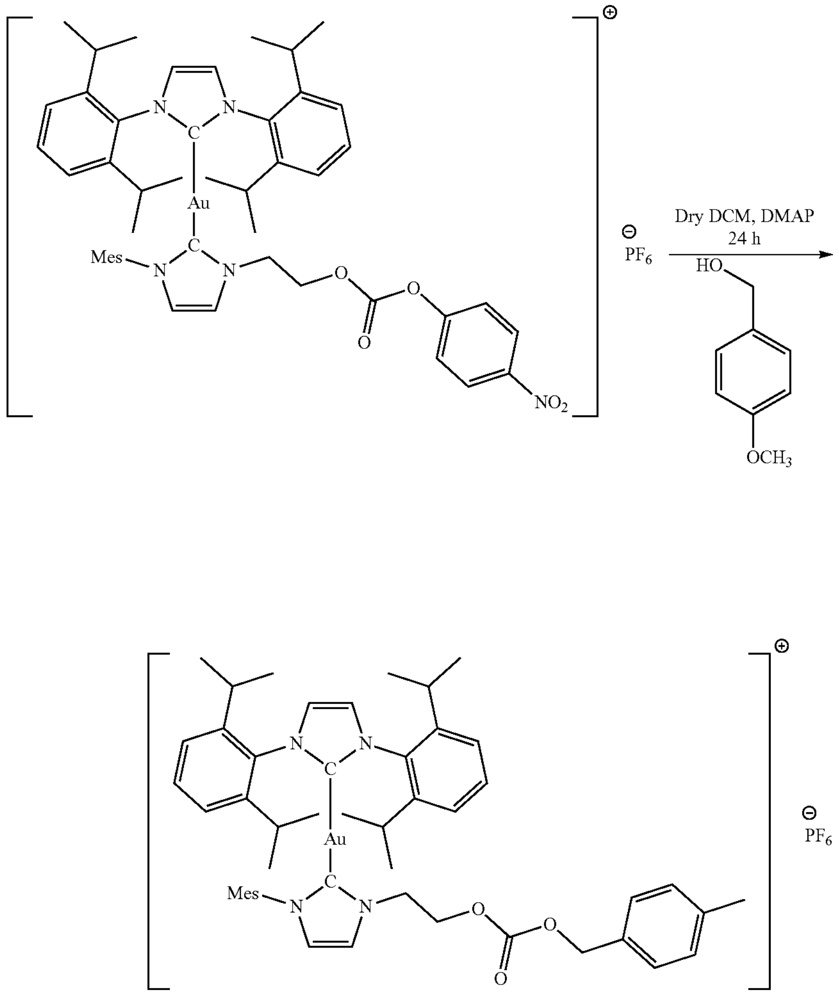

Precursor 2 (40 mg, 0.035 mmol) was used along with p-tolylmethanol (13 mg, 0:105 mmol, 3 equiv.) and dry DMAP (13 mg, 0.105 mmol, 3 equiv.) with the reaction run in 5 mL dry DCM. The product was obtained as a white microcrystalline powder. Crystals could be, grown via slow diffusion using DCM/diethyl ether. Yield: 21 mg (54%). ESI-HRMS (acetonitrile) (m/z): Calculated for $[C_{50}H_{62}N_4O_3Au]^+$: 963.4487. Found: 963.4491. $^1$H NMR (400 MHz, DMSO-$d_6$) δ 8.02 (s, 2H), 7.57 (d, J=1.9 Hz, 1H), 7.52 (t, J=7.8 Hz, 2H), 7.29-7.21 (m, 5H), 7.21-7.14 (m, 4H), 6.72 (s, 2H), 4.97 (s, 2H), 3.90 (t, J=5.2 Hz, 2H), 3.82 (t, J=5.5 Hz, 2H), 2.35-2.24 (m, 10H), 1.50 (s, 6H), 1.11 (d, J=6.8 Hz, 12H), 1.01 (d, J=6.9 Hz, 12H). $^{13}$C NMR (126 MHz, DMSO-$d_6$) δ 186.1, 182.8, 172.9, 155.9, 153.0, 149.6, 145.5, 138.9, 136.2, 134.1, 133.9, 130.9, 130.7, 129.5, 125.5, 124.3, 124.1, 123.6, 121.1, 78.8, 66.8, 55.5, 52.3, 49.2, 46.2, 36.2, 28.7, 28.6, 24.3, 24.1, 21.3, 17.1.

viii. Synthesis of 7

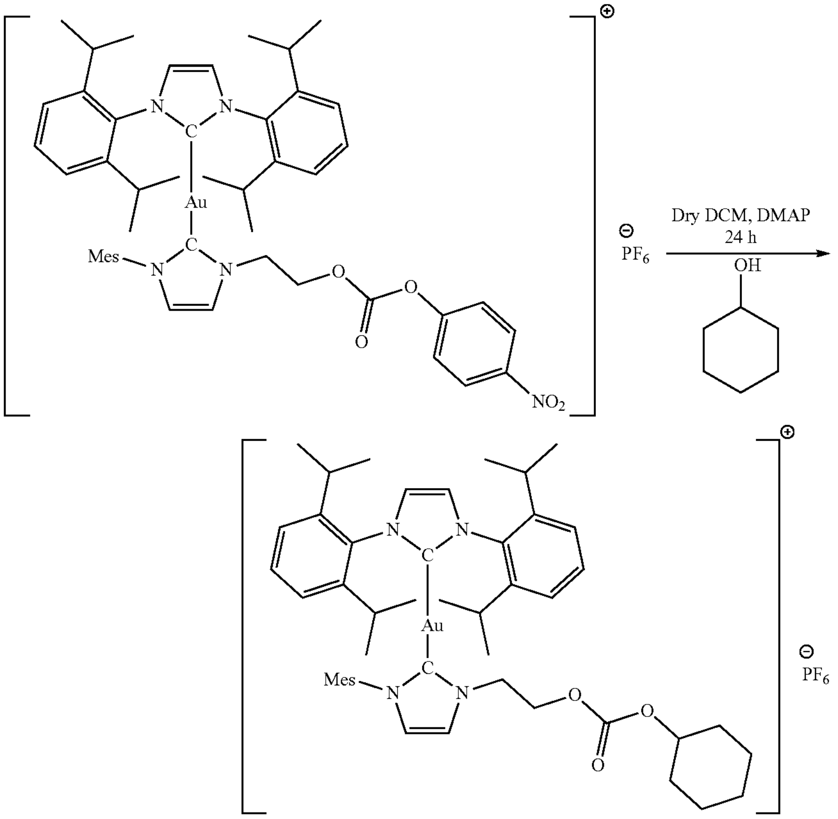

Precursor 2 (40 mg, 0.035 mmol) was used along with cyclohexanol (11 μL, 0.105 mmol, 3 equiv.) and dry DMAP (13 mg, 0.105 mmol, 3 equiv.) in 5 mL dry DCM. The product was obtained as a white microcrystalline powder. Crystals could be grown via slow diffusion using DCM/diethyl ether. However, the resulting crystals proved hard to mount and did not diffract well. Yield: 15 mg (43%). ESI-HRMS (acetonitrile) (m/z): Calculated for $[C_{48}H_{64}N_4O_3Au]^+$: 941.4644. Found: 941. 4649. $^1$H NMR (400 MHz, DMSO-$d_6$) δ 8.03 (s, 2H), 7.59-7.51 (m, 3H), 7.32-7.25 (m, 5H), 6.72 (s, 2H), 4.37 (s, 1H), 3.88 (d, J=5.1 Hz, 2H), 3.80 (d, J=5.3 Hz, 2H), 2.31 (d, J=8.2 Hz, 7H), 1.69 (s, 2H), 1.58 (s, 2H), 1.52 (s, 6H), 1.42 (s, 1H), 1.27 (q, J=9.4 Hz, 5H), 1.12 (d, J=6.8 Hz, 12H), 1.04 (d, J=6.8 Hz, 12H). $^{13}$C NMR (126 MHz, DMSO-$d_6$) δ 186.2, 182.8, 153.9, 145.5, 138.9, 134.4, 134.1, 133.9, 130.9, 129.5, 125.5, 124.3, 123.9, 123.4, 76.6, 65.6, 49.2, 31.3, 28.7, 25.1, 24.3, 24.1, 23.3, 21.3, 17.1.

ix. Synthesis of 9

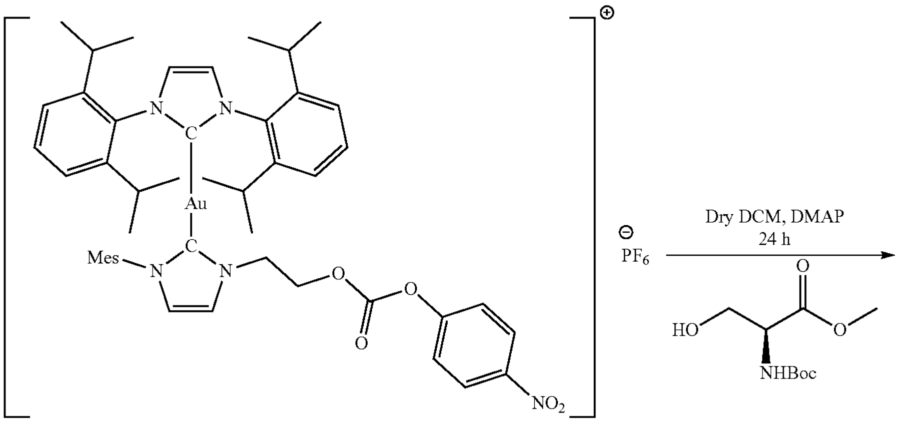

-continued

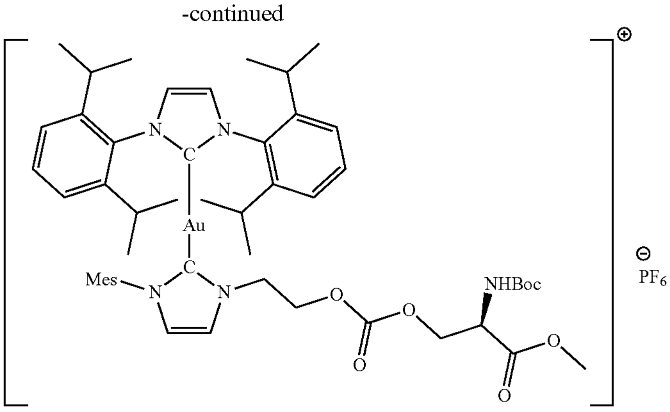

Precursor 2 (40 mg, 0.035 mmol) was used along with methyl(tert-butoxycarbonyl)-L-serinate (Commercially available as 95% pure) (22 μL, 0.105 mmol, 3 equiv.) and dry DMAP (13 mg, 0.105 mmol, 3 equiv.) in 5 mL dry DCM. White microcrystalline powder was obtained as product. Yield: 18 mg (43%). ESI-HRMS (acetonitrile) (m/z): Calculated for $[C_{51}H_{69}N_5O_7Au]^+$: 1060.4857. Found: 1060.4874. $^1H$ NMR (400 MHz, DMSO-$d_6$) δ 8.02 (s, 2H), 7.59-7.51 (m, 3H), 7.35 (d, J=7.6 Hz, 1H), 7.32-7.24 (m, 5H), 6.72 (s, 2H), 4.25 (d, J=9.2 Hz, 2H), 4.11 (d, J=10.0 Hz, 1H), 3.96-3.76 (m, 4H), 3.61 (s, 3H), 2.31 (q, J=6.9, 5.6 Hz, 7H), 1.52 (s, 6H), 1.34 (s, 9H), 1.12 (d, J=6.9 Hz, 12H), 1.04 (d, J=6.8 Hz, 12H). $^{13}C$ NMR (126 MHz, DMSO-$d_6$) § 186.1, 182.7, 170.3, 155.8, 154.1, 145.5, 138.9, 134.3, 133.9, 130.9, 129.5, 125.5, 124.3, 123.9, 123.6, 79.1, 66.7, 66.4, 52.9, 52.7, 49.1, 31.4, 28.7, 28.6, 24.3, 24.1, 22.5, 21.3, 17.1, 14.4.

x. Synthesis of 10

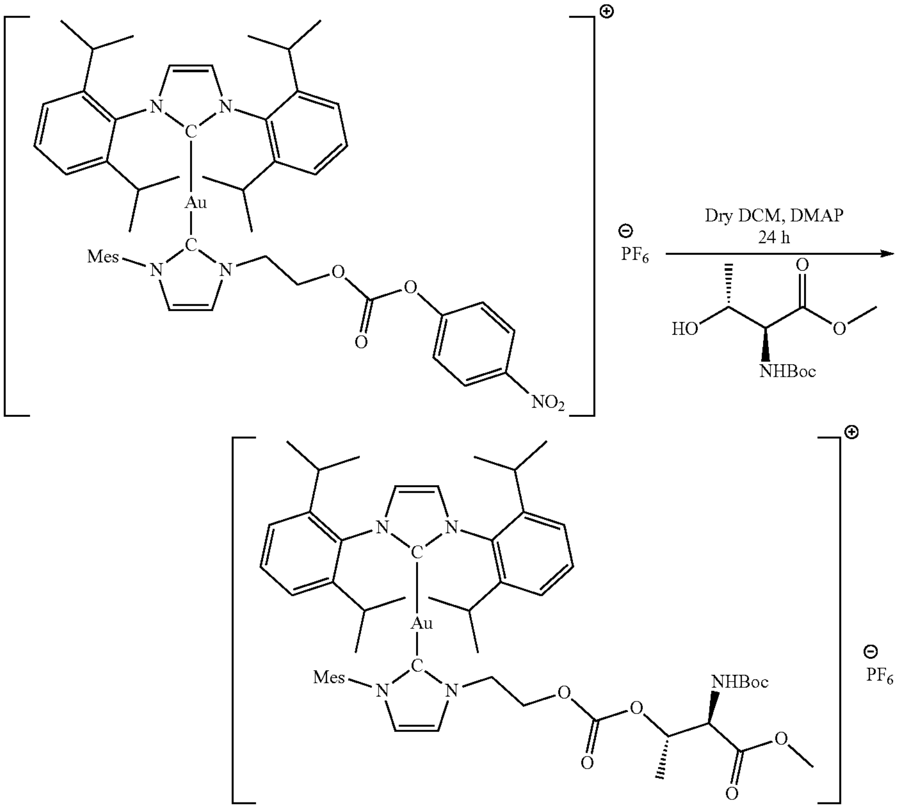

Precursor 4 (40 mg, 0.035 mmol) was used along with methyl(tert-butoxycarbonyl)-L-threoninate (Commercially available in 95% purity) (22 μL., 0.105 mmol, 3 equiv.) and dry DMAP (13 mg, 0.105 mmol, 3 equiv.) with the reaction run in 5 mL dry DCM. The product was obtained as a white microcrystalline powder. Yield: 14 mg (33%). ESI-HRMS (acetonitrile) (m/z): Calculated for $[C_{52}H_{71}N_5O_7Au]^+$: 1074.5014. Found: 1074.5013. $^1H$ NMR (500 MHz, DMSO-$d_6$) δ 8.06 (d, J=10.4 Hz, 2H), 7.60 (t, J=7.8 Hz, 2H), 7.56 (d, J=1.9 Hz, 1H), 7.33 (d, J=8.0 Hz, 5H), 7.15 (d, J=8.6 Hz, 1H), 6.76 (s, 2H), 4.91 (q, J=5.4 Hz, 1H), 4.30 (dd, J=8.7, 4.3 Hz, 1H), 4.04-3.72 (m, 4H), 3.63 (s, 3H), 2.36 (q, J=6.4, 5.7 Hz, 7H), 1.62-1.51 (m, 6H), 1.40 (s, 9H), 1.17 (d, J=6.6 Hz, 15H), 1.08 (dt, J=6.4, 3.1 Hz, 12H). $^{13}$C NMR (126 MHz, DMSO-$d_6$) δ 186.1, 182.7, 170.5, 156.0, 153.5, 145.5, 138.9, 134.1, 133.9, 130.9, 129.5, 125.5, 124.3, 123.9, 123.6, 79.2, 74.2, 66.3, 57.2, 52.7, 49.2, 34.7, 31.4, 28.7, 28.6, 24.3, 24.1, 22.5, 21.3, 17.1, 16.7, 14.4.

TABLE 6

Types of alcohols attached via present methodology.

| Types of alcohol | Example | Protocol | Yield[a](%) |
|---|---|---|---|
| Aromatic | 4 | 1 | 74 |
| Primary | 5 | 2 | 40 |
| Benzylic | 6 | 2 | 54 |
| Secondary | 7 | 2 | 43 |
| Modified tyrosine | 8 | 1 | 60 |
| Modified serine | 9 | 2 | 43 |
| Modified threonine | 10 | 2 | 33 |

([a]Yields were calculated based on isolated product).

C. Biological Experimentations i. Cell Proliferation Studies

A549 cells were harvested and seeded into 96-well culture plates (Costar 07-200-90) in 100 μL of culture medium. The cells were allowed to incubate overnight at 37° C. in the presence of 5% $CO_2$. A549 cells were seeded at a density of 1500 cells/well. The next day, appropriate serial dilutions of drug stocks in culture media were made. To each well of a 96 well plate was added 100 μL of the appropriate solution. After a total of three days, a 50 mL aliquot of 3 mg/mL tetrazolium dye, 3-(4,5-dimethylthiazol-2-yl)-2,5-diphenyltetrazolium bromide (Alfa Aesar L11939), dissolved in culture medium without fetal bovine serum (FBS), was added to each well, followed by a 4 h incubation period at 37° C. After removal of the medium, the resulting formazan was dissolved in 50 mL DMSO and the respective absorbances were measured at 560-650 nm using a microplate reader (Molecular Devices, Sunnyvale, CA). Absorbance values were corrected for background and then normalized to wells containing untreated cells to allow for plate-to-plate comparisons. The resulting dose response curves were subjected to linear regression analysis (Origin by OriginLab, Inc.) for determination of $IC_{50}$ values. The data are shown as mean inhibition of proliferation or growth as a percentage of control cells and are from 3 replicate experiments. Maximum concentration of DMSO used is 0.1%. This concentration of DMSO was determined to be non-toxic in separate control experiments. To evaluate the cytotoxicity of BSA-treated 5, 100 μM of complex 5 was incubated with 40 mg/mL (600 μM) BSA at 37° C. for 1 h (final DMSO conc. 2%). The stock solution was further diluted 10-fold in RPMI media such that the maximum drug concentration used was 10 μM for the dose dependent MTT assay.

ii. Confocal Fluorescence Microscopy

Tumor cells were harvested and seeded at a density of $2\times10^5$ cells/dish in 35 mm dishes containing a poly-D lysine coated 10 mm glass diameter (Mat Tek P35GC-1.5-10-C) overnight. Cells were then incubated with respective doses of different complexes at 37° C. for 4 h. Post incubation, the media was removed and cells were washed (2×) with PBS. To the cells was added a PBS solution containing 50 nM Mitotracker® Red FM (Lifetech M22425) for 30 min at 37° C. After incubation, the dye PBS solution was removed and the cells were washed with PBS (2×). The cells were then imaged fluorescently on a Zeiss LSM 710 laser scanning confocal microscope using a Plan-Apo 63x/1.4 oil objective. The green channel was excited with a 405 nm laser, and the emission was detected spectrally from 482-555 nm. The red channel was excited with a 561 nm laser, and the emission was detected spectrally from 573-639 nm. For the BSA pretreated studies, a 100 μM solution of complex 5 was incubated with 40 mg/ml (600 μM) BSA at 37° C. for 1 h (final DMSO conc. 2%). The stock solution was further diluted 100-fold in RPMI media giving 5 at a final concentration of 1 μM.

Example 4—Carbamate Functionalized Gold Carbene Compounds

The preparation of heteroleptic bis-NHC gold(I) complex [1][Br] is shown in Scheme 1b. Its synthesis utilized "golden synthon" methodology originally developed by Nolan et al. that involves combining a NHC—Au—OH and an imidazolium bromide in the presence of toluene (Gaillard et al., 2010; Prühs et al., 2004). The isolation of [1][Br] as a bromide salt was facilitated by water washings, a procedure that allowed it to be obtained in an overall yield of 70%. [1][Br] is an example of a hydroxyl functionalized heteroleptic bis-NHC gold(I) system that is positioned for further post-synthetic modification.

Scheme 1.

a)

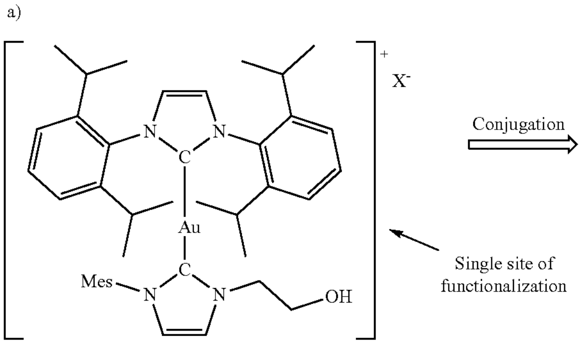

1

Heteroleptic Au(I)
bis-NHC
X = Br or $PF_6$

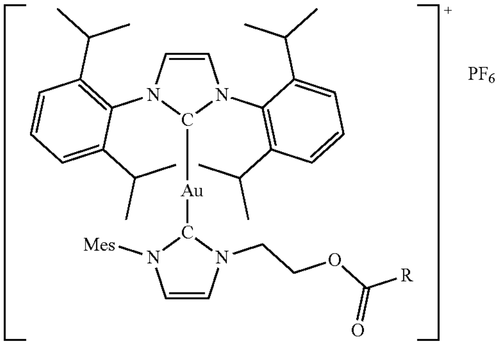

Conjugates containing a carbamate linker

-continued b)

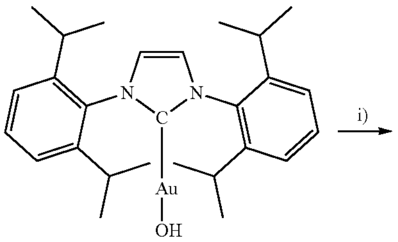

2

+

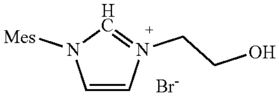

3

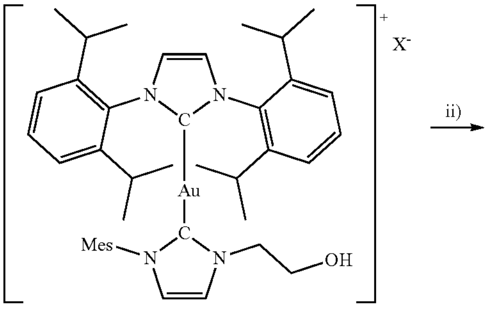

1

X = Br or $PF_6$

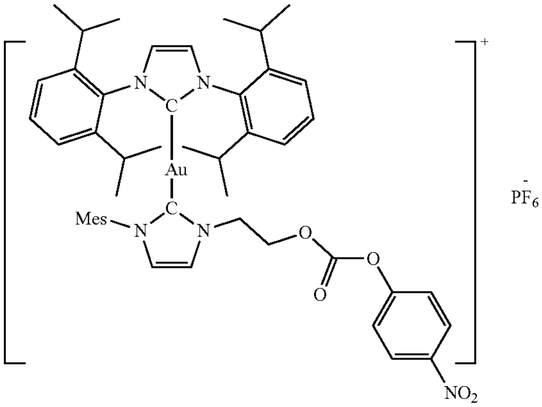

4

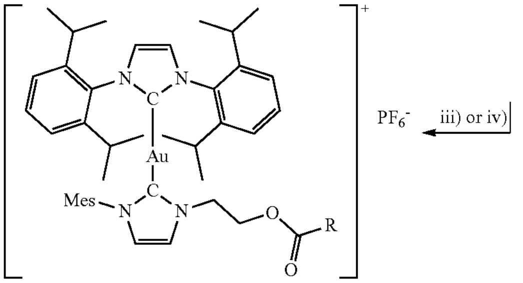

5-12

(i) Toluene, 90° C., 1 d, then $NaPF_6$ (6 equiv.), 8 h
ii) 4-nitrophenylchloroformate (8 equiv.), DCM TEA (4 equiv.), 2 d
iii) (protocal 1) Amines (3 equiv.), DCM, TEA (3 equiv.), 12-36 h.
iv) (protocol 2) HOBt (1.5 equiv.), DMF, aromatic amines (3 equiv.).

In an effort to improve the yields for the subsequent functionalization of the hydroxyethyl group present in 1, (Diehl et al., 2017) anion exchange was carried out by using sodium hexafluorophosphate to generate [1][$PF_6$] in near quantitative yield. ESI-negative mass spectrometry provided support for the expected anion exchange. Complex [1][$PF_6$] was then reacted with p-nitrophenylchloroformate to give the corresponding carbonate ester intermediate 4.

Single crystals suitable for X-ray diffraction analysis were grown for both [1][$PF_6$] and 4 via slow diffusion of diethyl ether into a dichloromethane solution of the respective complex. The molecular structures for [1][$PF_6$] and 4 is presented in FIG. 13. Both complexes are characterized by overall linear geometries as reflected in $C_{NHC}$—Au—$C_{NHC}$ bond angles of ~177°. The Au—$C_{NHC}$ bond lengths in [1][$PF_6$] and 4 are in the ~2.00 Å range, values that are in accord with those noted in the literature. (McCall et al., 2017; Arambula et al., 2016)

Figure 13:
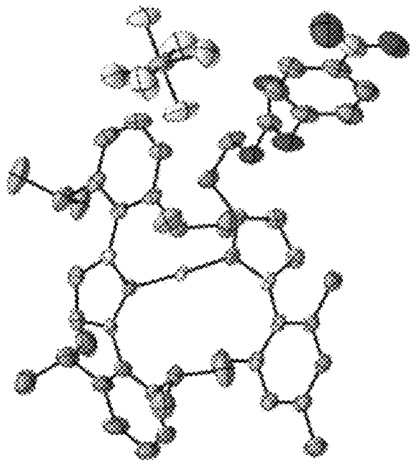
FIG. 13 shows the ORTEP representation of 1, 4, 10, and 11 rendered using POV-Ray. Thermal ellipsoids are at the 50% probability level.
Figure 13:
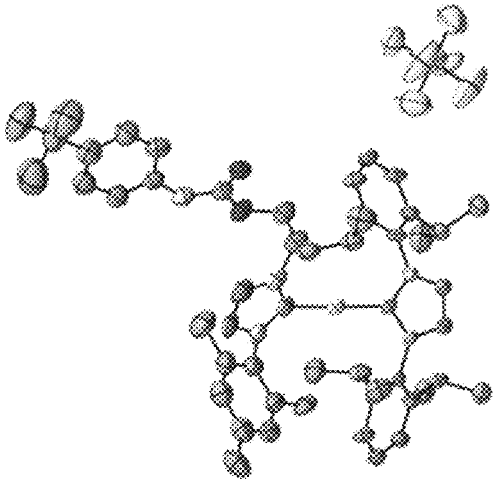
Figure 13:
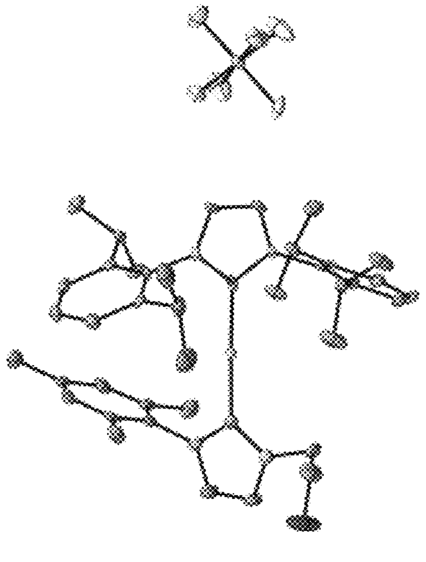
Figure 13:
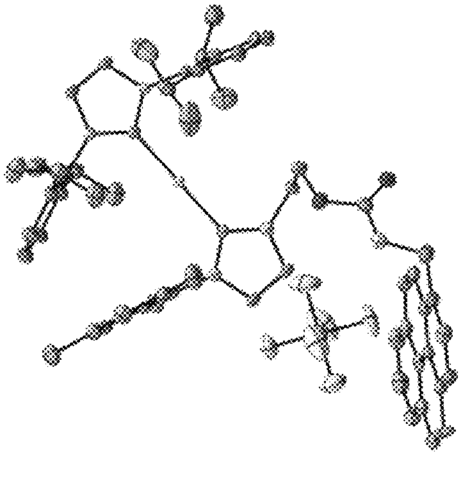

Functionalization of complex 4 was then affected by combining it with a series of amine-containing precursors (Scheme 1). A summary of the functionalized bis-NHC gold(I) complexes produced in this way and the conditions used for their preparation is provided in Table 7 and shown below, respectively. All carbamates were characterized using $^1H$ and $^{13}C$ NMR spectroscopy, as well as high res ESI-MS. In all these Au(I) bis-NHC complexes, the $C_{NHC}$—Au—$C_{NHC}$ subunits exhibit different chemical shifts in $^{13}C$ NMR, owing to their asymmetric nature. In the presence of 2-3 equivalents of amine, dichloromethane and triethylamine (i.e., Protocol 1), complete conversion to the corresponding conjugate was observed by HPLC and LCMS when the amine was i) activated (5), ii) primary in its basic form (6), iii) primary in the form of the corresponding hydrochloride salt (7), iv) secondary (8), and v) benzylic (9, 10). Purification of conjugates 7 was affected by HPLC chromatography, whereas purification of 10 was performed using column chromatography over silica gel using 20:1 $CH_2Cl_2$/methanol (v/v) as the eluent. Such column purifications are rare in the context of Au(I) carbene chemistry and are taken as support for the notion that the species generated from 4 via carbamate conjugation are chemically robust. Single crystals of complexes 5, 8, 9 and 10 suitable for X-ray diffraction analysis were obtained via slow diffusion of diethyl ether into the respective solutions in $CH_2Cl_2$. Representative structures are shown in FIG. 13.

TABLE 7

Types of amines attached via the present methodology

| Type of amine | Example | Protocol | Yield* |
| --- | --- | --- | --- |
| Activated primary | 5 | 1 | 79% |
| Normal primary | 6 | 1 | 53% |
| Primary ammonium salt (an FDA approved drug Doxorubicin) | 7 | 1 | 15% |
| Secondary | 8 | 1 | 61% |
| Benzylic | 9 | 1 | 40% |
| Benzylic ammonium salt | 10 | 1 | 40% |
| Aromatic primary | 11 | 2 | 77% |
| Aromatic secondary | 12 | 2 | 36% |

*Yields were calculated based on isolated product

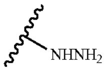

5

TABLE 7-continued

| Types of amines attached via the present methodology | | | |
|---|---|---|---|
| Type of amine | Example | Protocol | Yield* |
| 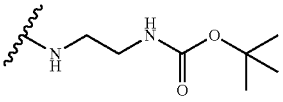 6 | | | |
| 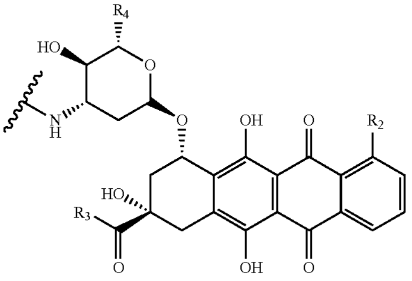 7 | | | |
| 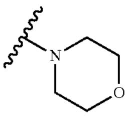 8 | | | |
| 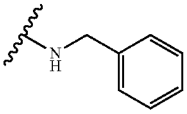 9 | | | |
| 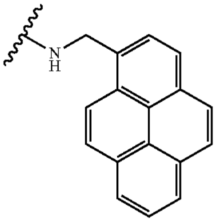 10 | | | |
| 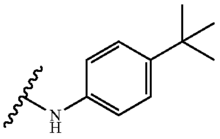 11 | | | |
| 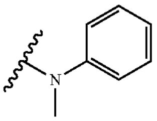 12 | | | |

Protocol 1 proved ineffective for preparing carbamate conjugates of aromatic amines. Aromatic amines are present in many pharmaceuticals, such as the anti-leprosy drug dapsone and some antimalarials (e.g. primaquine). However, they are relatively weak nucleophiles and often require activation for coupling reactions. Hence, the coupling conditions was modified to include hydroxybenzotriazole (HOBt) as the activating agent and DMF as a solvent (Protocol 2). With this new protocol, complexes 11 and 12 were successfully synthesized and fully characterized (cf. Table 7). Single crystals of 11 suitable for X-ray diffraction analysis were obtained, and the resulting structure is presented in FIG. 13.

To create a set of complexes that might allow SAR insights to be obtained, various amine classes were used to prepare derivatives of 4. Specific amine motifs were chosen due to their prevalence in therapeutics or because they are recognised as having biological utility. For example, the morpholine motif present in complex 8 was chosen because it is a known pharmacophore that appears in a number of cancer therapeutics (Arshad et al., 2019). Likewise, complex 7 contains doxorubicin, an approved anticancer agent (Tacar et al., 2013).

Figure 14:
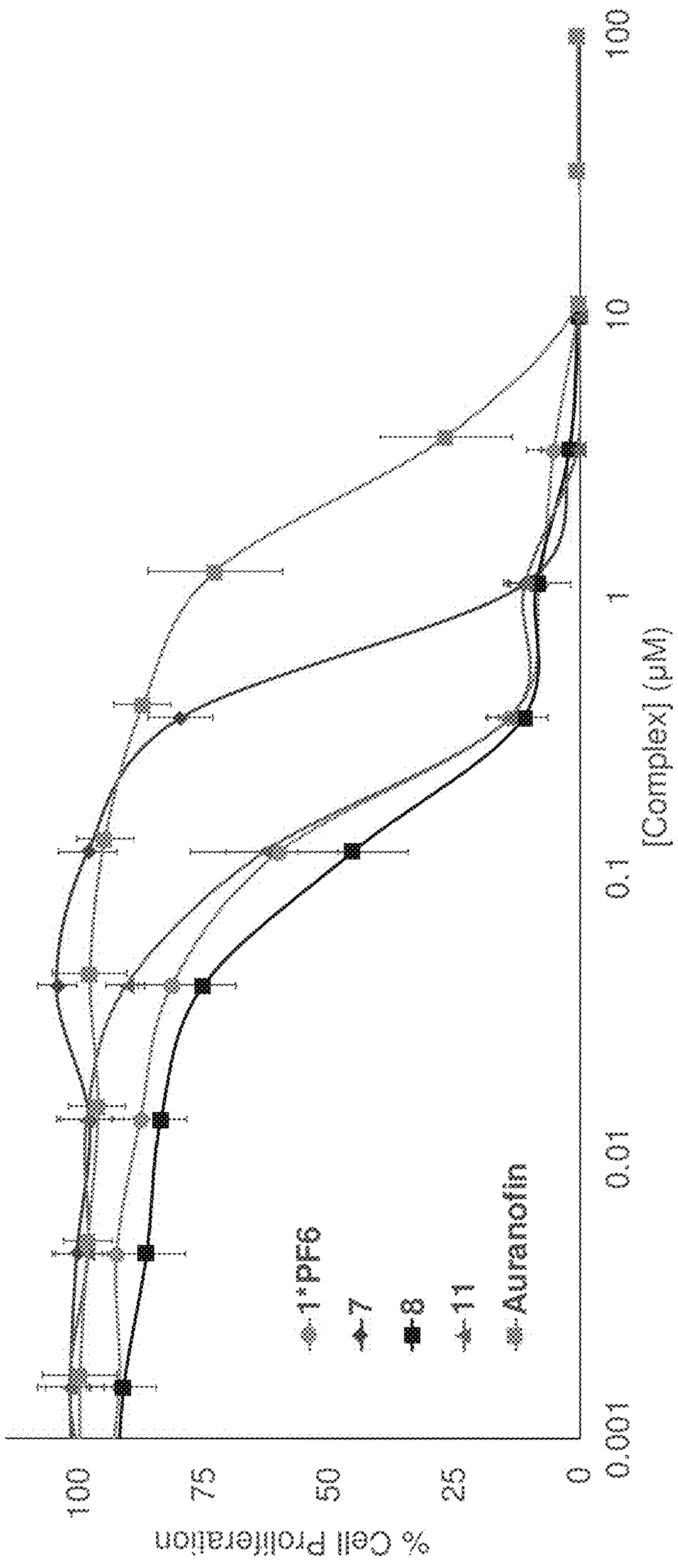
FIG. 14 shows the cell proliferation profiles of A549 lung cancer cells (ATCC) treated with representative conjugates of the present study as judged by MTT assay after 72 h of incubation. $IC_{50}$ values derived from these studies are given in Table 9.

Once in hand, complexes 5, 7-8, and 10-11 were screened for antiproliferative and mechanistic activity. Previously, it have shown that Au(I) complexes, including various Au(I) NHC complexes, inhibit thioredoxin reductase (TrxR), an enzyme that is overexpressed in multiple cancers and thought to be a potential biological target for cancer treatment (McCall et al., 2017; Arambula et al., 2016; Porchia et al., 2018; Mora et al., 2019, Hickey et al., 2008; Zhang et al., 2017; Lu et al., 2007). Therefore, the A549 human lung cancer cell line, known to overexpress TrxR, was chosen for study (Cell et al., 2001). Auranofin, was used as a validated positive control in these tests of anticancer activity due to its recognized ability to inhibit TrxR (Zhang et al., 2019; Marzano et al., 2007). The aforementioned complexes were screened for their ability to inhibit cancer cell growth using an MTT assay. It was found that all of conjugates produced in the context of the present study displayed high anticancer potency in the A549 cell line, providing inhibition constants ($IC_{50}$) varying from 0.11 μM (conjugate 8) to 0.56 μM (conjugate 7) (see Table 8). See FIG. 14.

TABLE 8

| Combined listing of $IC_{50}$ values of different conjugates[a] | | |
|---|---|---|
| Compounds | $IC_{50}$ (μM) | Standard deviation (±) |
| Auranofin | 2.18114 | 0.14796 |
| 1•$PF_6$ | 0.14813 | 0.01836 |
| 5 | 0.39418 | 0.02907 |
| 7 | 0.56166 | 0.02204 |
| Doxorubicin•HCl | 0.1311 | 0.03655 |
| 8 | 0.10905 | 0.01428 |
| 10 | 0.213 | 0.01206 |
| 11 | 0.15341 | 0.01086 |

[a]Values of different conjugates after 72 h treatment of A549 lung cancer cell line (maximum concentration of DMSO: 0.1%). This concentration of DMSO was determined to be non-toxic in separate control experiments.

Figure 15:
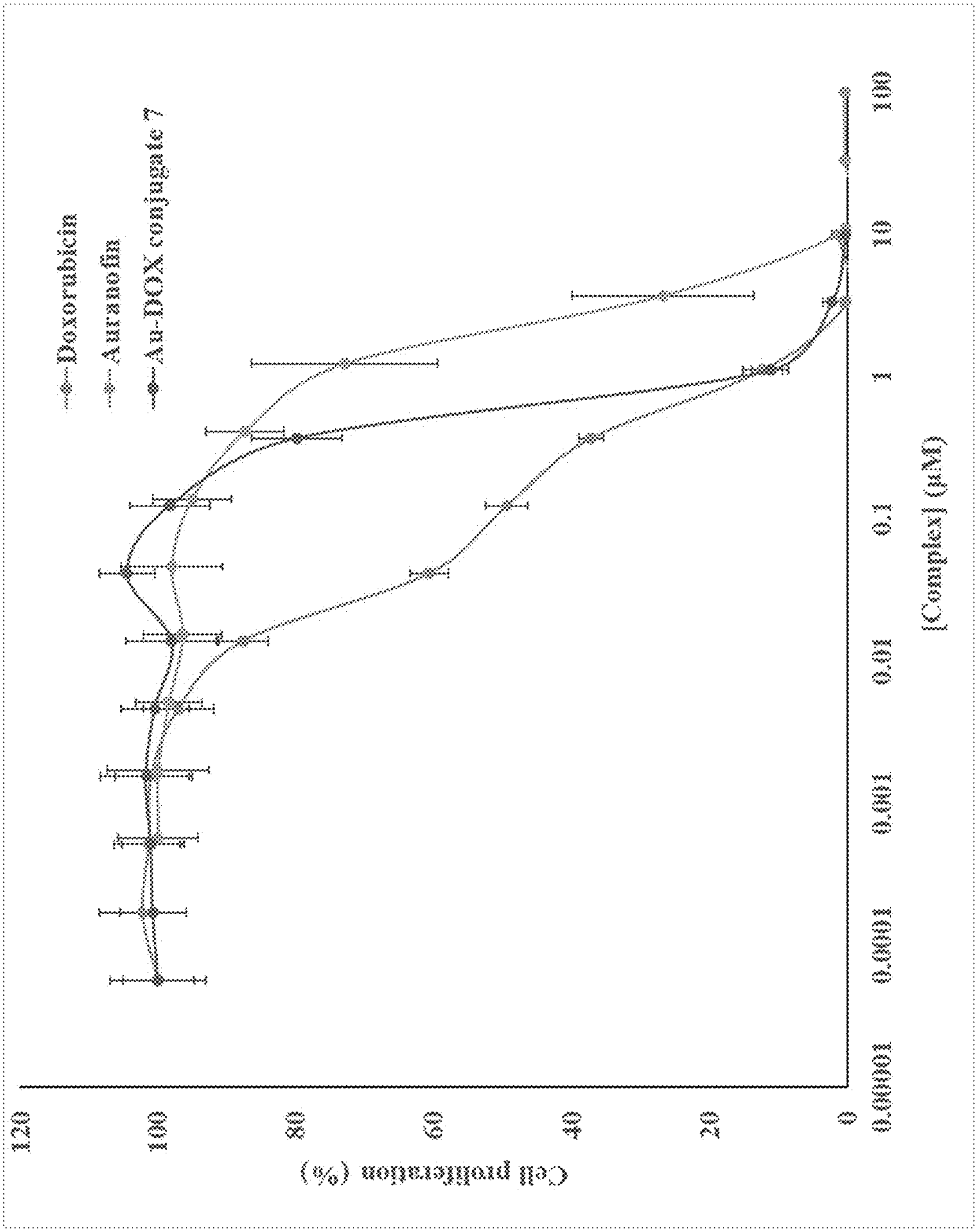
FIG. 15 shows the cell proliferation profiles of A549 lung cancer cells treated with 7 and doxorubicin (72 h drug incubation time). Auranofin has been used as a reference drug. (Maximum DMSO: 0.1%.)
Figure 16:
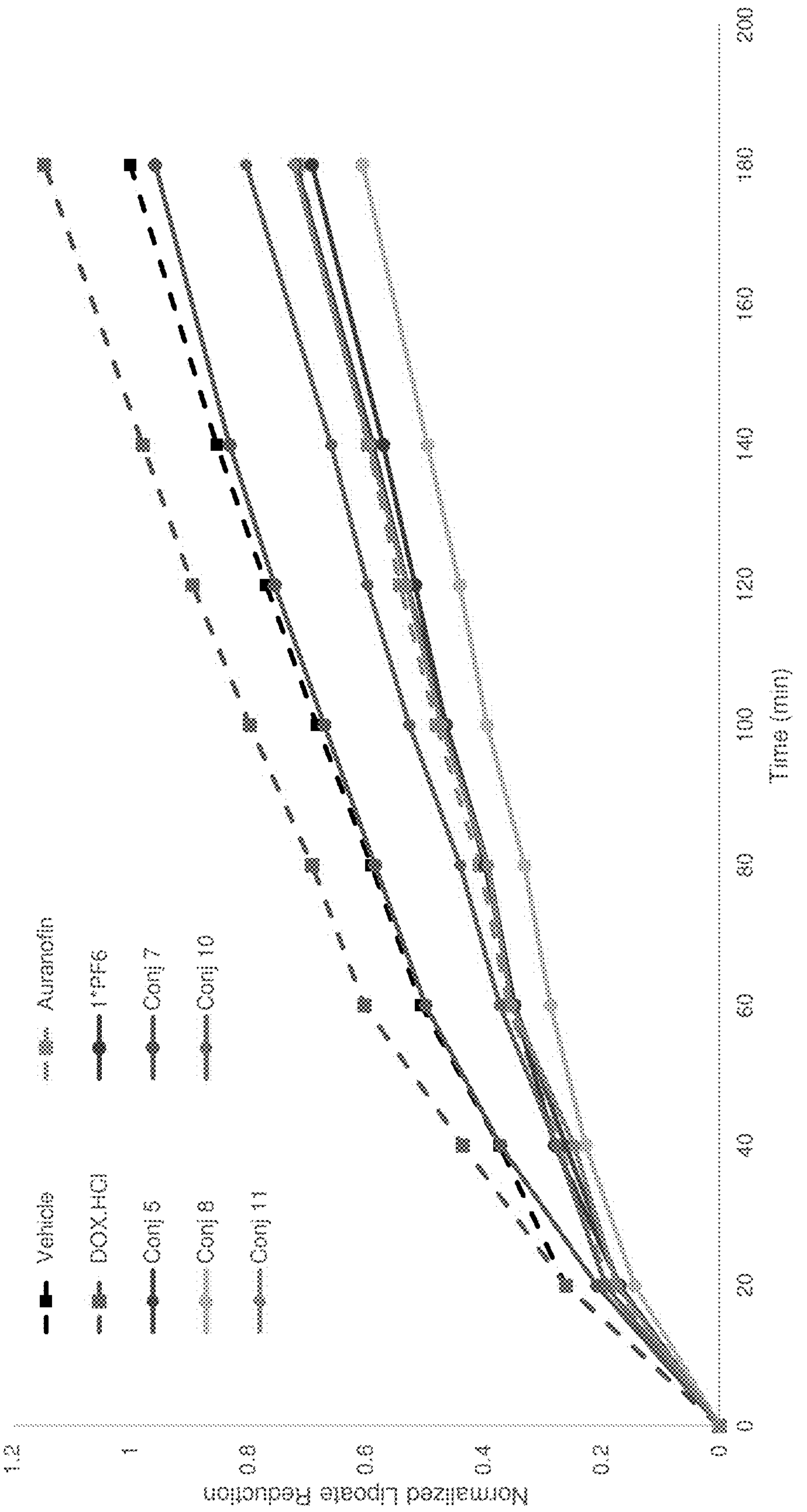
FIG. 16 shows the lipoate reduction assay as a method to assess thioredoxin reductase activity. This time dependent live cell imaging assay was conducted with 1.25 μM of respective complex in A549 lung cancer cells.
Figure 17:
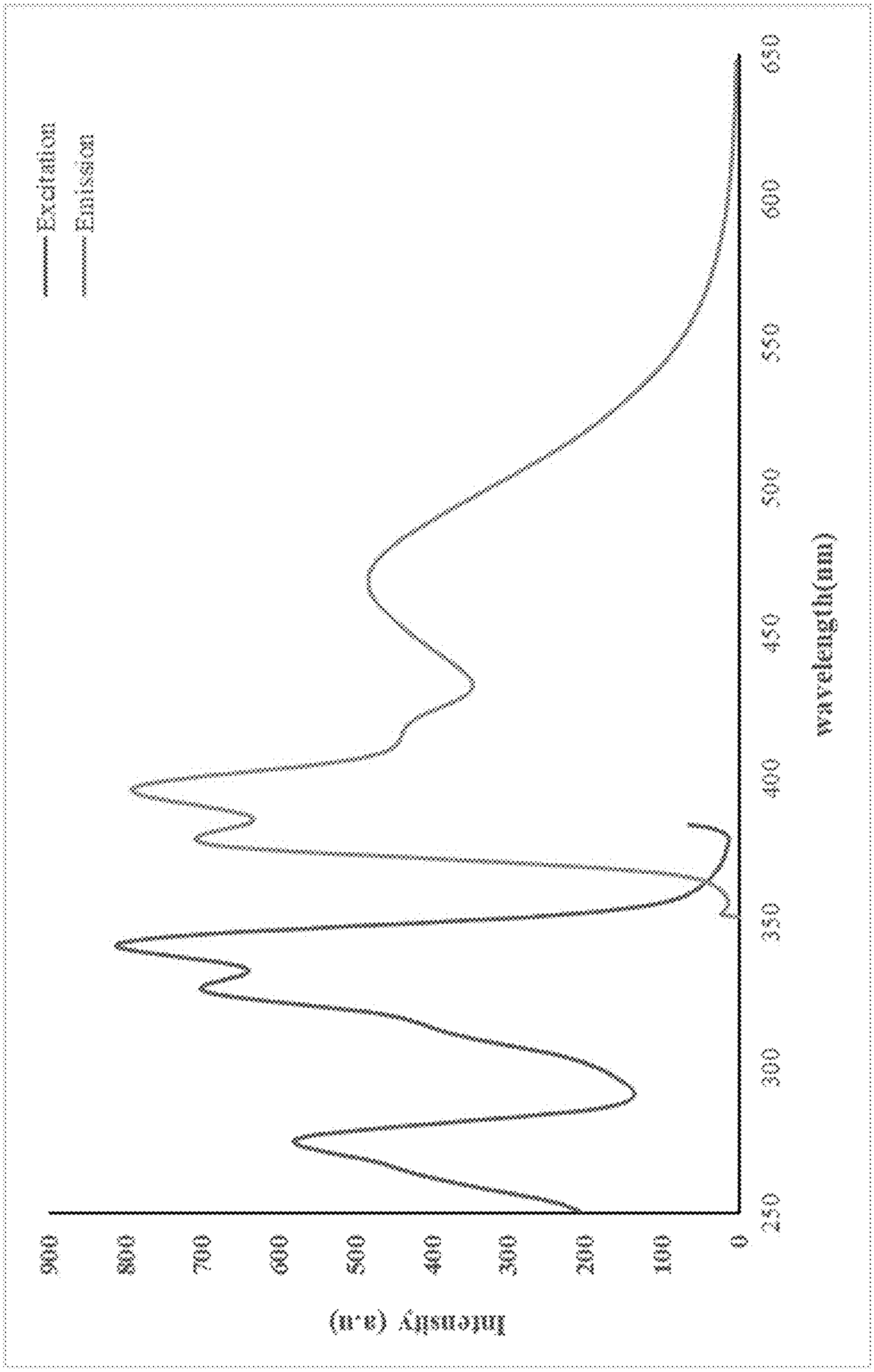
FIG. 17 shows the excitation and emission spectra of 10 (33 μM in 1% DMSO/water).
Figure 18:
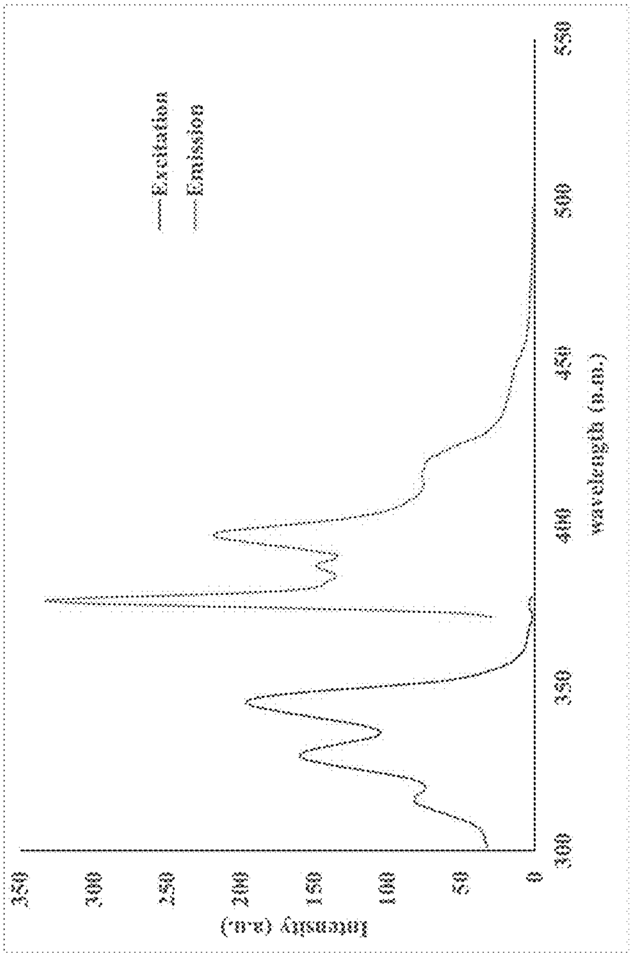
FIG. 18 shows the excitation and emission spectra of 10 (5 μM in DMSO).
Figure 19:
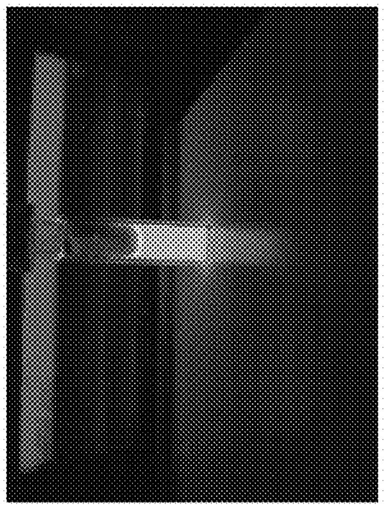
FIG. 19 shows the fluorescence produced by 10 when excited at 354 nm (33 μM in 1% DMSO/water solution).
Figure 20:
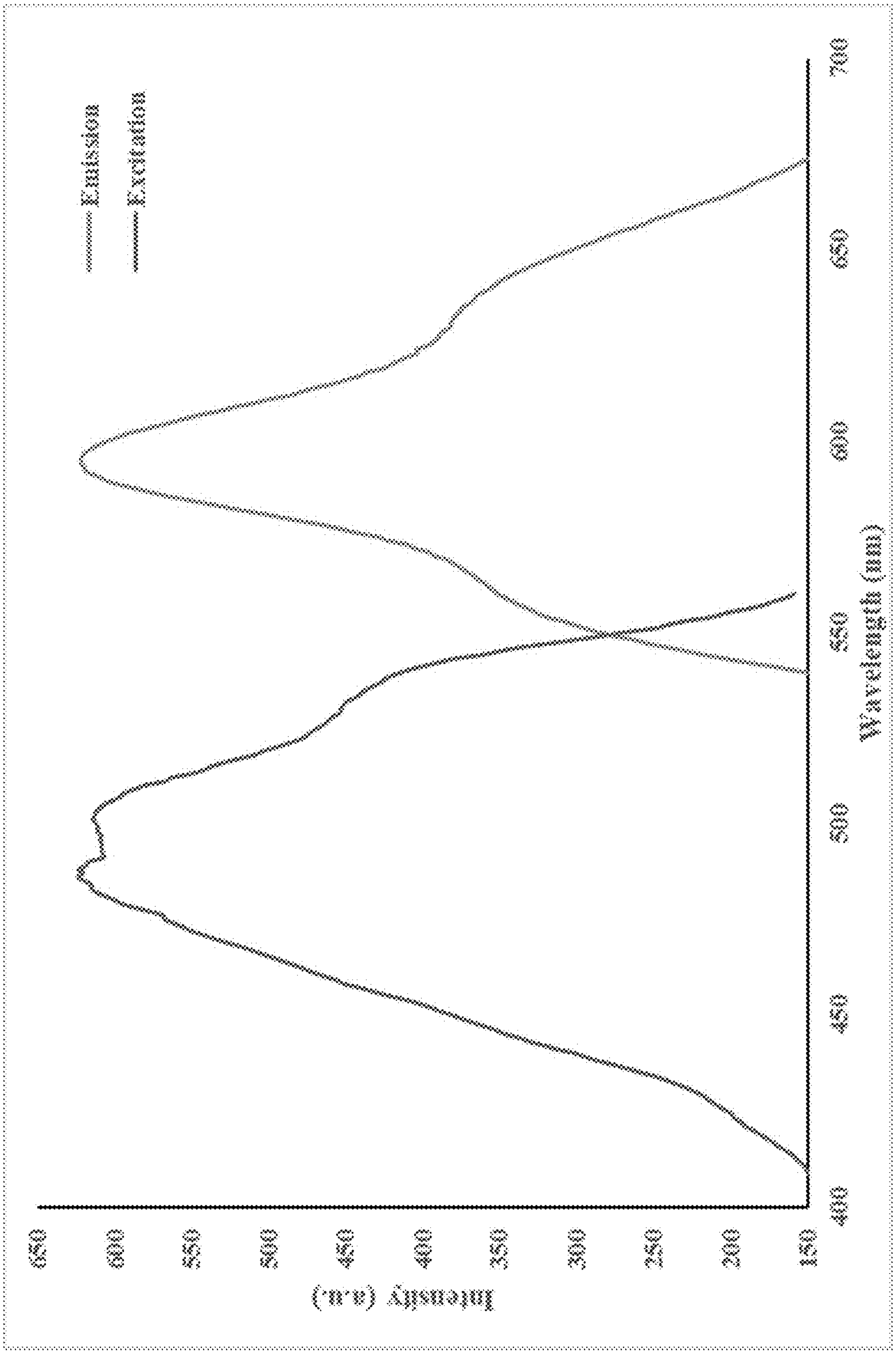
FIG. 20 shows the excitation and emission spectra of 7 (10 μM in DMSO).
Figure 21:
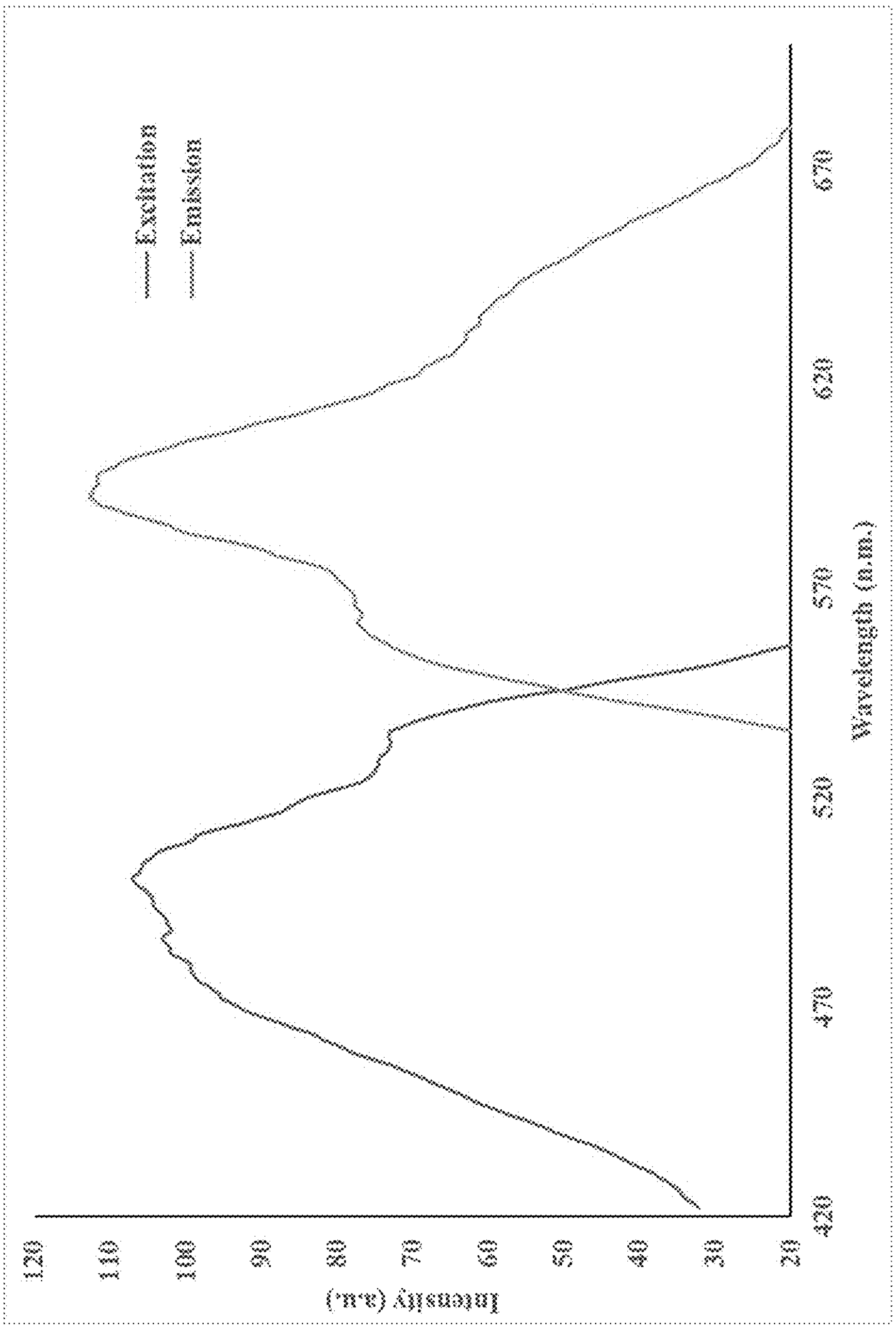
FIG. 21 shows the excitation and emission spectra of 7 (20 μM in 1% DMSO/$H_2O$).

Considered in concert, the $IC_{50}$ values deviated little compared to the starting hydroxyethyl complex 1 and other published systems (Porchia et al., 2018). Importantly, no substantial decrease was seen as the result of carbamate functionalization. On the other hand, a ~5-fold reduction in the anticancer potency of 7 relative to doxorubicin alone was observed (see FIG. 15). Nevertheless, even for this system, the overall $IC_{50}$ value remains in the relatively potent ≤1 μM range.

To assess whether complexes 5, 7-8, and 10-11 could serve as TrxR activity inhibitors, standard tests involving the reduction of the cell-permeable cofactor lipoate to dihydrolipoate were carried out. Treatment of A549 cells (from ATCC) with 1.25 μM of each respective complex for 6 h followed by live cell colorimetric imaging for 3 h revealed relative TrxR inhibition that correlated well to the $IC_{50}$ value of each complex (see FIG. 15). Furthermore, the inhibition of complexes [1][$PF_6$], 5, and 11 were found to inhibit TrxR to the same degree as auranofin within error (p-value >0.05). In contrast, 8 was found to inhibit TrxR to a greater extent than auranofin (p-value <0.0001) (see Table 9). Without wishing to be bound by any theory, it is believed that the carbamate functionalization represents a viable strategy for functionalization of Au(I) bis-NHC complexes.

TABLE 9

Statistical assessment of thioredoxin reductase inhibition from each respective complex[a]
Students unpaired T-test of data at 180 min

| | Auranofin | conj 5 | conj 8 | conj 11 | 1*PF6 | conj 10 | conj 7 | Dox |
|---|---|---|---|---|---|---|---|---|
| Control vs | 1.38E-12 | 2.43E-12 | 4.76E-14 | 7.85E-06 | 3.10E-14 | 1.81E-10 | 0.03 | 9.20E-04 |
| Auanofin vs | 1.00 | 0.94 | 2.10E-08 | 0.60 | 0.01 | 2.94E-03 | 1.17E-10 | 3.66E-19 |
| Dox vs | 3.66E-19 | 4.49E-17 | 1.21E-20 | 1.60E-18 | 1.90E-20 | 4.64E-18 | 6.53E-07 | 1.00 |

[a]Inhibition from each respective complex after 180 min of monitoring (comparisons that were not statistically significant have been shown in italics).

Figure 22:
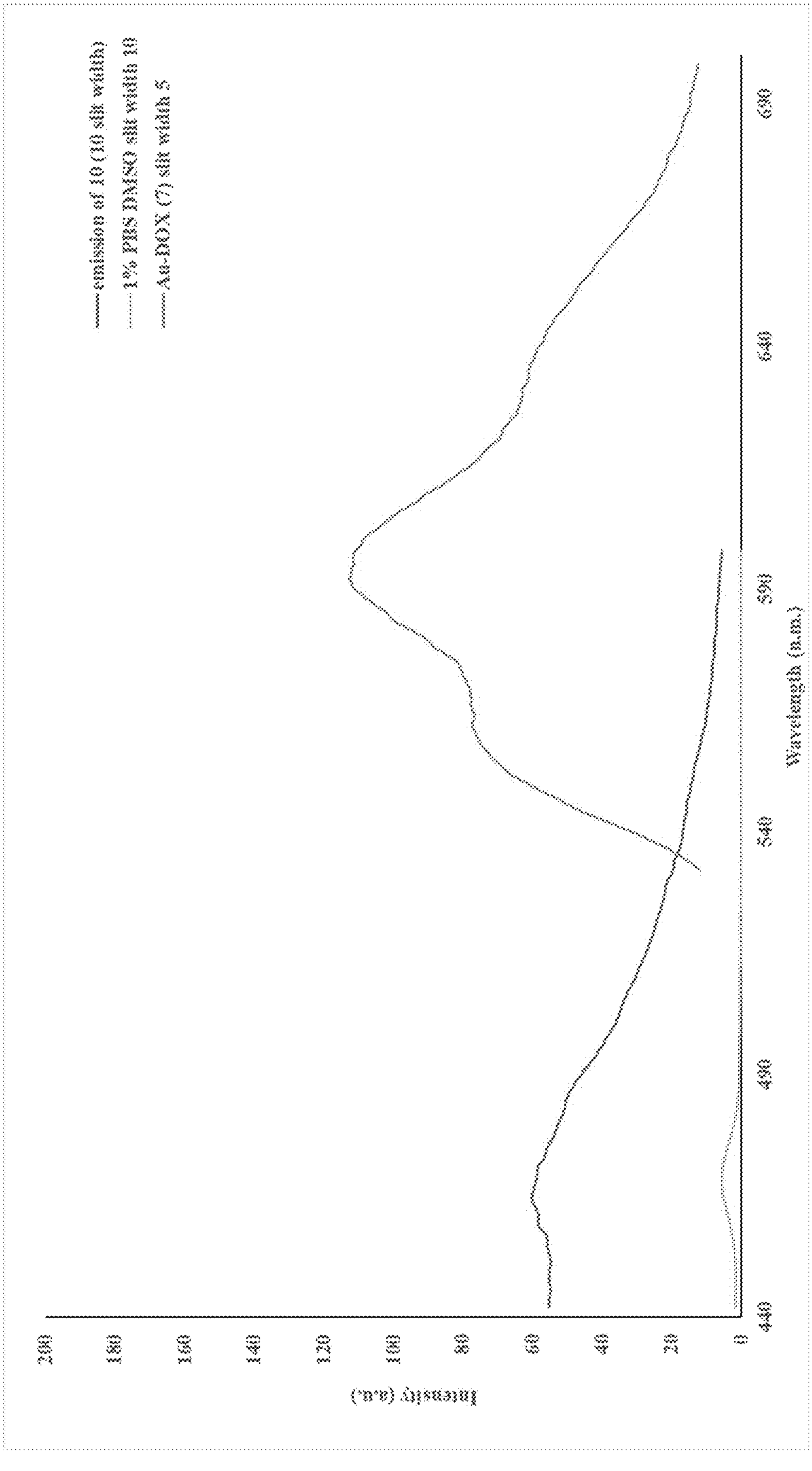
FIG. 22 shows the fluorescence intensity comparison: (light) 1% PBS DMSO mixture emission [slit width 10 mm], excited at 405 nm. (medium) Emission of 10 in 1% PBS DMSO mixture [slit width 10], excited at 405 nm. dark: Emission of 7 in 1% PBS DMSO mixture [slit width 5 mm], excited at 502 nm. This study compares the fluorescent output of 7 and 10 under confocal microscopy conditions where excitation of each fluorophore is limited to 405 nm or greater. Because of this, the fluorescent output of 10, possessing a $\lambda_{max}$ of 342 nm, was significantly reduced when excited at 405 nm. However, 7 was excited at the $\lambda_{max}$ of 502 nm and a resulting strong fluorescent output is observed and was also observed in the confocal microscopy images detailed below.
Figure 23:
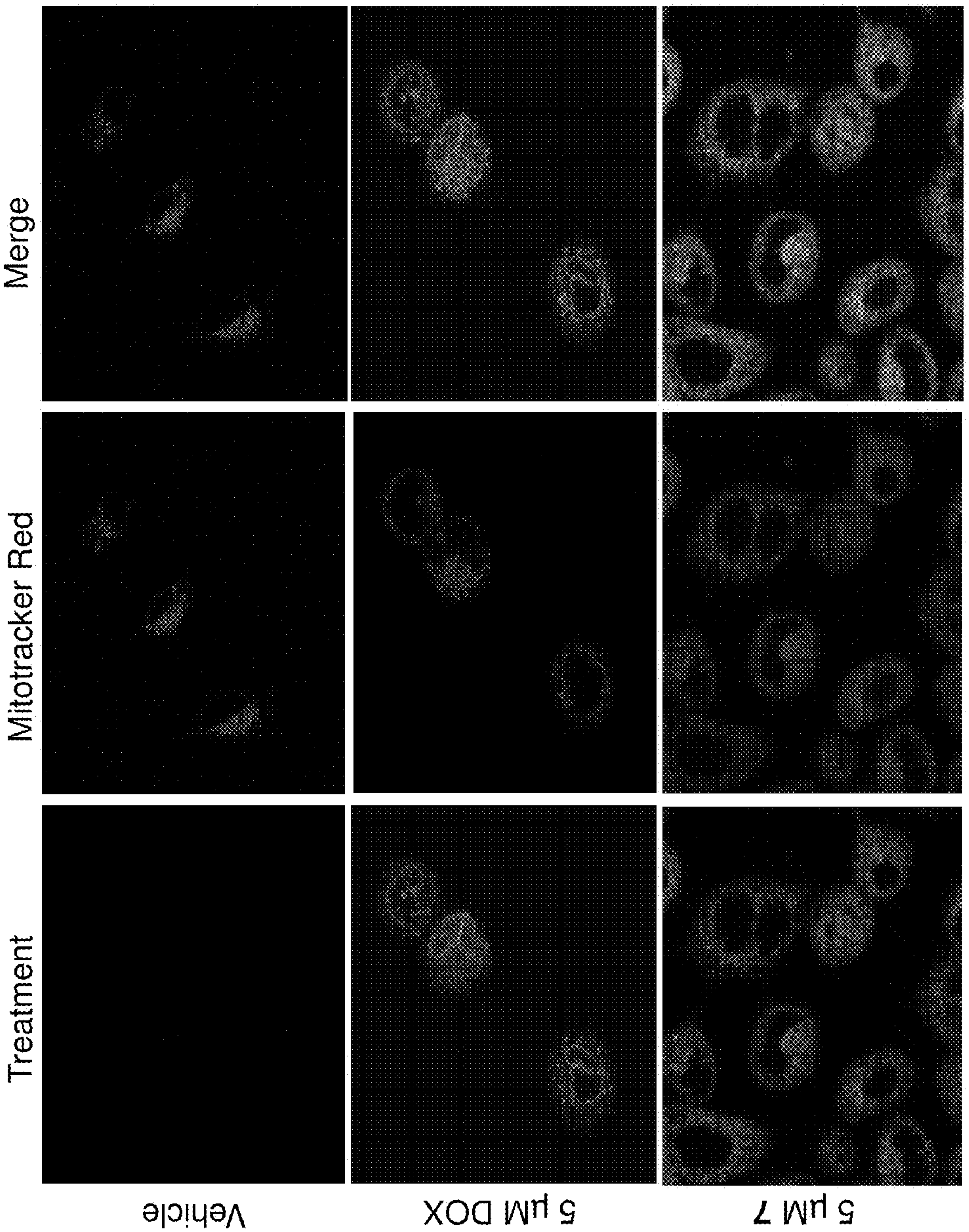
FIG. 23 shows the confocal microscopy images of A549 human lung cancer cells post-treatment with i) vehicle only ii) 5 μM doxorubicin iii) 5 μM Au(I)-NHC-DOX conjugate 7 for 6 h.
Figures 24A, 24B, 24C:
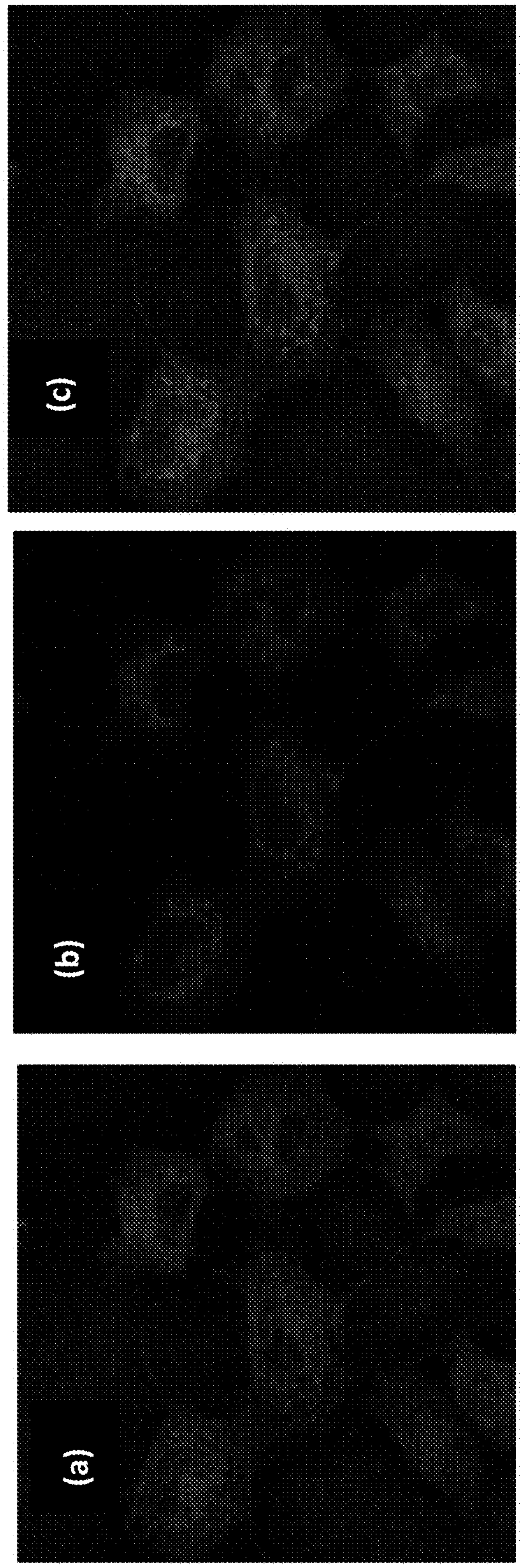
FIGS. 24A-24C show the confocal microscopy images of A549 human lung cancer cell line treated with 10 for 7 h.
Figures 25A, 25B, 25C:
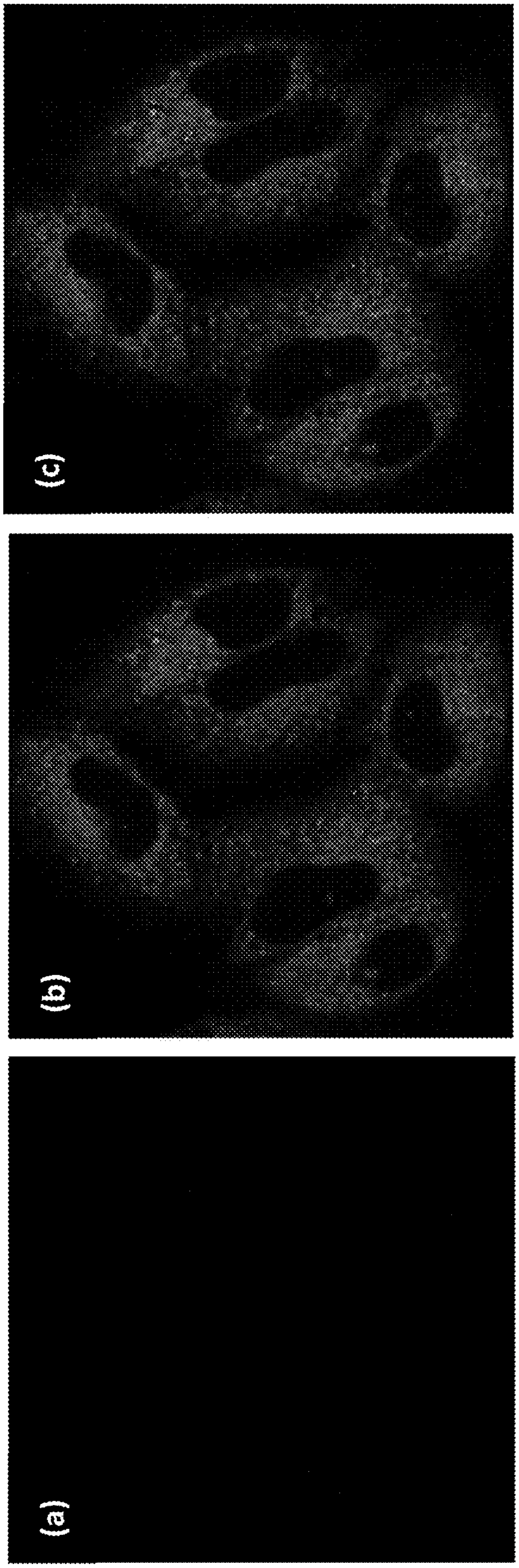
FIGS. 25A-25C show the confocal microscopy images of A549 human lung cancer cell line treated with only 7 at 5 μM for 6 h.
Figure 26B:
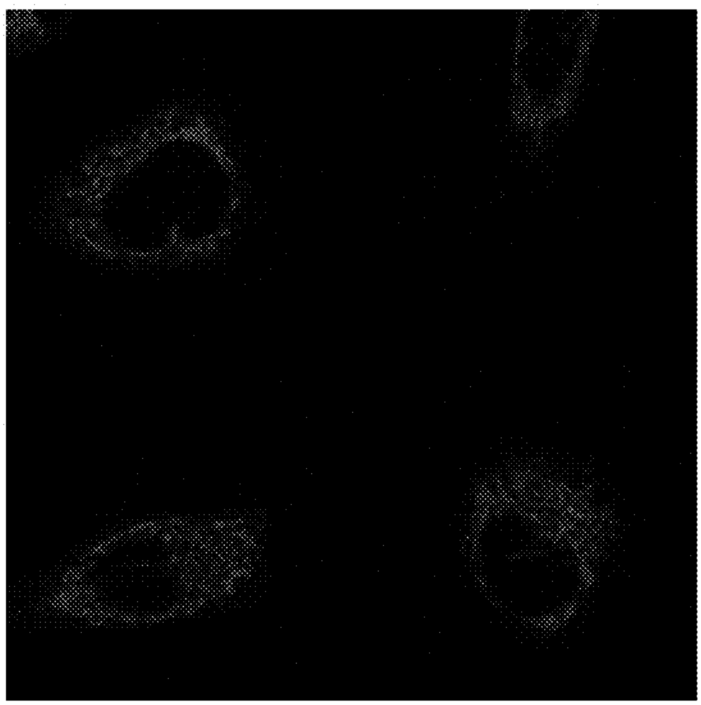
FIGS. 26A & 26B show the confocal microscopy images of A549 human lung cancer cell line treated with only 7 for 6 h imaged at two different concentrations.
Figure 26A:
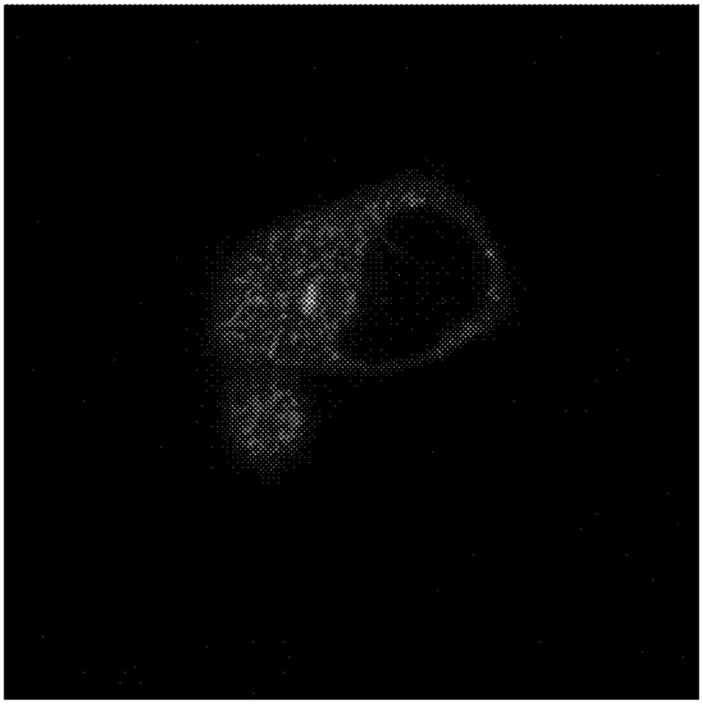
Figure 27:
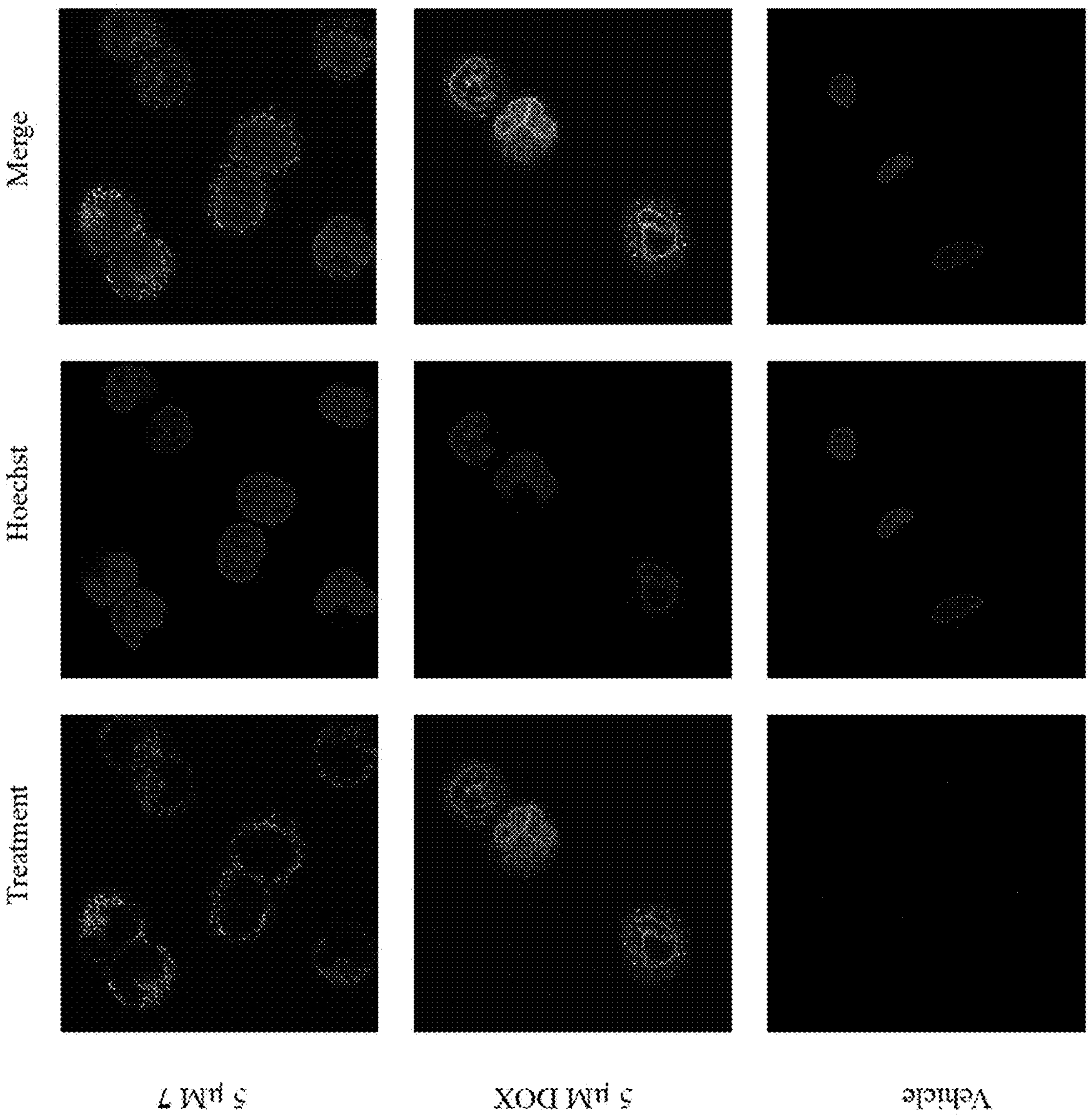
FIG. 27 shows the confocal microscopy images of A549 human lung cancer cells treated with 5 μM of Au(I)-NHC-Dox conjugate 7, 5 μM doxorubicin and vehicle only for 6 h. The nuclear overlay of doxorubicin and the Hoechst dye suggests the nuclear localization of doxorubicin. However, no overlay was observed between 7 and the Hoechst dye leading us to suggest that 7 does not localize to the nucleus.
Figure 28:
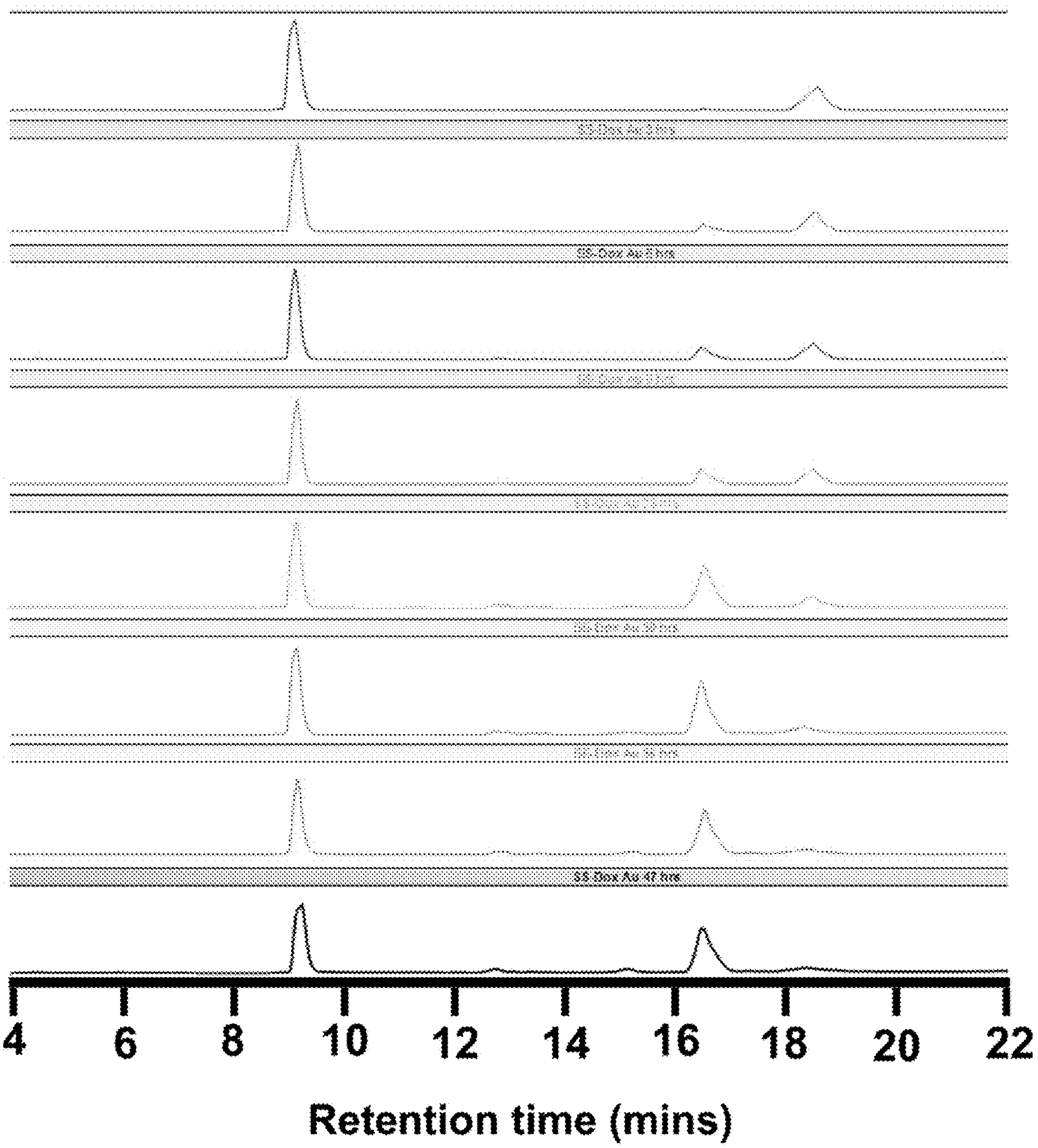
FIG. 28 shows the reaction progress for 7 as monitored by HPLC at various time points: t=0 h, 3 h, 8 h, 23 h, 30 h, 35 h, and 47 h.
Figure 29A:
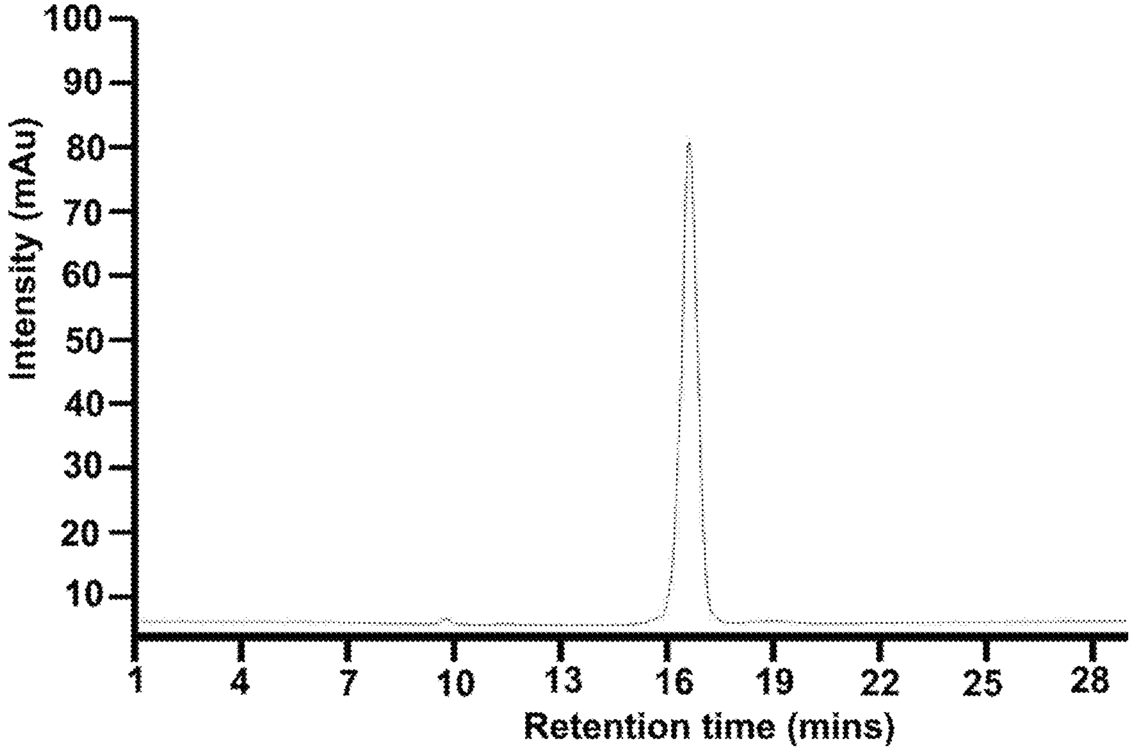
FIGS. 29A & 29B shows the HPLC trace of isolated product monitored at 470 nm (FIG. 29A) and at 254 nm (FIG. 29B).
Figure 29B:
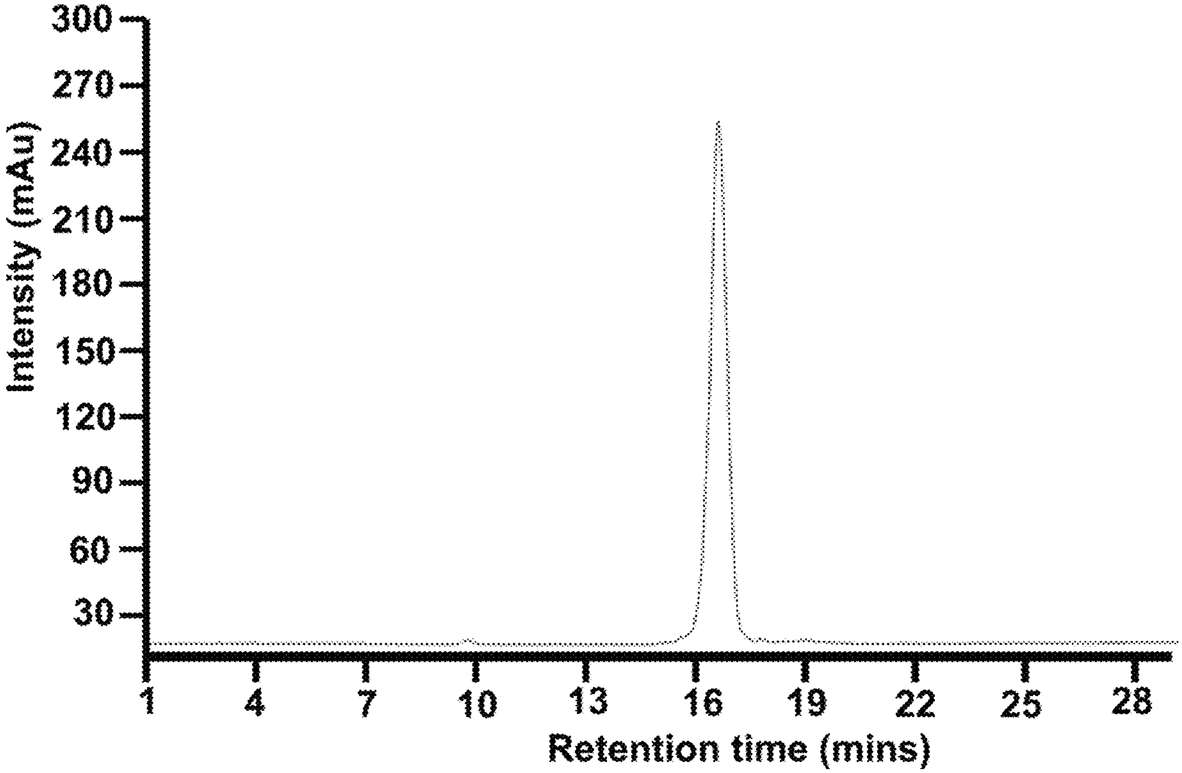

The utility of functionalization was illustrated in the case of 7 and 10. These complexes that contain inherently fluorescent doxorubicin and pyrene motifs. Known fluorescent Au(I)-bis-NHCs are relatively rare (Visbal et al., 2016; Li et al., 2014) compared to the corresponding Au(I)-mono-NHC species (Ibrahim et al., 2014; Bertrand et al., 2014; Citta et al., 2013). Systems 7 and 10 represent such fluorescent species. They could be analysed readily using the same excitation and emission maxima as used to monitor the constituent fluorophores (see FIGS. 17-22). These complexes were thus evaluated for their utility as fluorescent probes in vitro. To this end, A549 lung cancer cells were treated with each complex and subsequently subjected to fluorescent microscopic imaging (cf. FIGS. 23-27). Mitochondrial localization of Au-bis-NHCs is well validated (Hickey et al., 2008, Berners-Price and Filipovska, 2011), and this proved true for both complexes 7 and 10 as inferred from the fluorescent overlap of the emission signal from each complex and the mitochondrial probe Mitotracker Red (FIGS. 23 & 24). In the case of 7 fluorescent imaging of the mitochondria could be achieved at probe concentrations as low as 500 nM (see FIG. 26). However, such low concentrations could not be used effectively in the case of complex 10 since it is not effectively excited at a wavelength (e.g., 405 nm) compatible with the fluorescent microscopic imaging set up (see FIG. 22).

A. Methods and Materials

All chemical reactions were conducted under nitrogen atmosphere using Schlenk techniques. The glassware was oven dried at 120° C. before use. All materials were obtained, from commercial sources at the highest purity available and used without further purification. Chloro (dimethylsufide) gold(I) was purchased from Sigma-Aldrich. [Au(IPr)OH] (2) was synthesized according to the procedure of Nolan et al. (Gaillard et al., 2010). Complex 3 was also synthesized according to previously published protocols (Prühs et al., 2004). Solvents were either dried with a solvent purification system (DCM, acetonitrile, methanol) or dried over molecular sieves (toluene) (3 Å) and degassed prior to use.

The reported $^{1}H$ NMR and $^{13}C$ NMR spectra were measured on Varian Inova spectrometers at The University of Texas at Austin using $CD_2Cl_2$ and DMSO-$d_6$ as deuterated solvents. The chemical shifts were reported relative to the residual solvent proton signals. For the spin multiplicities the following abbreviations were used: s (singlet), d (doublet), t (triplet) and m (multiplet), as well as appropriate combinations of these. Coupling constants for protons (J) are given in Hertz (Hz). The NMR spectra were analyzed using the software MestReNova v. 10.0.2-15465 (Mestrelab Research S.L.) All deuterated solvents were purchased from Cambridge Isotope Laboratories. High-resolution electrospray ionization (ESI) mass spectra were recorded on a VG ZAB2E instrument or VG AutoSpec apparatus. Column chromatography was performed on Sorbent silica gel (40-63 μm). Analytical thin layer chromatography (TLC) analyses were carried on glass-backed silica gel plates (200 μm, Sorbent Technologies). Fluorescence measurements were performed at room temperature on a Photon Technology International fluorimeter.

B. Synthesis i. Synthesis of [1][Br]:

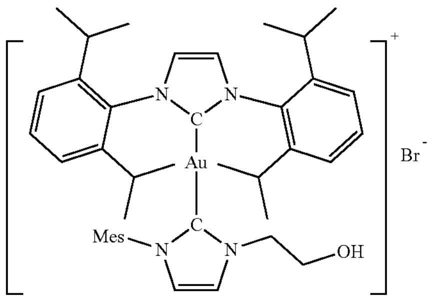

Compound 2 (250 mg, 0.414 mmol, 1 equiv.) and 3 (142 mg, 0.456 mmol, 1.1 equiv.) were combined in an oven-dried 20 mL scintillation vial containing 4 mL of dry toluene. The mixture was stirred for 18 h at 90° C., which led to the appearance of a white precipitate. The precipitate was filtered using a Buchner funnel and washed with toluene and then pentane two times. After collecting the precipitate, 4 mL nanopure water was added and the resulting mixture was left stirring for 15 min to remove any residual imidazolium bromide salt. Thereafter, the white precipitate was filtered again and the resulting solid was washed with 3 mL water and diethyl ether twice. The resulting solid was then collected and dried under vacuum to afford [1][Br] as a white microcrystalline powder. Yield: 260 mg (70%). ESI-HRMS (acetonitrile) (m/z): calculated for $[C_{41}H_{54}AuN_4O]^+$: 815.3958, obtained: 815.3960. $^{1}H$ NMR (DMSO-$d_6$): δ 8.05 (s, 2H), 7.60 (t, 2H, J=7.77 Hz), 7.48 (s, 1H), 7.33 (d, J=7.80, 4H), 7.26 (s, 1H), 6.77 (s, 1H), 4.89 (br s, 1H), 3.64 (t, J=5 Hz, 2H), 3.20 (dd, J=4.90 Hz, 4.91 Hz, 2H), 2.35 (m, 7H), 1.56 (s, 6H), 1.17 (d, J=6.80 Hz, 12H), 1.07 (d, J=6.86 Hz, 12H). Small toluene peaks can be seen even after 12 h vacuum drying. δ 7.25 (m), δ 7.18 (m), δ 2.30 (s). $^{13}$C NMR (DMSO-$d_6$): δ 186.34, 181.86, 145.35, 138.72, 134.56, 134.11, 133.94, 125.41, 124.23, 123.13, 61.30, 52.92, 28.84, 24.23, 21.34, 17.16. Small toluene peaks can be seen even after 12 h vacuum drying. δ 137.84, 129.36, 128.68, 125.79, 21.46.

ii. Synthesis of [1][$PF_6$]:

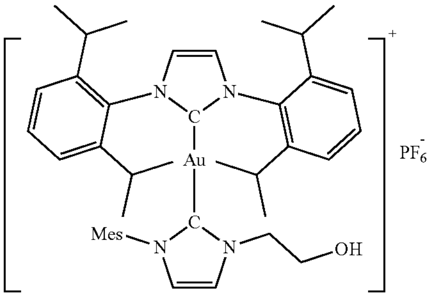

[1][Br] (250 mg, 0.279 mmol, 1 equiv.) was dissolved in 1 mL methanol and NaPF6 (281 mg, 1.674 mmol, 6 equiv.) in 4 mL nanopure water was added. The mixture was stirred overnight, and the precipitate was filtered. The white solid was washed with 5 ml water and finally with 5 mL hexanes twice. The solid was dried under vacuum and collected as white fluffy powder. Yield: 258 mg (97%). ESI-HRMS (acetonitrile) (m/z): Positive mode: calculated for [$C_{41}H_{54}AuN_4O$]$^+$815.3958, obtained: 815.3964. Negative mode: (ESI-MS): 145.0 [$PF_6$]$^-$. $^1$H NMR (500 MHz, DMSO-$d_6$): δ 8.05 (s, 2H), 7.60 (t, J=7.8 Hz, 2H), 7.48 (d, J=1.8 Hz, 1H), 7.33 (d, J=7.8 Hz, 4H), 7.26 (d, J=1.8 Hz, 1H), 6.77 (s, 2H), 4.89 (t, J=4.9 Hz, 2H), 3.64 (t, J=5.0 Hz, 2H), 3.20 (q, J=4.9 Hz, 2H), 2.35 (q, J=7.0 Hz, 7H), 1.56 (s, 6H), 1.17 (d, J=6.8 Hz, 12H), 1.07 (d, J=6.9 Hz, 12H). $^{13}$C NMR (DMSO-$d_6$): δ (ppm) 186.34, 181.86, 145.35, 138.72, 134.56, 134.11, 133.94, 125.41, 124.23, 123.13, 61.30, 52.92, 28.84, 24.23, 21.34, 17.16. Elemental Analysis: Calculated for [$C_{41}H_{54}AuN_4O$][$PF_6$]: C, 51.25; H, 5.67; N, 5.83. Found: C, 51.37; H, 5.70; N, 5.88.

iii. Synthesis of 4:

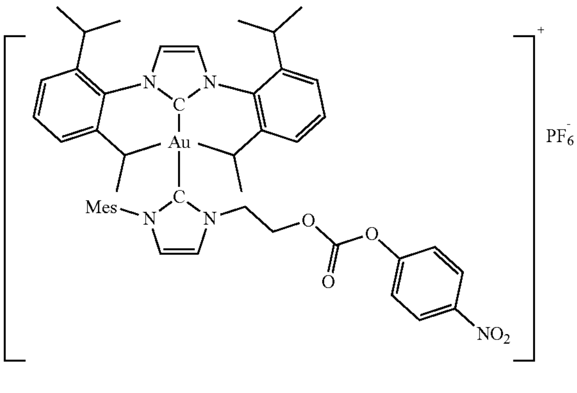

[1][$PF_6$] (200 mg, 0.208 mmol, 1 equiv.) and 4-nitrophenylchloroformate (335 mg, 1.664 mmol, 8 equiv.) were combined in an oven-dried two-neck round bottom and kept under vacuum for 15 min. 7 mL of dry DCM and dry triethylamine (44 μL, 0.312 mmol, 1.5 equiv.) were added to the mixture. The clear solution was stirred for 48 h to achieve the full conversion as indicated by LCMS. The DCM was evaporated off and diethyl ether was added. A white solid precipitated out after stirring for 15 mins and trituration. The solid obtained in this way was collected via filtration and washed several times with diethyl ether. (Note: If water is added to the filtrate, it turns yellow indicating the presence of 4-nitrophenol.) The solid was placed in a 20 mL scintillation vial and 5 mL of nanopore water was added. The reaction mixture was then stirred for 15 min. Finally, the resulting white suspension was filtered, washed with 5 mL water and diethyl ether and left to dry under air. Yield: 185 mg (79%). ESI-HRMS (acetonitrile) (m/z): Calculated for [$C_{48}H_{57}AuN_5O_5$]$^+$ 980.4020 obtained: 980.4025. $^1$H NMR (500 MHz, DMSO-$d_6$): δ 8.36-8.30 (m, 2H), 8.07 (s, 2H), 7.73 (d, J=2.0 Hz, 2H), 7.60 (t, J=7.8 Hz, 2H), 7.46-7.40 (m, 2H), 7.37 (d, J=1.8 Hz, 2H), 7.34 (d, J=7.8 Hz, 4H), 6.76 (s, 2H), 4.12 (t, J=5.0 Hz, 2H), 3.96 (t, J=5.1 Hz, 2H), 2.42-2.30 (m, 7H), 1.54 (s, 6H), 1.17 (d, J=6.9 Hz, 12H), 1.09 (d, J=6.9 Hz, 12H). $^{13}$C NMR (DMSO-$d_6$): δ (ppm) 186.39, 181.85, 145.43, 138.77, 134.56, 133.94, 130.89, 129.46, 125.41, 124.29, 123.13, 61.30, 52.92, 28.71, 24.25, 24.08, 21.25, 17.21. Elemental Analysis: Calculated for $C_{48}H_{57}AuN_5O_5PF_6$: C, 51.20; H, 5.10; N, 6.22. Found: C, 51.14; H, 5.13; N, 6.19.

iv. General Synthesis of Carbamates Via Protocol 1:

Precursor 4 (1 equiv.) was kept under vacuum for 15 mins in an oven-dried two-neck round bottomed flask. Dry DCM (4 mL) and the amine of interest (2-3 equiv.) were then added. After stirring the mixture for 10 min, dry TEA (2 equiv.) was added and whole mixture was stirred under $N_2$ atmosphere for 12-36 h. After confirming the completion of the reaction by LCMS, the DCM was evaporated and to that diethyl ether was added. The solid precipitate was subsequently filtered. Finally, the solid was collected and 4 mL of nanopore water was added to it and stirred for another 15 min. The remaining solid was filtered and washed with 5 mL water and hexanes respectively.

v. Synthesis of 5:

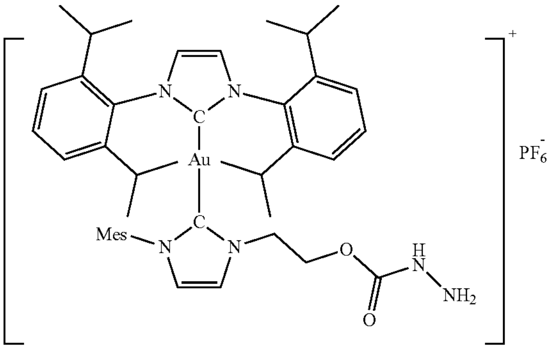

Reaction Time: 12 h 4 (50 mg, 0.044 mmol, 1 equiv.) was used along with $NH_2NH_2 \cdot xH_2O(N_2H_4$: 60%) (8 μL, ~3 equiv.) and dry TEA (10 μL, 0.071 mmol, 1.6 equiv.). White microcrystalline powder. Crystals were grown using DCM/DEE and via slow diffusion. Yield: 35 mg (79%). ESI-HRMS (acetonitrile) (m/z): Calculated for [$C_{42}H_{56}AuN_6O_2$]$^+$ 873.4125 obtained: 873.4123. $^1$H NMR (500 MHz, DMSO-$d_6$): δ 8.13 (s, 1H), 8.07 (s, 2H), 7.60 (t, J=7.8 Hz, 2H), 7.48 (s, 1H), 7.34 (d, J=8.0 Hz, 5H), 6.77 (s, 2H), 4.02 (s, 2H), 3.80 (t, J=5.2 Hz, 2H), 3.71 (d, J=5.4 Hz, 2H), 2.35 (d, J=7.3 Hz, 7H), 1.56 (s, 6H), 1.17 (d, J=6.8 Hz, 12H), 1.08 (d, J=6.9 Hz, 12H). $^{13}C$ NMR (DMSO-$d_6$): δ 185.88, 182.28, 157.51, 145.45, 138.87, 134.39, 134.10, 133.89, 130.95, 129.48, 126.88, 125.46, 123.67, 124.28, 63.25, 49.78, 28.72, 24.30, 24.07, 21.26, 17.21.

vi. Synthesis of 6:

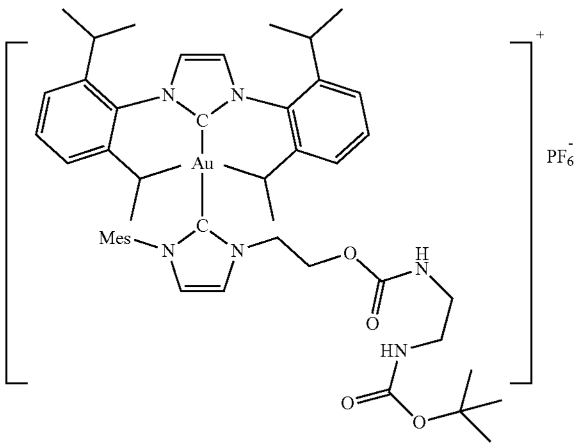

Reaction time: 24 h 4 (40 mg, 0.035 mmol, 1 equiv.) was used along with N-Boc-ethylenediamine (17 μL, 0.105 mmol, 3 equiv.) and dry TEA (10 μL, 0.071 mmol, 2 equiv.). White microcrystalline powder. Crystals were grown using DCM/DEE, via slow diffusion, but they were too thin to mount. Yield: 21 mg (53%) ESI-HRMS (acetonitrile) (m/z): Calculated for $[C_{49}H_{68}AuN_6O_4]^+$: 1001.4962 observed: 1001.4961. $^1H$ NMR (500 MHz, DMSO-$d_6$): δ 8.07 (s, 2H), 7.60 (t, J=7.8 Hz, 2H), 7.49 (d, J=1.9 Hz, 1H), 7.36-7.30 (m, 5H), 7.05 (d, J=5.7 Hz, 1H), 6.79 (d, J=5.7 Hz, 1H), 6.76 (s, 2H), 3.78 (t, J=5.4 Hz, 2H), 3.71 (t, J=5.2 Hz, 2H), 2.98-2.93 (m, 3H), 2.35 (q, J=6.6 Hz, 7H), 1.56 (s, 6H), 1.37 (s, 9H), 1.17 (d, J=6.8 Hz, 12H), 1.08 (d, J=6.9 Hz, 12H). $^{13}C$ NMR (DMSO-$d_6$): δ 186.19, 182.30, 156.09, 155.68, 145.45, 138.86, 134.40, 134.10, 133.90, 130.94, 129.48, 125.46, 124.27, 124.06, 123.62, 78.17, 62.95, 49.92, 28.72, 28.68, 24.29, 24.07, 21.25, 17.19. Elemental Analysis: Calculated for $C_{49}H_{70}AuN_6O_5PF_6$: C, 50.52; H, 6.06; N, 7.21. Found: C, 50.83; H, 6.10; N, 7.12.

vii. Synthesis of 7:

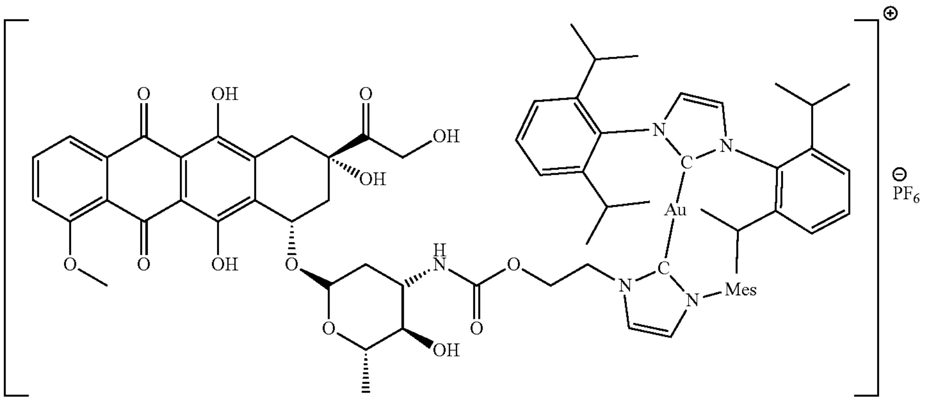

Reaction time: ~47 h DOX·HCl (40 mg, 0.0735 mmol, 2.1 equiv.) was dissolved in 0.2 mL dry DMF, 12 mL dry DCM and 0.080 mL dry TEA (0.582 mmol, 16 equiv.) and stirred for 30 mins. Next, 4 (40 mg, 0.035 mmol, 1 equiv.) dissolved in 1 mL dry DCM was added. The reaction progress was monitored over time. It was noticed that after ~47 h, the reaction is complete as determined by TLC analysis. The DCM was evaporated off and DEE was added; this produced a dark red solid. This red solid (15 mg) was dissolved in 2 ml ACN:water (55:45 v/v). The resultant mixture was purified via HPLC using ACN:water 75:25 as the eluent to provide a retention time ~24.5 min. The pure fractions were collected and combined together. Finally, they were lyophilized to get pure dry product. Yield: 8 mg (15%) ESI-HRMS (acetonitrile) (m/z): Positive mode-Calculated for $[C_{69}H_{81}AuN_5O_{13}]^+$: 1384.5497, obtained: 1384.5505. Negative mode-$[PF_6]^-$: 145.1. $^1H$ NMR (500 MHz, dichloromethane-$d_2$): δ 13.94 (s, 1H), 13.21 (s, 1H), 7.94 (d, J=7.7 Hz, 1H), 7.73 (t, J=8.1 Hz, 1H), 7.43 (t, J=7.8 Hz, 2H), 7.33 (d, J=8.5 Hz, 1H), 7.20-7.11 (m, 5H), 7.05 (d, J=1.9 Hz, 1H), 6.61 (d, J=1.8 Hz, 1H), 6.47 (s, 1H), 6.39 (s, 1H), 5.39 (d, J=3.7 Hz, 1H), 5.19 (t, J=3.0 Hz, 1H), 5.13 (d, J=8.8 Hz, 1H), 4.67 (s, 2H), 4.48 (s, 1H), 4.00 (q, J=6.6 Hz, 1H), 3.93 (s, 3H), 3.68-3.52 (m, 4H), 3.49 (d, J=2.6 Hz, 1H), 3.20 (dd, J=18.6, 2.0 Hz, 1H), 2.97 (d, J=18.7 Hz, 1H), 2.29 (pd, J=7.1, 4.3 Hz, 4H), 2.19 (s, 3H), 1.41 (d, J=4.1 Hz, 6H), 1.21-1.16 (m, 3H), 1.08 (d, J=6.8 Hz, 12H), 1.00 (dd, J=16.4, 6.9 Hz, 12H).

viii. Synthesis of 8:

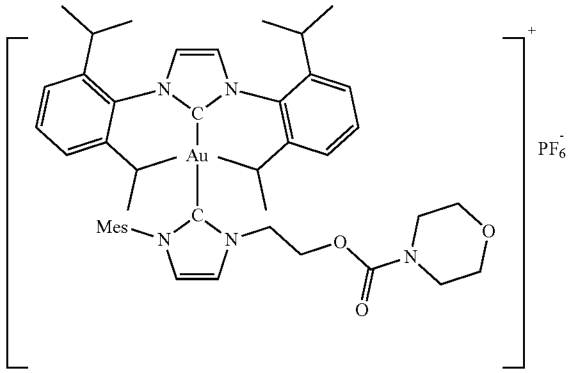

Reaction time: 24 h Precursor 4 (40 mg, 0.035 mmol, 1 equiv.) was combined with morpholine (9 μL, 0.105 mmol, 3 equiv.) and dry TEA (10 μL, 0.071 mmol, 2 equiv.) per the general procedure above. This gave 8 as a white microcrystalline powder. Crystals were grown from DCM/DEE via slow diffusion. Yield: 23 mg (61%) ESI-HRMS (Acetonitrile) (m/z): Calculated for $[C_{46}H_{61}AuN_5O_3]^+$: 928.4434 observed: 928.4451. $^1H$ NMR (500 MHz, DMSO-$d_6$): δ 8.07 (s, 2H), 7.64 (d, J=1.9 Hz, 1H), 7.60 (t, J=7.8 Hz, 2H), 7.34 (d, J=7.6 Hz, 5H), 6.77 (s, 2H), 3.91-3.79 (m, 4H), 3.47 (d, J=31.7 Hz, 4H), 3.20 (d, J=39.6 Hz, 4H), 2.35 (q, J=6.9 Hz, 7H), 1.55 (s, 6H), 1.17 (d, J=6.8 Hz, 12H), 1.08 (d, J=6.9 Hz, 12H). $^{13}C$ NMR (DMSO-$d_6$): δ 186.11, 182.33, 153.99, 145.47, 138.89, 134.44, 134.05, 133.92, 130.95, 129.51, 125.49, 124.29, 123.78, 123.66, 66.27, 63.52, 49.35, 43.68, 28.72, 24.28, 24.08, 21.25, 17.11.

ix. Synthesis of 9:

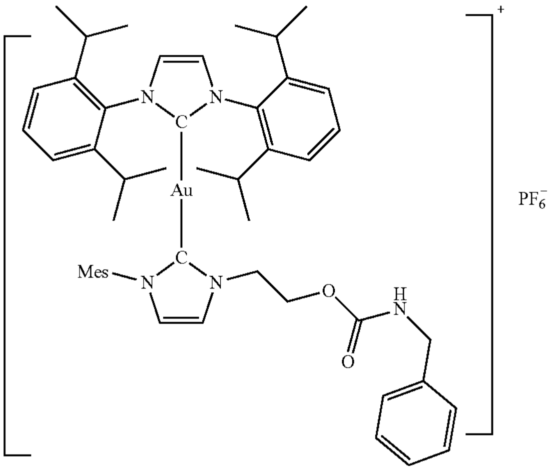

Reaction time: 24 h Precursor 4 (40 mg, 0.035 mmol, 1 equiv.) was combined with benzyl amine (12 μL, 0.105 mmol, 3 equiv.) and dry TEA (10 μL, 0.071 mmol, 2 equiv.) per the general procedure. This gave 9 as a white microcrystalline powder. Crystals were grown using DCM/DEE and via slow diffusion. Yield: 15 mg (40%) ESI-HRMS (Acetonitrile) (m/z): Calculated for $[C_{49}H_{61}AuN_5O_2]^+$: 948.4485 observed: 948.4493. $^1H$ NMR (500 MHz, DMSO-$d_6$): δ 8.06 (s, 2H), 7.64 (t, J=6.2 Hz, 1H), 7.58 (t, J=7.8 Hz, 2H), 7.50 (d, J=1.9. Hz, 1H), 7.31 (dd, J=7.3, 5.3 Hz, 7H), 7.26-7.20 (m, 3H), 6.76 (s, 2H), 4.15 (d, J=6.2 Hz, 2H), 3.80 (d, J=5.2 Hz, 2H), 3.74 (d, J=5.1 Hz, 2H), 2.35 (q, J=6.8, 5.5 Hz, 7H), 1.54 (s, 6H), 1.16 (d, J=6.8 Hz, 12H), 1.08 (d, J=6.9 Hz, 12H). $^{13}C$ NMR (DMSO-$d_6$): δ 186.18, 182.32, 155.91, 145.44, 139.99, 138.86, 134.44, 134.14, 133.90, 130.94, 129.48, 128.72, 127.51, 127.32, 125.46, 124.26, 124, 123.56, 63.09, 49.80, 44.24, 28.71, 24.29, 24.07, 21.26, 17.16.

x. Synthesis of 10:

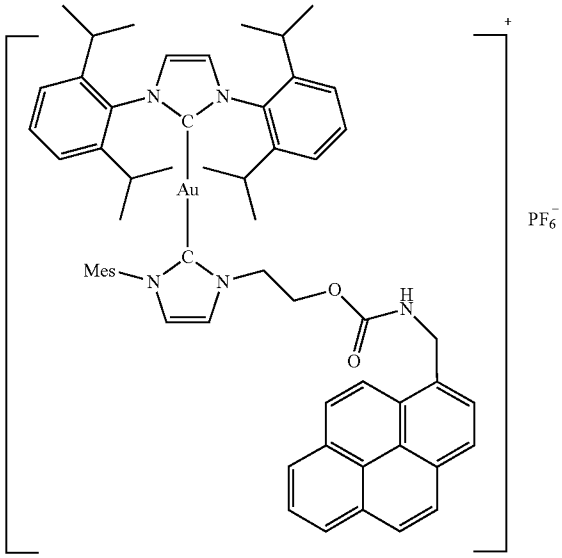

Reaction time: 36 h Precursor 4 (40 mg, 0.035 mmol, 1 equiv.) was combined with pyrene methyl amine hydrochloride (20 mg, 0.075 mmol, 2.1 equiv.) and dry TEA (22 μL, 0.170 mmol, 4.8 equiv.) per the general procedure. After the reaction was deemed complete as inferred from an LCMS analysis, the DCM was evaporated off and diethyl ether was added. This produced a white precipitate. The white solid was collected via filtration. The solid isolated in this way was partially dissolved in around 1 mL DCM containing 2 drops of methanol. The mixture was loaded on a silica column and the pure product was collected using 5% methanol in DCM as the eluent; $R_f$~0.4. The column can be monitored using an UV lamp with the fluorescent band that elutes second being collected. Conjugate 10 was isolated in the form of a white microcrystalline powder. Crystals were grown from DCM/DEE via slow diffusion. Yield: 17 mg (40%) ESI-HRMS (acetonitrile) (m/z): Calculated for $[C_{59}H_{65}AuN_5O_2]^+$: 1072.4798 observed: 1072.4815. $^1H$ NMR (600 MHz, DMSO-$d_6$): δ 8.40 (d, J=9.2 Hz, 1H), 8.32-8.27 (m, 2H), 8.25 (dd, J=8.6, 3.8 Hz, 2H), 8.14 (s, 2H), 8.07 (t, J=7.6 Hz, 1H), 7.99 (d, J=8.1 Hz, 3H), 7.88 (t, J=6.0 Hz, 1H), 7.52 (d, J=1.9 Hz, 1H), 7.48 (t, J=7.8 Hz, 2H), 7.30 (d, J=1.9 Hz, 1H), 7.21 (d, J=7.8 Hz, 4H), 6.71 (s, 2H), 4.88 (d, J=5.9 Hz, 2H), 3.78 (d, J=5.3 Hz, 2H), 3.73 (d, J=5.4 Hz, 2H), 2.32 (s, 3H), 2.28 (q, J=6.9 Hz, 4H), 1.50 (s, 6H), 1.07 (dd, J=6.9, 5.0 Hz, 12H), 1.01 (d, J=6.9 Hz, 12H). (Diethyl ether remains with the solid even after overnight vacuum dry, with the crystal too). δ 3.36 (q), 1.06 (m). $^{13}C$ NMR (DMSO-$d_6$): δ 186.10, 182.32, 155.80, 145.36, 138.83, 134.35, 134.05, 133.81, 131.24, 130.86, 130.74, 129.43, 128.44, 128.01, 127.81, 127.53, 127.07, 126.72, 125.74, 125.63, 125.39, 125.09, 124.50, 124.38, 124.17, 123.99, 123.60, 63.16, 49.60, 42.60, 28.60, 24.22, 23.97, 21.22, 17.14. (Diethyl ether remains with the solid even after overnight vacuum dry, and with the crystal too). δ 65.63, 15.62.

xi. Alternative Scheme for Aromatic Amines (Protocol 2):

General Protocol 2: Precursor 4 (1 equiv.) and HOBt (1.5-2 equiv.) were combined in a two-necked round bottom flask and kept under vacuum for 15 min. After that, dry DMF (3 mL) and the amine in question (3-3.5 equiv.) were added.

After confirming the completion of the reaction by LCMS, the DMF was concentrated and to the resulting mixture were added DEE and hexanes in excess. The resulting precipitate was then collected by filtration. The solid obtained in this was treated with 6 mL of nanopore water and stirred for another 15 mins at 45° C. The solid that remained was collected by filtration and washed with first 5 mL of water and then hexanes, respectively.

xii. Synthesis of 11:

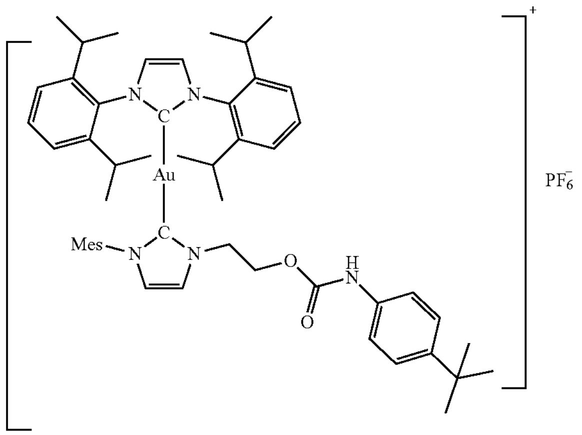

Reaction time: 48 h Precursor 4 (35 mg, 0.031 mmol, 1 equiv.) was reacted with $^{t}$Bu Aniline (15 μL, 0.093 mmol, 3 equiv.) and HOBt (7 mg, 0.0465 mmol, 1.5 equiv.) per the general Protocol 2. The product was a white powder. Crystals were grown from DCM/DEE via slow diffusion. Yield: 27 mg (77%) ESI-HRMS (acetonitrile) (m/z): Calculated for $[C_{52}H_{67}AuN_5O_2]^+$: 990.4955 observed: 990.4972. $^1$H NMR (500 MHz, DMSO-$d_6$): δ 9.50 (s, 1H), 8.07 (s, 2H), 7.60 (t, J=7.8 Hz, 2H), 7.56 (d, J=1.8 Hz, 1H), 7.40-7.31 (m, 5H), 7.29 (s, 3H), 6.77 (s, 2H), 3.85 (dd, J=21.3, 5.2 Hz, 4H), 2.37 (q, J=5.3, 3.8 Hz, 7H), 1.57 (s, 6H), 1.25 (s, 9H), 1.17 (d, J=6.8 Hz, 12H), 1.10 (d, J=6.9 Hz, 12H). $^{13}$C NMR (DMSO-$d_6$): δ 186.16, 182.38, 153.01, 145.45, 134.09, 133.91, 130.94, 129.50, 125.82, 125.48, 124.28, 123.67, 118.55, 63.23, 49.90, 34.39, 31.68, 28.73, 24.31, 24.07, 21.26, 17.22.

xiii. Synthesis of 12:

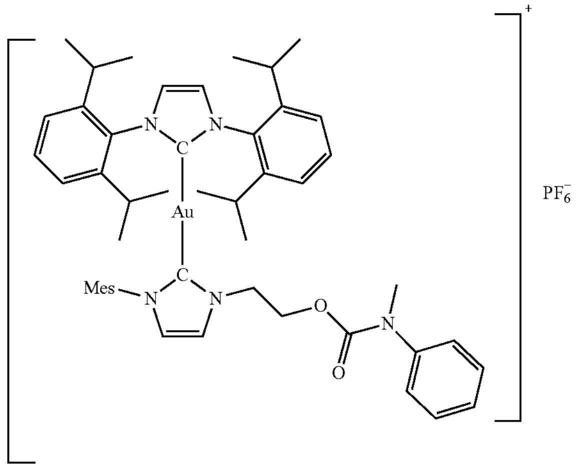

Reaction time: 48 h Precursor 4 (40 mg, 0.035 mmol, 1 equiv.) was reacted with N-methylaniline (12 μL, 0.11 mmol, 3.1 equiv.) and HOBt (9 mg, 0.07 mmol, 1.5 equiv.) per general Protocol 2. Product 12 was obtained as a white powder. Crystals could be grown from DCM/DEE but they proved too thin to mount for characterization via X-ray diffraction analysis. Yield: 14 mg (36%) ESI-HRMS (acetonitrile) (m/z): Calculated for $[C_{49}H_{61}AuN_5O_2]^+$: 948.4485 observed: 928.4502. $^1$H NMR (DMSO-$d_6$): δ 8.02 (d, J=1.1 Hz, 2H), 7.54 (t, J=7.8 Hz, 2H), 7.40-7.21 (m, 8H), 7.17 (t, J=7.0 Hz, 2H), 6.72 (s, 2H), 3.78 (s, 4H), 3.06 (s, 3H), 2.30 (d, J=8.8 Hz, 7H), 1.48 (s, 6H), 1.12 (d, J=6.8 Hz, 12H), 1.02 (d, J=6.8 Hz, 12H). $^{13}$C NMR (DMSO-$d_6$): δ 186.09, 182.24, 154.13, 145.41, 138.84, 134.03, 133.87, 130.90, 129.46, 129.19, 126.43, 125.95, 125.45, 124.26, 123.66, 63.91, 49.58, 37.78, 28.69, 24.22, 24.03, 21.20, 17.11

C. Biological Evaluation i. Cell Proliferation Studies:

A549 Cells were harvested and seeded into 96-well culture plates (Costar 07-200-90) in 100 μL of culture media. They were allowed to incubate overnight at 37° C. in the presence of 5% $CO_2$. A549 cells were seeded at a density of 1500 cells/well. The next day, appropriate serial dilutions of drug stocks in culture media were made. To each well of a 96 well plate was added 100 μL of the appropriate solution. After a total of three days, a 50 mL aliquot of 3 mg/mL tetrazolium dye, 3-(4,5-dimethylthiazol-2-yl)-2,5-diphenyltetrazolium bromide (Alfa Aesar L11939) was added to each well, followed by a 4 h incubation period at 37° C. After removal of the medium, the resulting formazan was dissolved in 50 ml DMSO and the respective absorbances were measured at 560-650 nm using a microplate reader (Molecular Devices, Sunnyvale, CA). Absorbance values were corrected for background and then normalized to wells containing untreated cells to allow for plate-to-plate comparisons. Resulting dose response curves were subjected to linear regression analysis (Origin by OriginLab, Inc.) for determination of $IC_{50}$ values. The data are shown as mean inhibition of proliferation or growth as a percentage of control cells and are from 2-3 replicate experiments.

ii. Lipoate Reduction Assay

Reagent Preparation: 20 mg of lipoic acid was dissolved in 600 μL of PEG 400 and 400 μL of DPBS to make a 97 mM stock solution. In a separate vial, 7.1 mg of sodium phosphate anhydrous (dibasic) was added to 9.49 mL HBSS (Life tech 14025-092), resulting in 5 mM solution. From the lipoic acid stock solution, 0.51 mL was slowly transferred into HBSS containing phosphate buffer solution. The final concentration of lipoic acid was 5 mM. To this mixture was added 3.96 mg of DTNB which gave 1 mM solution. Finally, the mixture was sonicated several times and heated at 40° C. for 5 mins to ensure complete dissolution of DTNB. The solution was passed through a sterile 0.2 micron filter.

Live Cell Imaging Assay: A549 cells were harvested and seeded at a density of 10,000 cells/well in 96-well culture plates. Following an overnight incubation at 37° C. and 5% $CO_2$, appropriate serial dilutions of drug stocks in culture media were performed, and 100 μL of the appropriate solution were added to each well. Cells were further incubated for 6 h. Thereafter, the media solution was removed from each well and washed with 200 μL of HBSS solution. Finally, 100 μL of 5 mM Lipoate (Tokyo Chemical Industry Co., Ltd. L0207) and 1 mM of DTNB (Acros Organics 117540050) solution were added to each well. The absorbance of each well at 405 nm was recorded immediately and once every 20 min for three hours on a microplate reader. Plates were covered with aluminum foil between readings.

iii. Fluorescence Microscopy

Tumor cells were harvested and seeded at a density of $2\times10^5$ cells/dish in 35 mm dishes containing a poly-D lysine coated 10 mm glass diameter (Mat Tek P35GC-1.5-10-C) overnight. Cells were then incubated with respective doses of different complexes at 37° C. 4-7 h. Post incubation, the media was removed and cells were washed (2×) with PBS. To the cells was added a PBS solution containing 1 μg/mL Hoechst 33342 (Lifetech $H_{1399}$) and 50 nM Mitotracker Red FM (Lifetech M22425) for 30 min at 37° C. After incubation, the dye PBS solution was removed and cells were washed with PBS (2×). Cells were then imaged fluorescently on a Leica SP5 X White light laser confocal microscope. Images were taken with a 63X, NA 1.4 objective.

All of the compositions and methods disclosed and claimed herein can be made and executed without undue experimentation in light of the present disclosure. While the compositions and methods of this disclosure have been described in terms of certain embodiments, it will be apparent to those of skill in the art that variations may be applied to the compositions and methods and in the steps or in the sequence of steps of the methods described herein without departing from the concept, spirit and scope of the disclosure. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the disclosure as defined by the appended claims.

REFERENCES

The following references, to the extent that they provide exemplary procedural or other details supplementary to those set forth herein, are specifically incorporated herein by reference.

Aguirre et al., *Dalt. Trans.*, No. 48, 10806-10812, 2009.
Ai et al., *J. Med. Chem.,* 59 (5), 1747-1760, 2016.
Antonarakis and Emadi, *Cancer Chemother. Pharmacol.,* 66 (1), 1-9, 2010.
Apetoh et al., *Nat. Med.,* 13, 1050. 2007.
Arambula et al., *Chem. Sci.,* 7 (2), 1245-1256, 2016.
Arner and Holmgren, *Eur. J. Biochem.,* 267 (20), 6102-6109, 2000.
Arshad et al., *J. Med. Chem.,* 167:324-356, 2019.
Baik et al., *Clin. Cancer Res.,* 23 (17), 4992 LP-5002, 2017.
Baker et al., *Dalt. Trans.,* 6, 3708-3715, 2006.
Barabási and Oltvai, *Nat. Rev. Genet.,* 5, 101, 2004.
Barry and Sadler, *Chem. Commun.,* 49, 5106-5131, 2013.
Berggren et al., *Anticancer Res.,* 16 (6B), 3459-3466, 1966.
Berners-Price and Filipovska, *Metallomics,* 3 (9), 863-873, 2011.
Bertrand et al., *Eur. Inorg. Chem.,* 2014:4532-4536, 2014.
Bezu et al., *Front. Immunol.,* 6, 187. 2015.
Blachère et al., *PLOS Biol.,* 3 (6), e185, 2005.
Casares et al., *J. Exp. Med.,* 202 (12), 1691 LP-1701, 2005.
Cell et al., *Clin. Cancer Res.,* 7:1750-1757, 2001.
Che and Sun, *Chem. Commun.,* 47, 9554-9560, 2011.
Cisnetti et al., *J. Organomet. Chem.,* 782, 22-30, 2015.
Citta et al., *Metallomics,* 5:1006-1015, 2013.
Colotti et al., *ChemMedChem,* 8 (10), 1634-1637, 2013.
Di Sarra et al., *Eur. J. Inorg. Chem.*, (15), 2718-2727, 2013.
Diehl et al., *Dalt. Trans.,* 46, 2988-2997, 2017.
Diehn et al., *Nature,* 458 (7239), 780-783, 2009.
Enomoto et al., *J. Am. Chem. Soc.,* 123, 5608-5609, 2001.
Eriksson et al., *Free Radic. Biol. Med.,* 47 (11), 1661-1671, 2009.
Fan et al., *Phys. Chem. Chem. Phys.,* 21:7429-7439, 2019.
Farkona et al., *BMC Med.,* 14 (1), 73, 2016.
Fernández et al., *J. Chem. Soc. Dalt. Trans.,* 1969-1981, 2007.
Ferwerda et al., *Proc. Natl. Acad. Sci.,* 104 (42), 16645-16650, 2007.
Gaillard et al., *Organometallics,* 29, 5402-5408, 2010.
Galanski et al., *Curr. Med. Chem.,* 12 (18), 2075-2094, 2005.
Ghosh and Brindisi, *J. Med. Chem.,* 2015, 58, 2895-2940.
Gorin and Toste, *Nature,* 446, 395-403, 2007.
Gorrini et al., *Nat. Rev. Drug Discov.,* 12 (12), 931-947, 2013.
Gromer et al., *Med. Res. Rev.,* 24 (1), 40-89, 2004.
Groves et al., *Dalt. Trans.,* 48:1599-1612, 2019.
Guo et al., *Organometallics,* 32, 3685-3696, 2013.
Haro and Nevado, *Angew. Chemie-Int. Ed.,* 50, 906-910, 2011.
Hashmi et al., *Angew. Chem., Int. Ed.,* 39, 2285-2288, 2000.
He et al., *Chem. Rev.,* 108, 3239-3265, 2008.
Hickey et al., *J. Am. Chem. Soc.,* 130 (38), 12570-12571, 2008.
Hill et al., *Inorg. Chem.,* 28 (1 1), 3529-3533, 1989.
Hillenmeyer et al., *Science* (80-.)., 320 (5874), 362 LP-365, 2008.
Hong et al., *Chem. Commun.,* 4332-4353, 2009.
Hopkins, *Nat. Chem. Biol.,* 4 (11), 682-690, 2008.
Hospital et al., *Dalt. Trans.,* 41, 6803-6812, 2012.
Ibrahim et al., *J. Chem. Soc. Dalt. Trans.,* 43, 6981-6989, 2014.
Ishizaki et al., *Phys. Chem. Chem. Phys.,* 12:7319-7337, 2010.
Kaufmann, *Nat. Rev. Drug Discov.,* 7 (5), 373, 2008.
Kepp et al., *Oncotarget,* 5 (14), 5190-5191, 2014.
Kim et al., *Clin. Cancer Res.,* 11 (23), 8425-8430, 2005.
Kimutai et al., *J. Biol. Inorg. Chem.,* 24:985-997, 2019.
Lazreg et al., *Organometallics,* 34, 419-425, 2015.
Le Joncour and Laakkonen, *Bioorganic Med. Chem.,* 26:2797-2806, 2018.
Lewe et al., *Chem. Commun.,* 54, 9498-9501, 2018.
Li et al., *Metallomics,* 6:1460-1468, 2014.
Lima and Rodríguez, *Chem. Soc. Rev.,* 40, 5442-5456. 2011.
Liu et al., *RSC Adv.,* 8:7280-7286, 2018.
Lu et al., *Proc. Natl. Acad. Soc.,* 104:12288-12293, 2007.
Mahoney et al., *Nat. Rev. Drug Discov.,* 14, 561, 2015.
Mamane et al., *J. Am. Chem. Soc.,* 126, 8654-8655, 2004.
Marion and Nolan, *Chem. Soc. Rev.,* 37, 1776-1782, 2008.
Marques et al., *J. Biomed. Sci.,* 24:1-15, 2017.
Marzano et al., *Free Radic. Biol. Med.,* 42:872-881, 2007.
Matzinger et al., *Science* (80-.)., 296 (5566), 301 LP-305, 2002.
McCall et al., *Chem. Sci.,* 8, 5918-5929, 2017.
Melendez, *Crit. Rev. Oncol. Hematol.,* 42, 309-315, 2002.
Mirabelli et al., *J. Med. Chem.,* 29 (2), 218-223, 1986.
Mirabelli et al., *Cancer Res.,* 45 (January), 32-39, 1985.
Mo et al., *Adv. Funct. Mater.,* 27, 170210, 2017.
Mora et al., *Chem. Soc. Rev.,* 48, 447-462, 2019.
Ni et al., *Chem. Commun. Organometallics* 47 32, 2140-2142 903-914, 2011.
Nieto-Oberhuber et al., *Angew. Chemie-Int. Ed.,* 43, 2402-2406, 2004.
Niu et al., *Angew. Chemie-Int. Ed.,* 55, 8889-8893, 2016.
Obeid et al., *Nat. Med.,* 13, 54, 2006.
Ooi et al., *Trends Genet.,* 22 (1), 56-63, 2017.

Porchia et al., *Eur. J. Med. Chem.*, 146:709-746, 2018.
Prühs et al., *Organometallics*, 23, 280-287, 2004.
Puddephatt, *Chem. Soc. Rev.*, 37, 2012-2027, 2008.
Raffel et al., *J. Lab. Clin. Med.*, 142 (1), 46-51, 2003.
Rijal et al., *Chem. Commun.*, 50:3918-3920, 2014.
Sancho et al., *J. Clin. Invest.* 118 (6), 2098-2110, 2008.
Sanz et al., *Organometallics*, 26, 952-957, 2007.
Savill and Fadok, *Nature*, 407, 784, 2000.
Schumacker, *Cancer Cell*, 10 (3), 175-176, 2017.
Sedgwick et al., *Chem. Soc. Rev.*, 47:8842-8880, 2018.
Sen et al., *Chem. Commun.*, 55:10627-10630, 2019.
Sessler and Miller, *Biochem. Pharmacol.*, 59 (7), 733-739, 2000.
Sharma and Allison, *Cell*, 161 (2), 205-214, 2015.
Sharma et al., *Nat. Rev. Cancer*, 11, 805, 2011.
Sittaramane et al., *ChemMedChem*, 10 (11), 1802-1807, 2015.
Sun et al., *Chem. Commun.*, 5514-5516, 2008.
Sun et al., *Bioorganic Med. Chem. Lett.*, 21:3798-3804, 2011.
Suntharalingam et al., *J. Am. Chem. Soc.*, 137 (8), 2967-2974, 2015.
Tacar et al., *J. Pharm. Pharmacol.*, 65:157-170, 2013.
Tallarida, Genes *Cancer*, 2 (11), 1003-1008, 2011.
Terenzi et al., *J. Inorg. Biochem.*, 165, 71-79, 2016.
Tesniere et al., *Oncogene*, 29, 482, 2009.
Timerbaev, *Metallomics*, 1 (3), 193-198, 2009.
Topalian et al., *J. Clin. Oncol.*, 29 (36), 4828-4836, 2011.
Trachootham et al., *Nat. Rev. Drug Discov.*, 8 (7), 579-591, 2009.
Vacondio et al., *PLOS One*, 10:1-24, 2015.
Valent et al., *J. Innate Immun.*, 8 (2), 111-120, 2016.
Viotte et al., *Inorg. Chim. Acta*, 253, 71-76, 1996.
Visbal et al., *Dalt. Trans.*, 45:15026-15033, 2016.
Witte et al., *Free Radic. Biol. Med.*, 39 (5), 696-703, 2005.
Wu et al., *Chem. Soc. Rev.*, 46:7105-7123, 2017.
Yam and Cheng, *Chem. Soc. Rev.*, 37, 1806-1813, 2008.
Zhang et al., *Trends Pharmacol. Sci.*, 38:794-808, 2017.
Zhang et al., *Biochimie*, 162:46-54, 2019.
Zhao and Butler, *Cell Death Dis.*, 4, e532, 2013.
Zhou et al., *SysteInt. J. Mol. Sci.*, 17 (2), 246, 2016.
Zou et al., *Angew. Chemie.-Int. Ed.*, 53:5810-5814, 2104.
Zou et al., *Chem. Soc. Rev.*, 44, 8786-8801, 2015.

What is claimed is:

1. A compound of the formula:

(I)

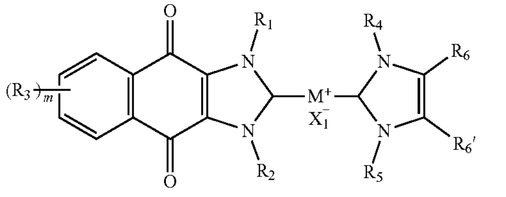

wherein:

M is an Au or Ag ion;

$R_1$ and $R_2$ are each independently alkyl$_{(C\leq 12)}$, cycloalkyl$_{(C\leq 12)}$, aryl$_{(C\leq 18)}$, aralkyl$_{(C\leq 18)}$, or a substituted version of any of these groups; or —$(CR_aR_b)C(O)Y_1$; wherein:

$Y_1$ is amino, hydroxy, alkoxy$_{(C\leq 8)}$, substituted alkoxy$_{(C\leq 8)}$, alkylamino$_{(C\leq 8)}$, substituted alkylamino$_{(C\leq 8)}$, dialkylamino$_{(C\leq 8)}$, or substituted dialkylamino$_{(C\leq 8)}$, and $R_a$ and $R_b$ are each independently the side chain of a canonical amino acid or alkyl$_{(C\leq 8)}$, cycloalkyl$_{(C\leq 8)}$, aryl$_{(C\leq 12)}$, aralkyl$_{(C\leq 12)}$, heteroaryl$_{(C\leq 12)}$, heteroaralkyl$_{(C\leq 12)}$, or a substituted version of these six groups; or a group of the formula: —$((CH_2)_qO)_nR_c$, wherein:

q is 1, 2, or 3;

n is 1-10; and $R_c$ is hydrogen, alkyl$_{(C\leq 8)}$, or substituted alkyl$_{(C\leq 8)}$, or a group of the formula: —$Y_{2A}$—$R_{7A}$, wherein:

$Y_{2A}$ is alkanediyl$_{(C\leq 12)}$, alkenediyl$_{(C\leq 12)}$, arenediyl$_{(C\leq 18)}$, heteroarenediyl$_{(C\leq 18)}$, or a substituted version thereof; and $R_{7A}$ is amino, carboxy, halo, hydroxy, mercapto, alkoxy$_{(C\leq 8)}$, substituted alkoxy$_{(C\leq 8)}$, alkylamino$_{(C\leq 8)}$, substituted alkylamino$_{(C\leq 8)}$, dialkylamino$_{(C\leq 8)}$, or substituted dialkylamino$_{(C\leq 8)}$, or —$X_{2A}C(O)R_{7A}'$; wherein:

$X_{2A}$ is a covalent bond, $NR_g$, or O, wherein:

$R_g$ is hydrogen, alkyl$_{(C\leq 6)}$, or substituted alkyl$_{(C\leq 6)}$;

$R_{7A}'$ is hydrazine, alkylhydrazine$_{(C\leq 12)}$, substituted alkylhydrazine$_{(C\leq 12)}$, heterocycloalkyl$_{(C\leq 12)}$, substituted heterocycloalkyl$_{(C\leq 12)}$, alkoxy$_{(C\leq 8)}$, substituted alkoxy$_{(C\leq 8)}$, cycloalkoxy$_{(C\leq 8)}$, substituted cycloalkoxy$_{(C\leq 8)}$, aryloxy$_{(C\leq 8)}$, substituted aryloxy$_{(C\leq 8)}$, aralkoxy$_{(C\leq 8)}$, substituted aralkoxy$_{(C\leq 8)}$, alkylamino$_{(C\leq 8)}$, substituted alkylamino$_{(C\leq 8)}$, dialkylamino$_{(C\leq 8)}$, substituted dialkylamino$_{(C\leq 8)}$, cycloalkylamino$_{(C\leq 8)}$, substituted cycloalkylamino$_{(C\leq 8)}$, arylamino$_{(C\leq 8)}$, substituted arylamino$_{(C\leq 8)}$, (alkyl)alkylamino$_{(C\leq 8)}$, substituted (alkyl)arylamino$_{(C\leq 8)}$, aralkylamino$_{(C\leq 8)}$, or substituted aralkylamino$_{(C\leq 8)}$;

$R_3$ is hydrogen, amino, cyano, halo, hydroxy, nitro, thio, or alkyl$_{(C\leq 12)}$, cycloalkyl$_{(C\leq 12)}$, aryl$_{(C\leq 12)}$, heteroaryl$_{(C\leq 12)}$, aralkyl$_{(C\leq 12)}$, heteroaralkyl$_{(C\leq 12)}$, acyl$_{(C\leq 12)}$, alkoxy$_{(C\leq 12)}$, alkylamino$_{(C\leq 12)}$, dialkylamino$_{(C\leq 12)}$, or a substituted version of any of these ten groups, or —$(O(CH_2)_r)_yZ_1$, wherein:

r is 1, 2, or 3;

y is 0-10; and $Z_1$ is hydroxy, alkoxy$_{(C\leq 6)}$, or substituted alkoxy$_{(C\leq 6)}$;

or two or more positions are substituted with $R_3$ and two of the $R_3$ groups are taken together and are alkanediyl$_{(C\leq 12)}$, alkenediyl$_{(C\leq 12)}$, arenediyl$_{(C\leq 18)}$, heteroarenediyl$_{(C\leq 18)}$, or a substituted version thereof;

$R_4$ and $R_5$ are each independently alkyl$_{(C\leq 12)}$, cycloalkyl$_{(C\leq 12)}$, aryl$_{(C\leq 18)}$, aralkyl$_{(C\leq 18)}$, or a substituted version of any of these groups; or —$(CR_dR_e)C(O)Y_{2B}$; wherein:

$Y_{2B}$ is amino, hydroxy, alkoxy$_{(C\leq 8)}$, substituted alkoxy$_{(C\leq 8)}$, alkylamino$_{(C\leq 8)}$, substituted alkylamino$_{(C\leq 8)}$, dialkylamino$_{(C\leq 8)}$, or substituted dialkylamino$_{(C\leq 8)}$, and $R_d$ and $R_e$ are each independently the side chain of a canonical amino acid or alkyl$_{(C\leq 8)}$, cycloalkyl$_{(C\leq 8)}$, aryl$_{(C\leq 12)}$, aralkyl$_{(C\leq 12)}$, heteroaryl$_{(C\leq 12)}$, heteroaralkyl$_{(C\leq 12)}$, or a substituted version of these six groups;

a group of the formula: —$((CH_2)_sO)_pR_f$, wherein:

s is 1, 2, or 3;

p is 1-10; or $R_f$ is hydrogen, alkyl$_{(C\leq8)}$, or substituted alkyl$_{(C\leq8)}$, or a group of the formula: —$Y_{2C}$—$R_{7C}$, wherein:

$Y_{2C}$ is alkanediyl$_{(C\leq12)}$, alkenediyl$_{(C\leq12)}$, arenediyl$_{(C\leq18)}$, heteroarenediyl$_{(C\leq18)}$, or a substituted version thereof; and $R_{7C}$ is amino, carboxy, halo, hydroxy, mercapto, alkoxy$_{(C\leq8)}$, substituted alkoxy$_{(C\leq8)}$, alkylamino$_{(C\leq8)}$, substituted alkylamino$_{(C\leq8)}$, dialkylamino$_{(C\leq8)}$, or substituted dialkylamino$_{(C\leq8)}$, or —C(O)$R_{7C}$'; wherein:

$R_{7C}$' is alkoxy$_{(C\leq8)}$, substituted alkoxy$_{(C\leq8)}$, alkylamino$_{(C\leq8)}$, substituted alkylamino$_{(C\leq8)}$, dialkylamino$_{(C\leq8)}$, or substituted dialkylamino$_{(C\leq8)}$;

$R_6$ and $R_6$' are each independently hydrogen, amino, cyano, halo, hydroxy, nitro, thio, or alkyl$_{(C\leq12)}$, cycloalkyl$_{(C\leq12)}$, aryl$_{(C\leq12)}$, heteroaryl$_{(C\leq12)}$, aralkyl$_{(C\leq12)}$, heteroaralkyl$_{(C\leq12)}$, acyl$_{(C\leq12)}$, alkoxy$_{(C\leq12)}$, alkylamino$_{(C\leq12)}$, dialkylamino$_{(C\leq12)}$, or a substituted version of any of these ten groups, or —$(O(CH_2)_t)_zZ_2$, wherein:

t is 1, 2, or 3;

z is 0-10; and $Z_2$ is hydroxy, alkoxy$_{(C\leq6)}$, or substituted alkoxy $_{(C\leq6)}$; or m is 1, 2, 3, or 4; and $X_1$ is an anionic species such that the charge on $X_1$ balances the net charge on the complex.

2. The compound of claim 1 further defined as:

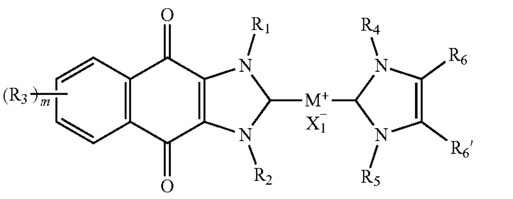

(I)

wherein:

M is an Au or Ag ion;

$R_1$ and $R_2$ are each independently alkyl$_{(C\leq12)}$, cycloalkyl$_{(C\leq12)}$, aryl$_{(C\leq18)}$, aralkyl$_{(C\leq18)}$, or a substituted version of any of these groups; or —$(CR_aR_b)C(O)Y_1$; wherein:

$Y_1$ is amino, hydroxy, alkoxy$_{(C\leq8)}$, substituted alkoxy$_{(C\leq8)}$, alkylamino$_{(C\leq8)}$, substituted alkylamino$_{(C\leq8)}$, dialkylamino$_{(C\leq8)}$, or substituted dialkylamino$_{(C\leq8)}$, and $R_a$ and $R_b$ are each independently the side chain of a canonical amino acid or alkyl$_{(C\leq8)}$, cycloalkyl$_{(C\leq8)}$, aryl$_{(C\leq12)}$, aralkyl$_{(C\leq12)}$, heteroaryl$_{(C\leq12)}$, heteroaralkyl$_{(C\leq12)}$, or a substituted version of these six groups; or a group of the formula: —$((CH_2)_qO)_nR_c$, wherein:

q is 1, 2, or 3;

n is 1-10; and $R_c$ is hydrogen, alkyl$_{(C\leq8)}$, or substituted alkyl$_{(C\leq8)}$, or a group of the formula: —$Y_{2A}$—$R_{7A}$, wherein:

$Y_{2A}$ is alkanediyl$_{(C\leq12)}$, alkenediyl$_{(C\leq12)}$, arenediyl$_{(C\leq18)}$, heteroarenediyl$_{(C\leq18)}$, or a substituted version thereof; and $R_{7A}$ is amino, carboxy, halo, hydroxy, mercapto, alkoxy$_{(C\leq8)}$, substituted alkoxy$_{(C\leq8)}$, alkylamino$_{(C\leq8)}$, substituted alkylamino$_{(C\leq8)}$, dialkylamino$_{(C\leq8)}$, or substituted dialkylamino$_{(C\leq8)}$, or —C(O)$R_{7A}$'; wherein:

$R_{7A}$' is alkoxy$_{(C\leq8)}$, substituted alkoxy$_{(C\leq8)}$, alkylamino$_{(C\leq8)}$, substituted alkylamino$_{(C\leq8)}$, dialkylamino$_{(C\leq8)}$, or substituted dialkylamino$_{(C\leq8)}$;

$R_3$ is hydrogen, amino, cyano, halo, hydroxy, nitro, thio, or alkyl$_{(C\leq12)}$, cycloalkyl$_{(C\leq12)}$, aryl$_{(C\leq12)}$, heteroaryl$_{(C\leq12)}$, aralkyl$_{(C\leq12)}$, heteroaralkyl$_{(C\leq12)}$, acyl$_{(C\leq12)}$, alkoxy$_{(C\leq12)}$, alkylamino$_{(C\leq12)}$, dialkylamino$_{(C\leq12)}$, or a substituted version of any of these ten groups, or —$(O(CH_2)_r)_yZ_1$, wherein:

r is 1, 2, or 3;

y is 0-10; and $Z_1$ is hydroxy, alkoxy$_{(C\leq6)}$, or substituted alkoxy$_{(C\leq6)}$;

or two or more positions are substituted with $R_3$ and two of the $R_3$ groups are taken together and are alkanediyl$_{(C\leq12)}$, alkenediyl$_{(C\leq12)}$, arenediyl$_{(C\leq18)}$, heteroarenediyl$_{(C\leq18)}$, or a substituted version thereof;

$R_4$ and $R_5$ are each independently alkyl$_{(C\leq12)}$, cycloalkyl$_{(C\leq12)}$, aryl$_{(C\leq18)}$, aralkyl$_{(C\leq18)}$, or a substituted version of any of these groups; or —$(CR_dR_e)C(O)Y_{2B}$; wherein:

$Y_{2B}$ is amino, hydroxy, alkoxy$_{(C\leq8)}$, substituted alkoxy$_{(C\leq8)}$, alkylamino$_{(C\leq8)}$, substituted alkylamino$_{(C\leq8)}$, dialkylamino$_{(C\leq8)}$, or substituted dialkylamino$_{(C\leq8)}$, and $R_d$ and $R_e$ are each independently the side chain of a canonical amino acid or alkyl$_{(C\leq8)}$, cycloalkyl$_{(C\leq8)}$, aryl$_{(C\leq12)}$, aralkyl$_{(C\leq12)}$, heteroaryl$_{(C\leq12)}$, heteroaralkyl$_{(C\leq12)}$, or a substituted version of these six groups;

a group of the formula: —$((CH_2)_sO)_pR_f$, wherein:

s is 1, 2, or 3;

p is 1-10; or $R_f$ is hydrogen, alkyl$_{(C\leq8)}$, or substituted alkyl$_{(C\leq8)}$, or a group of the formula: —$Y_{2C}$—$R_{7C}$, wherein:

$Y_{2C}$ is alkanediyl$_{(C\leq12)}$, alkenediyl$_{(C\leq12)}$, arenediyl$_{(C\leq18)}$, heteroarenediyl$_{(C\leq18)}$, or a substituted version thereof; and $R_{7C}$ is amino, carboxy, halo, hydroxy, mercapto, alkoxy$_{(C\leq8)}$, substituted alkoxy$_{(C\leq8)}$, alkylamino$_{(C\leq8)}$, substituted alkylamino$_{(C\leq8)}$, dialkylamino$_{(C\leq8)}$, or substituted dialkylamino$_{(C\leq8)}$, or —C(O)$R_{7C}$'; wherein:

$R_{7C}$' is alkoxy$_{(C\leq8)}$, substituted alkoxy$_{(C\leq8)}$, alkylamino$_{(C\leq8)}$, substituted alkylamino$_{(C\leq8)}$, dialkylamino$_{(C\leq8)}$, or substituted dialkylamino$_{(C\leq8)}$;

$R_6$ and $R_6$' are each independently hydrogen, amino, cyano, halo, hydroxy, nitro, thio, or alkyl$_{(C\leq12)}$, cycloalkyl$_{(C\leq12)}$, aryl$_{(C\leq12)}$, heteroaryl$_{(C\leq12)}$, aralkyl$_{(C\leq12)}$, heteroaralkyl$_{(C\leq12)}$, acyl$_{(C\leq12)}$, alkoxy$_{(C\leq12)}$, alkylamino$_{(C\leq12)}$, dialkylamino$_{(C\leq12)}$, or a substituted version of any of these ten groups, or —$(O(CH_2)_1)_zZ_2$, wherein:

t is 1, 2, or 3;

z is 0-10; and $Z_2$ is hydroxy, alkoxy$_{(C\leq6)}$, or substituted alkoxy$_{(C\leq6)}$; or m is 1, 2, 3, or 4; and $X_1$ is an anionic species such that the charge on $X_1$ balances the net charge on the complex.

3. The compound of claim 1 further defined as:

(II)

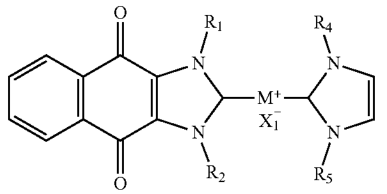

wherein:

M is an Au or Ag ion;

$R_1$ and $R_2$ are each independently alkyl$_{(C\le 12)}$, cycloalkyl$_{(C\le 12)}$, aryl$_{(C\le 18)}$, aralkyl$_{(C\le 18)}$, or a substituted version of any of these groups; or —$(CR_aR_b)C(O)Y_1$; wherein:

$Y_1$ is amino, hydroxy, alkoxy$_{(C\le 8)}$, substituted alkoxy$_{(C\le 8)}$, alkylamino$_{(C\le 8)}$, substituted alkylamino$_{(C\le 8)}$, dialkylamino$_{(C\le 8)}$, or substituted dialkylamino$_{(C\le 8)}$, and $R_a$ and $R_b$ are each independently the side chain of a canonical amino acid or alkyl$_{(C\le 8)}$, cycloalkyl$_{(C\le 8)}$, aryl$_{(C\le 12)}$, aralkyl$_{(C\le 12)}$, heteroaryl$_{(C\le 12)}$, heteroaralkyl$_{(C\le 12)}$, or a substituted version of these six groups; or a group of the formula: —$((CH_2)_qO)_nR_c$, wherein:

q is 1, 2, or 3;

n is 1-10; and $R_c$ is hydrogen, alkyl$_{(C\le 8)}$, or substituted alkyl$_{(C\le 8)}$, or a group of the formula: —$Y_{2A}$—$R_{7A}$, wherein:

$Y_{2A}$ is alkanediyl$_{(C\le 12)}$, alkenediyl$_{(C\le 12)}$, arenediyl$_{(C\le 18)}$, heteroarenediyl$_{(C\le 18)}$, or a substituted version thereof; and $R_{7A}$ is amino, carboxy, halo, hydroxy, mercapto, alkoxy$_{(C\le 8)}$, substituted alkoxy$_{(C\le 8)}$, alkylamino$_{(C\le 8)}$, substituted alkylamino$_{(C\le 8)}$, dialkylamino$_{(C\le 8)}$, or substituted dialkylamino$_{(C\le 8)}$, or —$X_{2A}C(O)R_{7A}'$; wherein:

$X_{2A}$ is a covalent bond, $NR_g$, or O, wherein:

$R_g$ is hydrogen, alkyl$_{(C\le 6)}$, or substituted alkyl$_{(C\le 6)}$;

$R_{7A}'$ is hydrazine, alkylhydrazine$_{(C\le 12)}$, substituted alkylhydrazine$_{(C\le 12)}$, heterocycloalkyl$_{(C\le 12)}$, substituted heterocycloalkyl$_{(C\le 12)}$, alkoxy$_{(C\le 8)}$, substituted alkoxy$_{(C\le 8)}$, cycloalkoxy$_{(C\le 8)}$, substituted cycloalkoxy$_{(C\le 8)}$, aryloxy$_{(C\le 8)}$, substituted aryloxy$_{(C\le 8)}$, aralkoxy$_{(C\le 8)}$, substituted aralkoxy$_{(C\le 8)}$, alkylamino$_{(C\le 8)}$, substituted alkylamino$_{(C\le 8)}$, dialkylamino$_{(C\le 8)}$, substituted dialkylamino$_{(C\le 8)}$, cycloalkylamino$_{(C\le 8)}$, substituted cycloalkylamino$_{(C\le 8)}$, arylamino$_{(C\le 8)}$, substituted arylamino$_{(C\le 8)}$, (alkyl)alkylamino$_{(C\le 8)}$, substituted (alkyl)arylamino$_{(C\le 8)}$, aralkylamino$_{(C\le 8)}$, or substituted aralkylamino$_{(C\le 8)}$;

$R_4$ and $R_5$ are each independently alkyl$_{(C\le 12)}$, cycloalkyl$_{(C\le 12)}$, aryl$_{(C\le 18)}$, aralkyl$_{(C\le 18)}$, or a substituted version of any of these groups; or —$(CR_dR_e)C(O)Y_{2B}$; wherein:

$Y_{2B}$ is amino, hydroxy, alkoxy$_{(C\le 8)}$, substituted alkoxy$_{(C\le 8)}$, alkylamino$_{(C\le 8)}$, substituted alkylamino$_{(C\le 8)}$, dialkylamino$_{(C\le 8)}$, or substituted dialkylamino$_{(C\le 8)}$, and $R_d$ and $R_e$ are each independently the side chain of a canonical amino acid or alkyl$_{(C\le 8)}$, cycloalkyl$_{(C\le 8)}$, aryl$_{(C\le 12)}$, aralkyl$_{(C\le 12)}$, heteroaryl$_{(C\le 12)}$, heteroaralkyl$_{(C\le 12)}$, or a substituted version of these six groups;

a group of the formula: —$((CH_2)_sO)_pR_f$, wherein:

s is 1, 2, or 3;

p is 1-10; or $R_f$ is hydrogen, alkyl$_{(C\le 8)}$, or substituted alkyl(8), or a group of the formula: —$Y_{2C}$—$R_{7C}$, wherein:

$Y_{2C}$ is alkanediyl$_{(C\le 12)}$, alkenediyl$_{(C\le 12)}$, arenediyl$_{(C\le 18)}$, heteroarenediyl$_{(C\le 18)}$, or a substituted version thereof; and $R_{7C}$ is amino, carboxy, halo, hydroxy, mercapto, alkoxy$_{(C\le 8)}$, substituted alkoxy$_{(C\le 8)}$, alkylamino$_{(C\le 8)}$, substituted alkylamino$_{(C\le 8)}$, dialkylamino$_{(C\le 8)}$, or substituted dialkylamino$_{(C\le 8)}$, or —$C(O)R_{7C}'$; wherein:

$R_{7C}'$ is alkoxy$_{(C\le 8)}$, substituted alkoxy$_{(C\le 8)}$, alkylamino$_{(C\le 8)}$, substituted alkylamino$_{(C\le 8)}$, dialkylamino$_{(C\le 8)}$, or substituted dialkylamino$_{(C\le 8)}$; and $X_1$ is an anionic species such that the charge on $X_1$ balances the net charge on the complex.

4. The compound of claim 1, wherein M is an Au ion.

5. The compound of claim 1, wherein $X_1$ is $Cl^-$.

6. The compound of claim 1, wherein $R_1$ and/or $R_2$ is aryl$_{(C\le 18)}$ or substituted aryl$_{(C\le 18)}$.

7. The compound of claim 1, wherein two positions are substituted with $R_3$ and the $R_3$ groups are taken together and are alkenediyl$_{(C\le 12)}$ or substituted alkenediyl$_{(C\le 12)}$.

8. The compound of claim 1, wherein at least one of $R_4$ or $R_5$ is a group of the formula: —$Y_{2C}$—$R_{7C}$.

9. The compound of claim 1, wherein $R_4$ is alkyl$_{(C\le 12)}$, substituted alkyl$_{(C\le 12)}$, aryl$_{(C\le 18)}$, substituted aryl$_{(C\le 18)}$, or —$Y_{2C}$—$R_{7C}$.

10. The compound of claim 1, wherein $R_5$ is alkyl$_{(C\le 12)}$, substituted alkyl$_{(C\le 12)}$, aryl$_{(C\le 18)}$, substituted aryl$_{(C\le 18)}$, or —$Y_{2C}$—$R_{7C}$.

11. The compound of claim 1, wherein the compound is further defined as a cation of the formula:

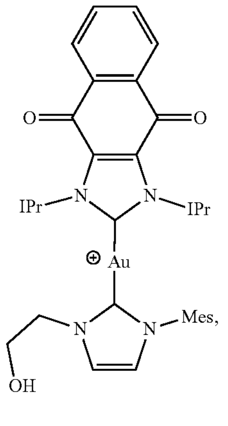

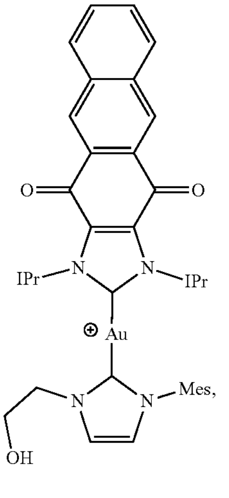

-continued
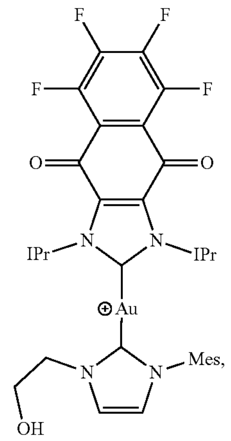
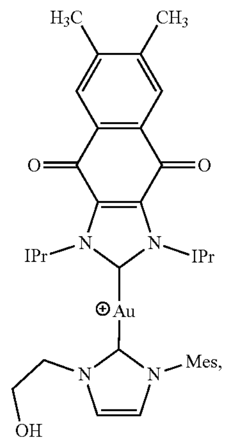
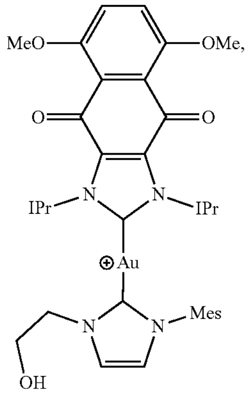
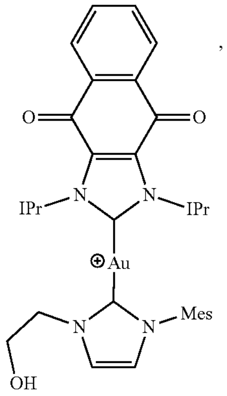
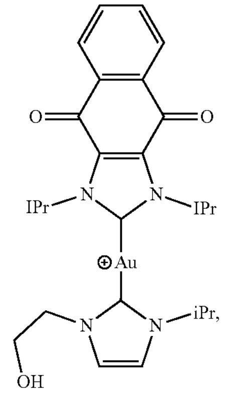
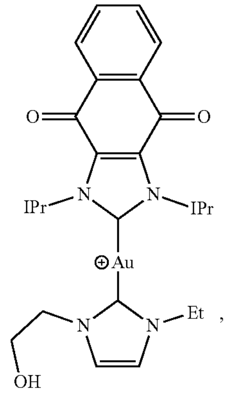
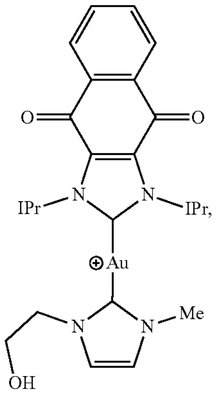
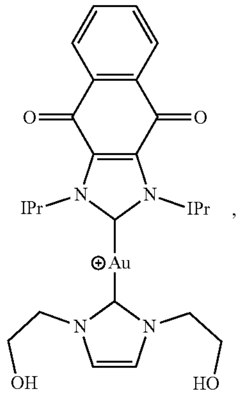
-continued
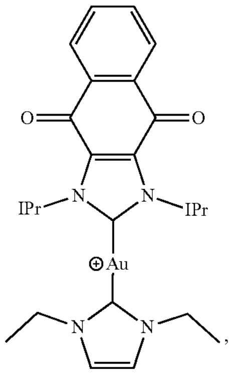
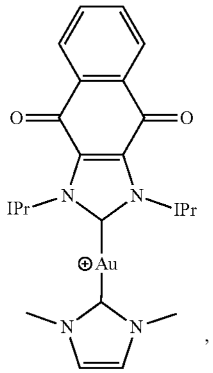
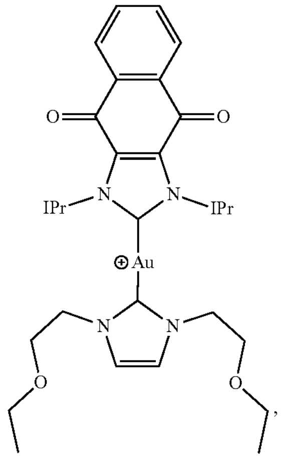
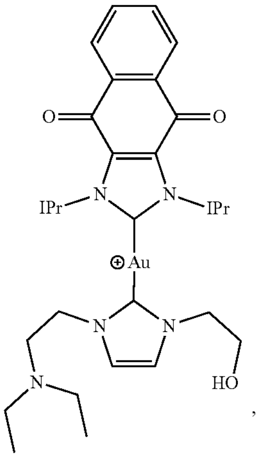
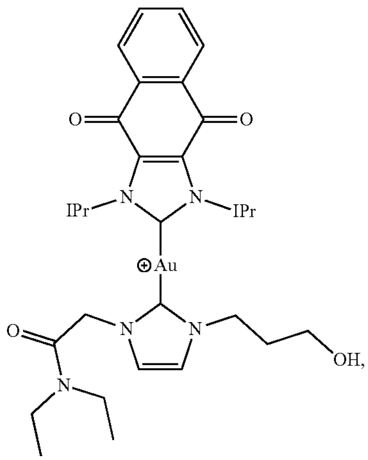

-continued

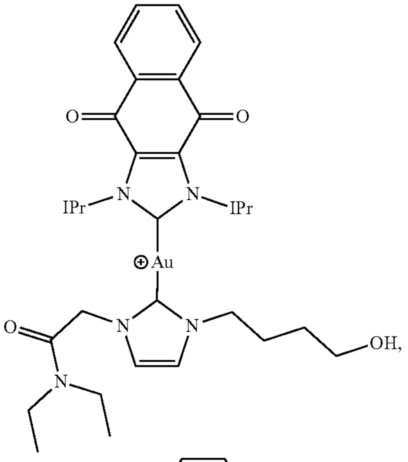

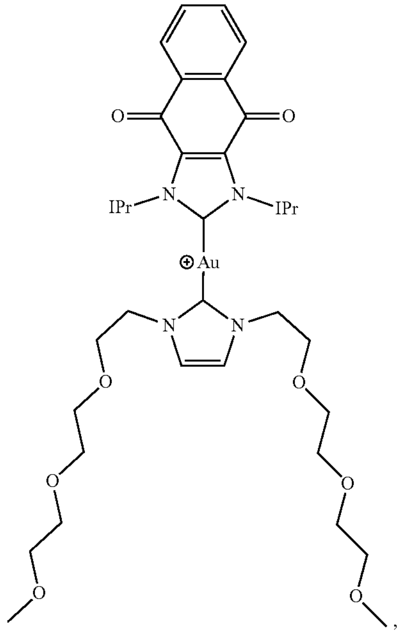

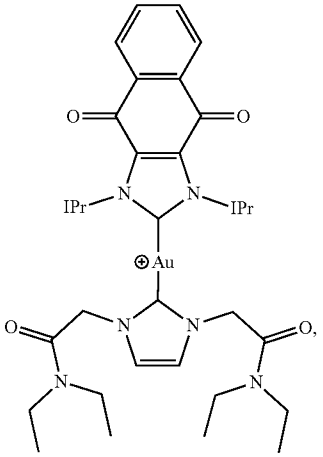

or

-continued

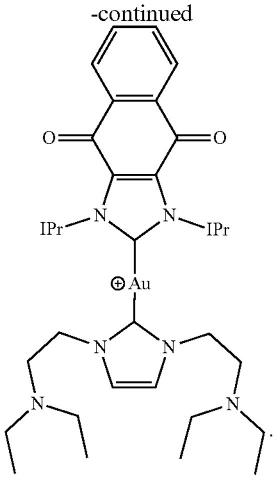

12. The compound of claim 11, wherein the compound is further defined as a halide salt.

13. The compound of claim 11, wherein the compound is further defined as a cation of the formula:

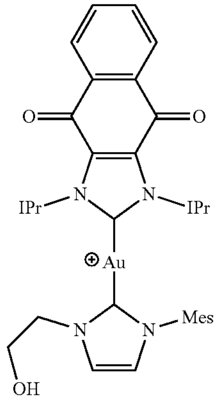

or a halide salt thereof.

14. A pharmaceutical composition comprising:

(A) a compound of claim 1; and (B) an excipient.

15. A method of treating a disease or disorder, wherein the disease or disorder is a parasitic infection or a cancer selected from ovarian cancer, lung cancer, or colon cancer in a patient comprising administering to the patient in need thereof a therapeutically effective amount of a compound or composition of claim 1.

16. The method of claim 15, wherein the disease or disorder is lung, colon, or ovarian cancer.

17. A method of treating cancer, wherein the cancer is ovarian cancer, lung cancer, or colon cancer, in a patient comprising administering a therapeutically effective amount of a composition of claim 1 to the patient.

* * * * *